США012544079B2

United States Patent
VanDyken et al.

(10) Patent No.: US 12,544,079 B2
(45) Date of Patent: Feb. 10, 2026

(54) ROBOTIC HAND-HELD SURGICAL INSTRUMENT SYSTEMS AND METHODS

(71) Applicant: MAKO Surgical Corp., Weston, FL (US)

(72) Inventors: Benjamin VanDyken, Plainwell, MI (US); Phillip Lindeman, Kalamazoo, MI (US); David E. Hershberger, Kalamazoo, MI (US); Dustin James Payne, Kalamazoo, MI (US); Gregory Daniel Arens, Kalamazoo, MI (US)

(73) Assignee: MAKO Surgical Corp., Weston, FL (US)

( * ) Notice: Subject to any disclaimer, the term of this patent is extended or adjusted under 35 U.S.C. 154(b) by 200 days.

(21) Appl. No.: 18/262,110

(22) PCT Filed: Jan. 20, 2022

(86) PCT No.: PCT/US2022/013108
§ 371 (c)(1),
(2) Date: Jul. 19, 2023

(87) PCT Pub. No.: WO2022/159568
PCT Pub. Date: Jul. 28, 2022

(65) Prior Publication Data
US 2024/0108358 A1    Apr. 4, 2024

Related U.S. Application Data

(60) Provisional application No. 63/139,628, filed on Jan. 20, 2021.

(51) Int. Cl.
*A61B 17/14*    (2006.01)
*A61B 34/30*    (2016.01)
*A61B 90/00*    (2016.01)

(52) U.S. Cl.
CPC ............ *A61B 17/142* (2016.11); *A61B 34/30* (2016.02); *A61B 90/03* (2016.02); *A61B 2090/034* (2016.02)

(58) Field of Classification Search
CPC .................. A61B 17/14; A61B 17/142; A61B 2034/2051; A61B 2034/2055;
(Continued)

(56) References Cited

U.S. PATENT DOCUMENTS

| 5,305,203 A | 4/1994 | Raab |
| 5,411,514 A | 5/1995 | Fucci et al. |

(Continued)

FOREIGN PATENT DOCUMENTS

| DE | 102011056927 A1 | 6/2013 |
| EP | 1103229 A2 | 5/2001 |

(Continued)

OTHER PUBLICATIONS

English language abstract and machine-assisted English translation for DE 10 2011 056 927 A1 extracted from espacenet.com database on Aug. 3, 2022, 19 pages.

(Continued)

*Primary Examiner* — Samuel S Hanna
(74) *Attorney, Agent, or Firm* — Howard & Howard Attorneys PLLC

(57) ABSTRACT

A system is provided comprising a robotic instrument for use with a tool. In some versions, the robotic instrument comprises a hand-held portion to be held by a user and a tool support movably coupled to the hand-held portion to support the tool. The robotic instrument further includes an actuator assembly operatively attached to the tool support and the hand-held portion and configured to move the tool support relative to the hand-held portion in a plurality of degrees of freedom. The robotic instrument may includes a handle (Continued)

alignment member extending from the hand-held portion. At least a portion of the handle alignment member and a tool plane defined by the tool are aligned when the tool support has an optimal range of motion relative to the hand-held portion.

19 Claims, 55 Drawing Sheets

(58) Field of Classification Search
CPC .... A61B 2034/2057; A61B 2090/3937; A61B 2090/3941; A61B 34/20
See application file for complete search history.

(56) References Cited

U.S. PATENT DOCUMENTS

| | | | |
|---|---|---|---|
| 5,766,199 | A | 6/1998 | Heisler et al. |
| 7,035,716 | B2 | 4/2006 | Harris et al. |
| 7,302,288 | B1 | 11/2007 | Schellengberg |
| 7,422,582 | B2 | 9/2008 | Malackowski et al. |
| 7,660,623 | B2 | 2/2010 | Hunter et al. |
| 8,388,541 | B2 | 3/2013 | Messerly et al. |
| 8,560,047 | B2 | 10/2013 | Haider et al. |
| 8,617,174 | B2 | 12/2013 | Axelson, Jr. et al. |
| 8,734,432 | B2 | 5/2014 | Tuma et al. |
| 8,858,455 | B2 | 10/2014 | Rothenberg |
| 8,876,830 | B2 | 11/2014 | Hodorek et al. |
| 8,898,043 | B2 | 11/2014 | Ashby et al. |
| 8,903,546 | B2 | 12/2014 | Diolaiti et al. |
| 9,008,757 | B2 | 4/2015 | Wu |
| 9,060,794 | B2 | 6/2015 | Kang et al. |
| 9,114,494 | B1 | 8/2015 | Mah |
| 9,554,812 | B2 | 1/2017 | Inkpen et al. |
| 9,707,043 | B2 | 7/2017 | Bozung |
| 9,820,753 | B2 | 11/2017 | Walen et al. |
| 10,070,849 | B2 | 9/2018 | Marczyk |
| 10,080,617 | B2 | 9/2018 | Haider et al. |
| 10,136,950 | B2 | 11/2018 | Schoenefeld |
| 10,335,237 | B2 | 7/2019 | Christian et al. |
| 10,350,014 | B2 | 7/2019 | Beelen et al. |
| 10,368,878 | B2 | 8/2019 | Lavallee et al. |
| 10,441,294 | B2 | 10/2019 | Lavallee et al. |
| 10,492,870 | B2 | 12/2019 | Shalayev et al. |
| 10,500,005 | B2 | 12/2019 | Weir et al. |
| 10,687,823 | B2 | 6/2020 | Mac an Tuile et al. |
| 11,185,378 | B2 | 11/2021 | Weir et al. |
| 11,284,946 | B2 | 3/2022 | Shalayev et al. |
| 11,389,304 | B1 | 7/2022 | Nikou |
| 11,457,980 | B2 | 10/2022 | Bonny et al. |
| 2005/0020909 | A1 | 1/2005 | Moctezuma de la Barrera et al. |
| 2008/0302226 | A1 | 12/2008 | Fischer |
| 2013/0060278 | A1 | 3/2013 | Bozung et al. |
| 2014/0107471 | A1 | 4/2014 | Haider et al. |
| 2016/0022374 | A1 | 1/2016 | Haider |
| 2016/0113720 | A1* | 4/2016 | Lavallee ................ A61B 17/15 901/9 |
| 2017/0007327 | A1 | 1/2017 | Haider et al. |
| 2017/0156799 | A1 | 6/2017 | Bozung |
| 2017/0281280 | A1 | 10/2017 | Haider et al. |
| 2018/0055517 | A1 | 3/2018 | Kang et al. |
| 2018/0142401 | A1 | 5/2018 | Deshpande |
| 2018/0280159 | A1 | 10/2018 | Hunter et al. |
| 2018/0333207 | A1 | 11/2018 | Moctezuma De la Barrera |
| 2018/0344409 | A1 | 12/2018 | Bonny et al. |
| 2018/0353245 | A1 | 12/2018 | Mccloud et al. |
| 2019/0083179 | A1 | 3/2019 | Kheradpir et al. |
| 2019/0090959 | A1 | 3/2019 | Haider et al. |
| 2019/0223957 | A1 | 7/2019 | Dekel et al. |
| 2019/0388099 | A1 | 12/2019 | Zuhars et al. |
| 2020/0069373 | A1 | 3/2020 | Yu et al. |
| 2020/0069377 | A1 | 3/2020 | Finley et al. |
| 2022/0249107 | A1 | 8/2022 | Bonny et al. |
| 2022/0265376 | A1 | 8/2022 | Bonny et al. |
| 2022/0265377 | A1 | 8/2022 | Bonny et al. |
| 2022/0323162 | A1 | 10/2022 | Bonny et al. |
| 2022/0323163 | A1 | 10/2022 | Bonny et al. |
| 2023/0068121 | A1 | 3/2023 | Lindeman et al. |

FOREIGN PATENT DOCUMENTS

| | | | |
|---|---|---|---|
| EP | 2716252 | B1 | 12/2015 |
| EP | 3007637 | B1 | 11/2017 |
| WO | 2017091380 | A1 | 6/2017 |
| WO | 2018104439 | A1 | 6/2018 |
| WO | 2018175172 | A1 | 9/2018 |
| WO | 2019219348 | A1 | 11/2019 |
| WO | 2020236814 | A1 | 11/2020 |
| WO | 2021011646 | A2 | 1/2021 |
| WO | 2022055980 | A1 | 3/2022 |

OTHER PUBLICATIONS

International Search Report for Application No. PCT/US2021/014205 dated May 10, 2021, 5 pages.
International Search Report for Application No. PCT/US2022/013108 dated Jun. 29, 2022, 2 pages.
Partal International Search Report for Application No. PCT/US2022/013108 dated May 2, 2022, 2 pages.

* cited by examiner

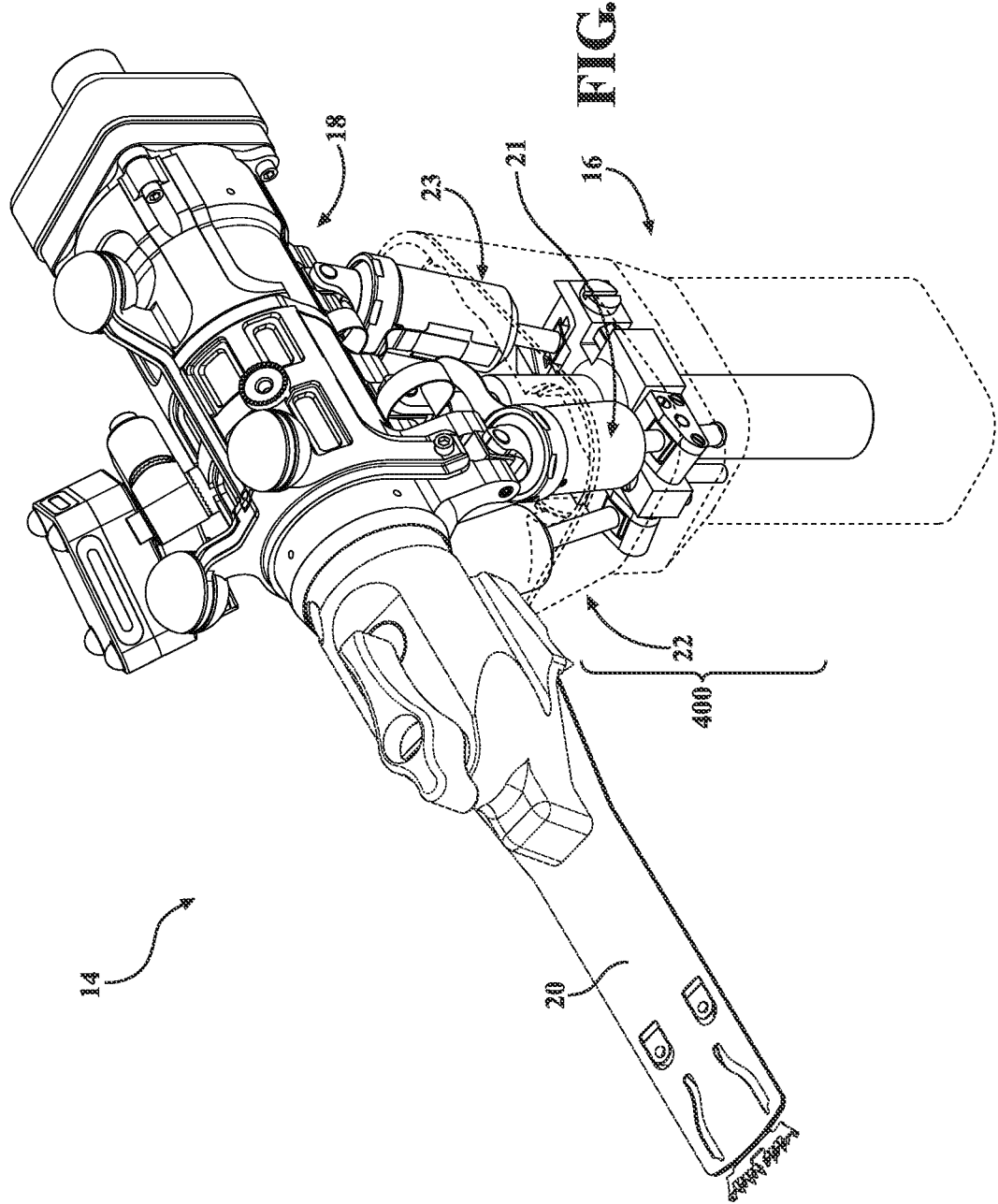

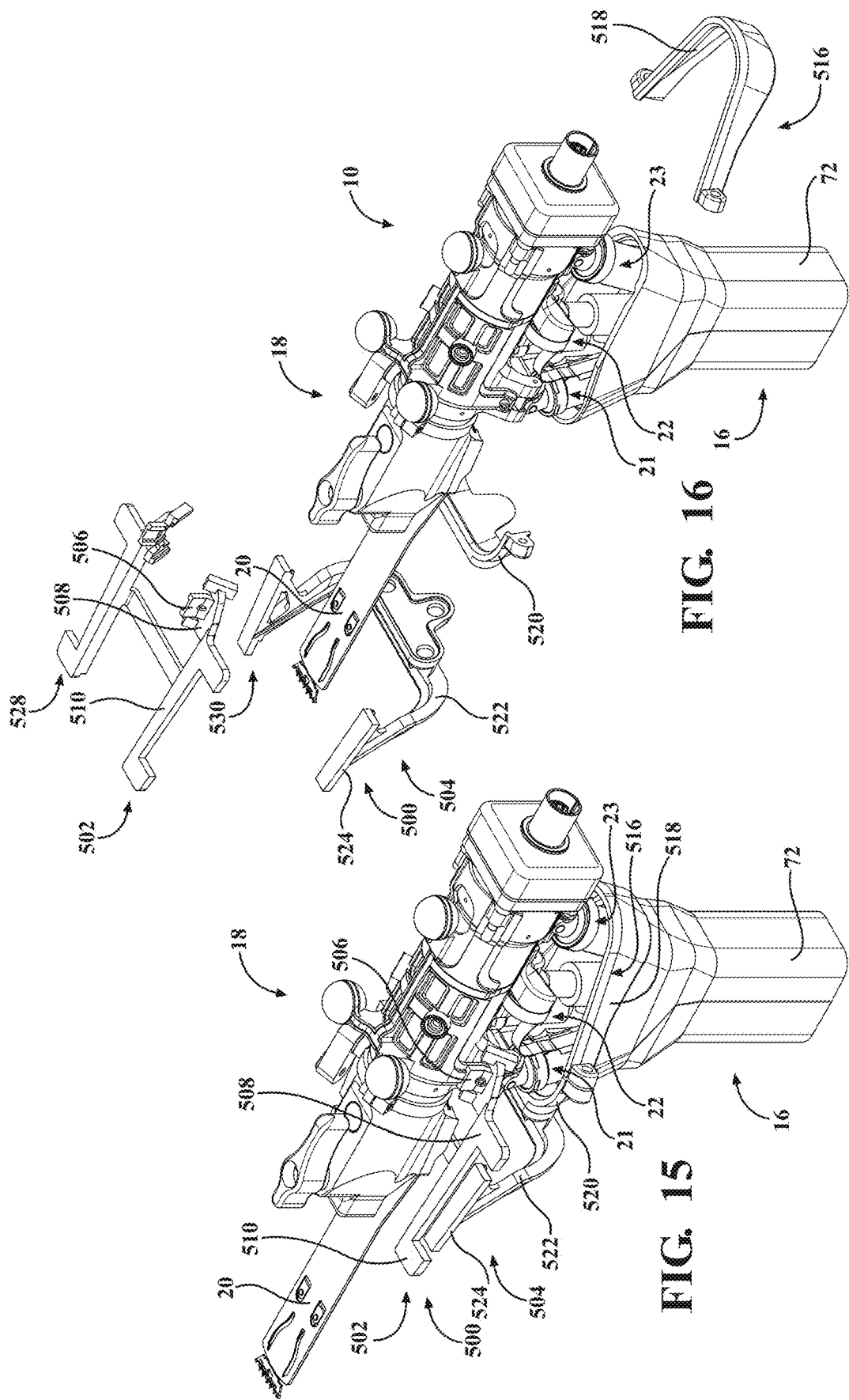

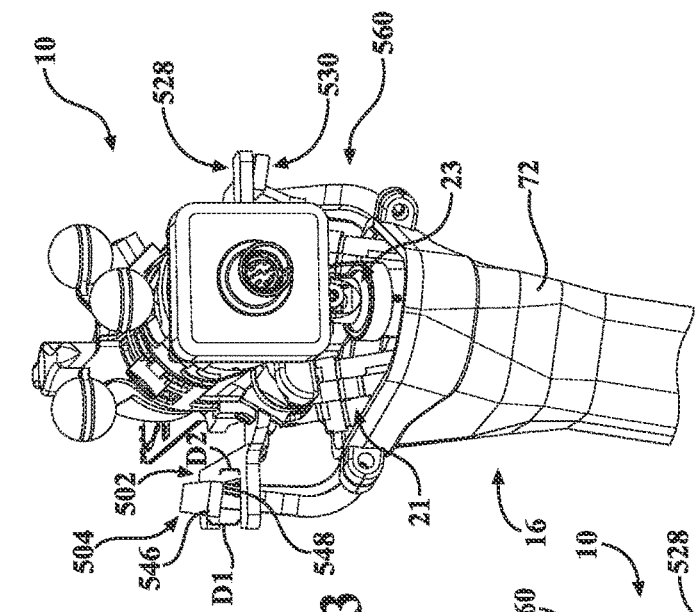
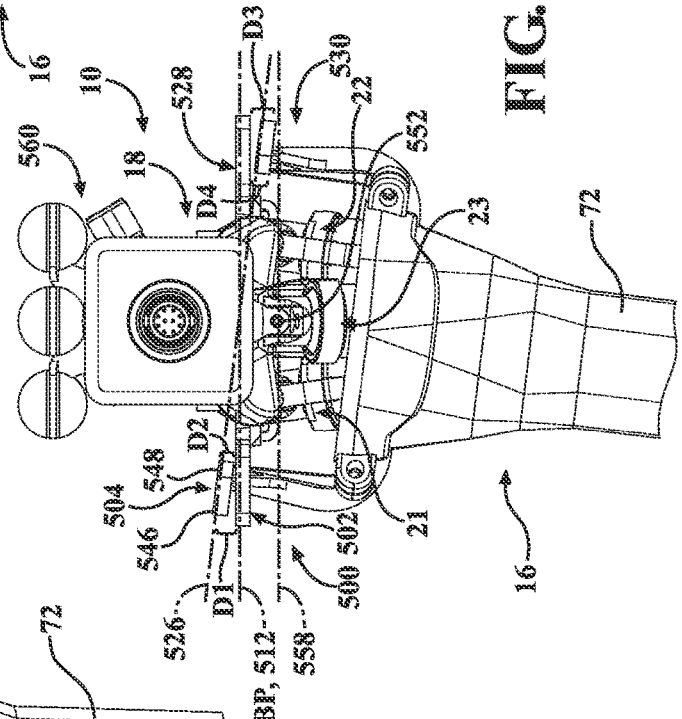
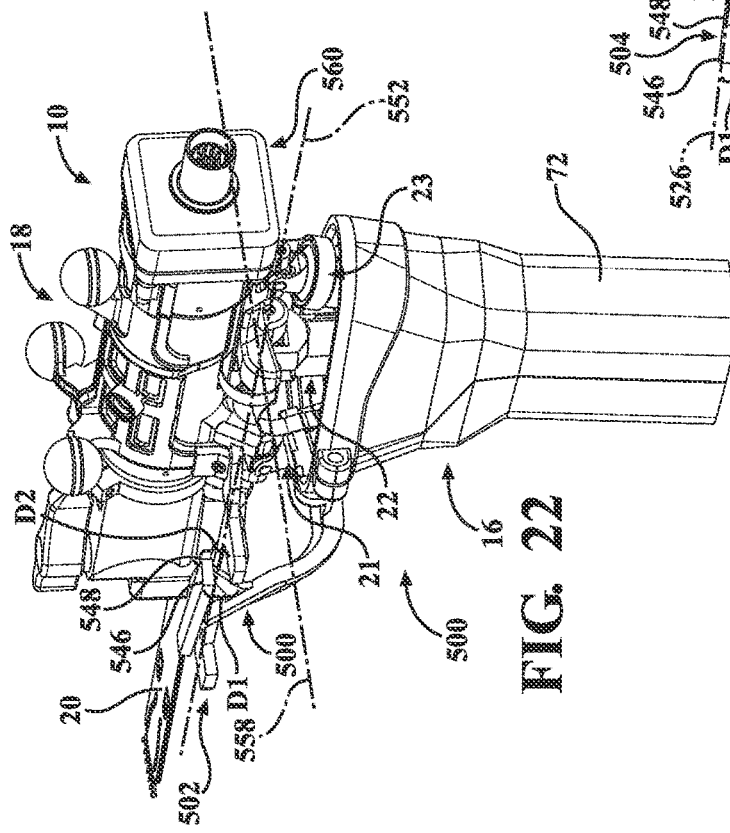

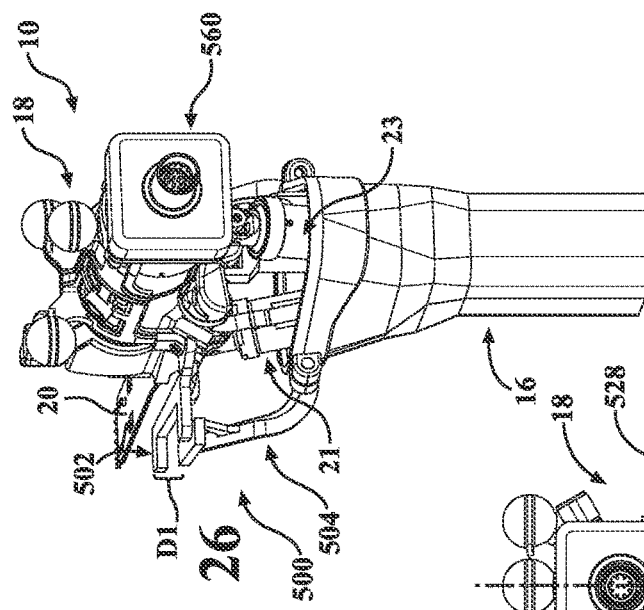
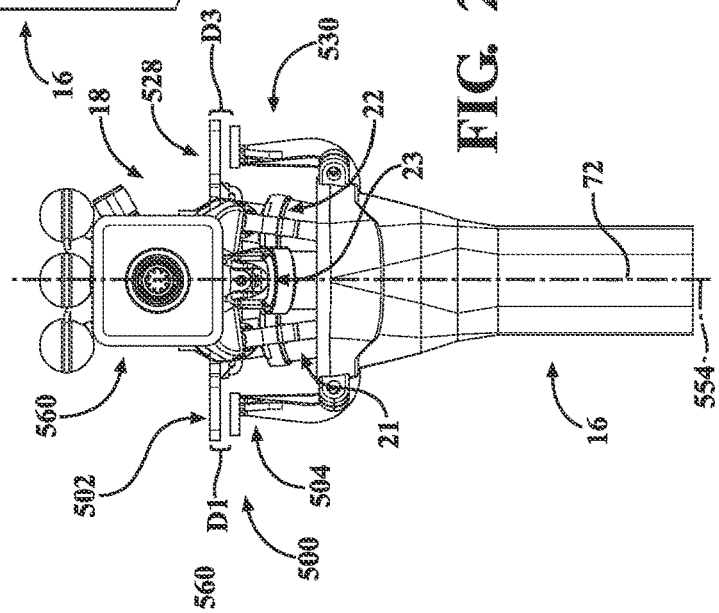
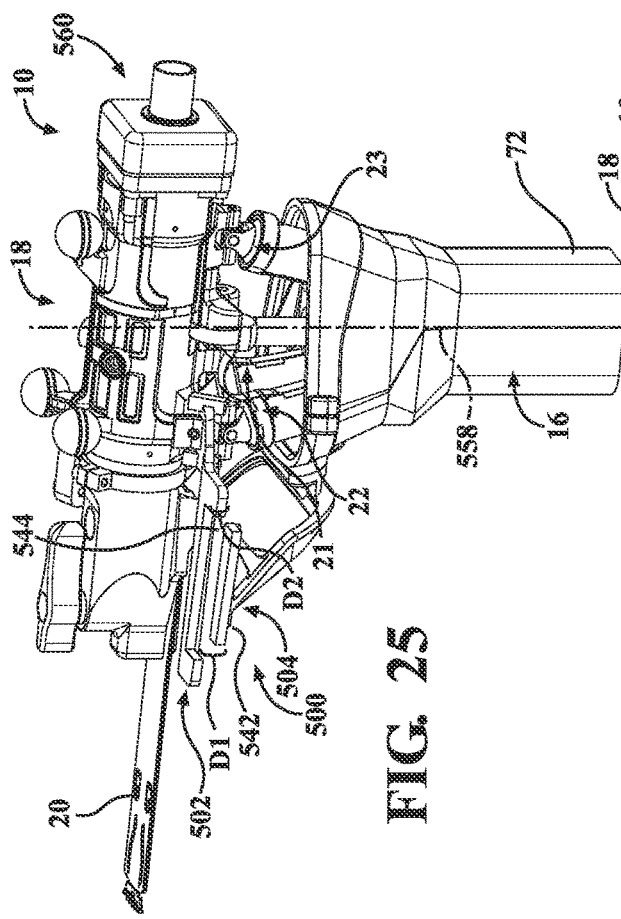
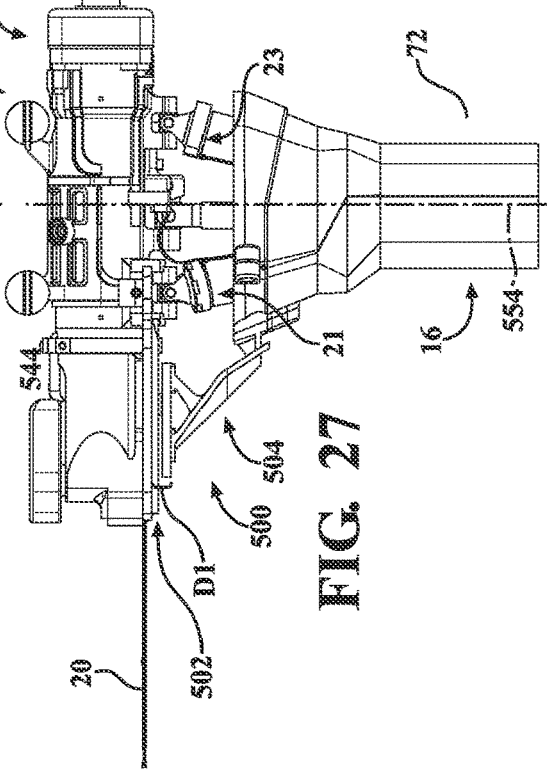
FIG. 25
FIG. 26
FIG. 27
FIG. 28

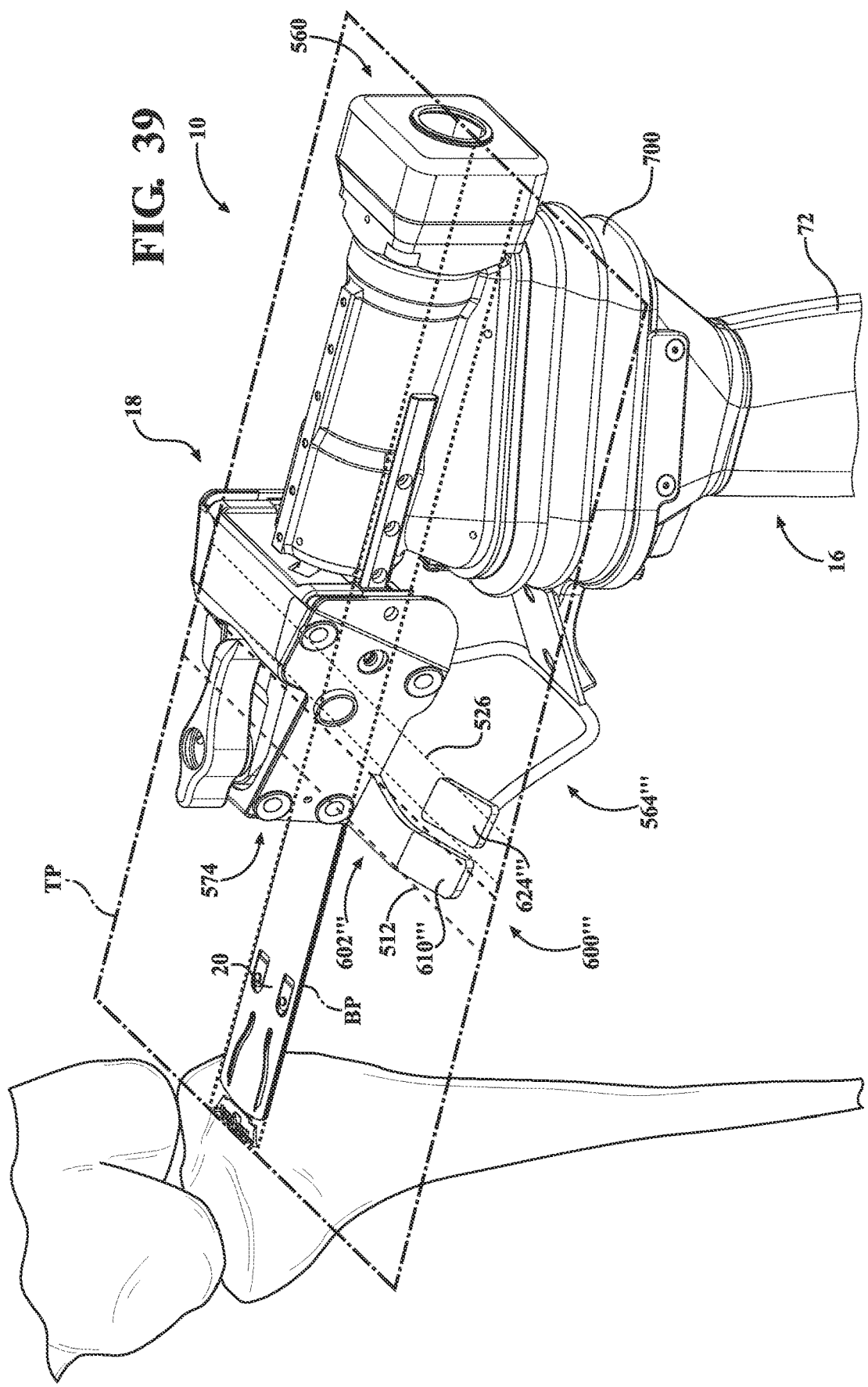

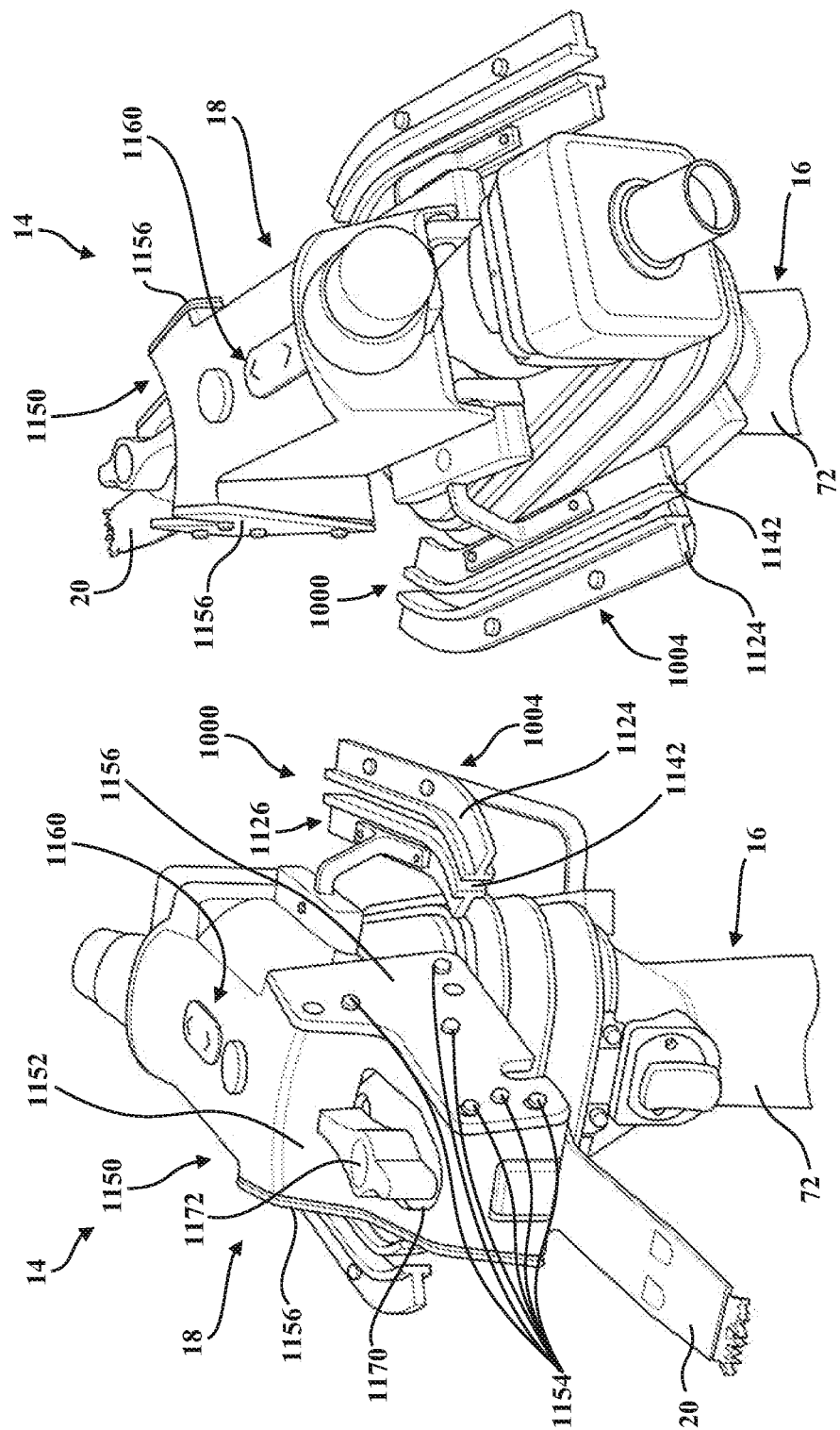

ROBOTIC HAND-HELD SURGICAL INSTRUMENT SYSTEMS AND METHODS

CROSS-REFERENCE TO RELATED APPLICATIONS

The present application is a National Stage of International Patent Application No. PCT/US2022/013108, filed on Jan. 20, 2022, which claims priority to and all the benefits of U.S. Provisional Patent Application No. 63/139,628, filed on Jan. 20, 2021, the entire contents of which are hereby expressly incorporated herein by reference.

TECHNICAL FIELD

The present disclosure relates generally to surgical robotic hand-held instrument systems and methods of use.

BACKGROUND

Physical cutting guides are used to constrain surgical tools when resecting tissue from a patient. In some cases, physical cutting guides constrain such surgical tools for the purpose of preparing joints to accept replacement implants. The time required to position and secure a physical cutting guide to the patient can represent a significant portion of the overall time required to perform a surgical procedure.

Navigation systems (also referred to as tracking systems) can be used to properly align and secure jigs, as well as track a position and/or orientation of a surgical tool used to resect tissue from a patient. Tracking systems typically employ one or more trackers associated with the tool and the tissue being resected. A display can then be viewed by a user to determine a current position of the tool relative to a desired cut path of tissue to be removed. The display may be arranged in a manner that requires the user to look away from the tissue and surgical site to visualize the tool's progress. This can distract the user from focusing on the surgical site. Also, it may be difficult for the user to place the tool in a desired manner.

Robotically assisted surgery typically relies on large robots with robotic arms that can move in six degrees of freedom (DOF). These large robots may be cumbersome to operate and maneuver in the operating room.

Further, robotic hand-held surgical instruments which use actuators to align a tool with a desired target object have a limited range of adjustability. Thus, an operator is required to hold these instruments within a certain distance and/or angle of the desired target object to allow the instrument to align with the desired target object. However, it is difficult for an operator to perceive how much adjustability the instrument has at a given moment during a procedure.

Accordingly, there is a need for systems and methods to address one or more of these challenges.

SUMMARY

One aspect of the present disclosure includes a hand-held surgical robotic system. The hand-held surgical robotic system includes a hand-held portion, a blade support movably coupled to the hand-held portion and including a blade mount defining a blade plane, a saw blade removably coupled to the blade support and disposed in the blade plane. The saw blade defines a longitudinal axis and a lateral axis. The hand-held surgical robotic system also includes an actuator assembly operatively attached to the blade support and the hand-held portion. The actuator assembly is configured to move the blade support relative to the hand-held portion in a plurality of degrees of freedom. The hand-held surgical robotic system further includes a handle alignment member extending from the hand-held portion. The handle alignment member includes a handle alignment projection extending toward the blade mount, where at least a portion of the handle alignment projection is oblique relative to the longitudinal axis and the lateral axis of the saw blade, and the portion of the handle alignment projection and the blade plane are aligned when the blade support has an optimal range of motion relative to the hand-held portion.

The actuator assembly includes a plurality of actuators, with each of the plurality of actuators are configured to move between a first position and a second position to move the blade support relative to the hand-held portion. A home position may be a midpoint between the first position and the second position of each of the plurality of actuators, and the blade support has the optimal range of motion when at least two of the plurality of actuators are at their home position.

The blade plane and the handle alignment projection may be misaligned when the hand-held portion is in a pose that does not provide the optimal range of motion, providing visual indication that the hand-held portion is in a pose that does not provide the blade support with the optimal range of motion.

The actuator assembly is configured to adjust at least one of a pitch, an elevation, and a roll of the blade support relative to the hand-held portion. A first spatial arrangement of the handle alignment projection relative to the blade plane may provide visual indication of at least one of a first pitch relationship, a first elevation relationship, and a first roll relationship of the blade support relative to the hand-held portion. Accordingly, the first spatial arrangement provides visual indication that the handle alignment projection and the blade plane are aligned, and the blade support has the optimal range of motion relative to the hand-held portion. A second spatial arrangement of the handle alignment projection relative to the blade plane provides visual indication of at least one of a second pitch relationship, a second elevation relationship, and a second roll relationship of the blade support relative to the hand-held portion. Accordingly, the second spatial arrangement provides visual indication that the hand-held portion is in a pose relative to the blade support that does not provide the blade support with the optimal range of motion.

The first spatial arrangement may provide visual indication of the first pitch relationship of the blade support relative to the hand-held portion, and the second spatial arrangement may provide visual indication of the second pitch relationship of the blade support relative to the hand-held portion. When the actuator pitches the blade support relative to the hand-held portion, the second pitch relationship provides visual indication of the pitch of the blade support relative to the hand-held portion, where a first portion of the handle alignment projection is further from the blade plane than a second portion of the handle alignment projection along the longitudinal axis in a direction of the pitch.

The first spatial arrangement may also provide visual indication of the first elevation relationship of the blade support relative to the hand-held portion, and the second spatial arrangement may also provide visual indication of the second elevation relationship of the blade support relative to the hand-held portion. Accordingly, the second elevation relationship provides visual indication of the elevation of the blade support relative to the hand-held portion, where the handle alignment projection is at least partially above or below the blade plane in a direction of the elevation.

The first spatial arrangement may further provide visual indication of the first roll relationship of the blade support relative to the hand-held portion, and the second spatial arrangement may further provide visual indication of the second roll relationship of the blade support relative to the hand-held portion. Accordingly, the second roll relationship provides visual indication of the roll of the blade support relative to the hand-held portion, where a lateral portion of the handle alignment projection is further from the blade plane than a medial portion of the handle alignment projection in a direction of the roll.

The hand-held surgical robotic system further may include a second handle alignment member extending from the hand-held portion at a separate location from the first handle alignment member, the second handle alignment member including a second handle alignment projection extending toward the blade mount, where at least a portion of the second handle alignment projection is oblique relative to the longitudinal axis and the lateral axis of the saw blade. Similar to above, the first handle alignment projection and the second handle alignment projection are aligned with the blade plane when the blade support has the optimal range of motion relative to the hand-held portion.

The hand-held surgical robotic system further may also further include a tool alignment member extending from the blade support. The tool alignment member includes a tool alignment projection extending toward the blade mount, wherein at least a portion of the tool alignment projection is oblique relative to the longitudinal axis and the lateral axis of the saw blade. The tool alignment projection may define a tool alignment edge, and the handle alignment member defines a handle alignment edge that is oblique relative to the longitudinal axis and the lateral axis of the saw blade. The tool alignment edge may be defined such that the tool alignment edge is offset from and parallel to the handle alignment edge when the blade support is aligned with the hand-held portion. The tool alignment projection and the handle alignment projection may be misaligned when the hand-held portion is in a pose that does not provide the optimal range of motion, providing visual indication that the hand-held portion is in a pose that does not provide the blade support with the optimal range of motion.

The handle alignment projection and the tool alignment projection may include a first visual indicia and a second visual indicia, the first visual indicia being visually distinguishable from the second visual indicia. The first visual indicia of the handle alignment projection and the first visual indicia of the tool alignment projection may be aligned when the tool alignment projection and the handle alignment projection are aligned, providing visual indication that the blade support has the optimal range of motion relative to the hand-held portion. The first visual indicia of the handle alignment projection and the first visual indicia of the tool alignment projection may be misaligned when the tool alignment projection and the handle alignment projection are misaligned, providing visual indication that the hand-held portion is in a pose that does not provide the blade support with the optimal range of motion. The first visual indicia may be a first color, and the second visual indicia is a second color.

Another aspect of the present disclosure includes a hand-held surgical robotic system for supporting a saw blade. The hand-held surgical robotic system includes a hand-held portion, a tool support movably coupled to the hand-held portion and defining a tool support plane, and an actuator assembly operatively attached to the tool support and the hand-held portion. The actuator assembly is configured to move the tool support relative to the hand-held portion in a plurality of degrees of freedom. The hand-held surgical robotic system further includes a handle alignment member extending from the hand-held portion, the handle alignment member including a handle hook-shaped portion. The handle hook-shaped portion and the tool support plane are aligned when the tool support has an optimal range of motion relative to the hand-held portion.

Yet another aspect of the present disclosure includes a hand-held surgical robotic system. The hand-held surgical robotic system includes a hand-held portion, a tool support movably coupled to the hand-held portion and defining a tool support plane, and a tool removably coupled to the tool support. The tool defines a longitudinal axis and a lateral axis. The hand-held surgical robotic system also includes an actuator assembly operatively attached to the tool support and the hand-held portion. The actuator assembly is configured to move the tool support relative to the hand-held portion in a plurality of degrees of freedom. The hand-held surgical robotic system further includes a handle alignment member extending from the hand-held portion, the handle alignment member including a handle alignment projection extending toward the tool support, where at least a portion of the handle alignment projection is arranged at an angle of greater than 0 degrees and less than 90 degrees relative to the longitudinal axis; where the portion of the handle alignment projection and the tool support plane are aligned when the tool support has an optimal range of motion relative to the hand-held portion.

A still another aspect of the present disclosure includes a hand-held surgical robotic system for supporting a tool. The hand-held surgical robotic system includes a hand-held portion, and a tool support movably coupled to the hand-held portion. The tool support is configured to support a tool defining a tool plane. The hand-held surgical robotic system also includes an actuator assembly operatively attached to the tool support and the hand-held portion. The actuator assembly is configured to move the tool support relative to the hand-held portion in a plurality of degrees of freedom. The hand-held surgical robotic system further includes a handle alignment member extending from the hand-held portion. The handle alignment member includes a handle support arm extending between a first handle support arm end and a second handle support arm end. The handle support arm includes a handle coupling portion coupled to the first handle support arm end and removably coupled to the hand-held portion. The handle alignment member also includes a handle alignment member mount coupled to the second handle support arm end, and a handle alignment indication member coupled to the handle alignment member mount. The handle coupling portion may include a handle coupling member configured to couple to a corresponding coupling member disposed on the hand-held portion to couple the handle alignment member to the hand-held portion.

A further aspect of the present disclosure includes a mechanical alignment apparatus configured to be used with a hand-held surgical robotic system for providing visual indication of a pose of a hand-held portion of the hand-held surgical robotic system relative to a tool support of the hand-held surgical robotic system. The mechanical alignment apparatus includes a support arm extending between a first support arm end and a second support arm end. The support arm includes a coupling portion coupled to the first support arm end and configured to be removably coupled to one of the hand-held portion and the tool support of the hand-held surgical robotic system. The mechanical alignment apparatus also includes an alignment member mount coupled to the second support arm end, and an alignment indication member coupled to the alignment member mount.

An additional aspect of the present disclosure includes a hand-held surgical robotic system for supporting a saw blade. The hand-held surgical robotic system also includes a hand-held portion. The system also includes a blade support movably coupled to the hand-held portion. The blade support is configured to support a saw blade. The system also includes an actuator assembly operatively attached to the blade support and the hand-held portion. The actuator assembly is configured to move the blade support relative to the hand-held portion in a plurality of degrees of freedom. The system also includes a tool alignment member coupled to and extending from the blade support, and a handle alignment member coupled to and extending from the hand-held portion, where at least a portion of the tool alignment member and at least a portion of the handle alignment member are aligned when the blade support has a desired range of motion relative to the hand-held portion.

Another aspect of the present disclosure includes a hand-held robotic system for supporting a saw blade. The hand-held robotic system also includes a hand-held portion. The system also includes a blade support movably coupled to the hand-held portion to support the saw blade. The system also includes an actuator assembly operatively attached to the blade support and the hand-held portion. The actuator assembly is configured to move the blade support relative to the hand-held portion in a plurality of degrees of freedom. The system also includes a first tool alignment member and a second tool alignment member coupled to and extending on both sides from the blade support. The system also includes a first handle alignment member and a second handle alignment member coupled to and extending from the hand-held portion, where the first tool alignment member and the second tool alignment member are aligned with the first handle alignment member and the second handle alignment member, respectively, when the blade support has a desired range of motion relative to the hand-held portion.

Yet another aspect of the present disclosure includes a visual indication system for use with a hand-held robotic system. The visual indication system includes a shroud coupled to and extending between the blade support and the hand-held portion such that the shroud surrounds at least one of the plurality of actuators. The shroud defines at least two shroud landmarks configured to displace relative to each other when the blade support and the hand-held portion are misaligned to each other to provide visual indication of a pose of the blade support relative to the hand-held portion.

A further aspect of the present disclosure includes a hand-held robotic system for supporting a saw blade. The hand-held robotic system includes a hand-held portion and a blade support movably coupled to the hand-held portion to support the saw blade. The system also includes a plurality of actuators operatively interconnecting the blade support and the hand-held portion and configured to move the blade support relative to the hand-held portion in a plurality of degrees of freedom. The system also includes a light source on the blade support. The system also includes a first tool alignment member and a second tool alignment member coupled to and extending on both sides from the blade support. The system also includes a first handle alignment member and a second handle alignment member coupled to and extending from the hand-held portion. The first tool alignment member and the second tool alignment member are aligned with the first handle alignment member and the second handle alignment member, respectively, when the blade support has a desired range of motion relative to the hand-held portion. The light source is illuminated when the blade support has the desired range of motion to indicate that the blade support and the hand-held portion are within a designated range of alignment with a cutting plane.

Another further aspect of the present disclosure includes a hand-held surgical robotic system for supporting a saw blade. The hand-held surgical robotic system includes a hand-held portion. The system also includes a blade support movably coupled to the hand-held portion. The blade support is configured to support a saw blade. The system also includes a plurality of actuators operatively interconnecting the blade support and the hand-held portion, the plurality of actuators configured to move the blade support relative to the hand-held portion in a plurality of degrees of freedom. The system further includes a tool alignment member coupled to and extending from the blade support and a handle alignment member coupled to and extending from the hand-held portion, where the handle alignment member is removably connected with the hand-held portion.

An additional aspect of the present disclosure includes surgical system for treating an anatomical structure according to a plurality of target planes. The surgical system includes an instrument including a saw blade, a hand-held portion, an actuator system may include a plurality of actuators, and a blade support to support the saw and move the saw. The plurality of actuators extend between the blade support and a hand-held portion, and the blade support may include a saw drive motor coupled to a saw mount. The system also includes a navigation system and a tracker for being coupled to the blade support, the tracker being configured to determine a current tool plane and including a tracker frame at least six optical markers coupled to the tracker frame. The tracker frame including at least two faces, the at least two faces being non-planar with one another, with at least three of the at least three to six optical markers being coupled to each of the at least two faces. The system also includes a control system in communication with the navigation system and the tracker, the control system configured to control the actuator system to align the current tool plane with at least one of a plurality of target planes.

Another additional aspect of the present disclosure includes a surgical method of controlling a surgical system including a hand-held robotic instrument, a saw blade, a hand-held portion, an actuator system including a plurality of actuators, and a blade support to support the saw and move the saw. The surgical method includes determining the current tool plane with the tool tracker and the navigation system, selecting with an input device on the tracker one of the plurality of target planes, and adjusting the tool support with the plurality of actuators to place the current plane in line with the selected target plane. The controlling also includes selecting with the input device a different one of the plurality of target planes.

A final aspect of the present disclosure includes a surgical instrument tracker for tracking a surgical saw. The surgical instrument tracker includes a tracker frame defining an instrument engaging aperture for receiving a proximal portion of the saw, the saw tracker frame including a mount. The tracker also includes at least six optical markers coupled to the tracker frame, the tracker frame including at least two faces, the at least two faces being non-planar with one another, with at least three of the at least three to six optical markers being coupled to each of the at least two faces. The tracker frame at least partially surrounds an accessory mount when the mount of the saw tracker is coupled to the accessory mount.

A BRIEF DESCRIPTION OF THE DRAWINGS

Advantages of the present disclosure will be readily appreciated as the same becomes better understood by reference to the following detailed description when considered in connection with the accompanying drawings.

FIG. 6 is a front perspective view of the robotic instrument illustrating one particular pose of a tool support relative to a hand-held portion.

Figure 11:
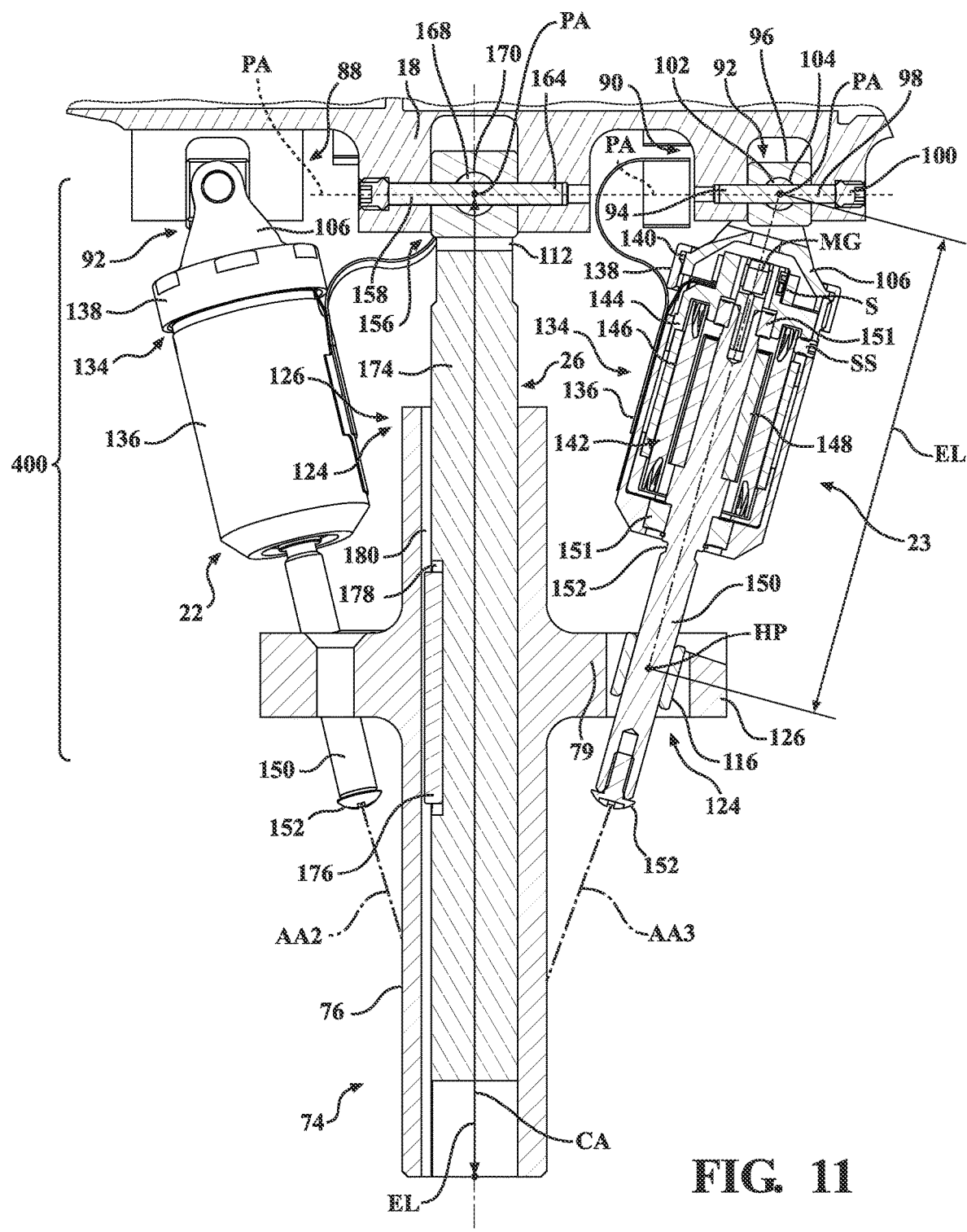

FIG. 11 a partial cross-sectional view of the robotic instrument

Figure 12:
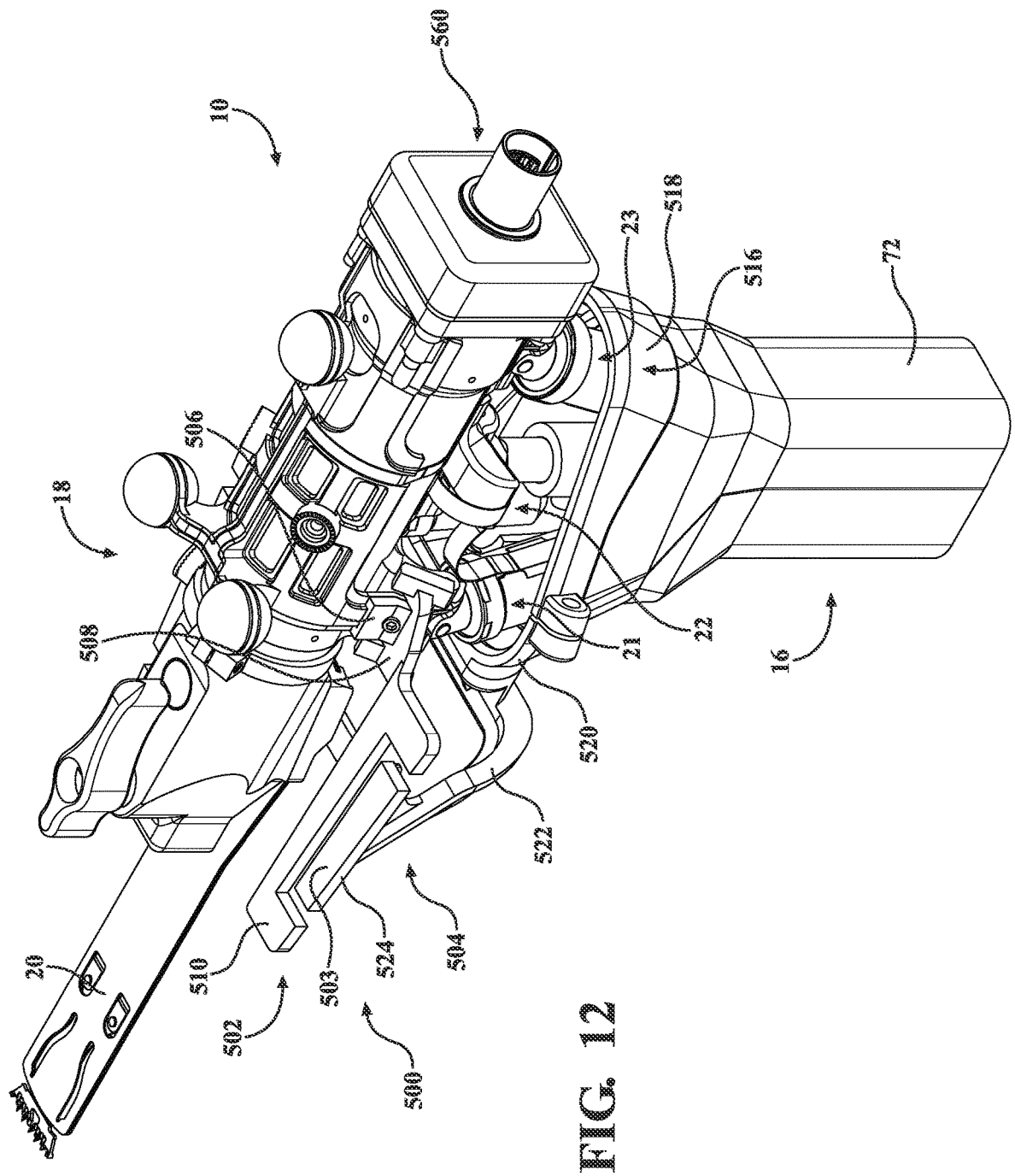

FIG. 12 is a rear perspective view of the robotic instrument including a guidance array.

Figure 13:
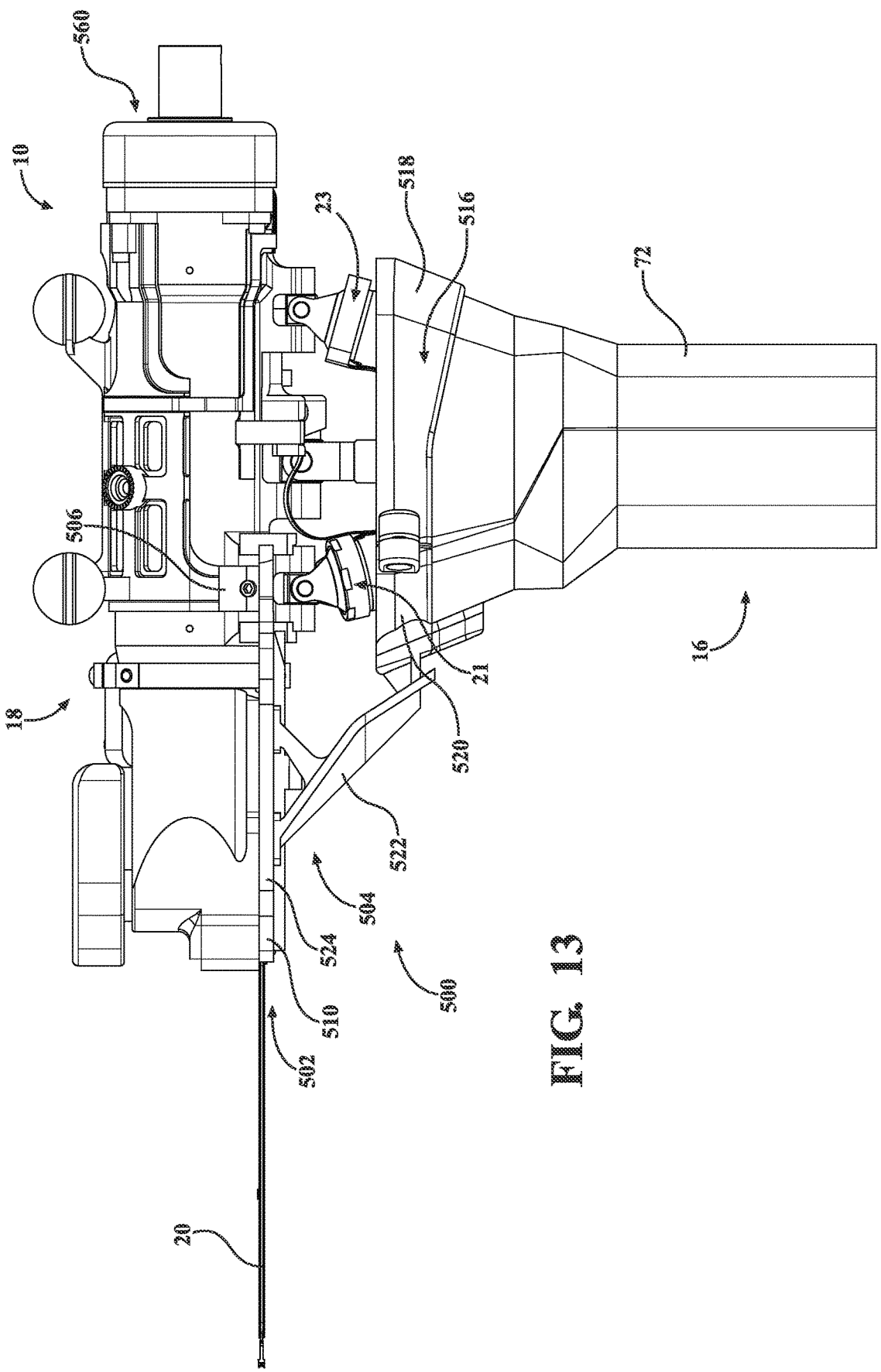

FIG. 13 is a side view of the robotic instrument including the guidance array of FIG. 12.

Figure 14:
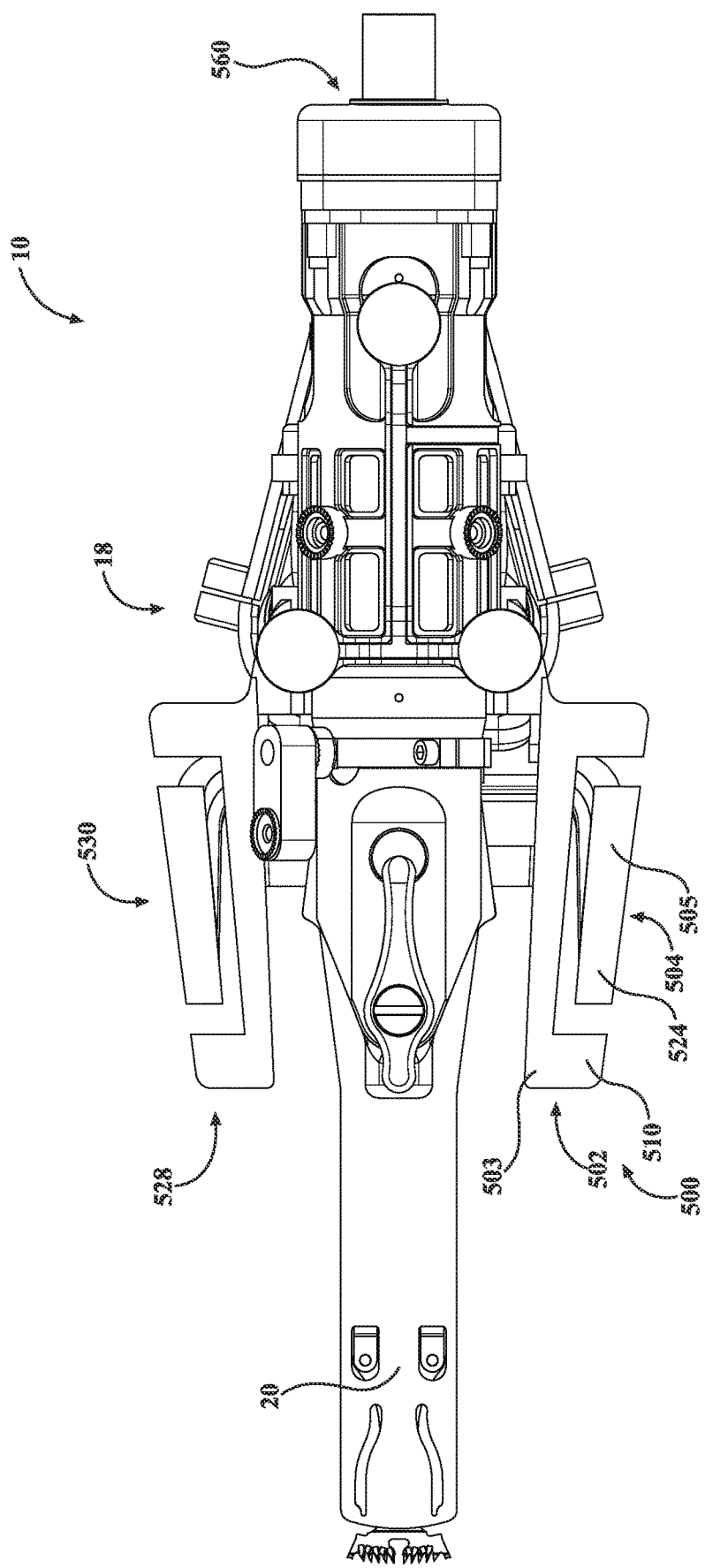

FIG. 14 is a top view of the robotic instrument including the guidance array of FIG. 12.

FIG. 15 is another rear perspective view of the robotic instrument including the guidance array of FIG. 12.

FIG. 16 is an exploded rear perspective view of the robotic instrument including the guidance array of FIG. 12.

Figure 17:
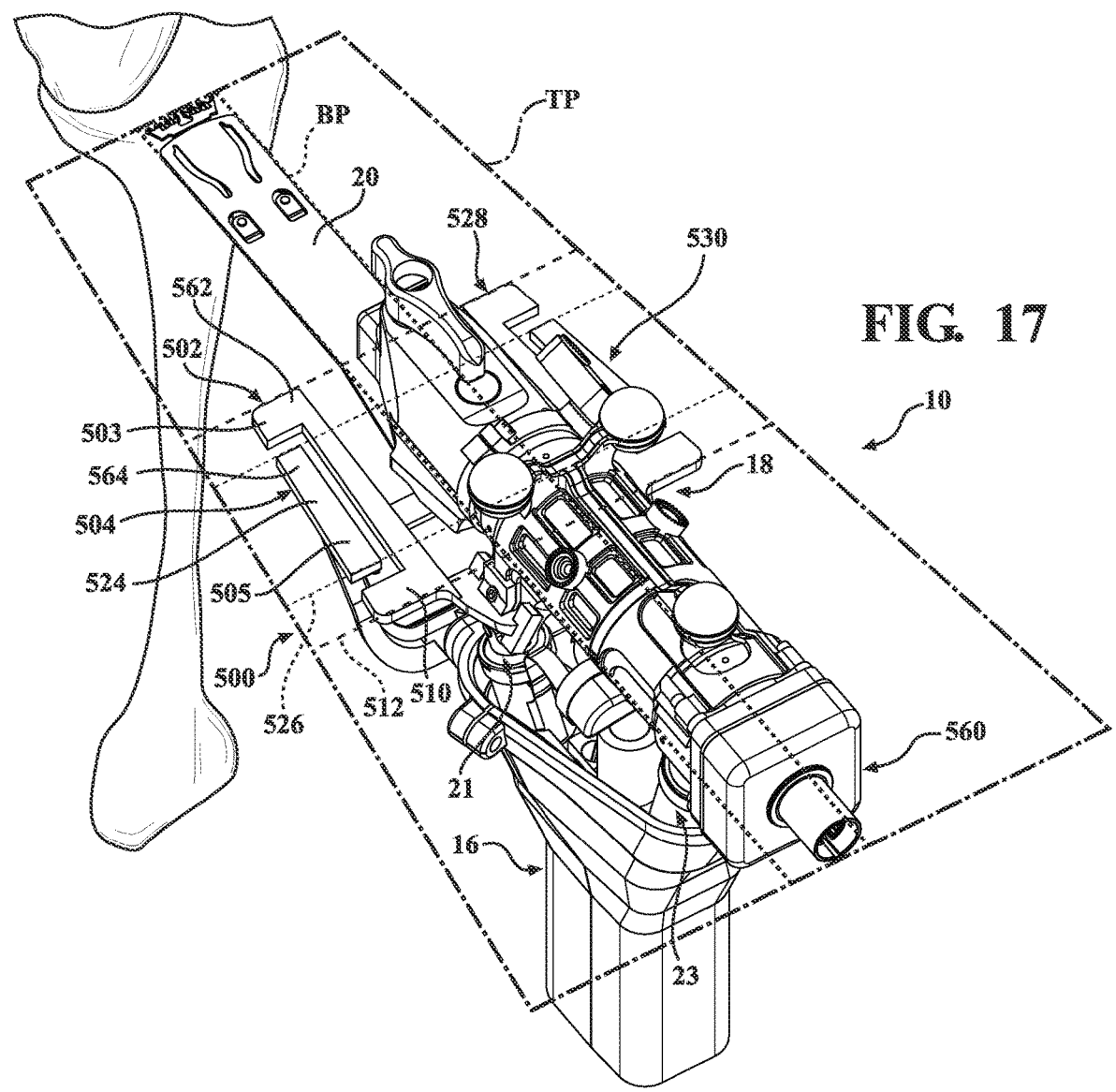

FIG. 17 is a rear perspective view of the robotic instrument including the guidance array of FIG. 12 arranged in a first spatial configuration.

Figure 18:
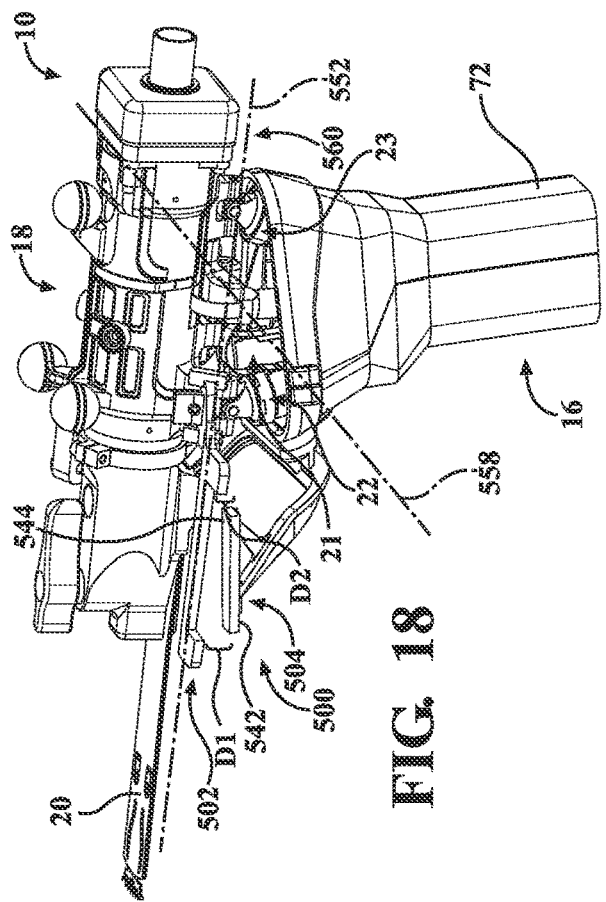

FIG. 18 is a rear perspective view of the robotic instrument including the guidance array arranged in a pitch relationship.

Figure 19:
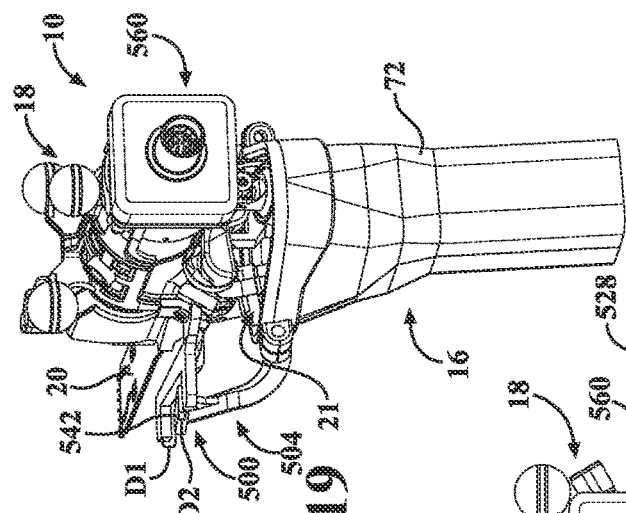

FIG. 19 is another rear perspective view of the robotic instrument including the guidance array arranged in the pitch relationship of FIG. 18.

Figure 20:
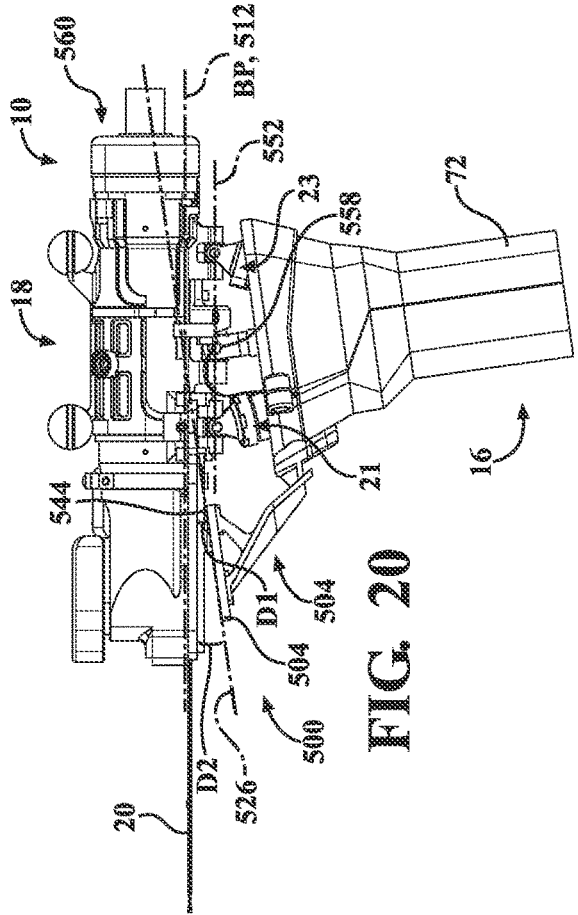

FIG. 20 is a side view of the robotic instrument including the first guidance array arranged in the pitch relationship of FIG. 18.

Figure 21:
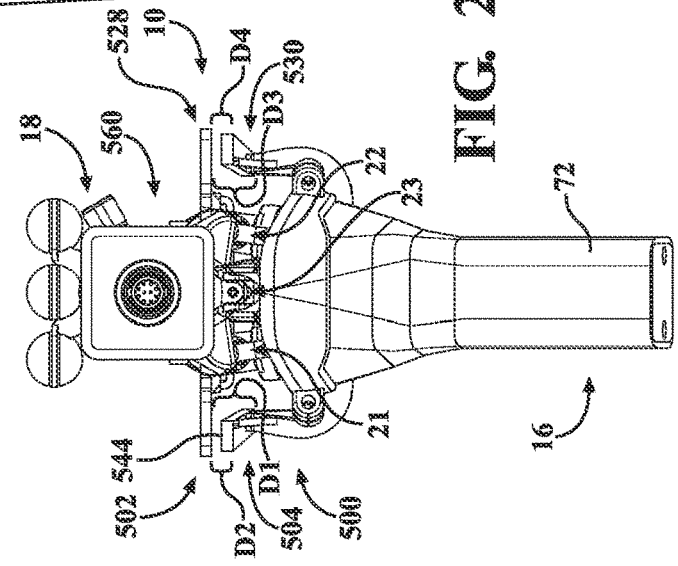

FIG. 21 is a rear view of the robotic instrument including the guidance array arranged in the pitch relationship of FIG. 18.

FIG. 22 is a rear perspective view of the robotic instrument including the guidance array arranged in a roll relationship.

FIG. 23 is another rear perspective view of the robotic instrument including the guidance array arranged in the roll relationship of FIG. 22.

FIG. 24 is a rear view of the robotic instrument including the guidance array arranged in the roll relationship of FIG. 22.

FIG. 25 is a rear perspective view of the robotic instrument including the guidance array arranged in an elevation relationship.

FIG. 26 is another rear perspective view of the robotic instrument including the guidance array arranged in the elevation relationship of FIG. 25.

FIG. 27 is a side view of the robotic instrument including the guidance array arranged in the elevation relationship of FIG. 25.

FIG. 28 is a rear view of the robotic instrument including the guidance array arranged in the elevation relationship of FIG. 25.

Figure 29:
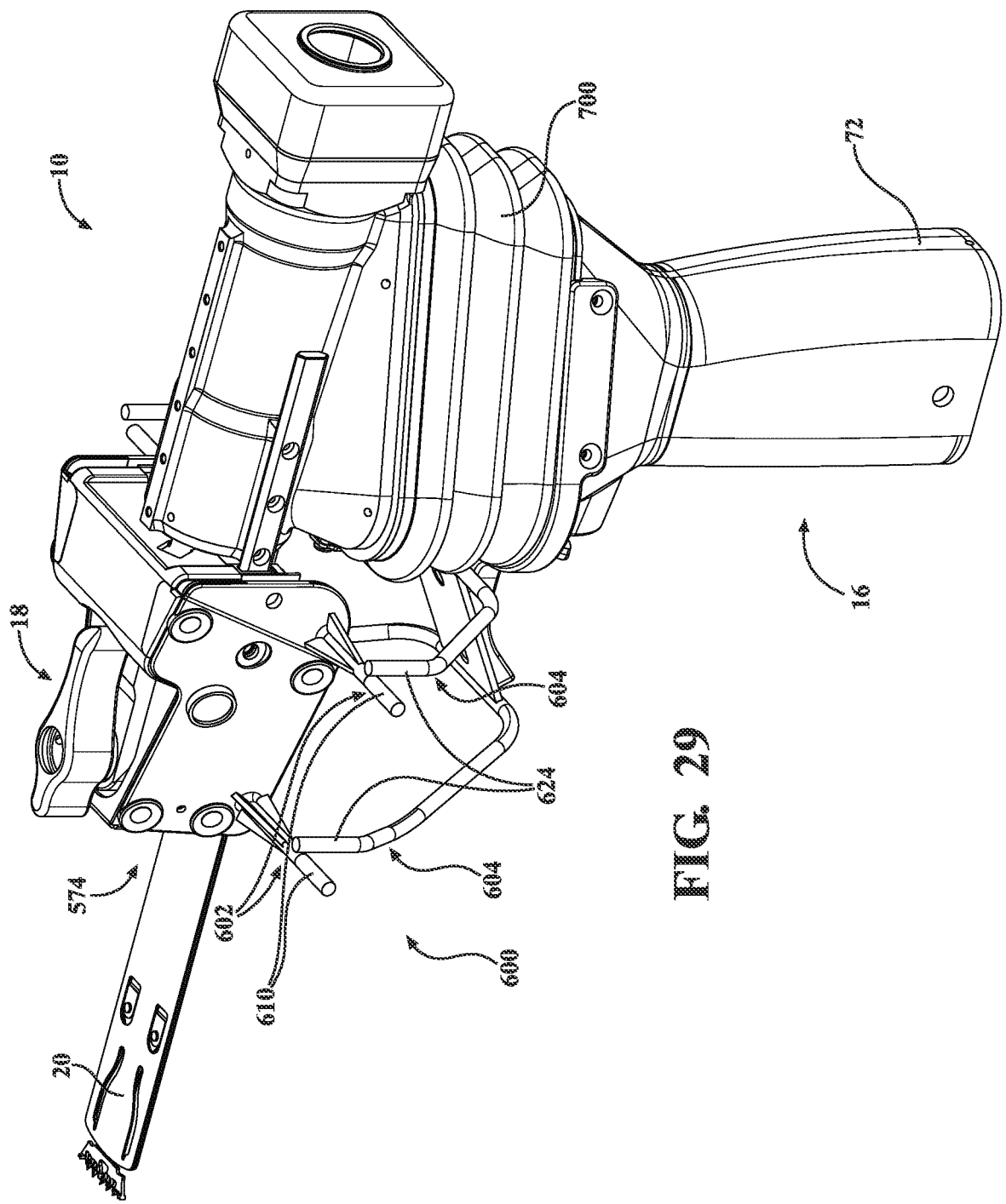

FIG. 29 is a rear perspective view of the robotic instrument including another configuration of the guidance array.

Figure 30:
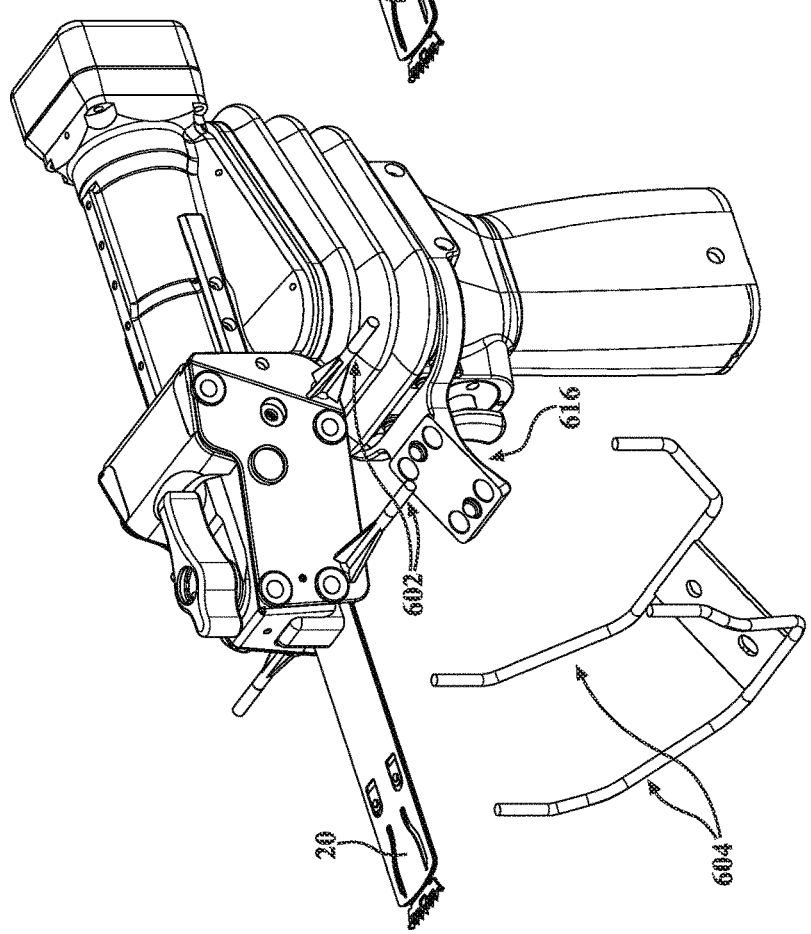

FIG. 30 is a front perspective view of the robotic instrument including the guidance array of FIG. 29, with a handle alignment member detached from the robotic instrument.

Figure 31:
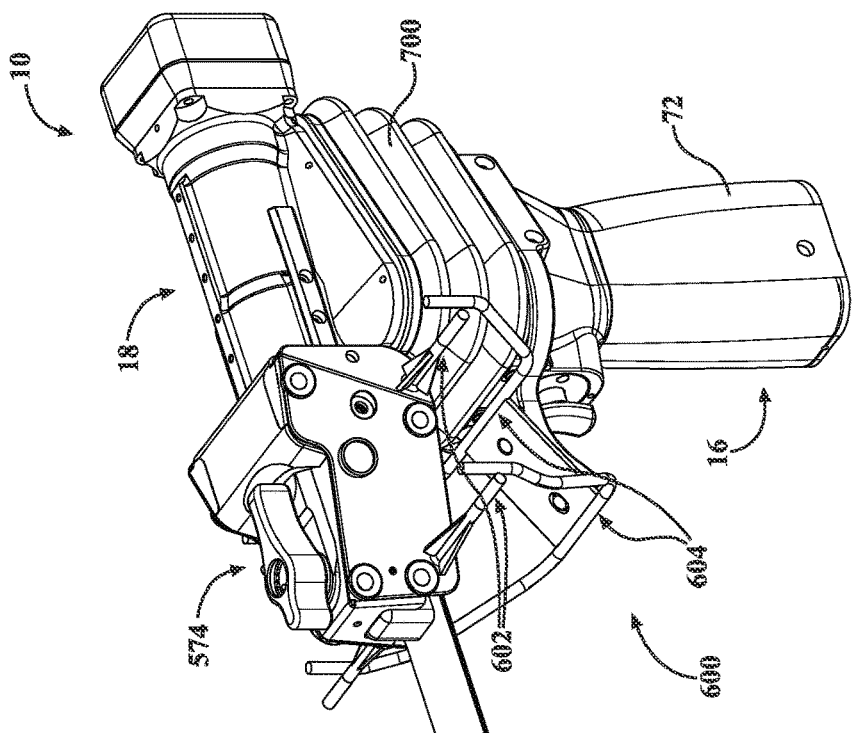

FIG. 31 is a front perspective view of the robotic instrument including the guidance array of FIG. 29, with the handle alignment member attached to the robotic instrument.

Figure 32:
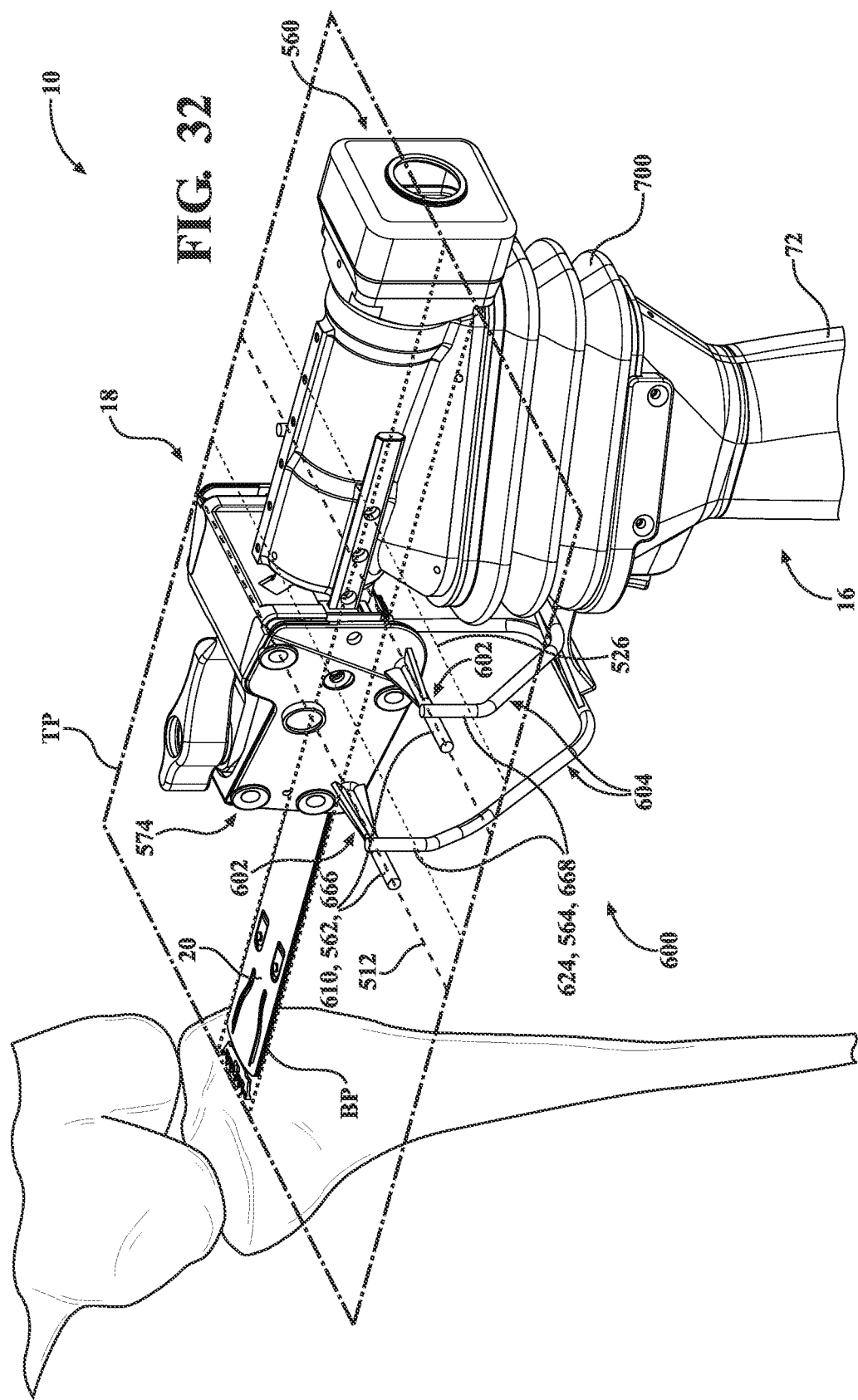

FIG. 32 is a rear perspective view of the robotic instrument including the guidance array of FIG. 29 arranged in a first spatial configuration.

Figure 33:
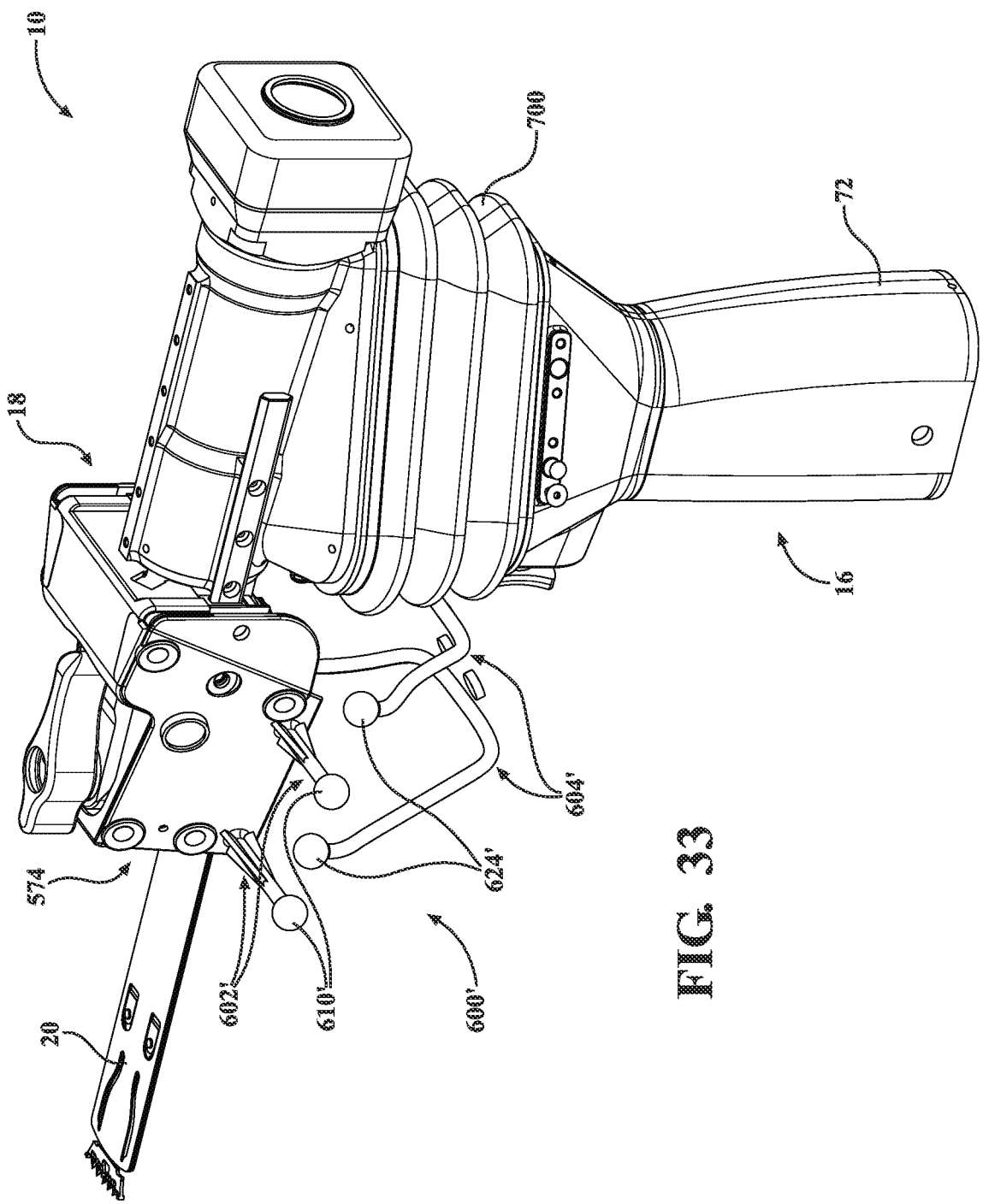

FIG. 33 is a rear perspective view of the robotic instrument including yet another configuration of the guidance array.

Figure 34:
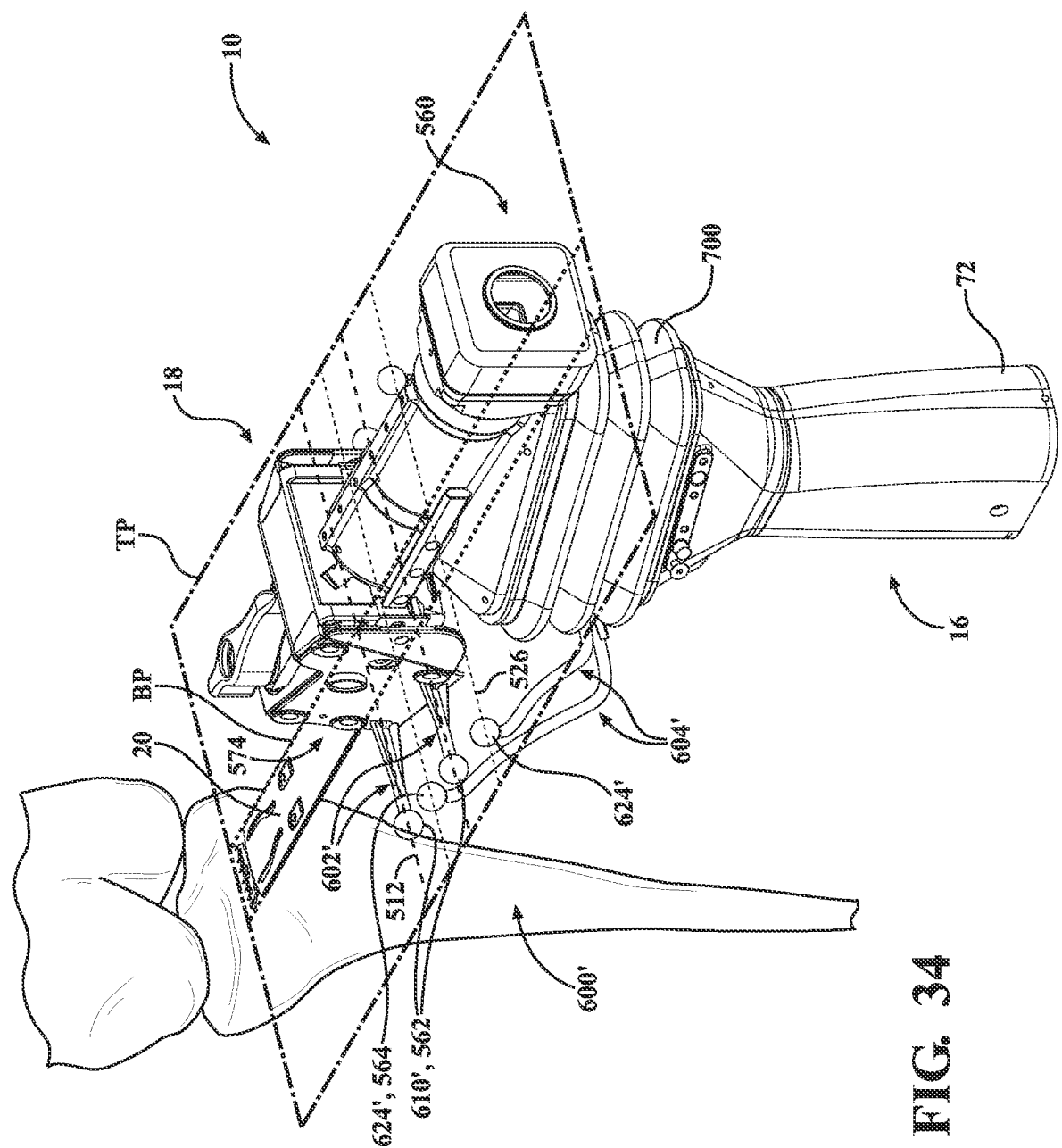

FIG. 34 is a rear perspective view of yet another configuration of the robotic instrument including the guidance array of FIG. 33 arranged in a first spatial configuration.

Figure 35:
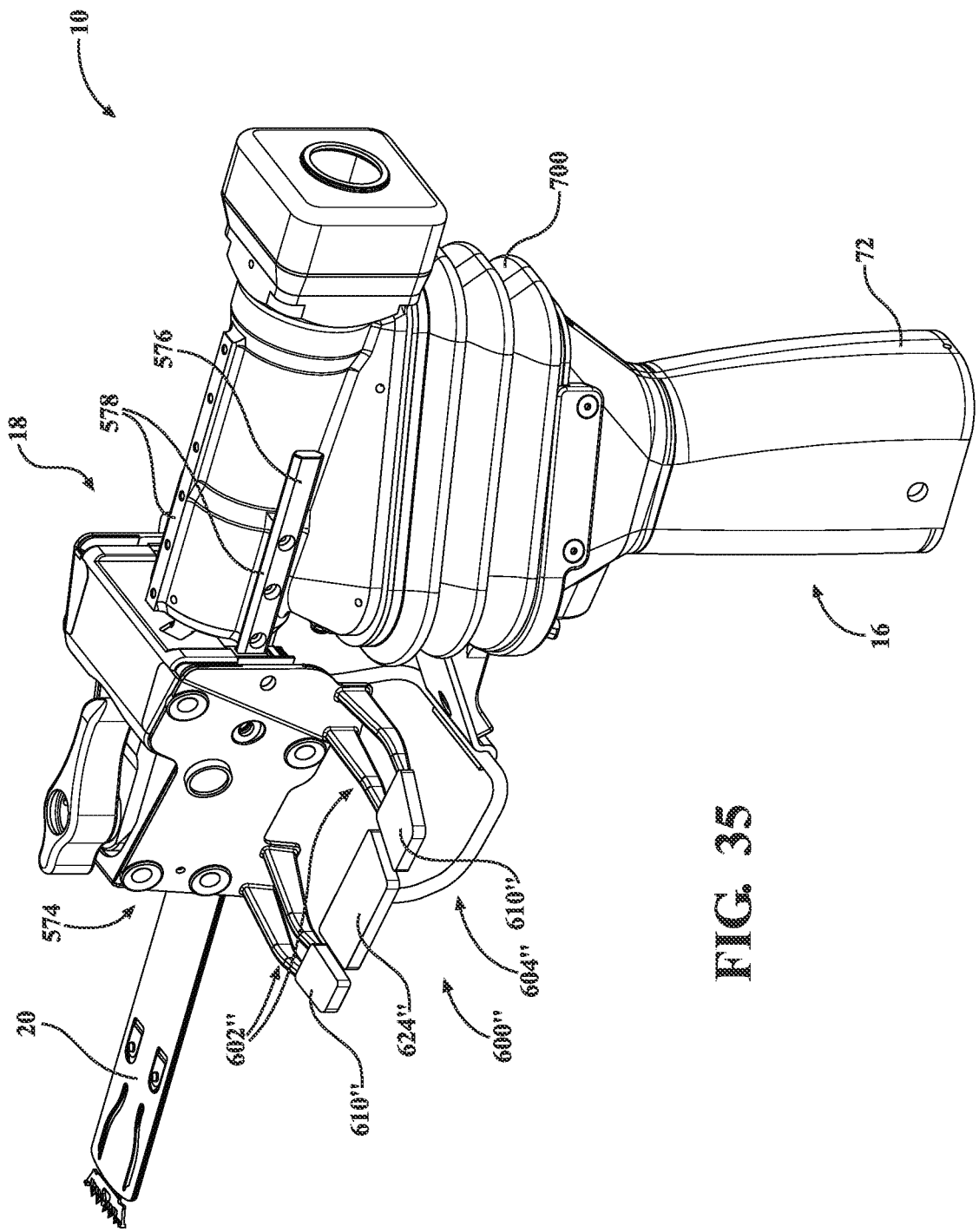

FIG. 35 is a rear perspective view of the robotic instrument including a further configuration of the guidance array.

Figure 36:
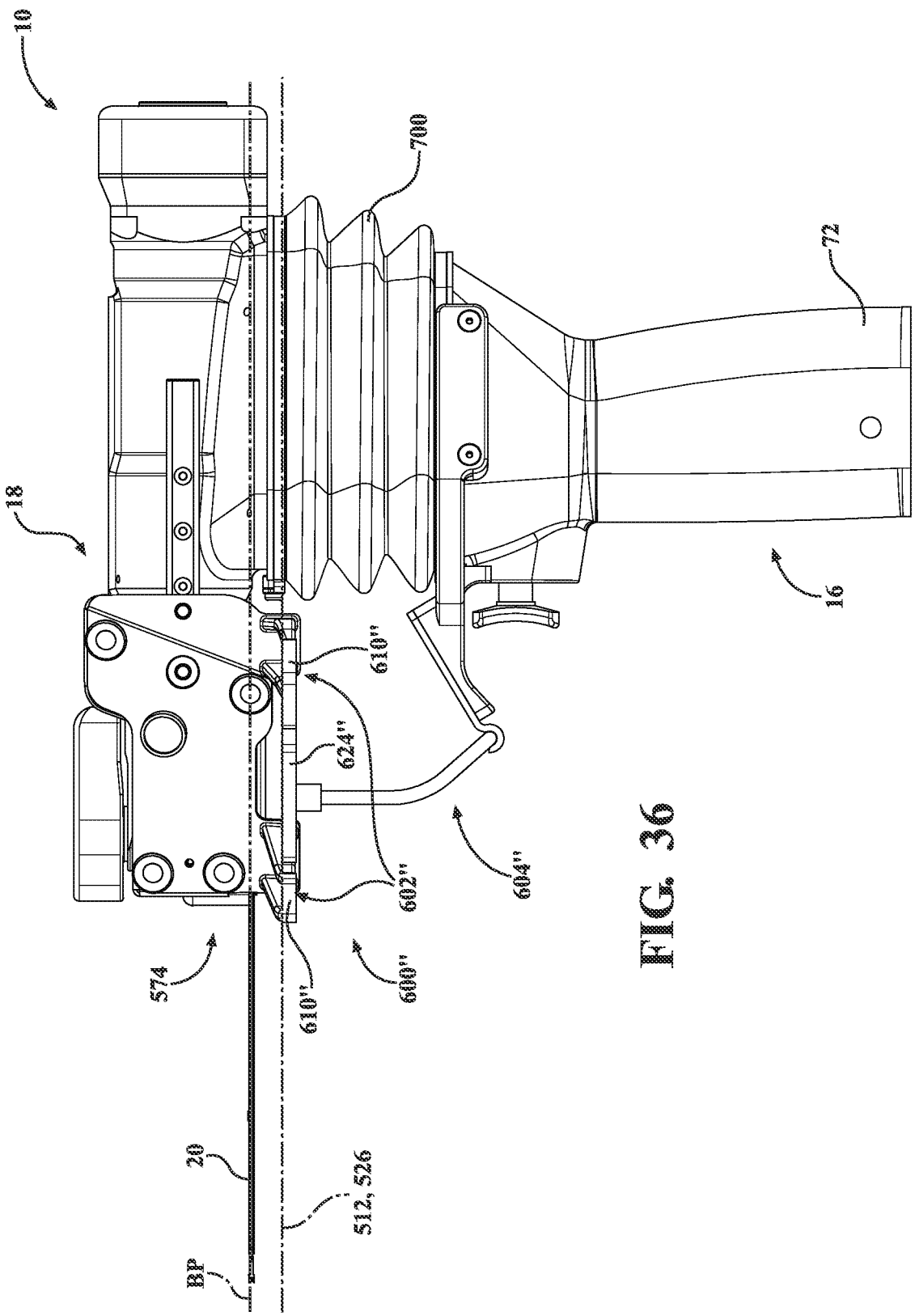

FIG. 36 is a side view of a further configuration of the robotic instrument including the guidance array of FIG. 35.

Figure 37:
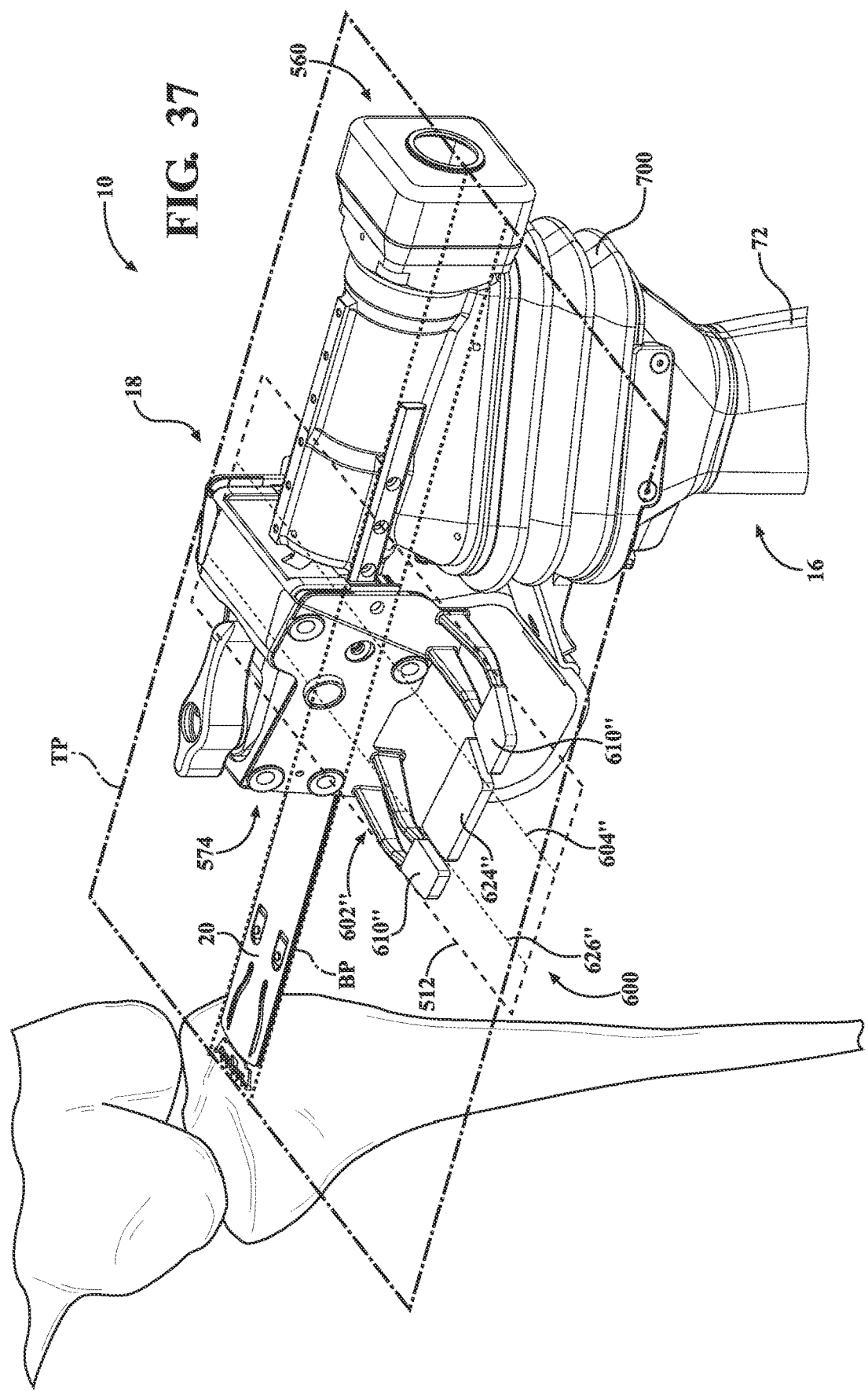

FIG. 37 is a rear perspective view of yet another configuration of the robotic instrument including the guidance array of FIG. 35 arranged in a first spatial configuration.

Figure 38:
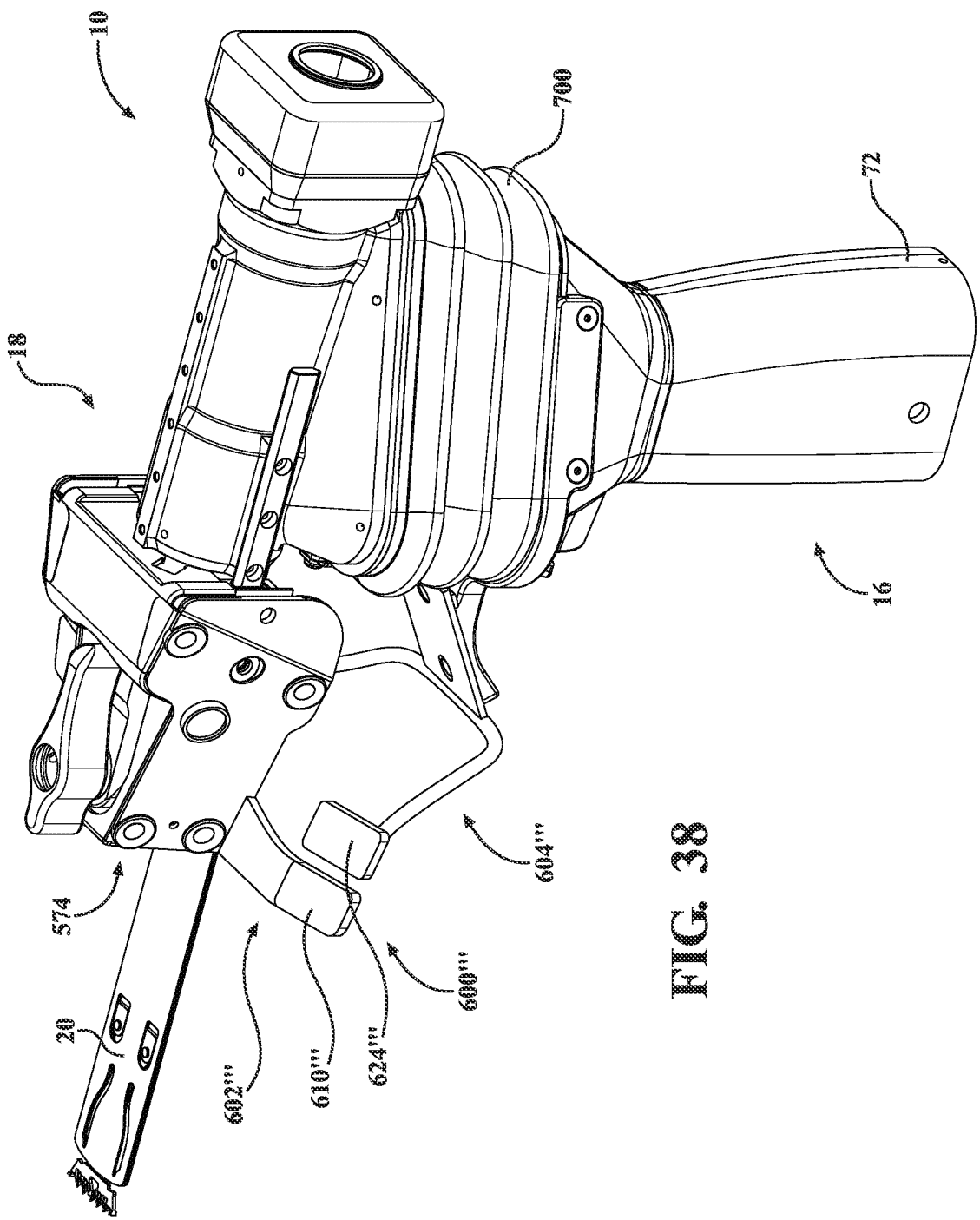

FIG. 38 is a rear perspective view of the robotic instrument including an additional configuration of the guidance array.

FIG. 39 is a rear perspective view of an additional configuration of the robotic instrument including the guidance array of FIG. 38 arranged in a first spatial configuration.

Figure 40:
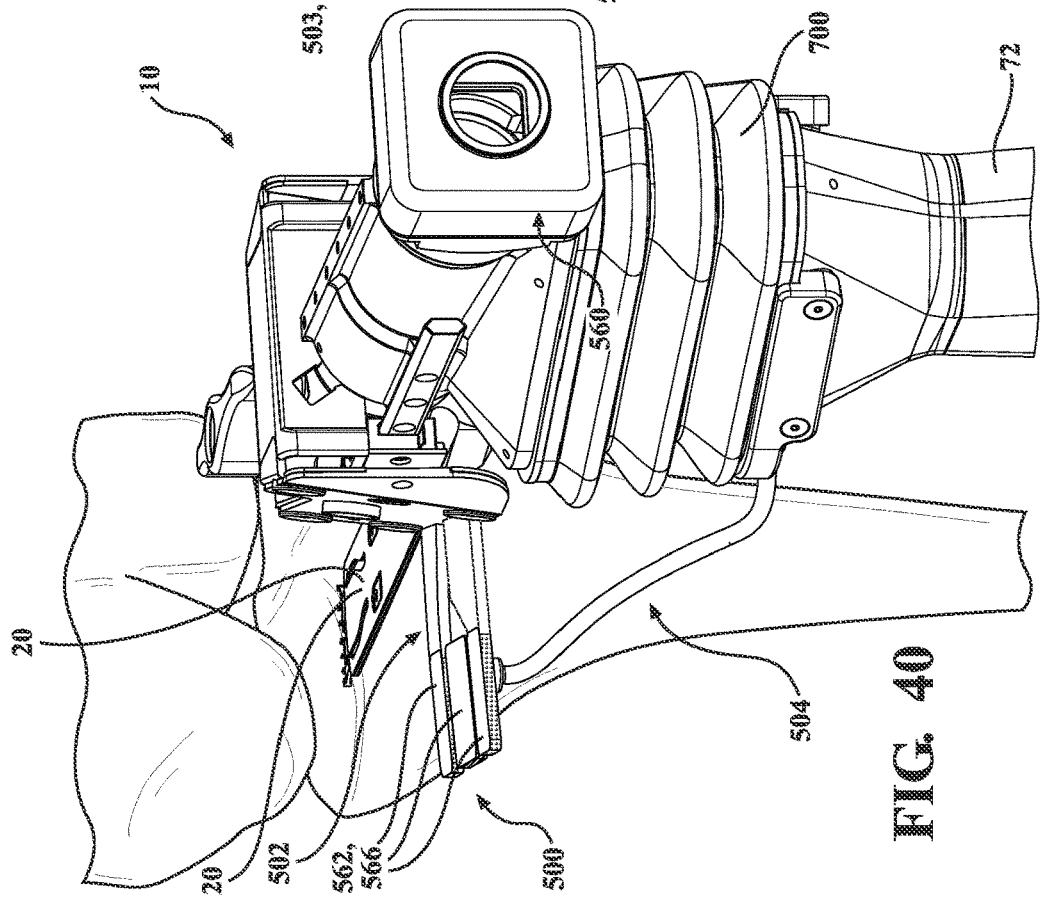

FIG. 40 is a rear perspective view of a configuration of the robotic instrument including a first visual indicia.

Figure 41:
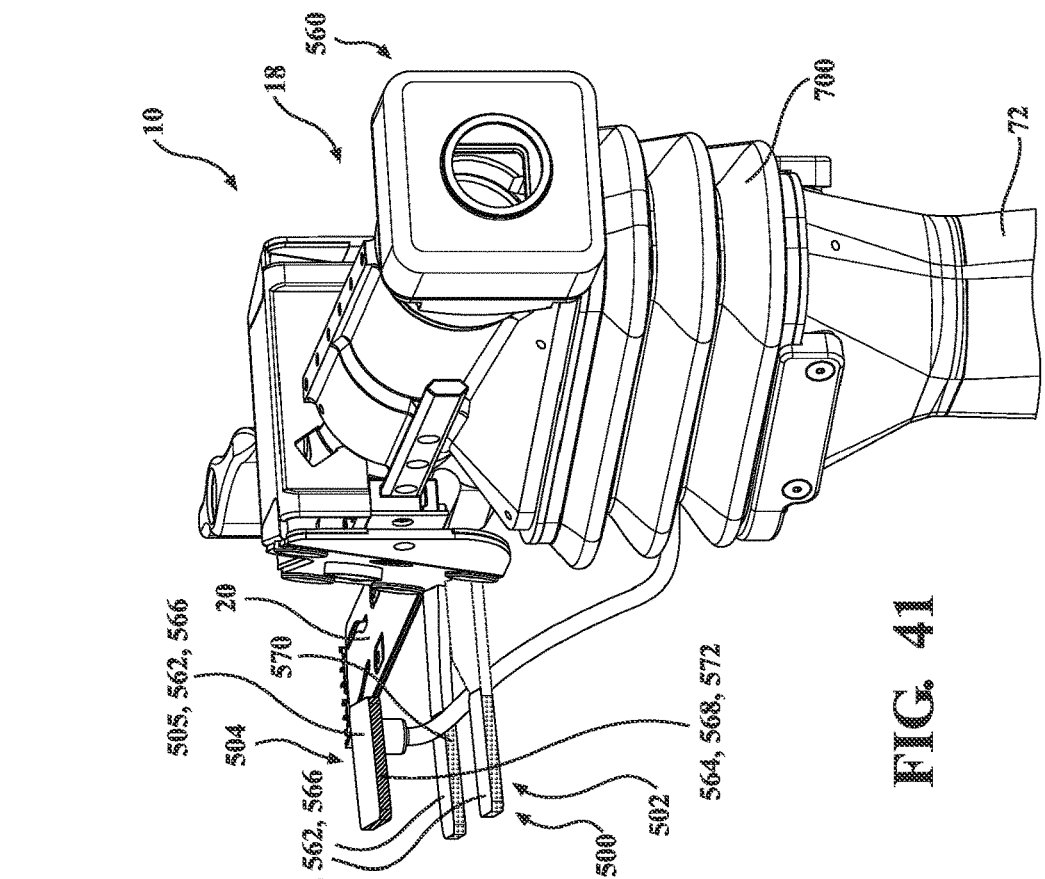

FIG. 41 is another rear perspective view of a configuration of the robotic instrument of FIG. 40, in a different spatial orientation.

Figure 42:
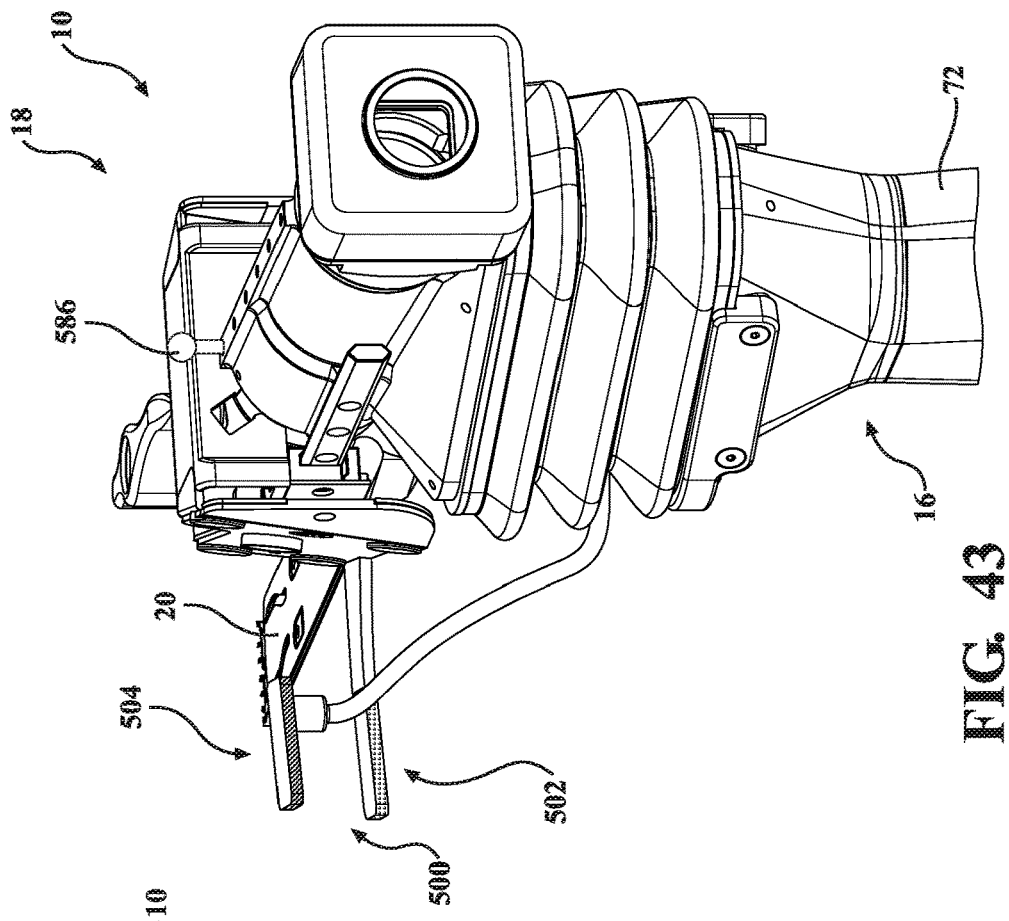

FIG. 42 is a rear perspective view of a configuration of the robotic instrument including a light emitter.

Figure 43:
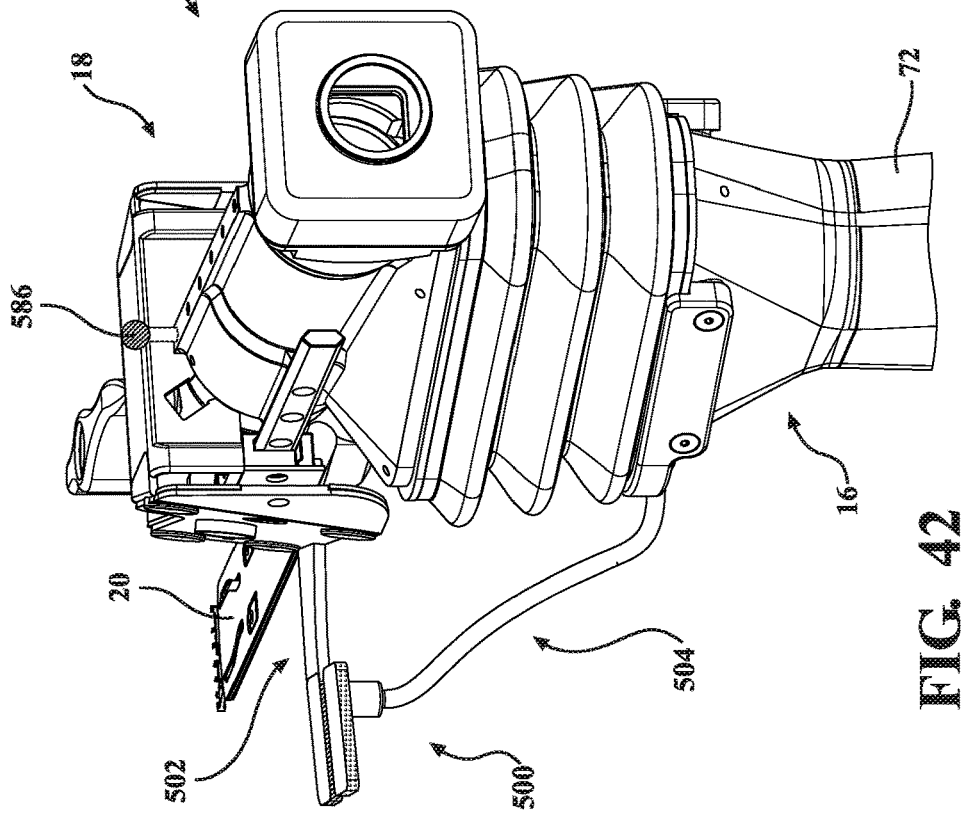

FIG. 43 is another rear perspective view of a configuration of the robotic instrument of FIG. 42, in a different spatial configuration.

Figure 44:
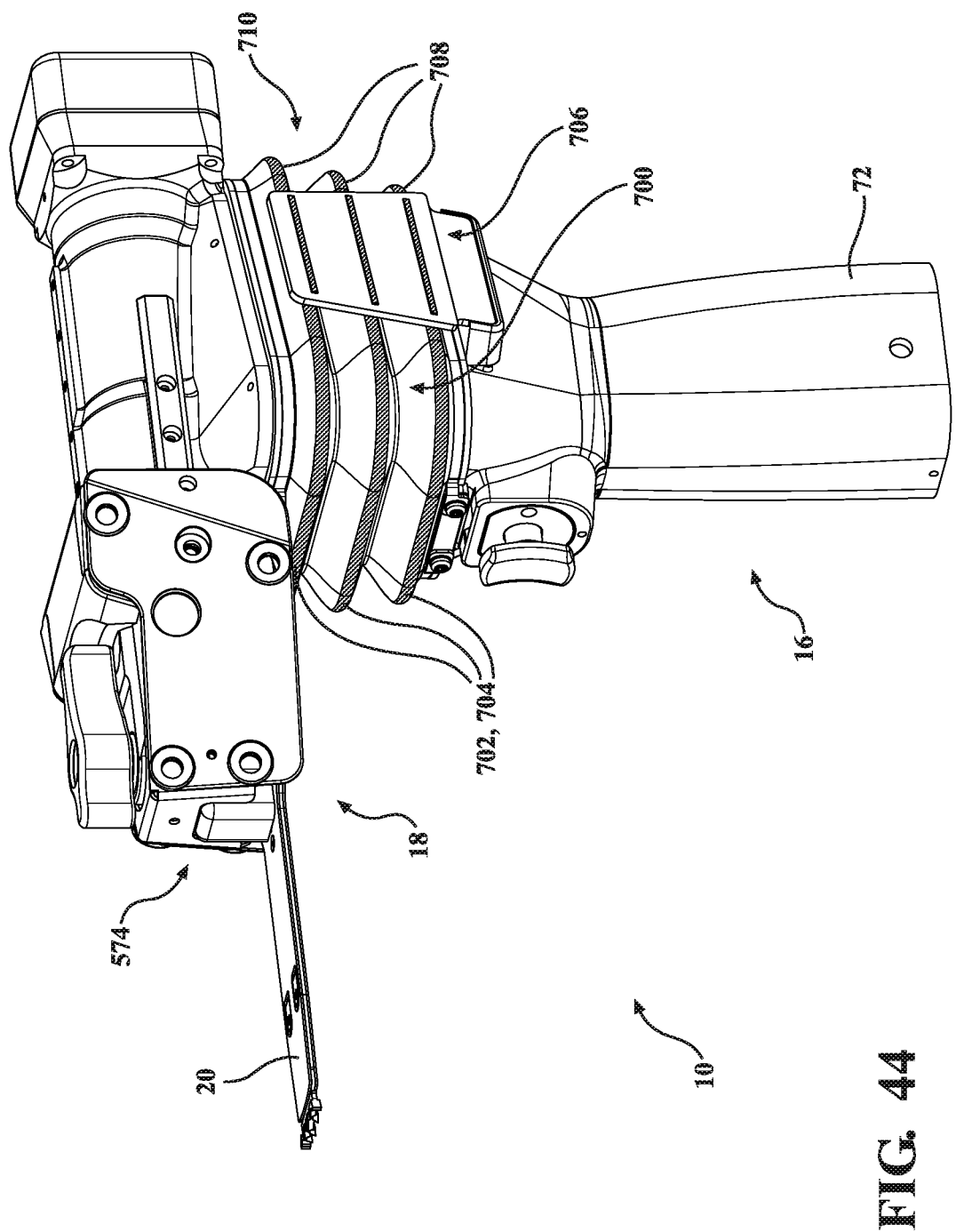

FIG. 44 is a front perspective view of a configuration of the robotic instrument including a shroud.

Figure 45:
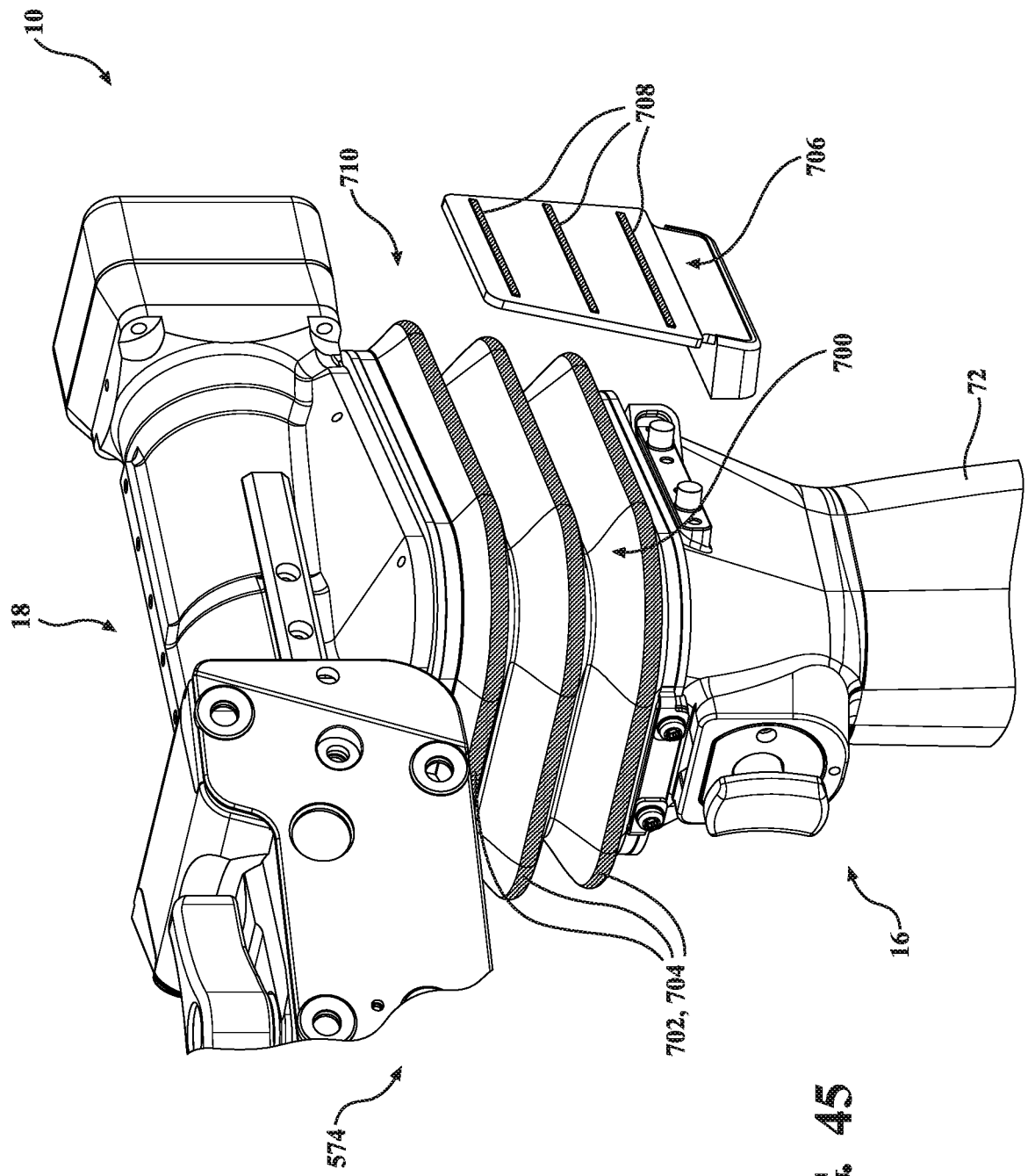

FIG. 45 is a partial front perspective view of a configuration of the robotic instrument including a shroud and a shroud alignment member spaced from the robotic instrument.

Figure 46:
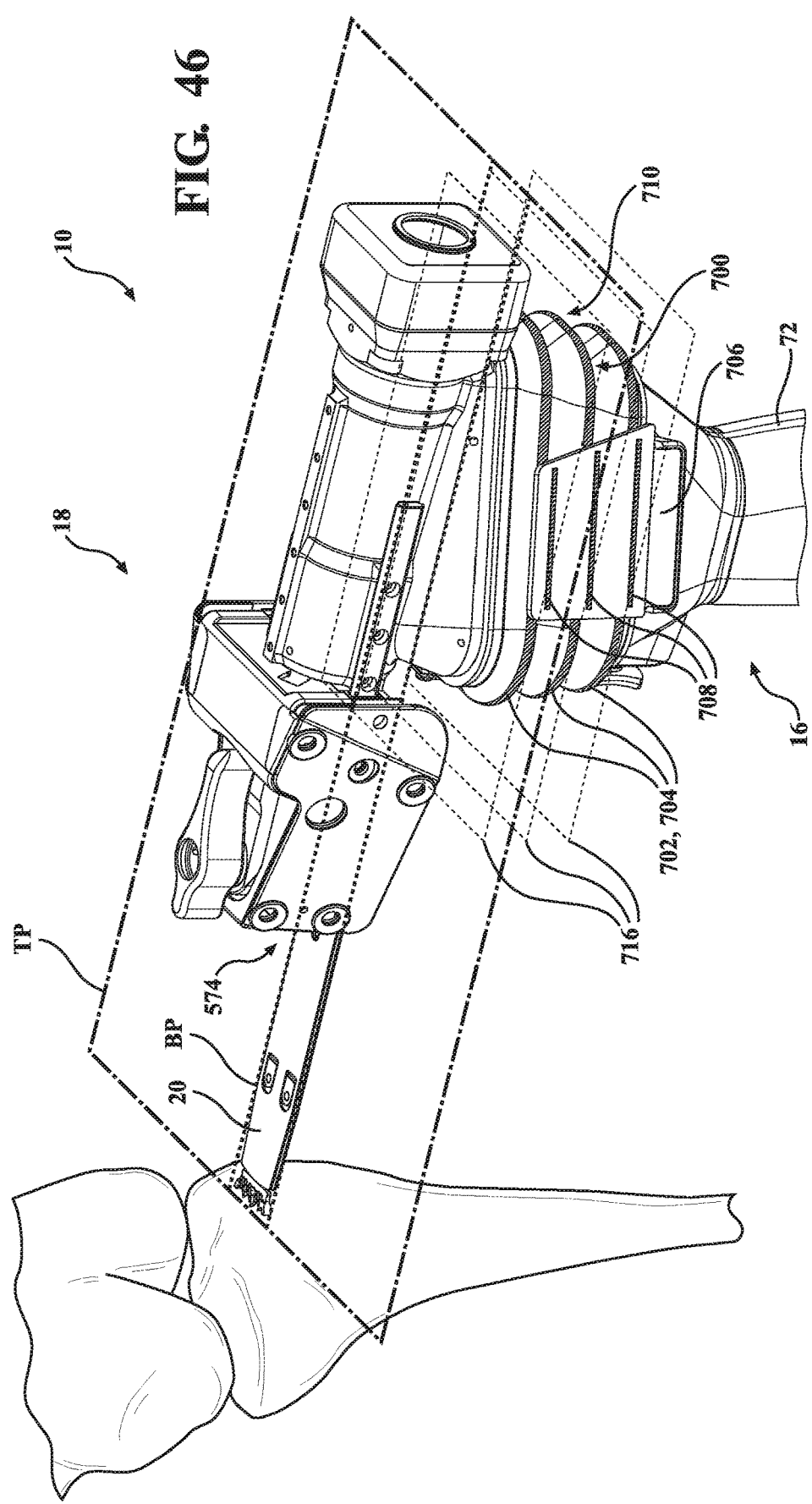

FIG. 46 is a rear perspective view of a configuration of the robotic instrument including a shroud.

Figure 47:
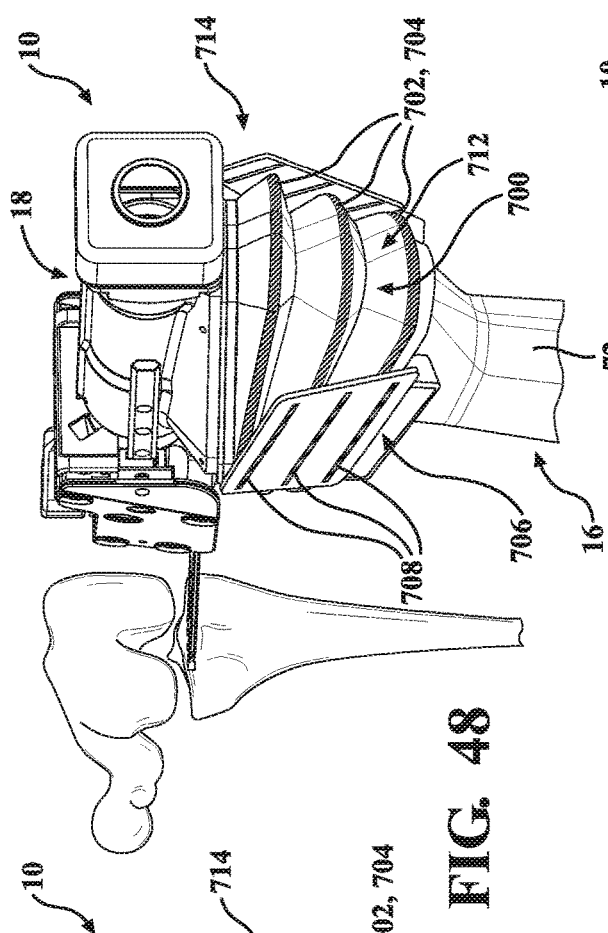

FIG. 47 is a rear perspective view of a configuration of the robotic instrument including a shroud arranged in a first position.

Figure 48:
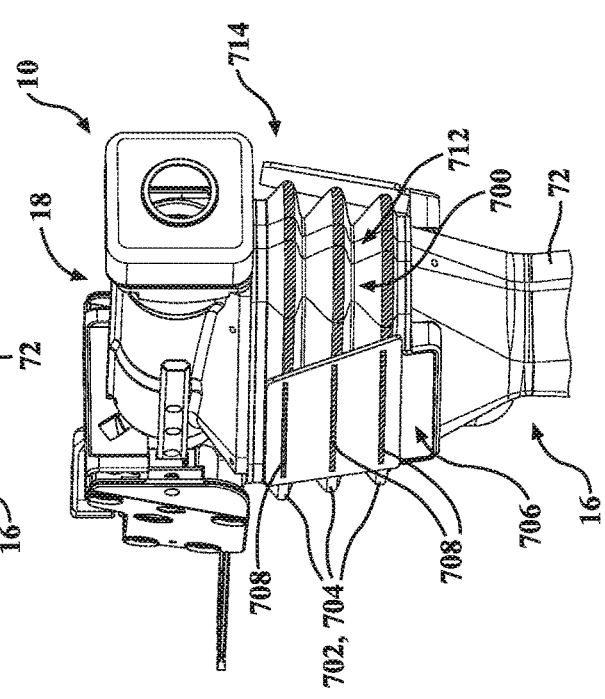

FIG. 48 is a rear perspective view of a configuration of the robotic instrument including a shroud arranged in a second position.

Figure 49:
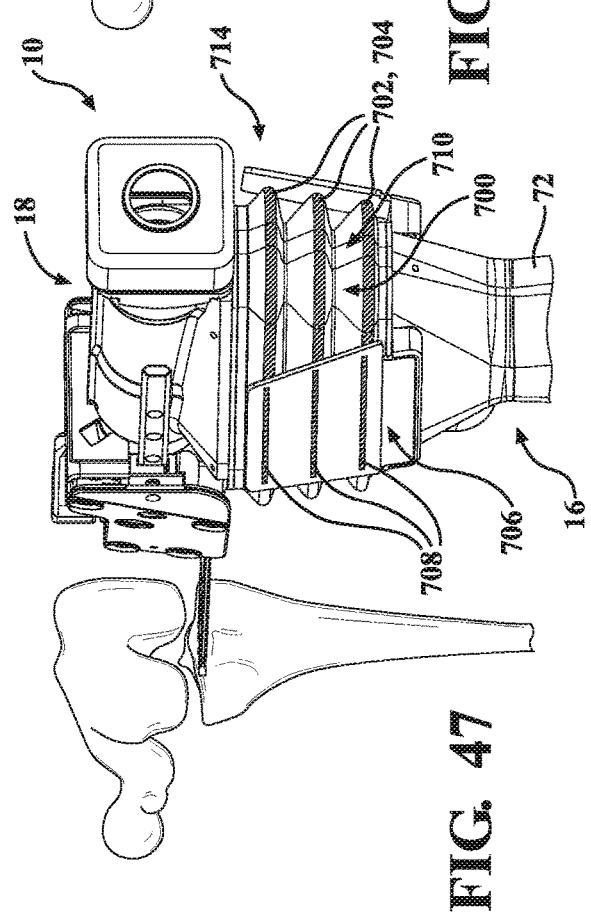

FIG. 49 is a rear perspective view of a configuration of the robotic instrument including a shroud arranged in an alternative second position.

Figure 50:
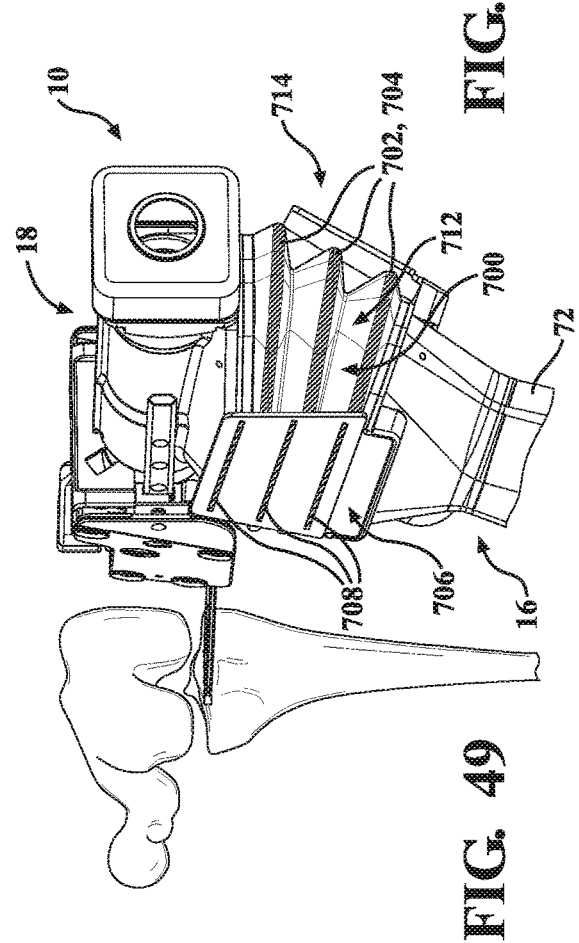

FIG. 50 is a rear perspective view of a configuration of the robotic instrument including a shroud arranged in an alternative second position.

Figure 51:
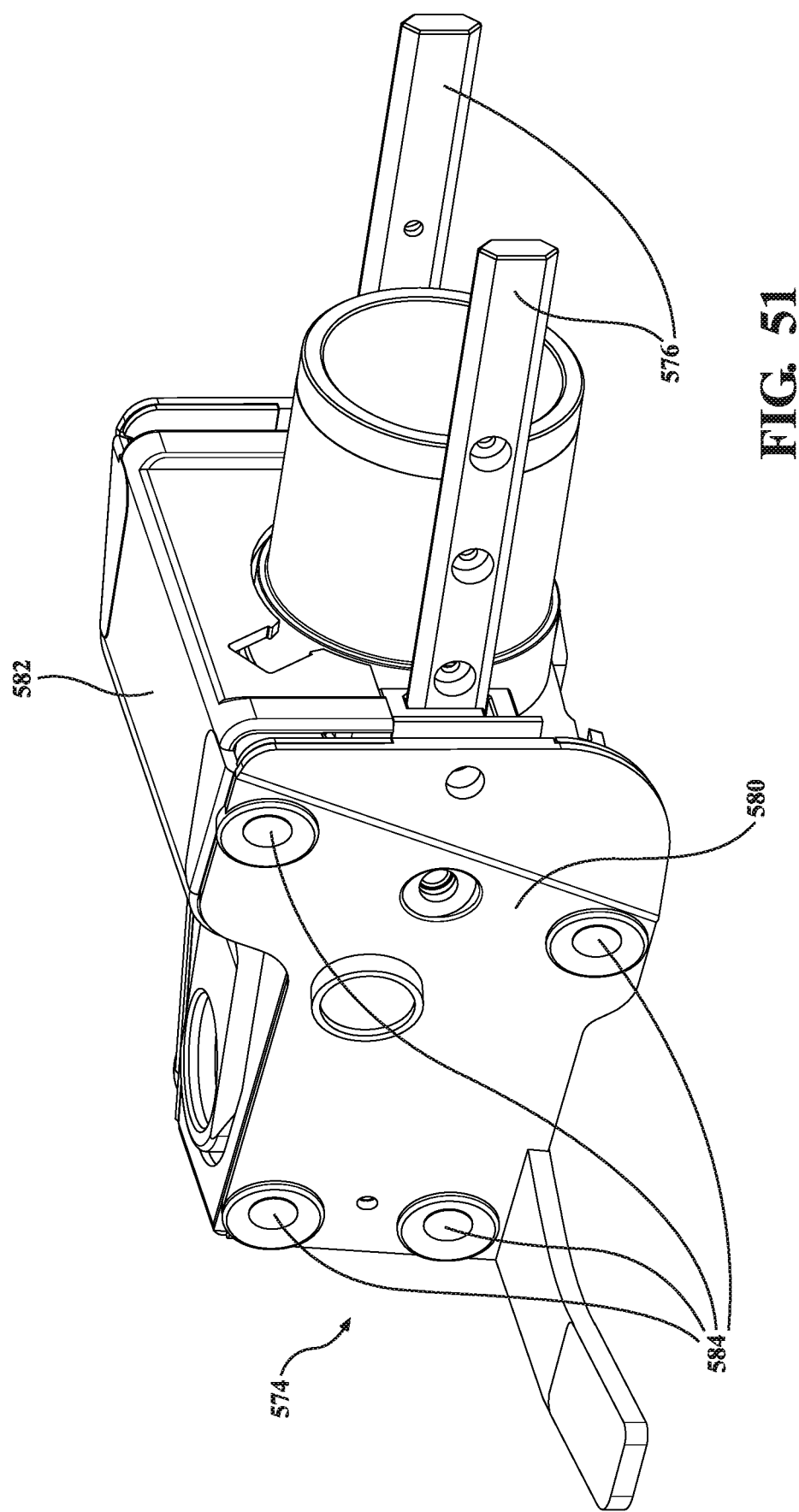

FIG. 51 is a rear perspective view of a tool tracker of the robotic instrument.

Figure 52:
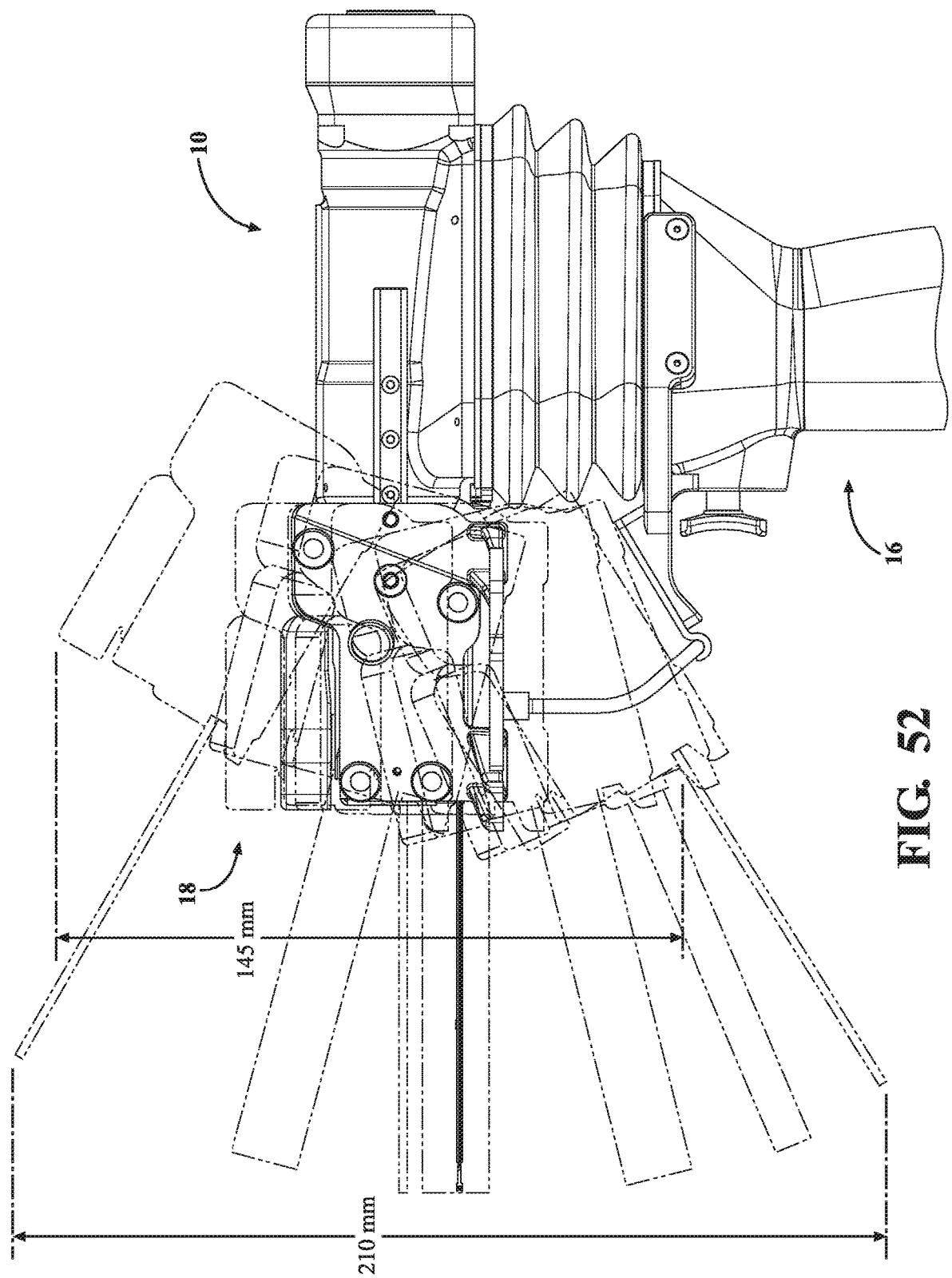

FIG. 52 is a side view of the robotic instrument illustrating a potential range of motion of the tool support relative to the hand-held portion.

Figure 53:
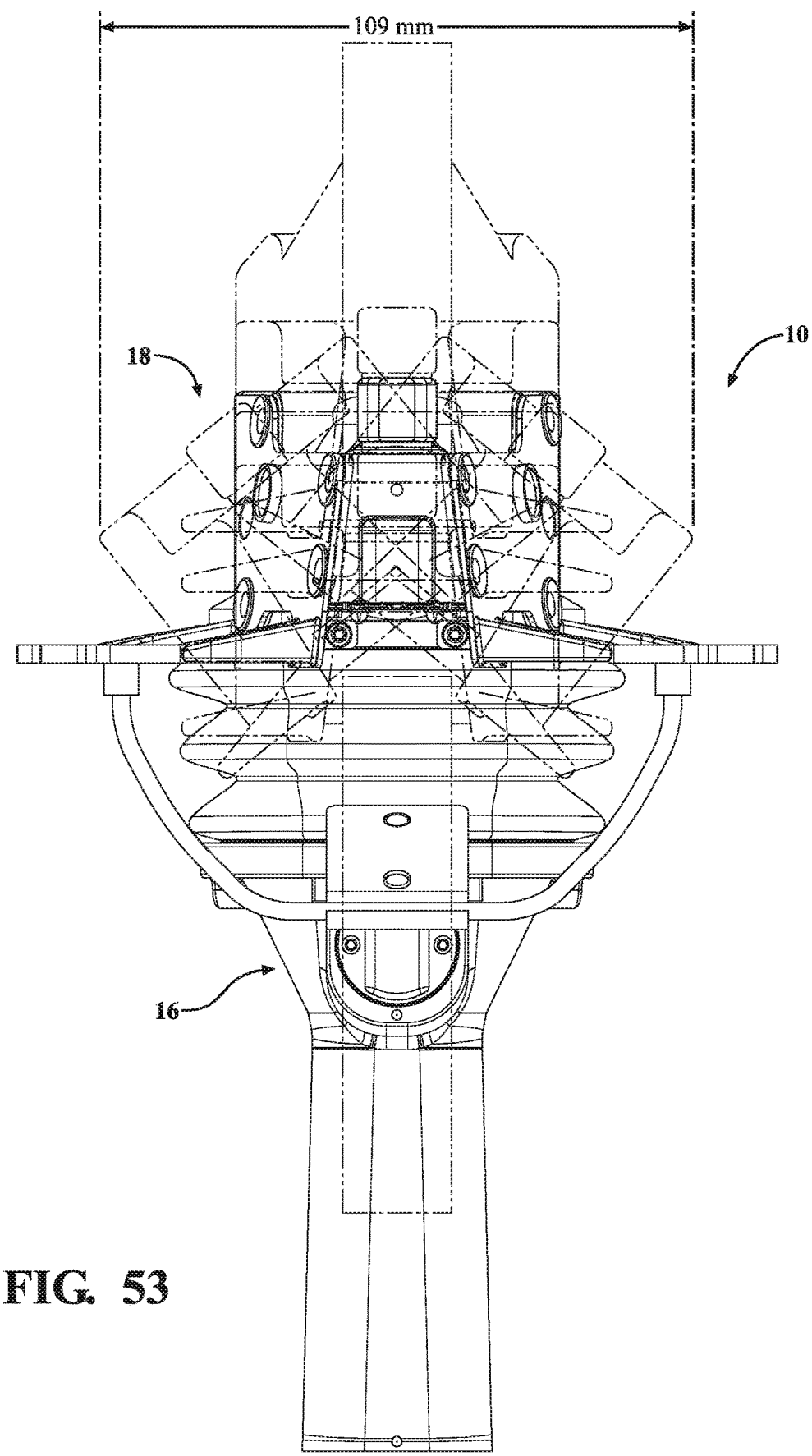

FIG. 53 is a front view of the robotic instrument illustrating a potential range of motion of the tool support relative to the hand-held portion.

Figure 54:
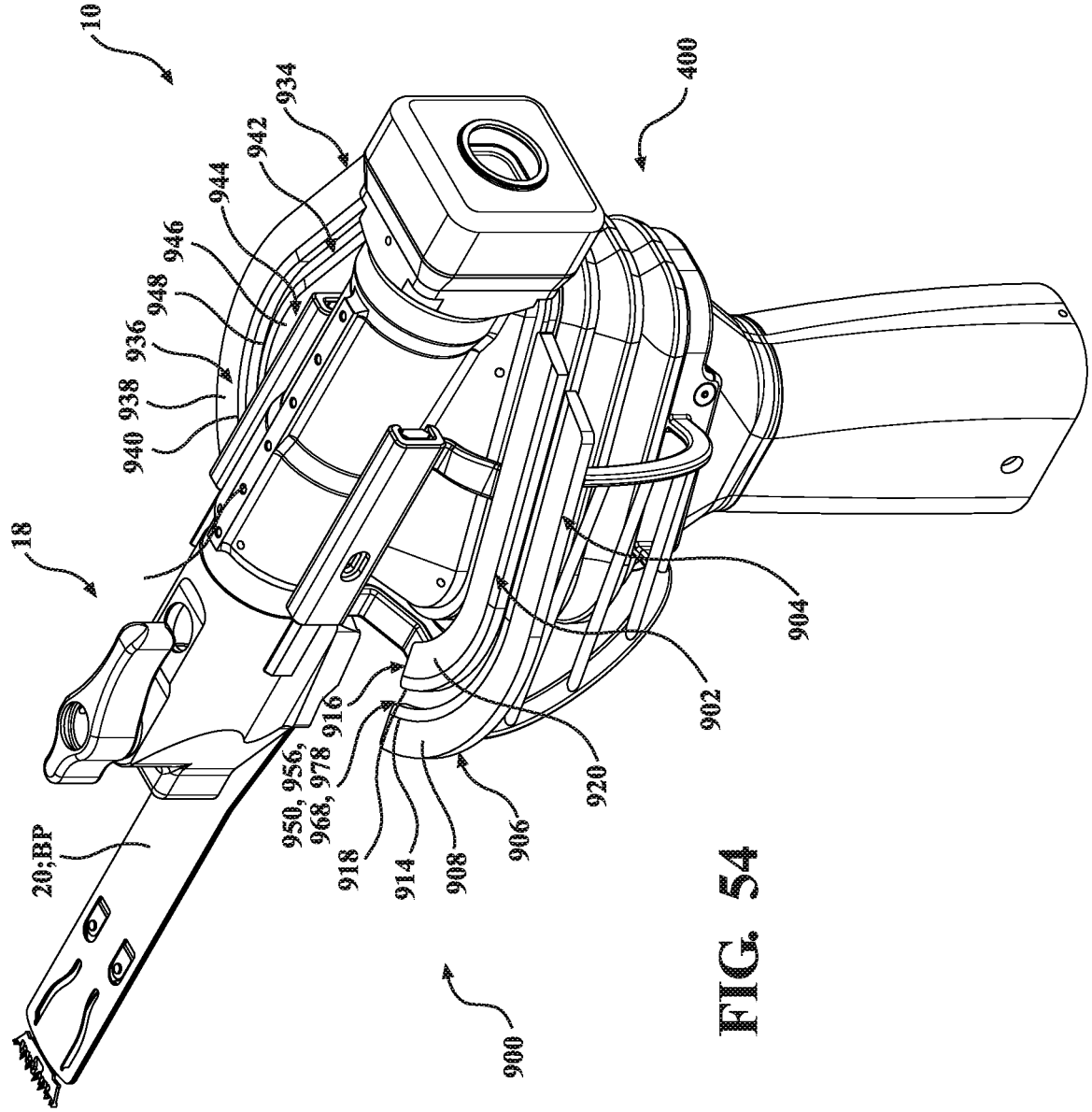

FIG. 54 is a rear perspective view of the robotic instrument including a yet another embodiment of a guidance array.

Figure 55:
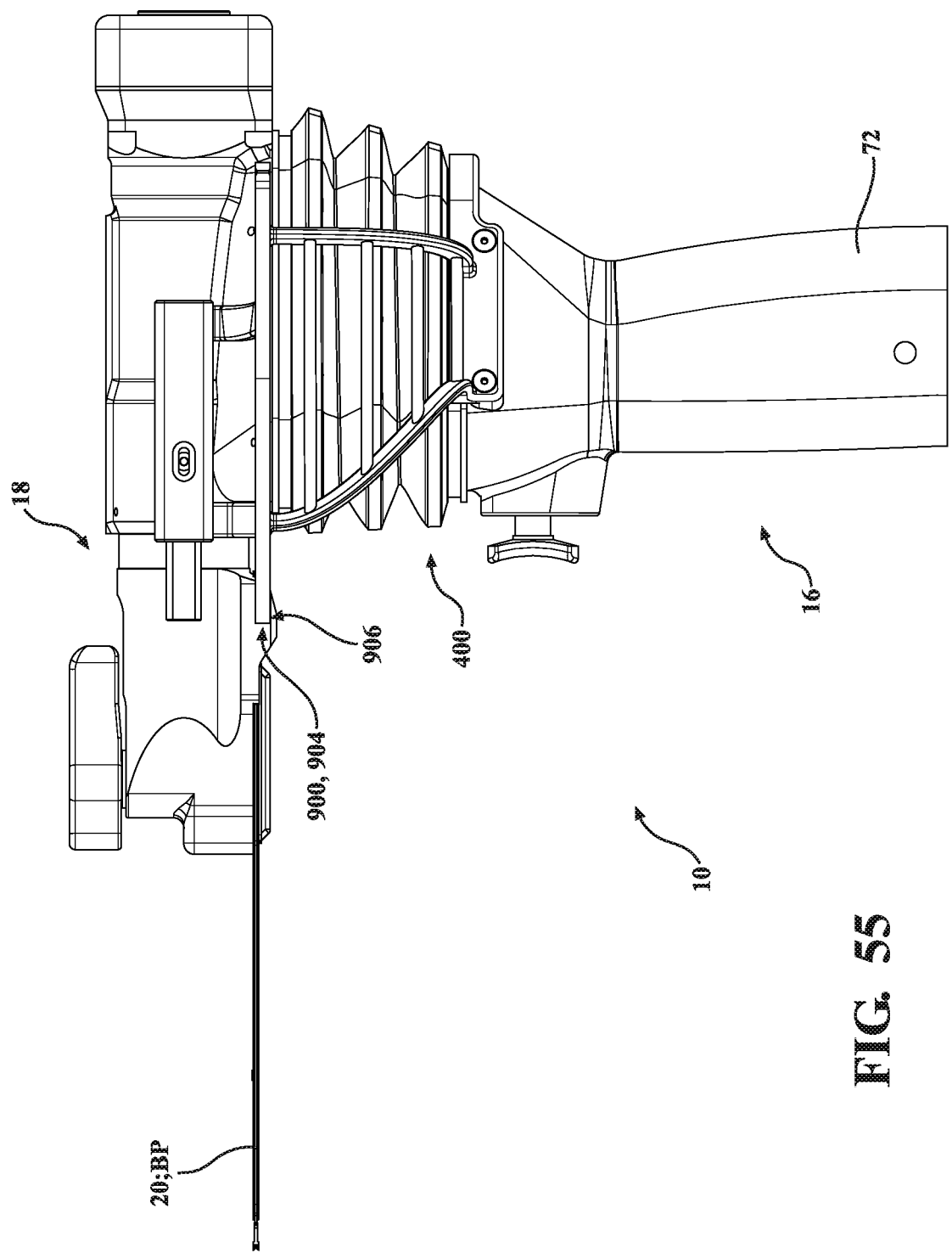

FIG. 55 is a side view of the robotic instrument including the guidance array of FIG. 54.

Figure 56:
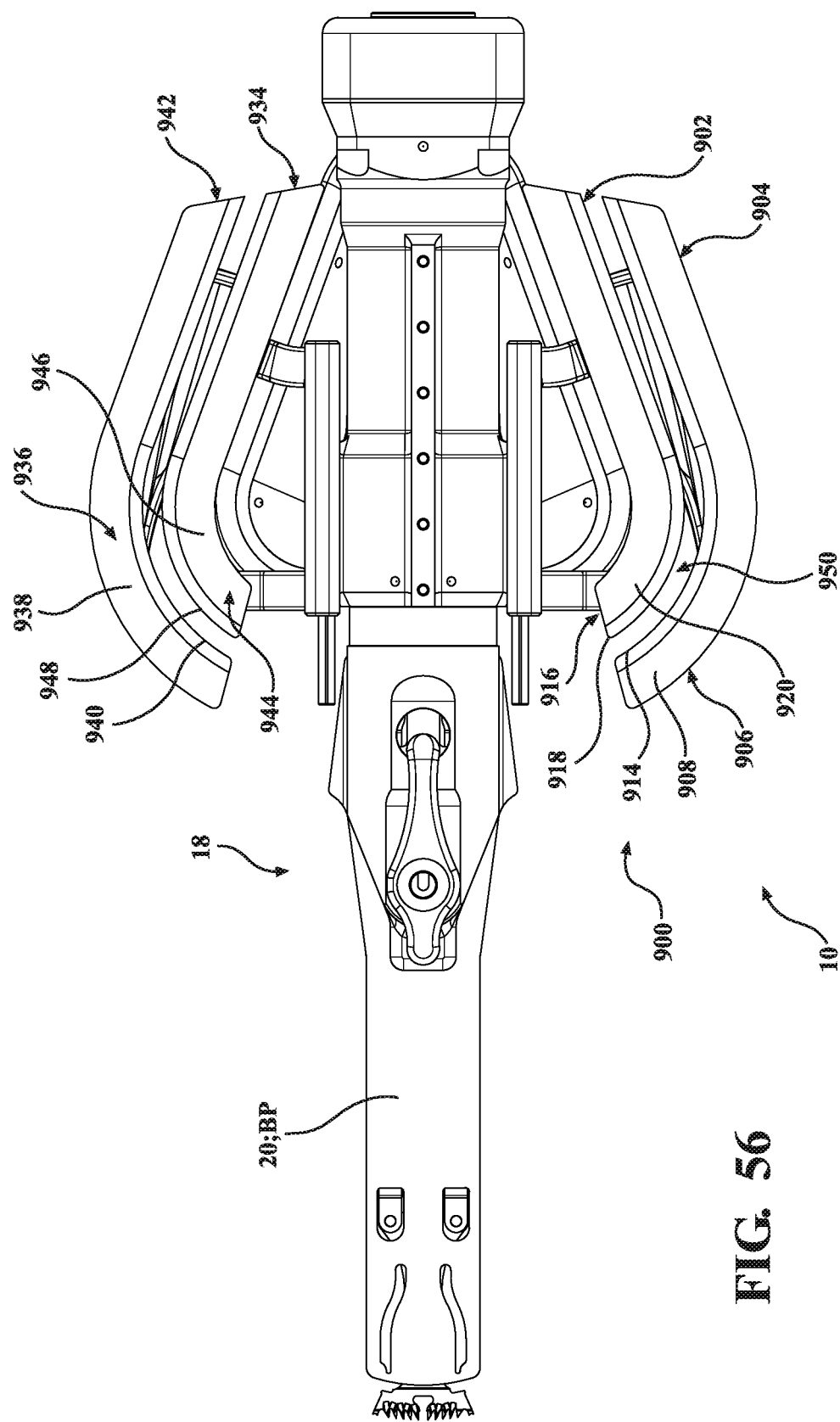

FIG. 56 is a top view of the robotic instrument including the guidance array of FIG. 54.

Figure 57:
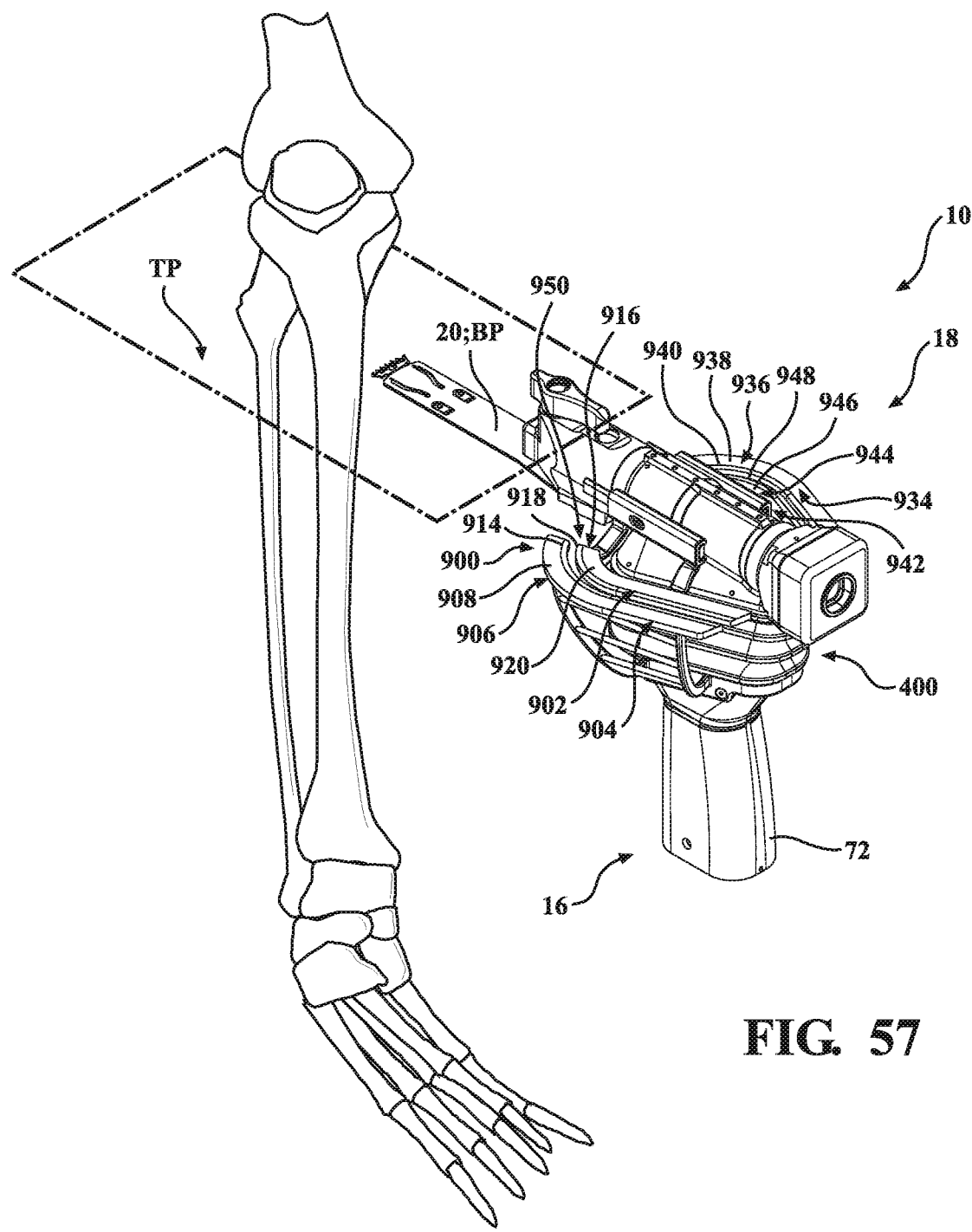

FIG. 57 is a rear perspective view of the robotic instrument including the guidance array of FIG. 54 arranged in a first spatial configuration.

Figure 58:
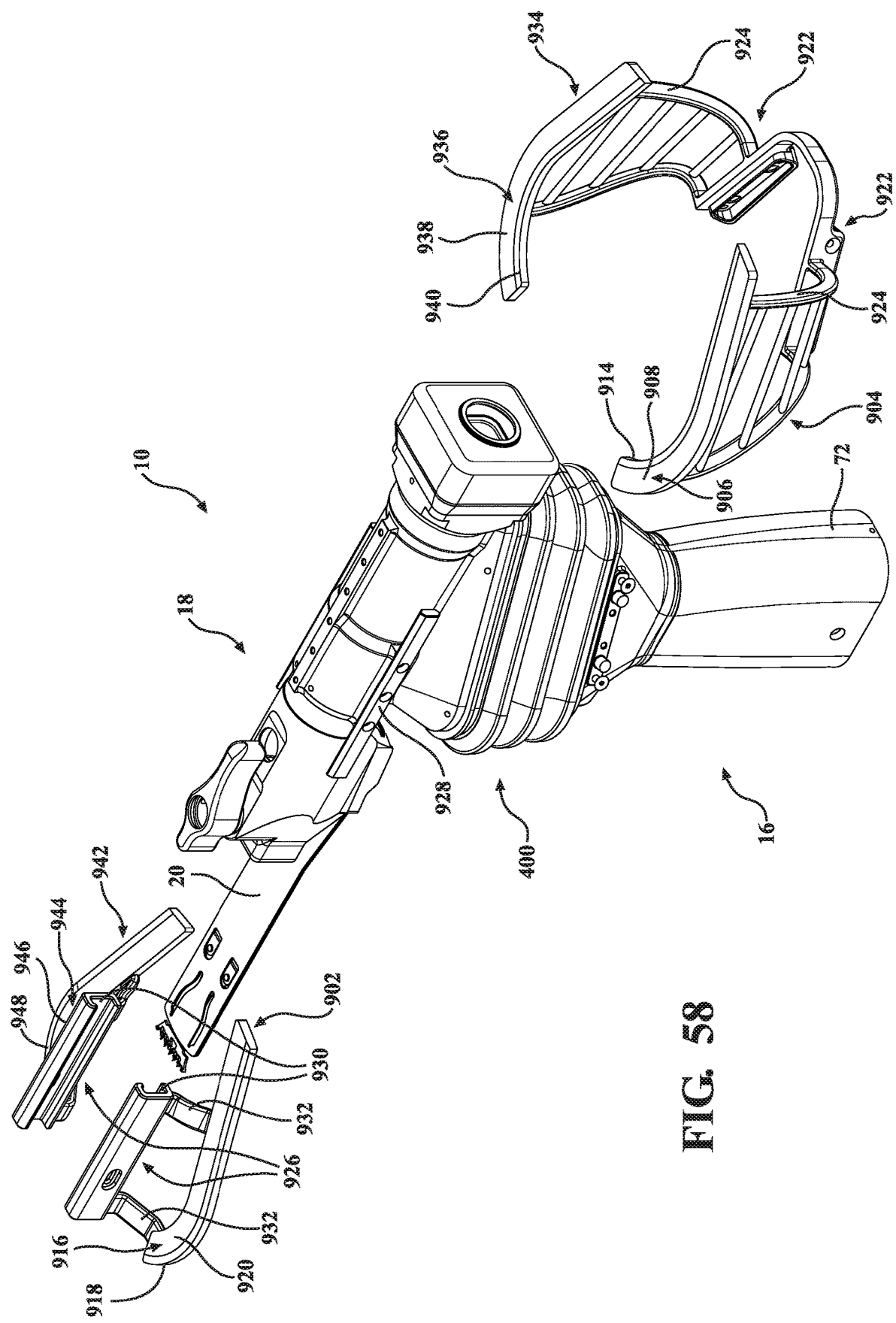

FIG. 58 is an exploded rear perspective view of the robotic instrument including the guidance array of FIG. 54.

Figure 59:
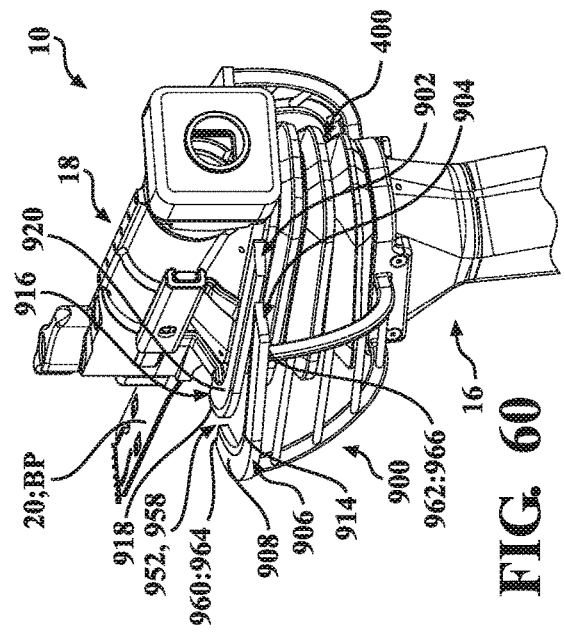

FIG. 59 is a rear perspective view of the robotic instrument including the guidance array arranged of FIG. 54 in a pitch relationship.

Figure 60:
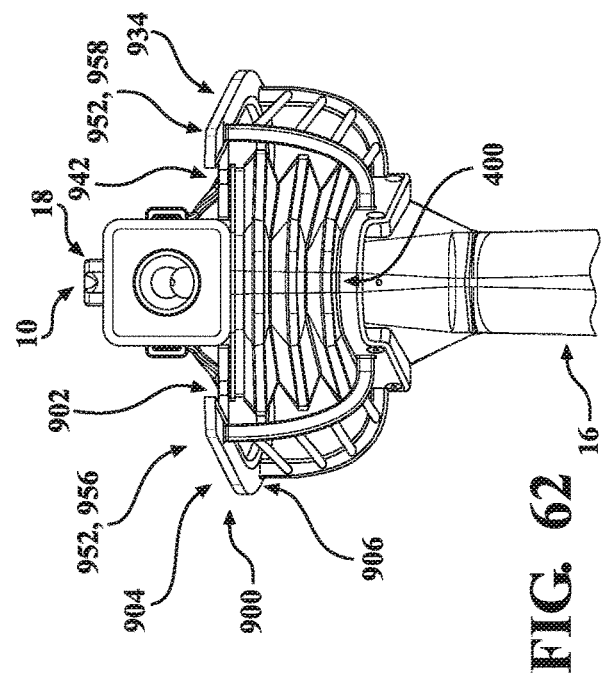

FIG. 60 is another rear perspective view of the robotic instrument including the guidance array of FIG. 54 in arranged in the pitch relationship of FIG. 59.

Figure 61:
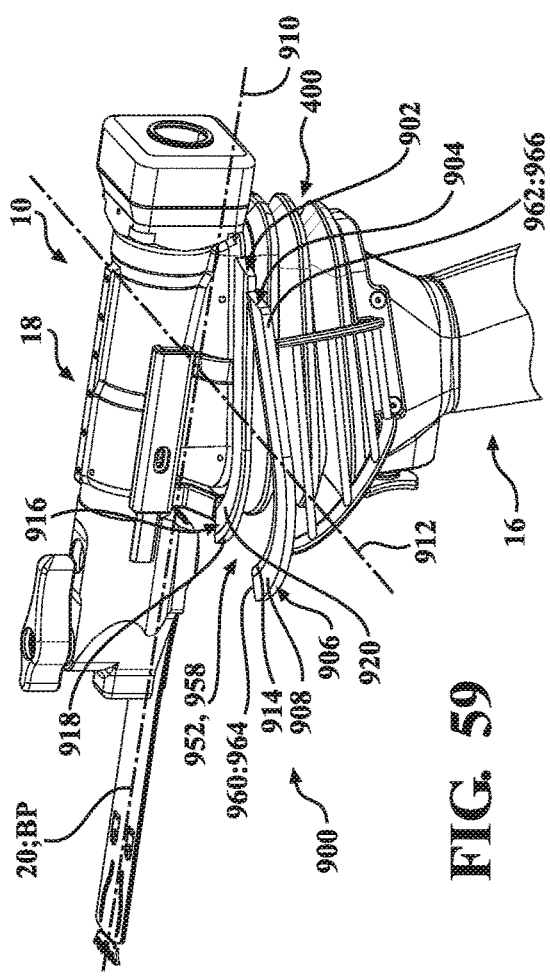

FIG. 61 is a side view of the robotic instrument including the guidance array of FIG. 54 in arranged in the pitch relationship of FIG. 59.

Figure 62:
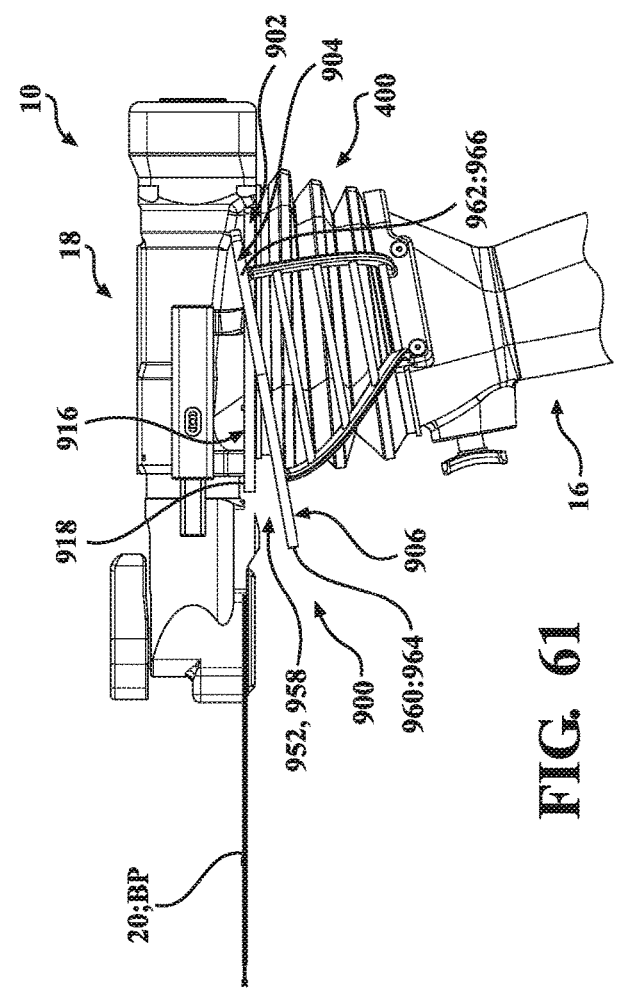

FIG. 62 is a rear view of the robotic instrument including the guidance array of FIG. 54 in arranged in the pitch relationship of FIG. 59.

Figure 63:
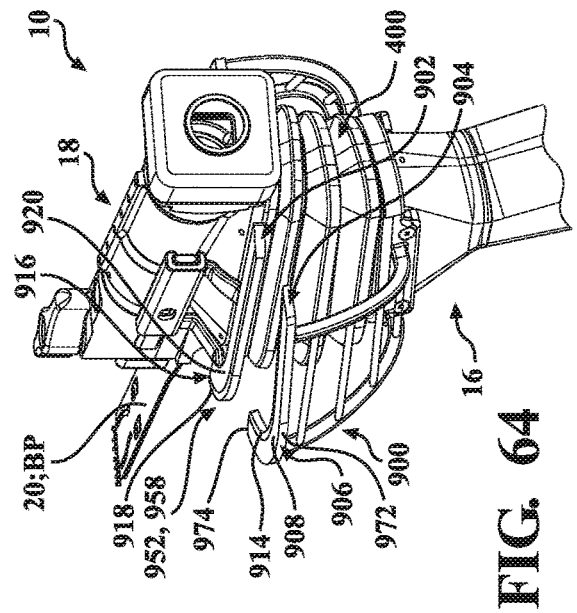

FIG. 63 is a rear perspective view of the robotic instrument including the guidance array of FIG. 54 arranged in a roll relationship.

Figure 64:
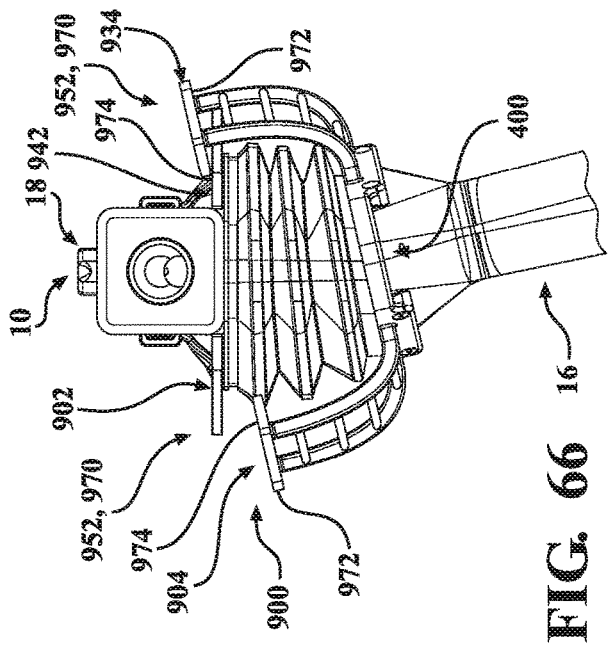

FIG. 64 is another rear perspective view of the robotic instrument including the guidance array of FIG. 54 arranged in the roll relationship of FIG. 63.

Figure 65:
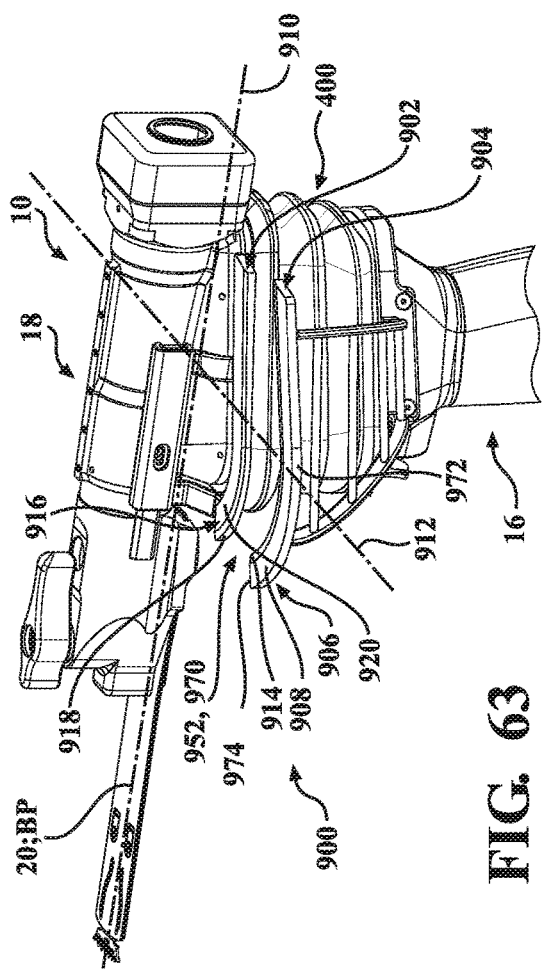

FIG. 65 is a side view of the robotic instrument including the guidance array of FIG. 54 arranged in the roll relationship of FIG. 63.

Figure 66:
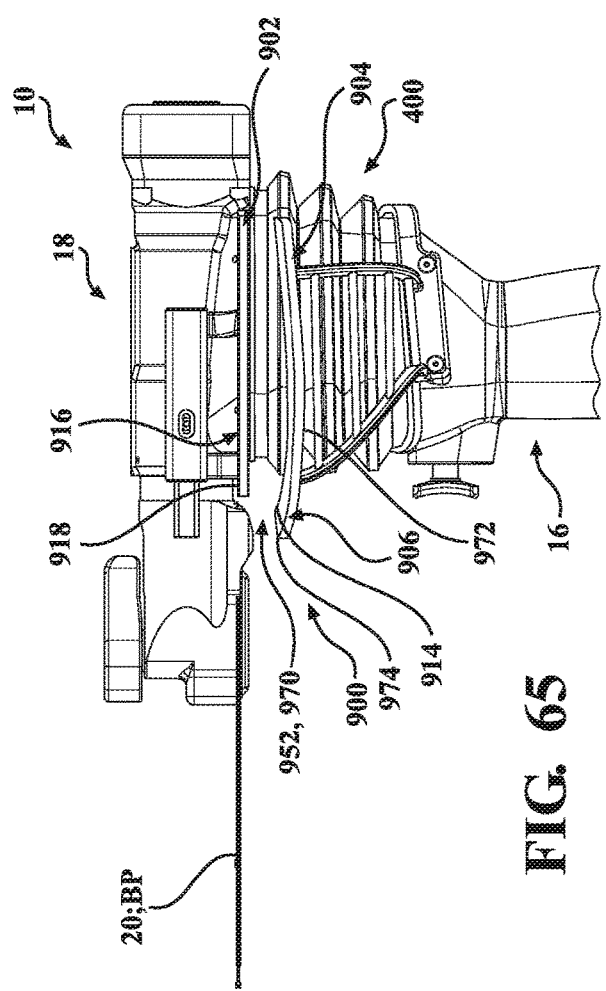

FIG. 66 is a rear view of the robotic instrument including the guidance array arranged of FIG. 54 arranged in the roll relationship of FIG. 63.

Figure 67:
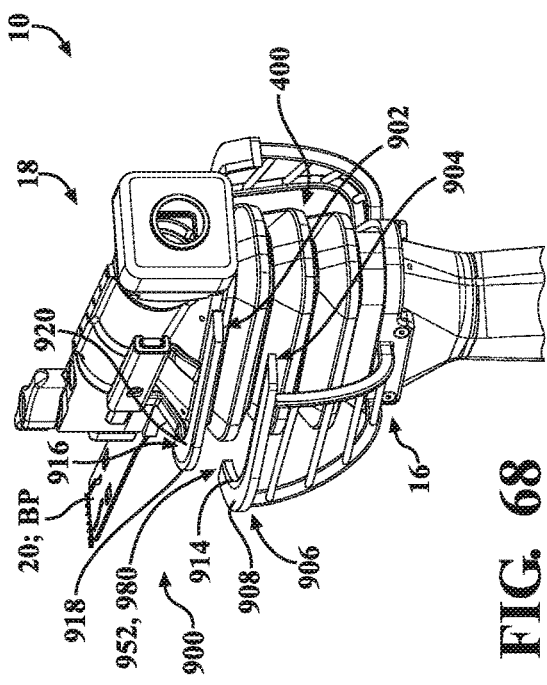

FIG. 67 is a rear perspective view of the robotic instrument including the guidance array of FIG. 54 arranged in an elevation relationship.

Figure 68:
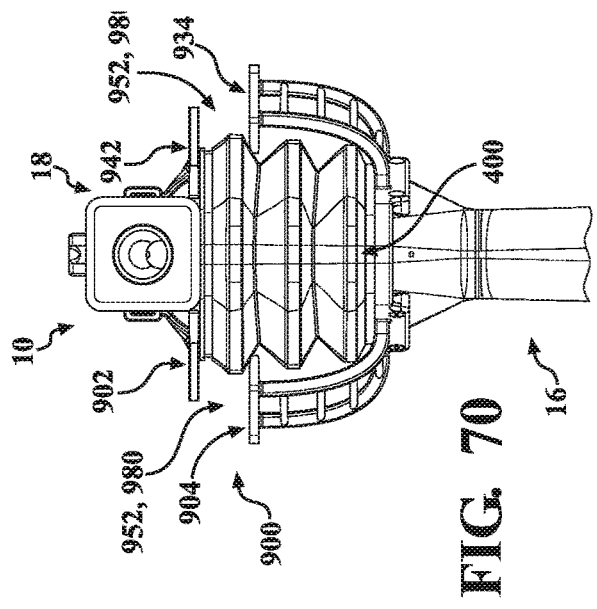

FIG. 68 is another rear perspective view of the robotic instrument including the guidance array of FIG. 54 arranged in the elevation relationship of FIG. 67.

Figure 69:
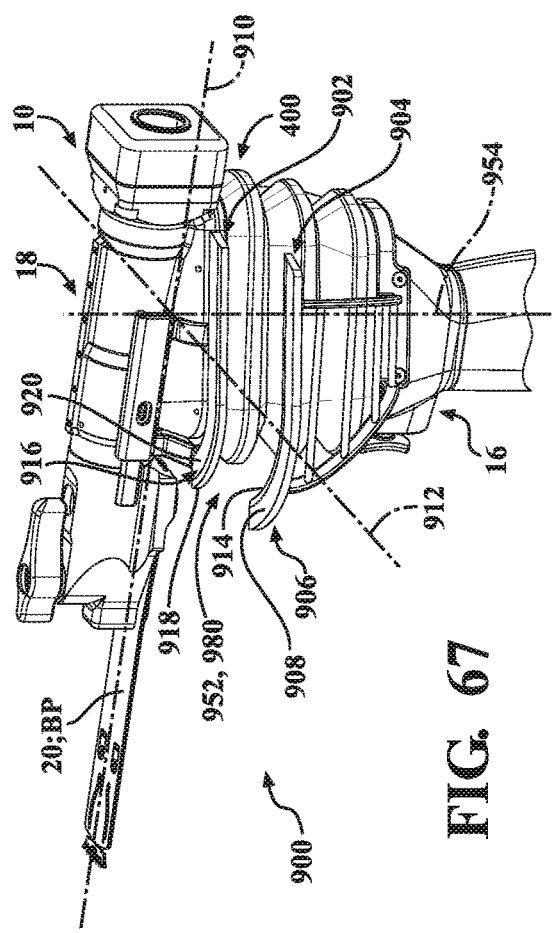

FIG. 69 is a side view of the robotic instrument including the guidance array of FIG. 54 arranged in the elevation relationship of FIG. 67.

Figure 70:
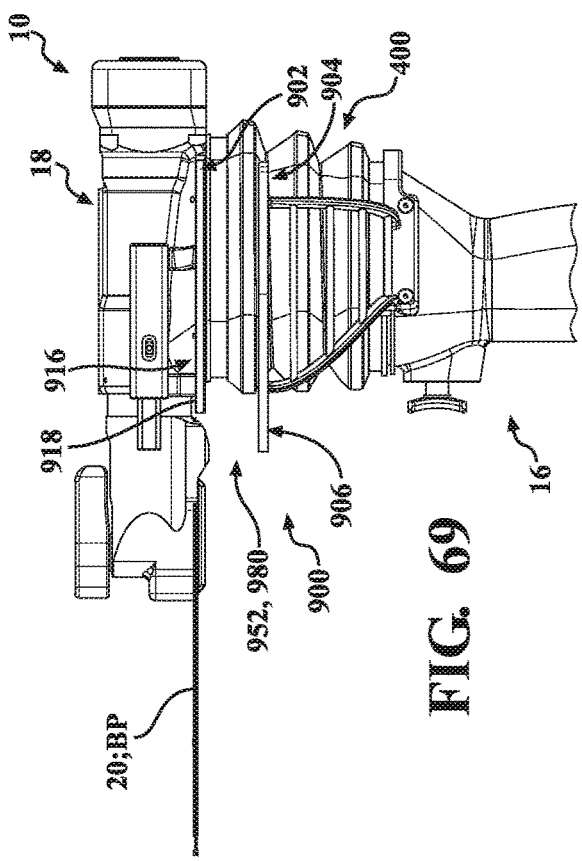

FIG. 70 is a rear view of the robotic instrument including the guidance array of FIG. 54 arranged in the elevation relationship of FIG. 67.

Figure 71:
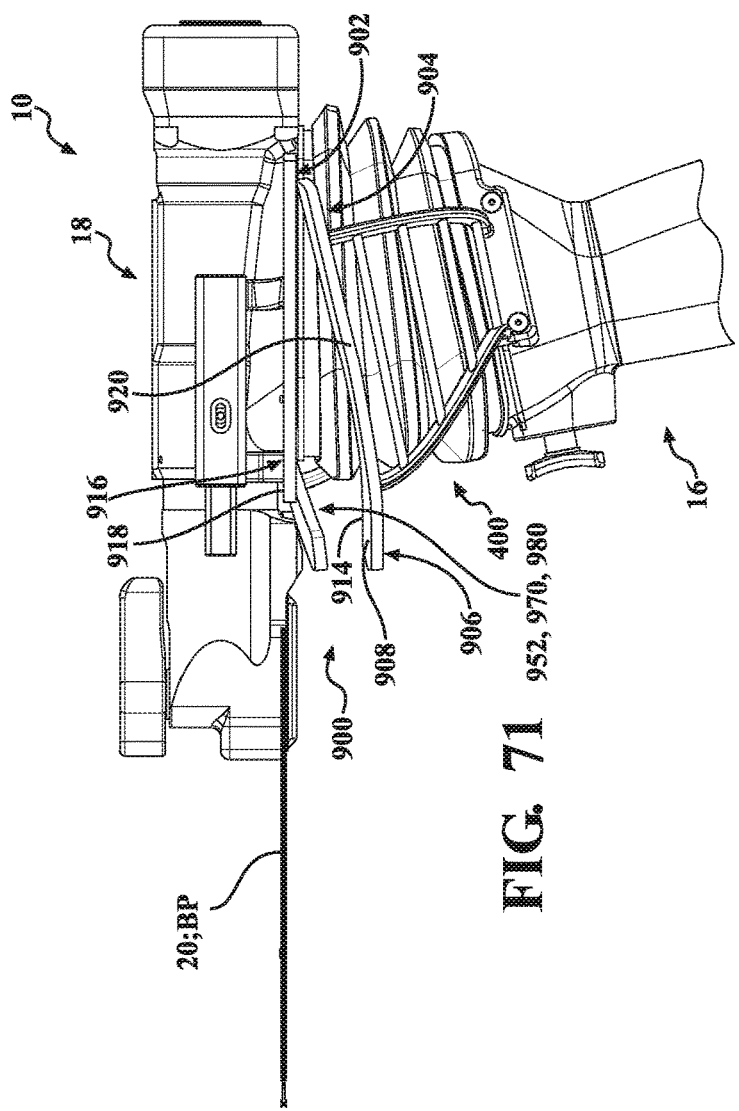

FIG. 71 is a side view of the robotic instrument including the guidance array of FIG. 54 arranged in another spatial relationship.

Figure 72:
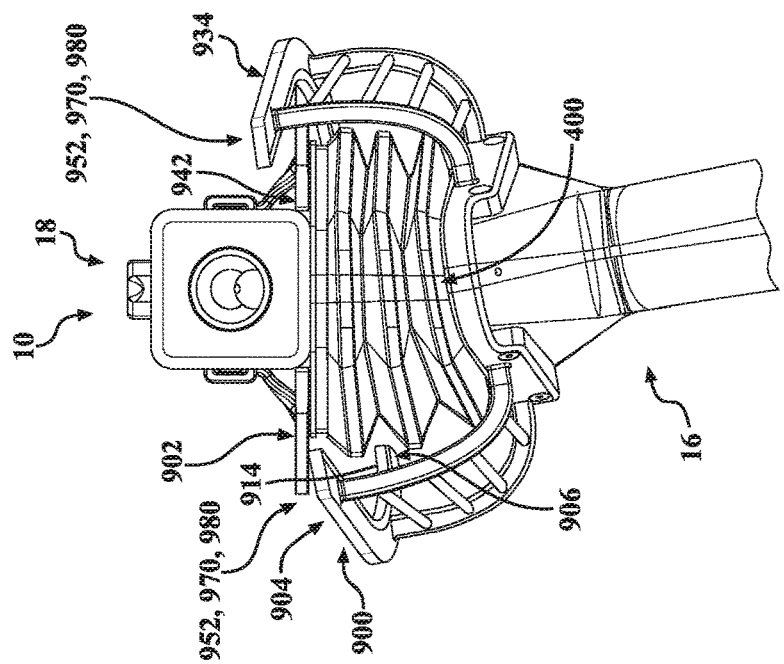

FIG. 72 is a rear view of the robotic instrument including the guidance array of FIG. 54 arranged in configuration of FIG. 71.

Figure 73:
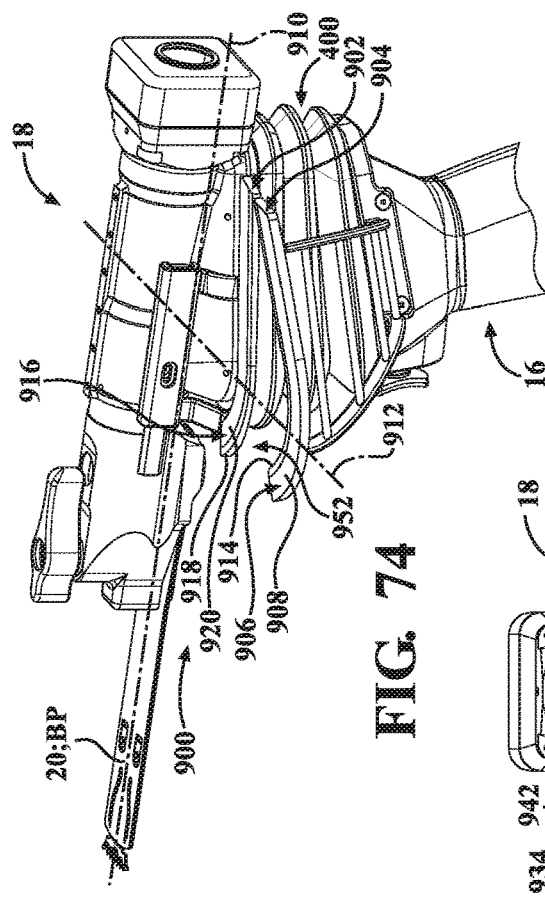

FIG. 73 is a first rear perspective view of the robotic instrument including the guidance array of FIG. 54 arranged in configuration of FIG. 71.

Figure 74:
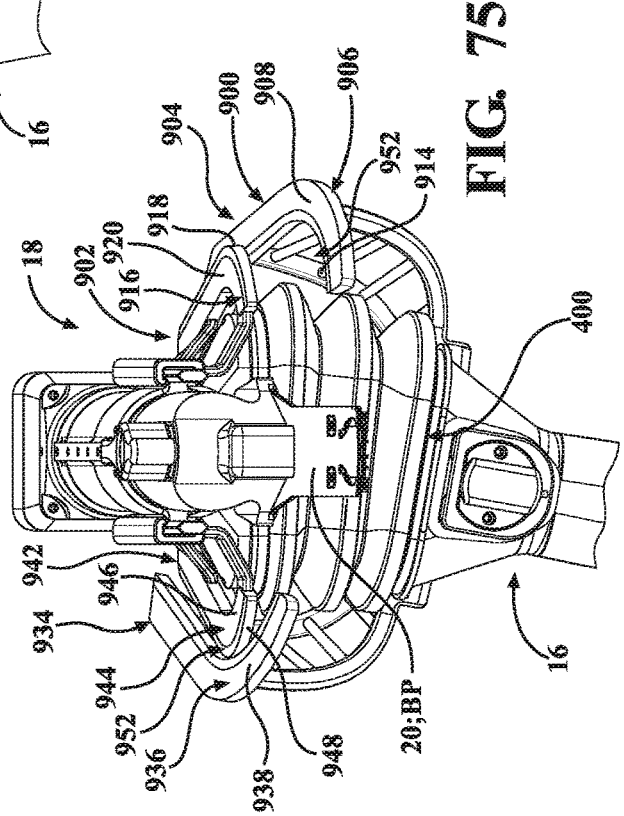

FIG. 74 is a front perspective view of the robotic instrument including the guidance array of FIG. 54 arranged in configuration of FIG. 71.

Figure 75:
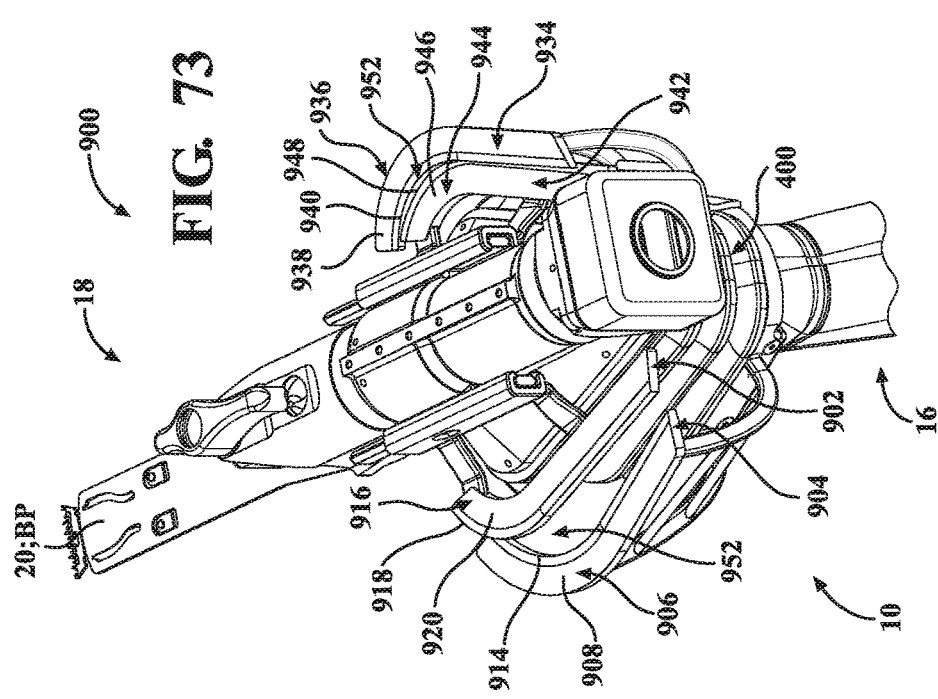

FIG. 75 is a second rear perspective view of the robotic instrument including the guidance array of FIG. 54 arranged in configuration of FIG. 71.

Figure 76:
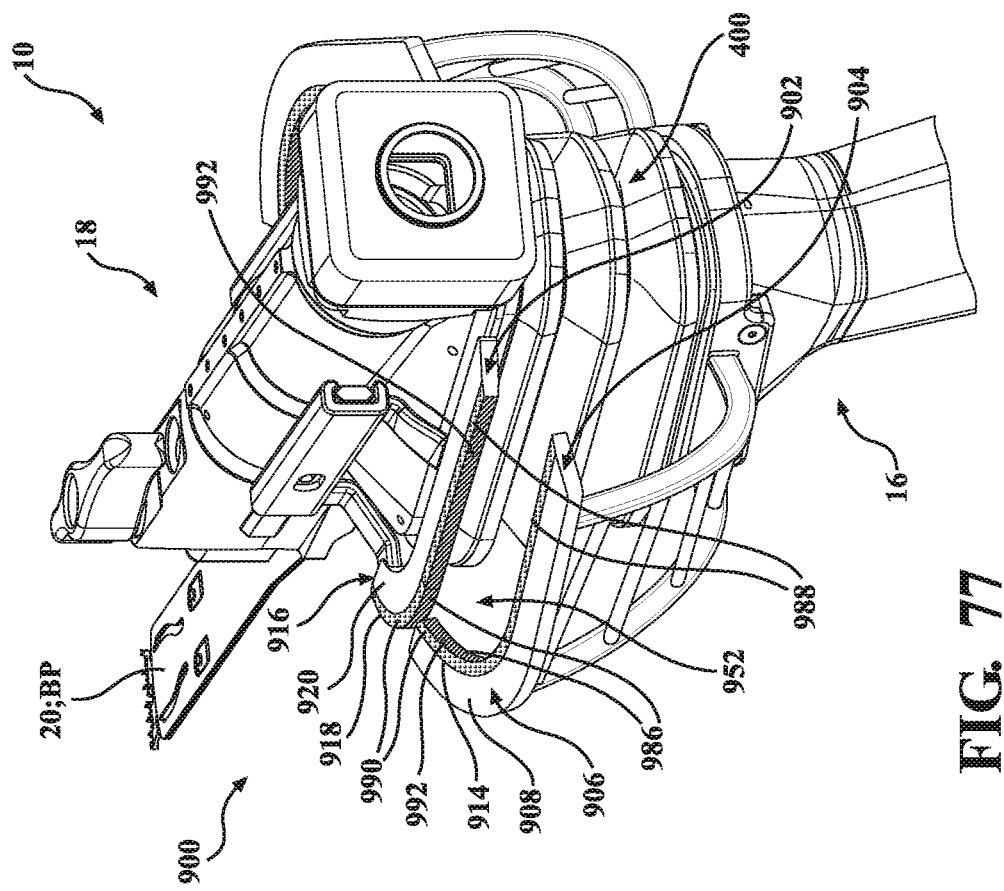

FIG. 76 is a rear perspective view of the robotic instrument including the guidance array of FIG. 54 arranged in a first spatial relationship and including visual indicia.

Figure 77:
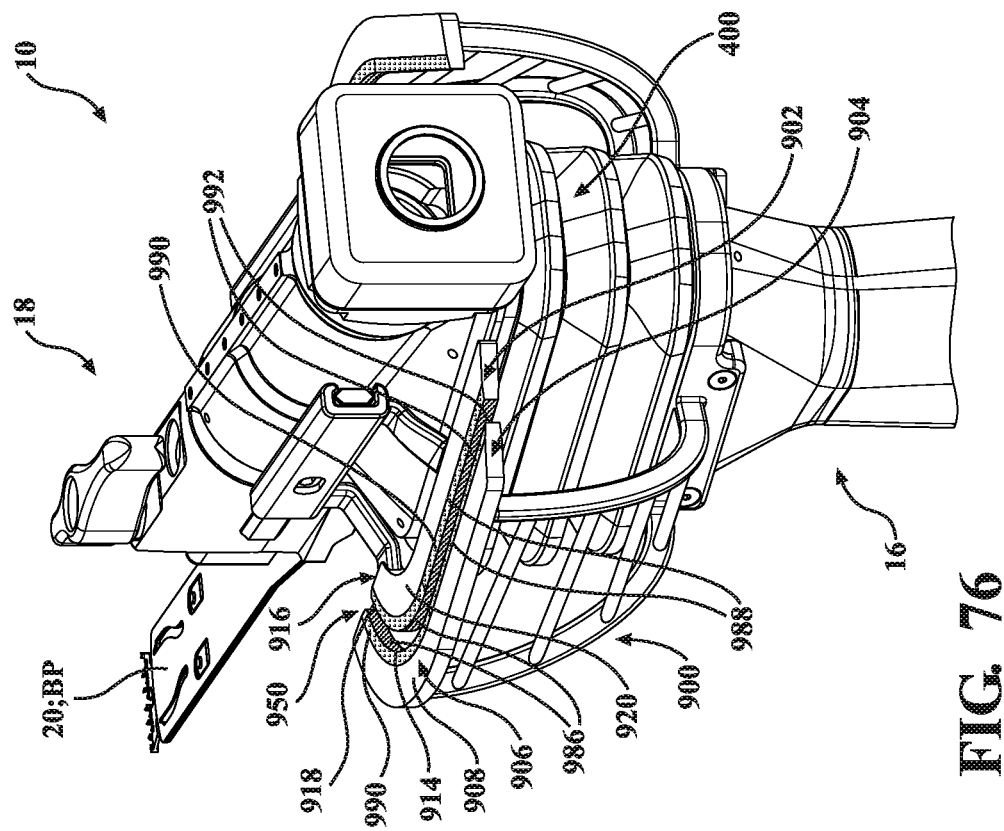

FIG. 77 is a rear perspective view of the robotic instrument including the guidance array of FIG. 54 arranged in a second spatial relationship and including visual indicia.

FIG. 78 is a front perspective view of another configuration of the robotic instrument including one configuration of a guidance array and a tracker.

FIG. 79 is a rear perspective view of the robotic instrument of FIG. 78.

Figure 80:
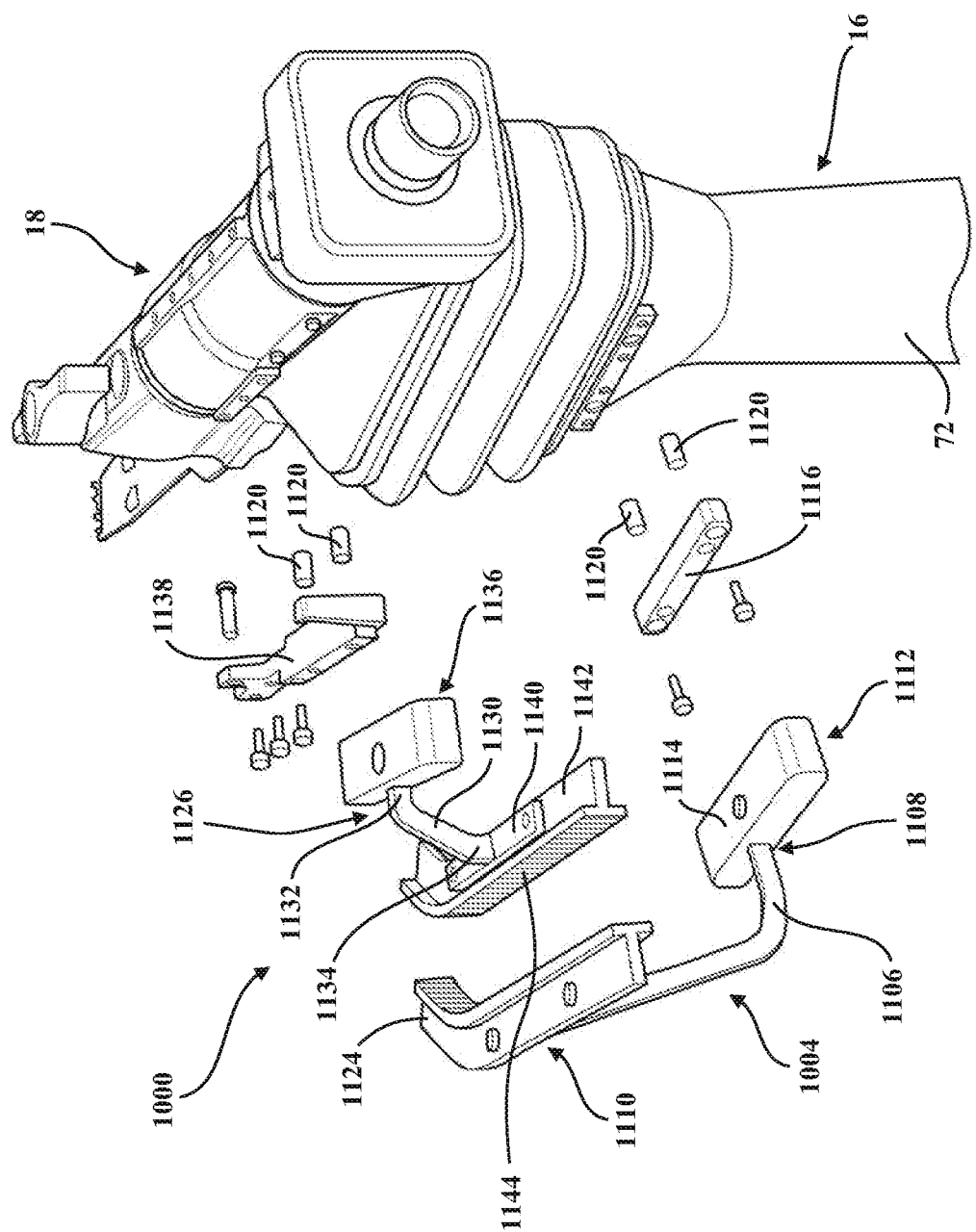

FIG. 80 is an exploded view of one configuration of the guidance array.

Figure 81:
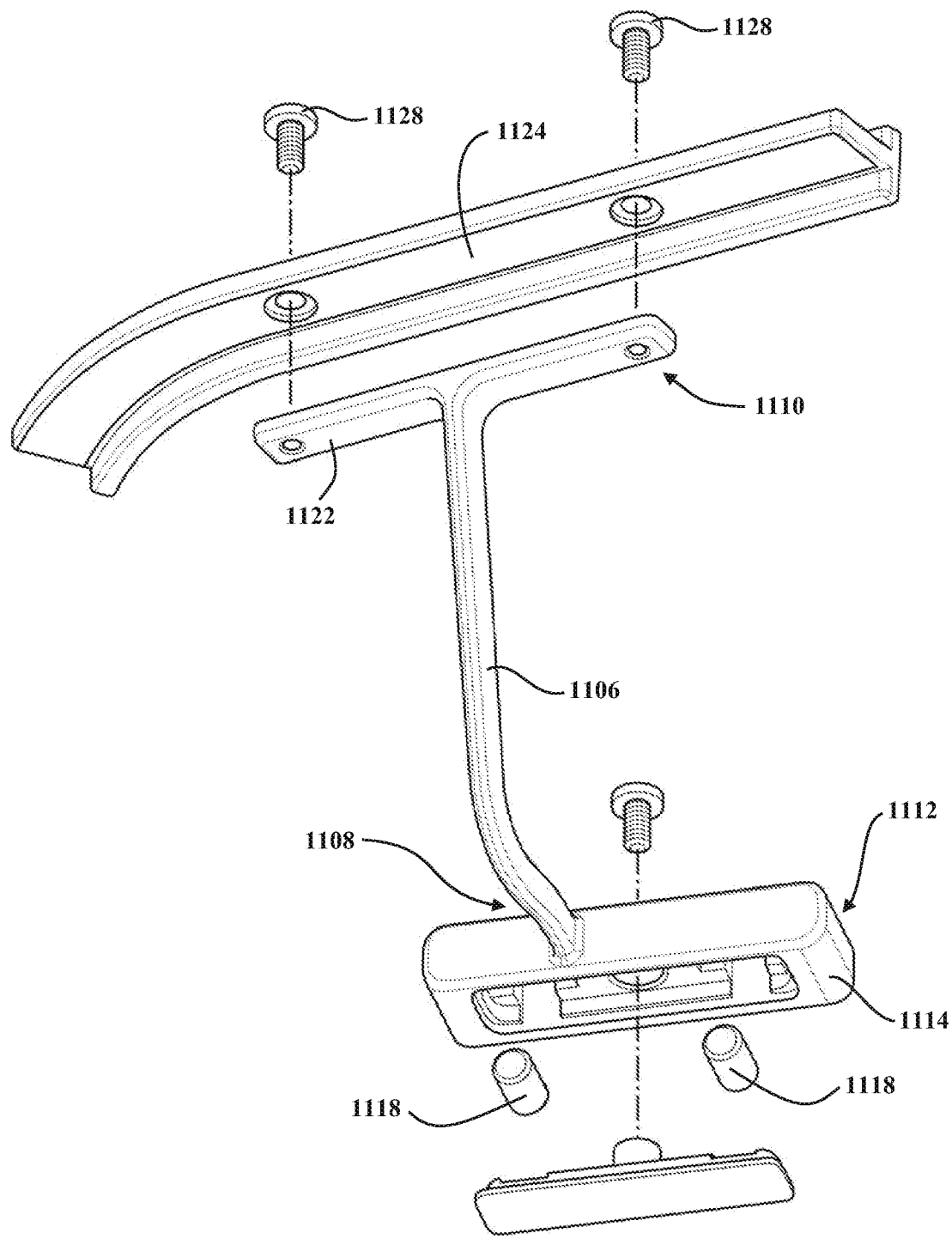

FIG. 81 is an exploded view of one configuration of a handle alignment member.

Figure 82:
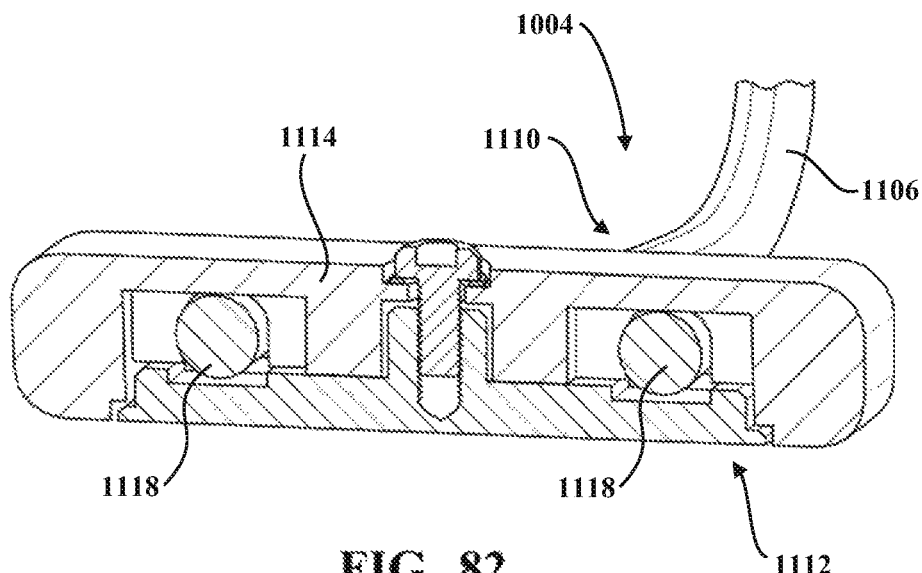

FIG. 82 is a partial perspective section view of the handle alignment member of FIG. 81.

Figure 83:
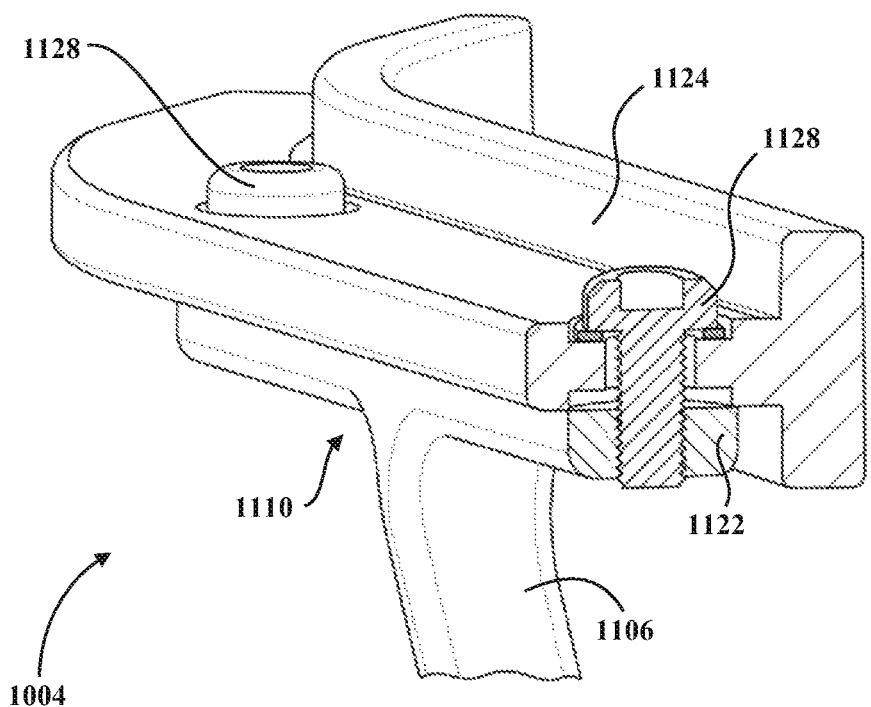

FIG. 83 is another partial perspective section view of the handle alignment member of FIG. 81.

Figure 84:
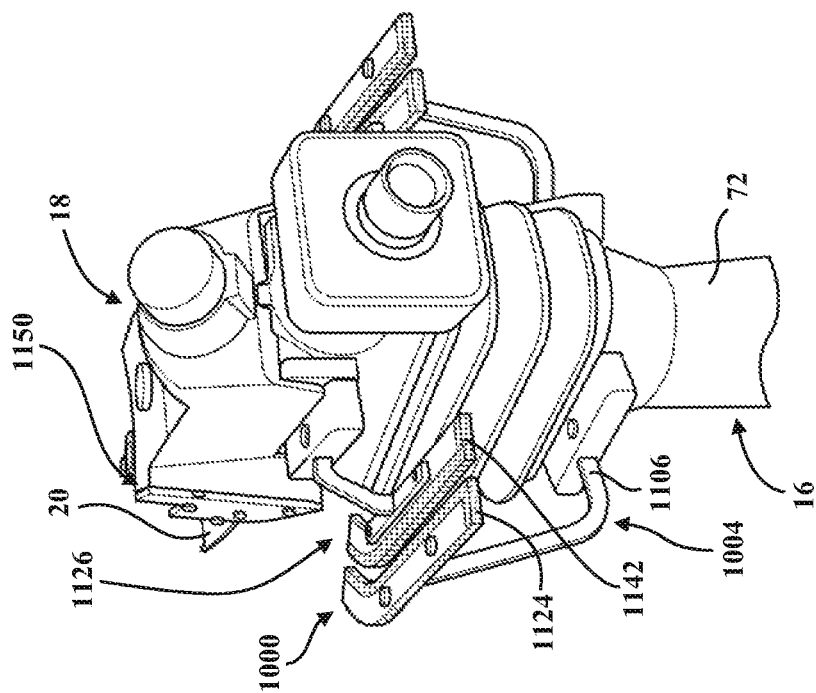

FIG. 84 is a rear perspective view of yet another configuration of the robotic instrument including another configuration of a guidance array.

Figure 85:
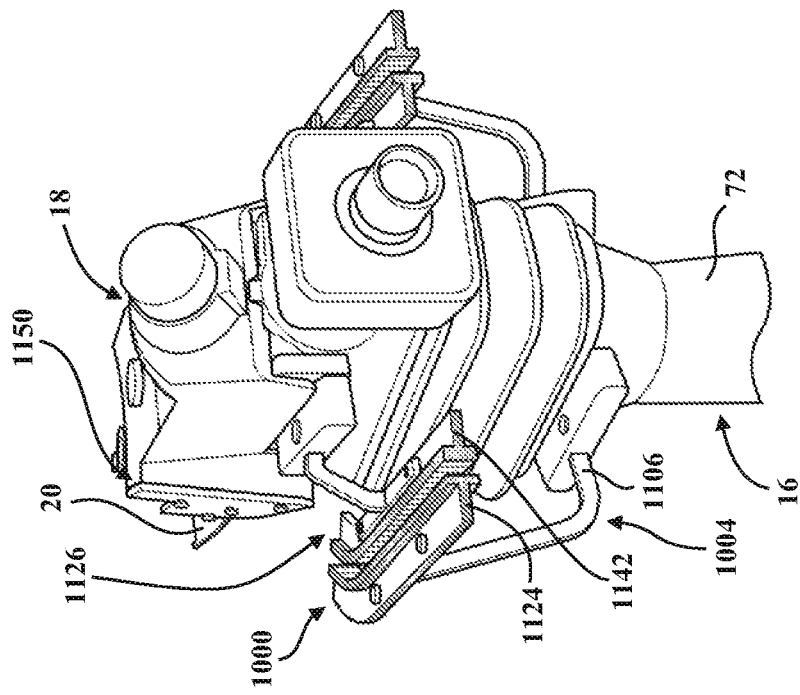

FIG. 85 is a rear perspective view of a further configuration of the robotic instrument including yet another configuration of a guidance array.

Figure 86:
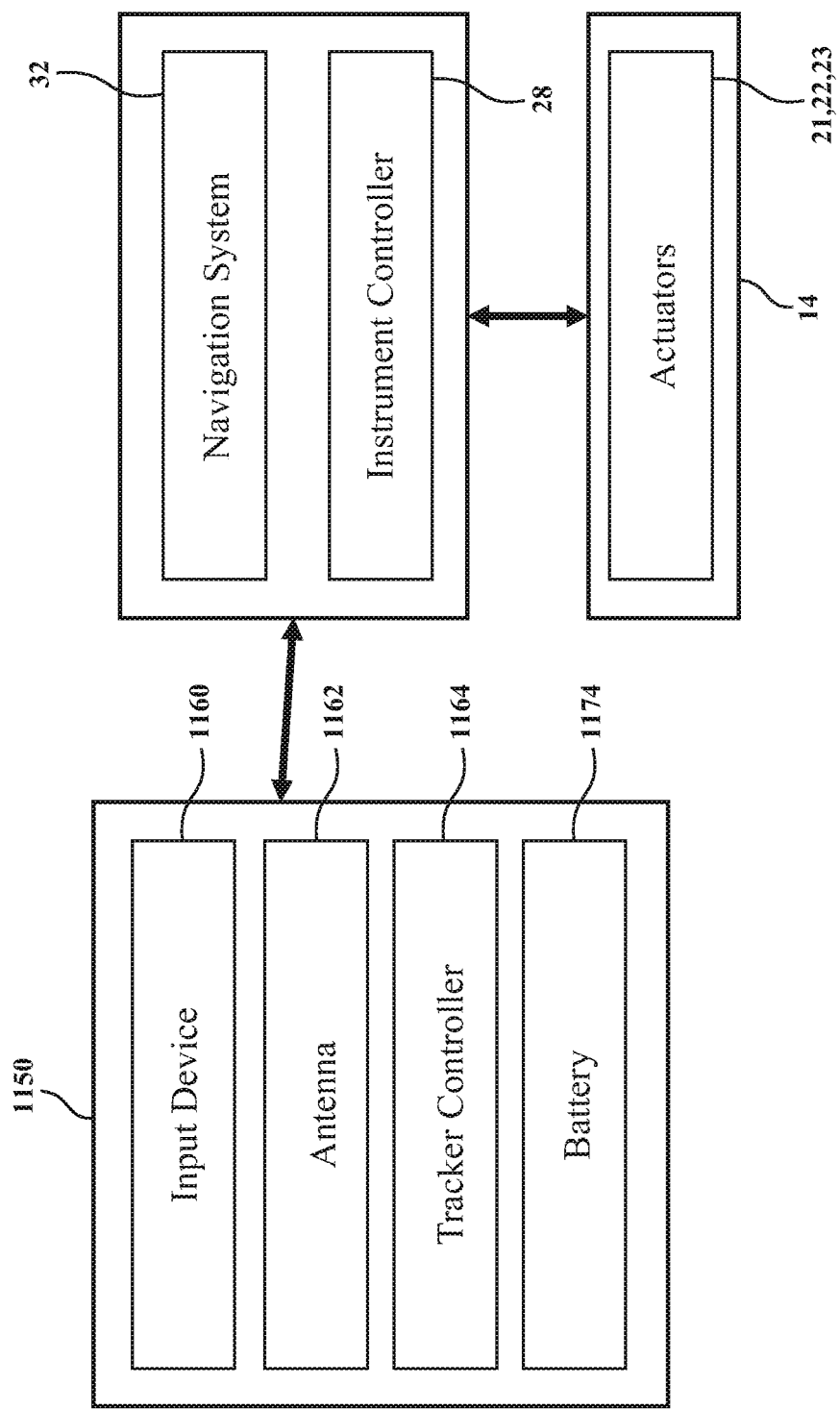

FIG. 86 is a schematic depiction of a tracker in communication with a control system.

DETAILED DESCRIPTION

Overview

Figure 1:
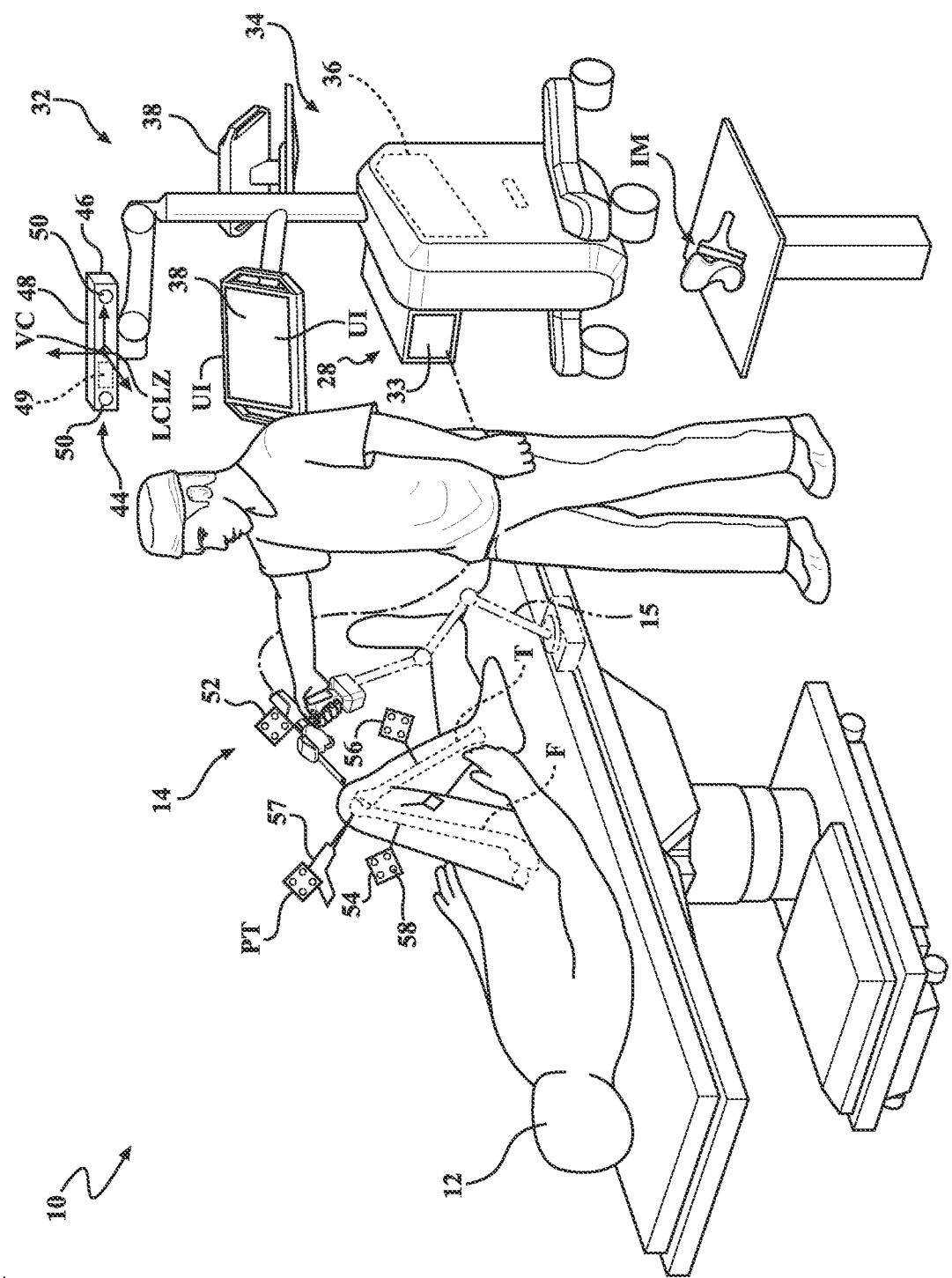
FIG. 1 is a perspective view of a robotic system.

Referring to FIG. 1, a robotic system 10 is illustrated. The robotic system 10 is shown performing a total knee procedure on a patient 12 to resect portions of a femur F and tibia T of the patient 12 so that the patient 12 can receive a total knee implant IM. The robotic system 10 may be used to perform other types of surgical procedures, including procedures that involve hard/soft tissue removal, or other forms of treatment. For example, treatment may include cutting tissue, coagulating tissue, ablating tissue, stapling tissue, suturing tissue, or the like. In some examples, the surgical procedure involves knee surgery, hip surgery, shoulder surgery, spine surgery, and/or ankle surgery, and may involve removing tissue to be replaced by surgical implants, such as knee implants, hip implants, shoulder implants, spine implants, and/or ankle implants. The robotic system 10 and techniques disclosed herein may be used to perform other procedures, surgical or non-surgical, and may be used in industrial applications or other applications where robotic systems are utilized.

Figure 2:
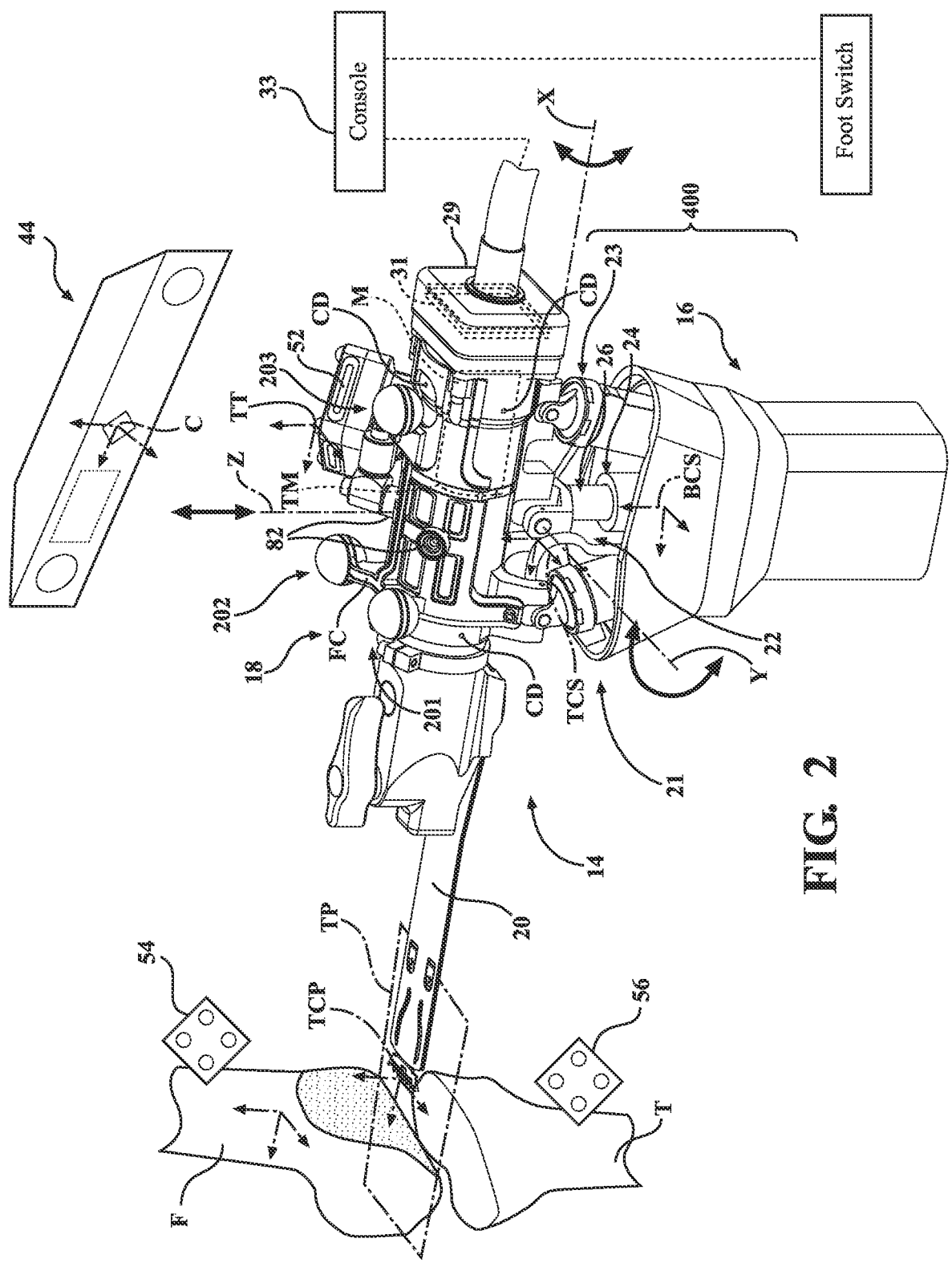
FIG. 2 is a perspective view of a robotic instrument being used to cut five planes on a femur to receive a total knee implant.
Figure 3A:
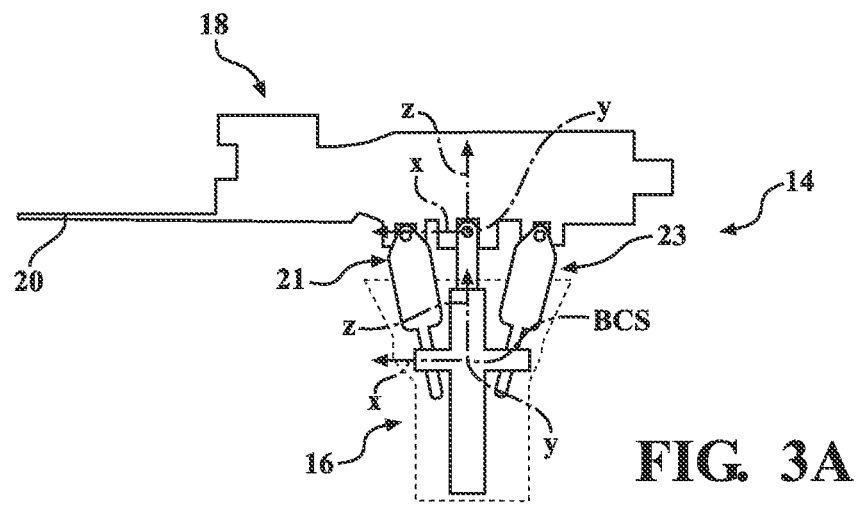
FIGS. 3A-3C are illustrations of various pitch orientations of the robotic instrument.
Figure 3B:
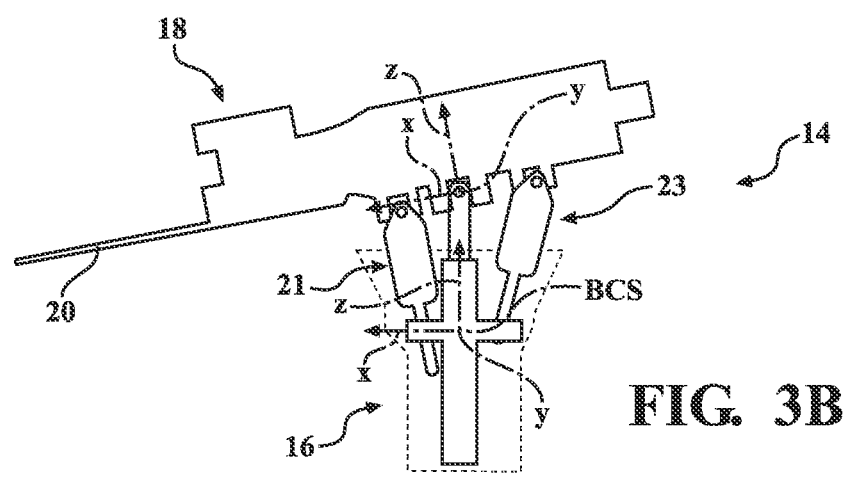
Figure 3C:
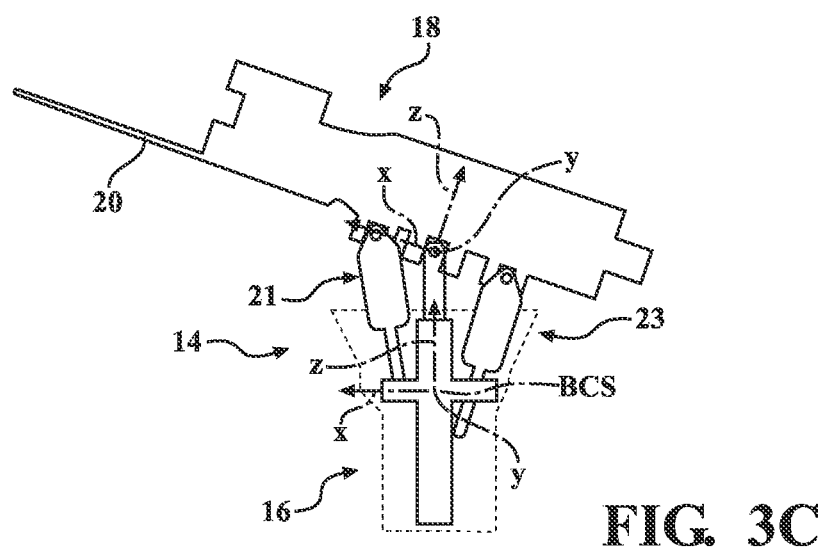
Figure 4C:
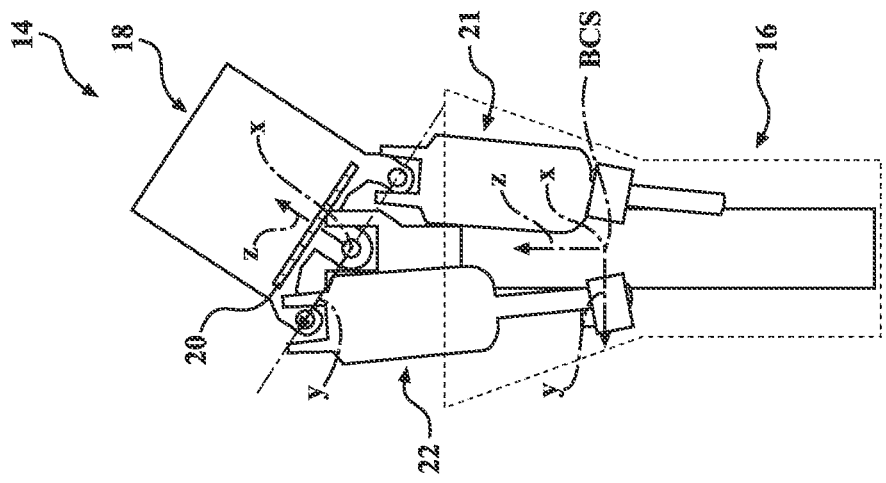
FIGS. 4A-4C are illustrations of various roll orientations of the robotic instrument.
Figure 4B:
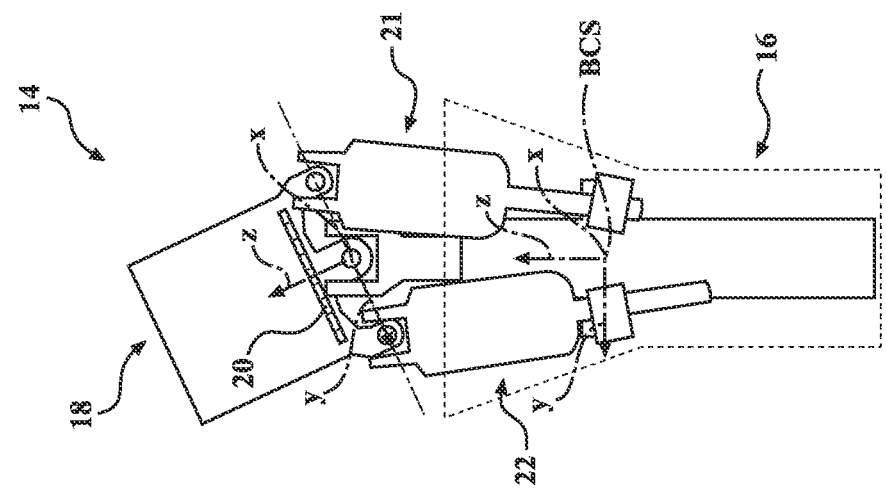
Figure 4A:
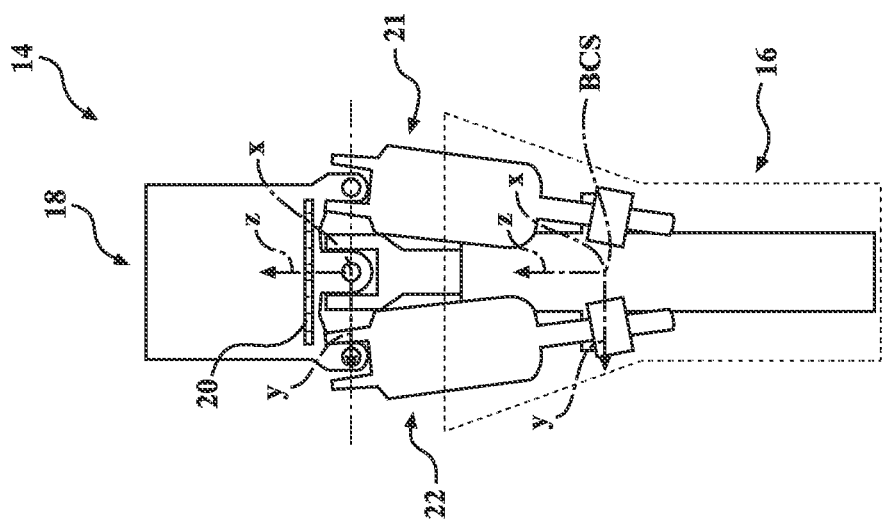
Figure 5A:
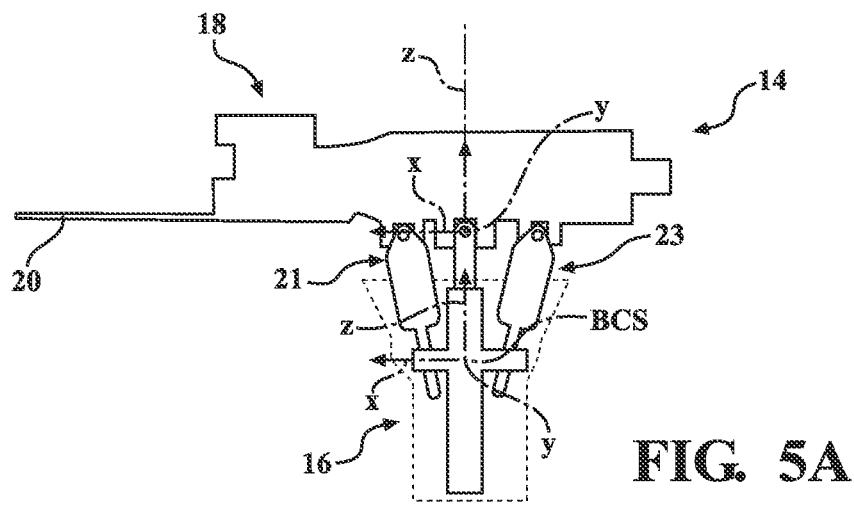
FIGS. 5A-5C are illustrations of various z-axis translation positions of the robotic instrument.
Figure 5B:
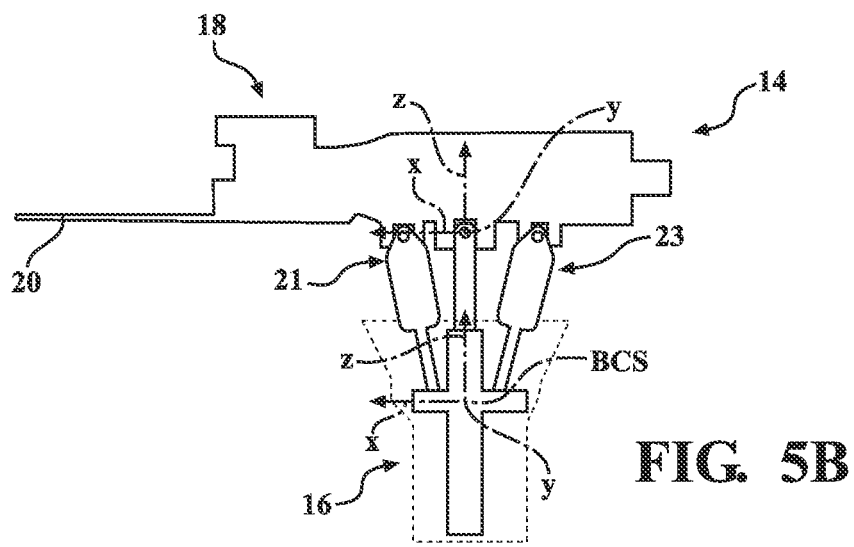
Figure 5C:
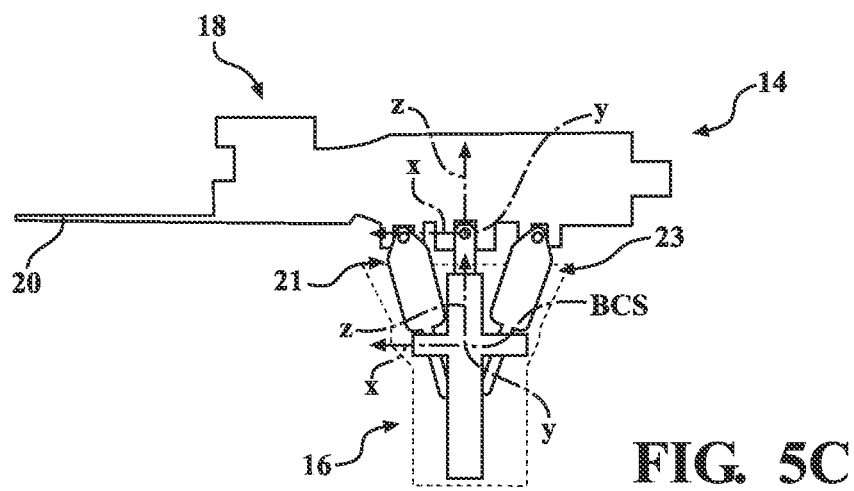

Referring to FIGS. 1 and 2, the robotic system 10 includes an instrument 14. In some examples, a user manually holds and supports the instrument 14 (as shown in FIG. 1). In some examples, the user may manually hold the instrument 14 while the instrument is being at least partially, or fully, supported by an assistive device, such as a passive arm (e.g., linkage arm with locking joints, weight-balancing arm), an active arm, and/or the like. As best shown in FIGS. 1 and 2, the instrument 14 comprises a hand-held portion 16 for being manually grasped and/or supported by the user and/or assistive device.

The instrument 14 may be freely moved and supported by a user without the aid of a guide arm, e.g., configured to be held by a human user while effecting physical removal of material such that the weight of the tool is supported solely by a hand of the user during the procedure. Put another way, the instrument 14 may be configured to be held such that the user's hand is supporting the instrument 14 against the force of gravity. The instrument 14 may weigh 8 lbs. or less, 6 lbs. or less, 5 lbs. or less, or even 3 lbs. or less. The instrument 14 may have a weight corresponding to ANSI/AAMI HE75: 2009. The instrument 14 also comprises a tool support 18 for receiving a tool 20. In some examples, when the tool 20 is a saw blade 380, the tool support 18 may be referred to as a blade support. The method for operating the instrument 14 may include a user suspending the weight of the instrument 14 without any assistance from a passive arm or robotic arm. Alternately, the weight of the instrument 14 may be supported through use of a counter-balanced passive arm, assistive device, or active robotic arm, such that the user does not have to support the entire weight of the instrument. In such cases, the user may still grasp the hand-held portion 16 in order to interact with and/or guide the instrument 14. The passive arm and the contents of U.S. Pat. No. 9,060,794 to Kang et al. are incorporated herein by reference. Furthermore, the robotic system 10, in some examples, may be free from a robot arm having more than one joint in series.

The tool 20 couples to the tool support 18 to interact with the anatomy in certain operations of the robotic system 10 described further below. The tool 20 may also be referred to as an end effector. The tool 20 may be removable from the tool support 18 such that new/different tools 20 can be attached when needed. The tool 20 may also be permanently fixed to the tool support 18. The tool 20 may comprise an energy applicator designed to contact the tissue of the patient 12. In some examples, the tool 20 may be a saw blade, as shown in FIGS. 1 and 2, or other type of cutting accessory. In such instances, the tool support 18 may be referred to as a blade support. It should be appreciated that in any instance where blade support is referred to, it may be substituted for the term 'tool support' and vice-versa. However, other tools may be contemplated, such as the contents of U.S. Pat. No. 9,707,043 to Bozung, which is hereby incorporated herein by reference. In some examples, the tool 20 may be a drill bit, an ultrasonic vibrating tip, a bur, a stapler, or the like. The tool 20 may comprise the blade assembly and drive motor to cause oscillatory motion of the blade as shown in U.S. Pat. No. 9,820,753 to Walen et al. or U.S. Pat. No. 10,687,823, hereby incorporated herein by reference. Such driving components may comprise a transmission TM coupled to the drive motor M to convert rotary motion from the drive motor M into oscillating motion of the tool 20.

The system and methods described in PCT/US2020/042128, entitled "Robotic Handheld Surgical Instrument Systems and Methods", filed on Jul. 15, 2020, are also hereby incorporated by reference.

An actuator assembly 400 comprising one or more actuators 21, 22, 23 move the tool support 18 in three degrees of freedom relative to the hand-held portion 16 to provide robotic motion that assists in placing the tool 20 at a desired position and/or orientation (e.g., at a desired pose relative to the femur F and/or tibia T during resection), while the user holds the hand-held portion 16. The actuator assembly 400 may comprise actuators 21, 22, 23 that are arranged in parallel, in series, or a combination thereof. In some examples, the actuators 21, 22, 23 move the tool support 18 in three or more degrees of freedom relative to the hand-held portion 16. In some examples, the actuator assembly 400 is configured to move the tool support 18 relative to the hand-held portion 16 in at least two degrees of freedom, such as pitch and z-axis translation. In some examples, such as shown herein, the actuators 21, 22, 23 move the tool support 18 and its associated tool support coordinate system TCS in only three degrees of freedom relative to the hand-held portion 16 and its associated base coordinate system BCS. For example, the tool support 18 and its tool support coordinate system TCS may: rotate about its y-axis to provide pitch motion; rotate about its x-axis to provide roll motion; and translate along an axis Z coincident with a z-axis of the base coordinate system BCS to provide z-axis translation motion. The allowed motions in pitch, roll, and z-axis translation are shown by arrows in FIG. 2 and in the schematic illustrations of FIGS. 3A-3C, 4A-4C, and 5A-5C, respectively. FIG. 6 provides one example of a pose of the tool support 18 and a pose of the hand-held portion 16 within the range of motion of the instrument 14. In some examples, not shown in the figures, actuators may move the tool support 18 in four or more degrees of freedom relative to the hand-held portion 16.

Referring back to FIG. 2, a constraint assembly 24 having a passive linkage 26 may be used to constrain movement of the tool support 18 relative to the hand-held portion 16 in the remaining three degrees of freedom. The constraint assembly 24 may comprise any suitable linkage (e.g., one or more links having any suitable shape or configuration) to constrain motion as described herein. In the example shown in FIG. 2, the constraint assembly 24 operates to limit motion of the tool support coordinate system TCS by: constraining rotation about the z-axis of the base coordinate system BCS to constrain yaw motion; constraining translation in the x-axis direction of the base coordinate system BCS to constrain x-axis translation; and constraining translation in the y-axis direction of the base coordinate system BCS to constrain y-axis translation. The actuators 21, 22, 23 and constraint assembly 24, in certain situations described further below, are controlled to effectively mimic the function of a physical cutting guide, such as a physical saw cutting guide.

Figure 7:
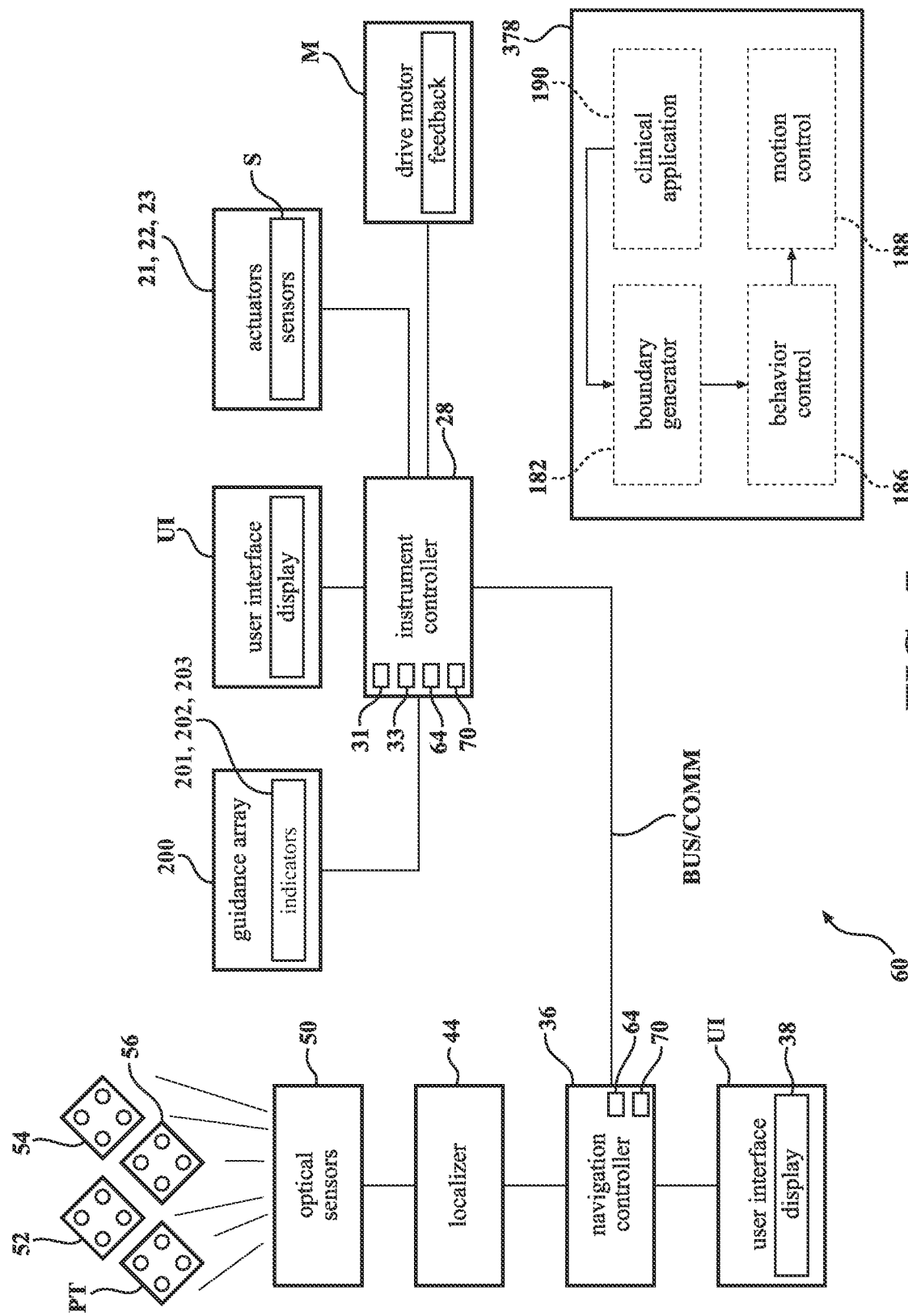
FIG. 7 is a block diagram of a control system, and also illustrates various software modules.

Referring to FIG. 7, an instrument controller 28, or other type of control unit, is provided to control the instrument 14. The instrument controller 28 may comprise one or more computers, or any other suitable form of controller that directs operation of the instrument 14 and motion of the tool support 18 (and tool 20) relative to the hand-held portion 16. The instrument controller 28 may have a central processing unit (CPU) and/or other processors, memory, and storage (not shown). The instrument controller 28 is loaded with software as described below. The processors could include one or more processors to control operation of the instrument 14. The processors can be any type of microprocessor, multi-processor, and/or multi-core processing system. The instrument controller 28 may additionally, or alternatively, comprise one or more microcontrollers, field programmable gate arrays, systems on a chip, discrete circuitry, and/or other suitable hardware, software, or firmware that is capable of carrying out the functions described herein. The term processor is not intended to limit any embodiment to a single processor. The instrument 14 may also comprise a user interface UI with one or more displays and/or input devices (e.g., triggers, push buttons, foot switches, keyboard, mouse, microphone (voice-activation), gesture control devices, touchscreens, etc.).

The control system 60 further includes one or more software programs and software modules. The software modules may be part of the program or programs that operate on the navigation controller 36, instrument controller 28, or both, to process data to assist with control of the robotic system 10. The software programs and/or modules include computer readable instructions stored in non-transitory memory 64 on the navigation controller 36, instrument controller 28, or both, to be executed by one or more processors 70 of the controllers 28, 36. The memory 64 may be any suitable configuration of memory, such as RAM, non-volatile memory, etc., and may be implemented locally or from a remote database. Additionally, software modules for prompting and/or communicating with the user may form part of the program or programs and may include instructions stored in memory 64 on the navigation controller 36, instrument controller 28, or both. The user may interact with any of the input devices of the navigation user interface UI or other user interface UI to communicate with the software modules. The user interface software may run on a separate device from the navigation controller 36, and/or instrument controller 28.

The instrument controller 28 controls operation of the tool 20, such as by controlling power to the tool 20 (e.g., to the drive motor M of the tool 20 that controls cutting motion) and controlling movement of the tool support 18 relative to the hand-held portion 16 (e.g., by controlling the actuators 21, 22, 23). The instrument controller 28 controls a state (e.g., position and/or orientation) of the tool support 18 and the tool 20 with respect to the hand-held portion 16. The instrument controller 28 can control velocity (linear or angular), acceleration, or other derivatives of motion of the tool 20 relative to the hand-held portion 16 and/or relative to the anatomy that is caused by the actuators 21, 22, 23.

As shown in FIG. 2, the instrument controller 28 may comprise a control housing 29 mounted to the tool support 18, and/or the hand-held portion 16 or a combination thereof with one or more control boards 31 (e.g., one or more printed circuit boards and associated electronic components) located inside the control housing 29. The control boards 31 may comprise microcontrollers, field programmable gate arrays (FPGA), drivers, memory, sensors, or other electronic components for controlling the actuators 21, 22, 23 and the drive motor M (e.g., via motor controllers). The instrument controller 28 may also comprise an off-board control console 33 in data and power communication with the control boards 31. The sensors S, actuators 21, 22, 23, and/or drive motor M described herein may feed signals to the control boards 31, which transmit data signals out to the console 33 for processing, and the console 33 may feed control commands (e.g. current commands, torque commands, velocity commands, angle commands, position commands, or a combination thereof, as well as various control and configuration parameters) back to the control boards 31 in order to power and control the actuators 21, 22, 23 and/or the drive motor M. It is contemplated that the processing may also be performed on the control board(s) of the control housing. In some examples, the processing of the control algorithms may be distributed between the console and the control housing. In one example, the position control and velocity control calculations may be in the console and current control may be in the field programmable gate arrays located in the control house. Of course, it is contemplated that no separate control housing is necessary, and/or the processing can be performed in any number of different locations.

In some versions, the console 33 may comprise a single console for powering and controlling the actuators 21, 22, 23, and the drive motor M. In some versions, the console 33 may comprise one console for powering and controlling the actuators 21, 22, 23 and a separate console for powering and controlling the drive motor M. One such console for powering and controlling the drive motor M may be like that described in U.S. Pat. No. 7,422,582, filed on Sep. 30, 2004, entitled, "Control Console to which Powered Surgical Handpieces are Connected, the Console Configured to Simultaneously Energize more than one and less than all of the Handpieces," hereby incorporated herein by reference. Flexible circuits FC, also known as flex circuits, may interconnect the actuators 21, 22, 23 and/or other components with the instrument controller 28. For example, flexible circuits Fc may be provided between the actuators 21, 22, 23, and the control boards 31. Other forms of connections, wired or wireless, may additionally, or alternatively, be present between components.

Referring briefly back to FIG. 1, the robotic system 10 further includes a navigation system 32. One example of the navigation system 32 is described in U.S. Pat. No. 9,008,757, filed on Sep. 24, 2013, entitled, "Navigation System Including Optical and Non-Optical Sensors," hereby incorporated herein by reference. The navigation system 32 tracks movement of various objects. Such objects include, for example, the instrument 14, the tool 20 and the anatomy, e.g., the femur F and tibia T. The navigation system 32 tracks these objects to gather state information of each object with respect to a (navigation) localizer coordinate system LCLZ. As used herein, the state of an object includes, but is not limited to, data that defines the position and/or orientation of the tracked object (e.g., coordinate systems thereof) or equivalents/derivatives of the position and/or orientation. For example, the state may be a pose of the object, and/or may include linear velocity data, angular velocity data, and the like.

The navigation system 32 may include a cart assembly 34 that houses a navigation controller 36, and/or other types of control units. A navigation user interface UI is in operative communication with the navigation controller 36. The navigation user interface UI includes one or more displays 38. The navigation system 32 is capable of displaying graphical representations of the relative states of the tracked objects to the user using the one or more displays 38. The navigation user interface UI further comprises one or more input devices to input information into the navigation controller 36 or otherwise to select/control certain aspects of the navigation controller 36. Such input devices include interactive touchscreen displays. However, the input devices may include any one or more of push buttons, pointer, foot switches, a keyboard, a mouse, a microphone (voice-activation), gesture control devices, and the like. In some examples, the user may use buttons located on the pointer to navigate through icons and menus of the user interfaces UI to make selections, configuring the robotic surgical system 10 and/or advancing through the workflow.

The navigation system 32 also includes a localizer 44 coupled to the navigation controller 36. In one example, the localizer 44 is an optical localizer and includes a camera unit 46. The camera unit 46 has an outer casing 48 that houses one or more optical sensors 50. The localizer 44 may comprise its own localizer controller 49 and may further comprise a video camera VC.

The navigation system 32 includes one or more trackers. In some examples, the trackers include a pointer tracker PT, a tool tracker 52, a first patient tracker 54, and a second patient tracker 56. In the illustrated example of FIG. 1, the tool tracker 52 is firmly attached to the instrument 14, the first patient tracker 54 is firmly affixed to the femur F of the patient 12, and the second patient tracker 56 is firmly affixed to the tibia T of the patient 12. In this example, the patient trackers 54, 56 are firmly affixed to sections of bone. The trackers 52, 54, 56 and pointer tracker are registered to their respective objects (e.g., bone, tool) and the navigation system 32 manually, automatically, or a combination thereof. In some examples, the pointer tracker PT is firmly affixed to a pointer 57 and used for registering the anatomy to one or more coordinate systems, including the localizer coordinate system LCLZ and/or used for other calibration and/or registration functions. In one example, the pointer 57 may be used to register the patient trackers 54, 56 to the bone which the tracker 54, 56 is attached, respectively, and the tool tracker 52 (and optionally 53) to the tool support 18, the tool 20, the hand-held portion 16, or a combination thereof. In some examples, the pointer tracker PT may be used to register the TCP of the instrument 14 to the tracker 52 relative to a tracker coordinate system. This way, if the localizer 44 is moved from position to position, the registration of the instrument 14 is located relative to the tool tracker 52. However, other means of registration of the trackers 52, 54, 56 are contemplated and may be implemented together or separately with the pointer tracker PT. Other tracker locations are also contemplated.

Throughout this description, various transforms are described, such as 'bone to tracker' or 'instrument TCP to tracker', i.e., relative to the 'tracker coordinate system' rather than to the LCTZ coordinate system. The localizer coordinate system may be used as an intermediate coordinate system during registration and bone prep, since all tracked objects are measured with respect to LCTZ. During registration, ultimately the various localizer-referred poses are combined mathematically, and registration results are stored 'with respect to a tracker', such that if the camera (i.e., LCTZ) moves, the registration is still valid.

The tool tracker 52 may be affixed to any suitable component of the instrument 14, and in some versions may be attached to the hand-held portion 16, the tool support 18, directly to the tool 20, or a combination thereof. The trackers 52, 54, 56, PT may be fixed to their respective components in any suitable manner, such as by fasteners, clamps, or the like. For example, the trackers 52, 54, 56, PT may be rigidly fixed, flexibly connected (optical fiber), or not physically connected at all (ultrasound), as long as there is a suitable (supplemental) way to determine the relationship (measurement) of that respective tracker to the associated object. Any one or more of the trackers 52, 54, 56, PT may include active markers 58. The active markers 58 may include light emitting diodes (LEDs). Alternatively, the trackers 52, 54, 56, PT may have passive markers, such as reflectors, which reflect light emitted from the camera unit 46. Printed markers, or other suitable markers not specifically described herein, may also be utilized.

Various coordinate systems may be employed for purposes of tracking the objects. For instance, the coordinate systems may comprise the localizer coordinate system LCLZ, the tool support coordinate system TCS, the base coordinate system BCS, coordinate systems associated with each of the trackers 52, 54, 56, PT, one or more coordinate systems associated with the anatomy, one or more coordinate systems associated with pre-operative and/or intraoperative images (e.g., CT images, MRI images, etc.) and/or models (e.g., 2D or 3D models) of the anatomy—such as the implant coordinate system, and a TCP (tool center point) coordinate system. In some examples, the robotic system 10 does not rely on pre-operative and/or intraoperative imaging to create the 2D or 3D models of the target bone. Rather, the robotic system may be used in an imageless system using the pointer tracker PT to register the target anatomy, capturing various anatomical landmarks, which is then processed by the control system 60 to morph a nominal bone model to match the captured data. In other examples, pre-operative and intraoperative imaging is used to image the target area of the patient and then transform the 2D and/or 3D images into a 3D model of the target bone. It is also contemplated that the robotic surgical system 10 may use a combination of imaged and imageless procedures in creating a 3D model of the target surgical area. One exemplary system is described in U.S. Pat. No. 8,617,174, which is hereby incorporated by reference. Coordinates in the various coordinate systems may be transformed to other coordinate systems using transformations upon establishing relationships between the coordinate systems, e.g., via registration, calibration, geometric relationships, measuring, etc.

As shown in FIG. 2, in some examples, the TCP is a predetermined reference point or origin of the TCP coordinate system defined at the distal end of the tool 20. The geometry of the tool 20 may be defined relative to the TCP coordinate system and/or relative to the tool support coordinate system TCS. The tool 20 may comprise one or more geometric features, e.g., perimeter, circumference, radius, diameter, width, length, height, volume, area, surface/plane, range of motion envelope (along any one or more axes), etc. defined relative to the TCP coordinate system and/or relative to the tool support coordinate system TCS and stored in the non-volatile memory of the control boards 31 in the control housing 29 of the instrument 14, the navigation system 32, the instrument controller 28, or a combination thereof. For example, the tool 20 may define a longitudinal axis 910 (see FIG. 68) extending the length of the tool and may define a lateral axis 912 extending across the width of the tool. The tool center point (TCP), in another example, is a predetermined reference point and corresponding coordinate system defined at the tool 20. The TCP has a known, or able to be calculated (i.e., not necessarily static), pose relative to other coordinate systems. The TCP coordinate system includes an origin point and a set of axes (e.g., x axis, y axis, z axis) which define the pose of the TCP. By tracking the TCP (or knowing the pose of the TCP), the system 10 may calculate the position and orientation of the instrument 14 based on the pose of the TCP and the known positional relationship between the TCP and the features of the instrument 14. In some examples, the tool 20 has a tool plane (e.g., for saw blades) that will be described for convenience and ease of illustration but is not intended to limit the tool 20 to any particular form. For example, the tool support 18 may include a tool mount 18a defining a blade plane BP. Points, other primitives, meshes, other 3D models, etc., can be used to virtually represent the tool 20. The origin point of the TCP coordinate system may be located at the spherical center of the bur of the tool 20 or at the distal end of the saw blade 27 such that the TCP coordinate system is tracked relative to the origin point on the distal tip of the tool 20. Alternatively, the TCP may be tracked using a plurality of tracked points. The TCP may be defined in various ways depending on the configuration of the tool 20. The instrument may employ the joint/motor encoders, or any other non-encoder position sensing method, so the control system 60 may determine a pose and/or position of the TCP relative to the hand-held portion 16 and BCS. The tool support 18 may use joint measurements to determine TCP pose and/or could employ techniques to measure TCP pose directly. The control of the tool 20 is not limited to a center point. For example, any suitable primitives, meshes, etc., can be used to represent the tool 20. It should be appreciated that the TCP may alternatively be defined as a point, as opposed to a coordinate system. The TCP coordinate system allows calculate any required reference points or geometry aspects of the tool once you have determined the pose of the saw blade or other tool.

The TCP coordinate system, the tool support coordinate system TCS, and the coordinate system of the tool tracker 52 may be defined in various ways depending on the configuration of the tool 20. For example, the pointer 57 may be used with calibration divots CD in the tool support 18 and/or in the tool 20 for: registering (calibrating) a pose of the tool support coordinate system TCS relative to the coordinate system of the tool tracker 52; determining a pose of the TCP coordinate system relative to the coordinate system of the tool tracker 52; and/or determining a pose of the TCP coordinate system relative to the tool support coordinate system TCS. Other techniques could be used to measure the pose of the TCP coordinate system directly, such as by attaching and fixing one or more additional trackers/markers directly to the tool 20. In some versions, trackers/markers may also be attached and fixed to the hand-held portion 16, the tool support 18, or both. In instances where the hand-held portion includes a tracker, the pose of the hand-held portion relative to the localizer coordinate system LCTZ may be measured directly. In still other alternatives, the TCP may be defined relative to the tool tracker, using the intermediate tool support coordinate system TCS.

Since the tool support 18 is movable in multiple degrees of freedom relative to the hand-held portion 16 via the actuators 21, 22, 23, the instrument 14 may employ encoders, hall-effect sensors (with analog or digital output), and/or any other position sensing method, to measure a pose of the TCP coordinate system and/or tool support coordinate system TCS relative to the base coordinate system BCS. In one example, the instrument 14 may use measurements from sensors that measure actuation of the actuators 21, 22, 23 to determine a pose of the TCP coordinate system and/or tool support coordinate system TCS relative to the base coordinate system BCS, as described further below.

The localizer 44 monitors the trackers 52, 54, 56, PT (e.g., coordinate systems thereof) to determine a state of each of the trackers 52, 54, 56, PT, which correspond respectively to the state of the object respectively attached thereto. The localizer 44 may perform known techniques to determine the states of the trackers 52, 54, 56, PT, and associated objects (such as the tool, the patient, the tool support, and the hand-held portion). The localizer 44 provides the states of the trackers 52, 54, 56, PT to the navigation controller 36. In some examples, the navigation controller 36 determines and communicates the states of the trackers 52, 54, 56, PT to the instrument controller 28.

The navigation controller 36 may comprise one or more computers, or any other suitable form of controller. Navigation controller 36 has a central processing unit (CPU) and/or other processors, memory, and storage (not shown). The processors can be any type of processor, microprocessor, or multi-processor system. The navigation controller 36 is loaded with software. The software, for example, converts the signals received from the localizer 44 into data representative of the position and/or orientation of the objects being tracked. The navigation controller 36 may additionally, or alternatively, comprise one or more microcontrollers, field programmable gate arrays, systems on a chip, discrete circuitry, and/or other suitable hardware, software, or firmware that is capable of carrying out the functions described herein. The term processor is not intended to limit any embodiment to a single processor.

Although one example of the navigation system 32 is shown to determine object states, the navigation system 32 may have any other suitable configuration for tracking the instrument 14, tool 20, and/or the patient 12. In another example, the navigation system 32 and/or localizer 44 are ultrasound-based. For example, the navigation system 32 may comprise an ultrasound imaging device coupled to the navigation controller 36. The ultrasound imaging device images any of the aforementioned objects, e.g., the instrument 14, the tool 20, and/or the patient 12, and generates state signals to the navigation controller 36 based on the ultrasound images. The ultrasound images may be 2D, 3D, or a combination of both. The navigation controller 36 may process the images in near real-time to determine states of the objects. The ultrasound imaging device may have any suitable configuration and may be different than the camera unit 46 as shown in FIG. 1.

In another example, the navigation system 32 and/or localizer 44 are radio frequency (RF)-based. For example, the navigation system 32 may comprise an RF transceiver coupled to the navigation controller 36. The instrument 14, the tool 20, and/or the patient 12 may comprise RF emitters or transponders attached thereto. The RF emitters or transponders may be passive or actively energized. The RF transceiver transmits an RF tracking signal and generates state signals to the navigation controller 36 based on RF signals received from the RF emitters. The navigation controller 36 may analyze the received RF signals to associate relative states thereto. The RF signals may be of any suitable frequency. The RF transceiver may be positioned at any suitable location to track the objects using RF signals effectively. Furthermore, the RF emitters or transponders may have any suitable structural configuration that may be much different than the trackers 52, 54, 56, PT shown in FIG. 1.

In yet another example, the navigation system 32 and/or localizer 44 are electromagnetically based. For example, the navigation system 32 may comprise an Electromagnetic (EM) transceiver coupled to the navigation controller 36. The instrument 14, the tool 20, and/or the patient 12 may comprise EM components attached thereto, such as any suitable magnetic tracker, electro-magnetic tracker, inductive tracker, or the like. The trackers may be passive or actively energized. The EM transceiver generates an EM field and generates state signals to the navigation controller 36 based upon EM signals received from the trackers. The navigation controller 36 may analyze the received EM signals to associate relative states thereto. Again, such navigation system 32 examples may have structural configurations that are different than the navigation system 32 configuration shown in FIG. 1.

The navigation system 32 may have any other suitable components or structure not specifically recited herein. Furthermore, any of the techniques, methods, and/or components described above with respect to the navigation system 32 shown may be implemented or provided for any of the other examples of the navigation system 32 described herein. For example, the navigation system 32 may utilize solely inertial tracking or any combination of tracking techniques, and may additionally or alternatively comprise, fiber optic-based tracking, machine-vision tracking, and the like.

Referring to FIG. 7, the robotic system 10 includes a control system 60 that comprises, among other components, the instrument controller 28 and the navigation controller 36. The control system 60 further includes one or more software programs and software modules. The software modules may be part of the program or programs that operate on the instrument controller 28, navigation controller 36, or a combination thereof, to process data to assist with control of the robotic system 10. The software programs and/or modules include computer readable instructions stored in memory 64 on the instrument controller 28, navigation controller 36, or a combination thereof, to be executed by one or more processors 70 of the controllers 28. The memory 64 may be any suitable configuration of memory, such as non-transitory memory, RAM, non-volatile memory, etc., and may be implemented locally or from a remote database. Additionally, software modules for prompting and/or communicating with the user may form part of the program or programs and may include instructions stored in memory 64 on the instrument controller 28, navigation controller 36, or a combination thereof. The user may interact with any of the input devices of the navigation user interface UI or other user interface UI to communicate with the software modules. The user interface software may run on a separate device from the instrument controller 28 and/or navigation controller 36. The instrument 14 may communicate with the instrument controller 28 via a power/data connection. The power/data connection may provide a path for the input and output used to control the instrument 14 based on the position and orientation data generated by the navigation system 32 and transmitted to the instrument controller 28, as shown as the BUS/COMM connection 37 in FIG. 7.

The control system 60 may comprise any suitable configuration of input, output, and processing devices suitable for carrying out the functions and methods described herein. The control system 60 may comprise the instrument controller 28, the navigation controller 36, or a combination thereof, and/or may comprise only one of these controllers, or additional controllers. The controllers may communicate via a wired bus or communication network as shown in one example as the BUS/COMM connection 37 in FIG. 7, via wireless communication, or otherwise. The control system 60 may also be referred to as a controller. The control system 60 may comprise one or more microcontrollers, field programmable gate arrays, systems on a chip, discrete circuitry, sensors, displays, user interfaces, indicators, and/or other suitable hardware, software, or firmware that is capable of carrying out the functions described herein.

Instrument

Figure 8:
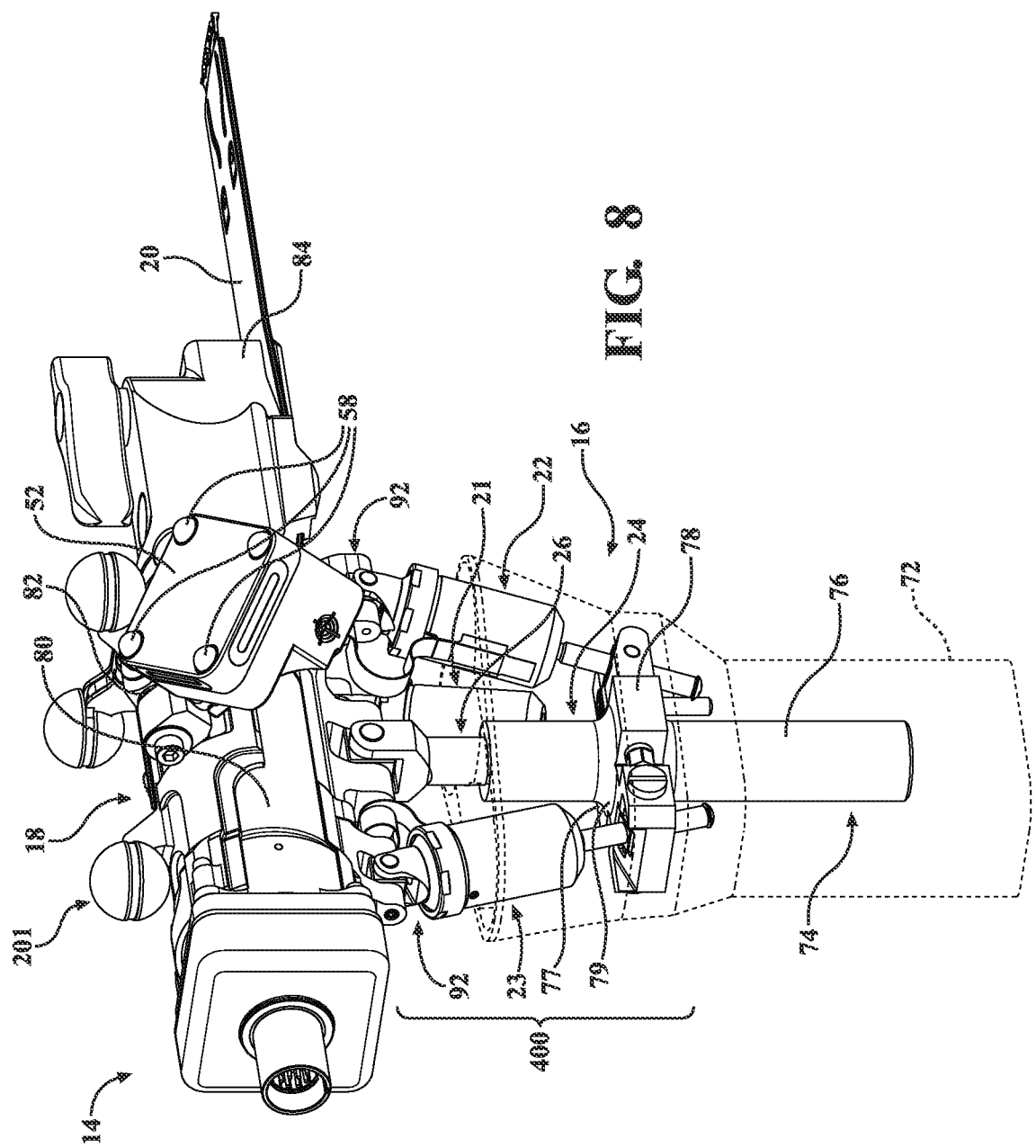
FIG. 8 is a rear perspective view of the robotic instrument.
Figure 9:
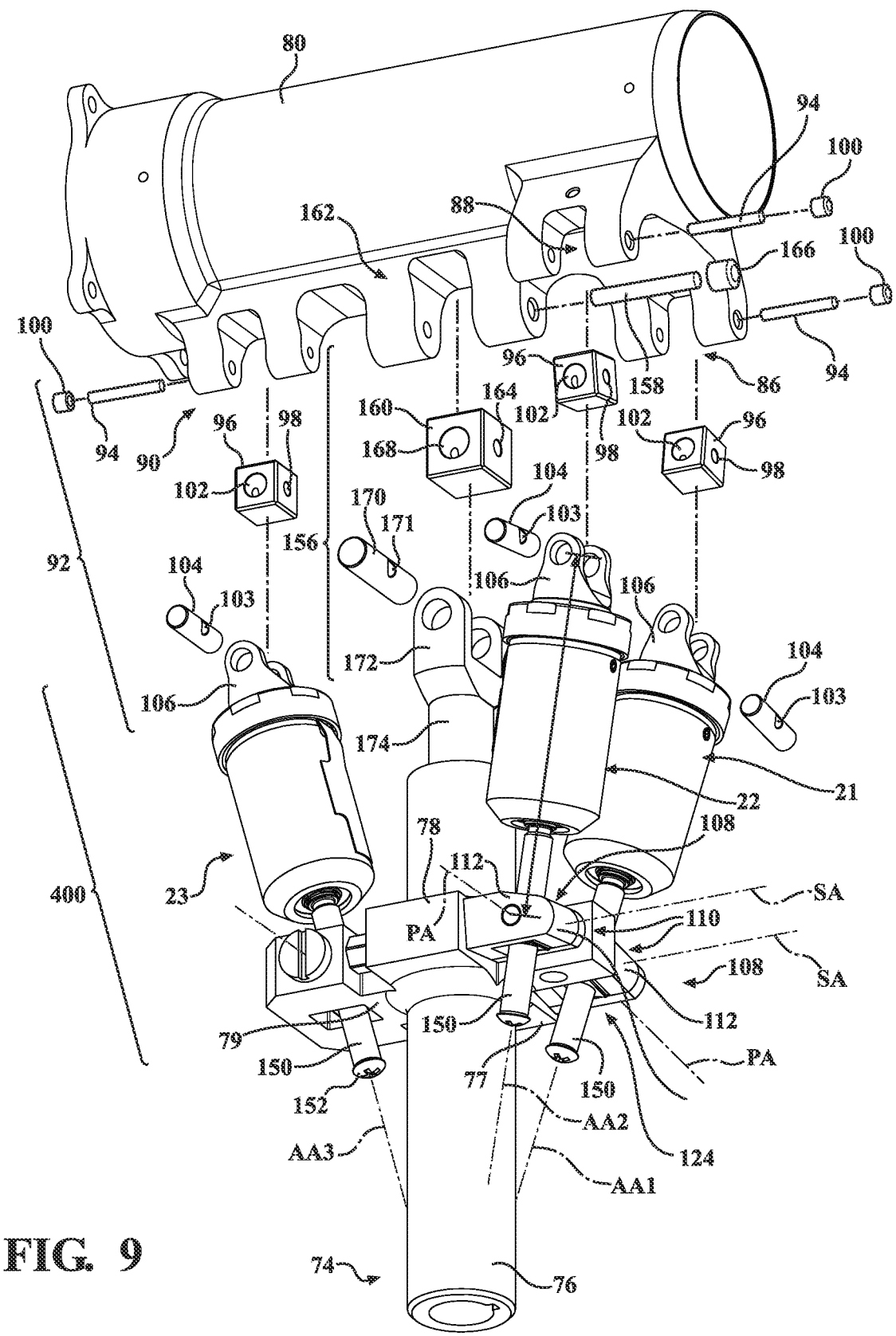
FIG. 9 is a side elevational view of the robotic instrument.
Figure 10:
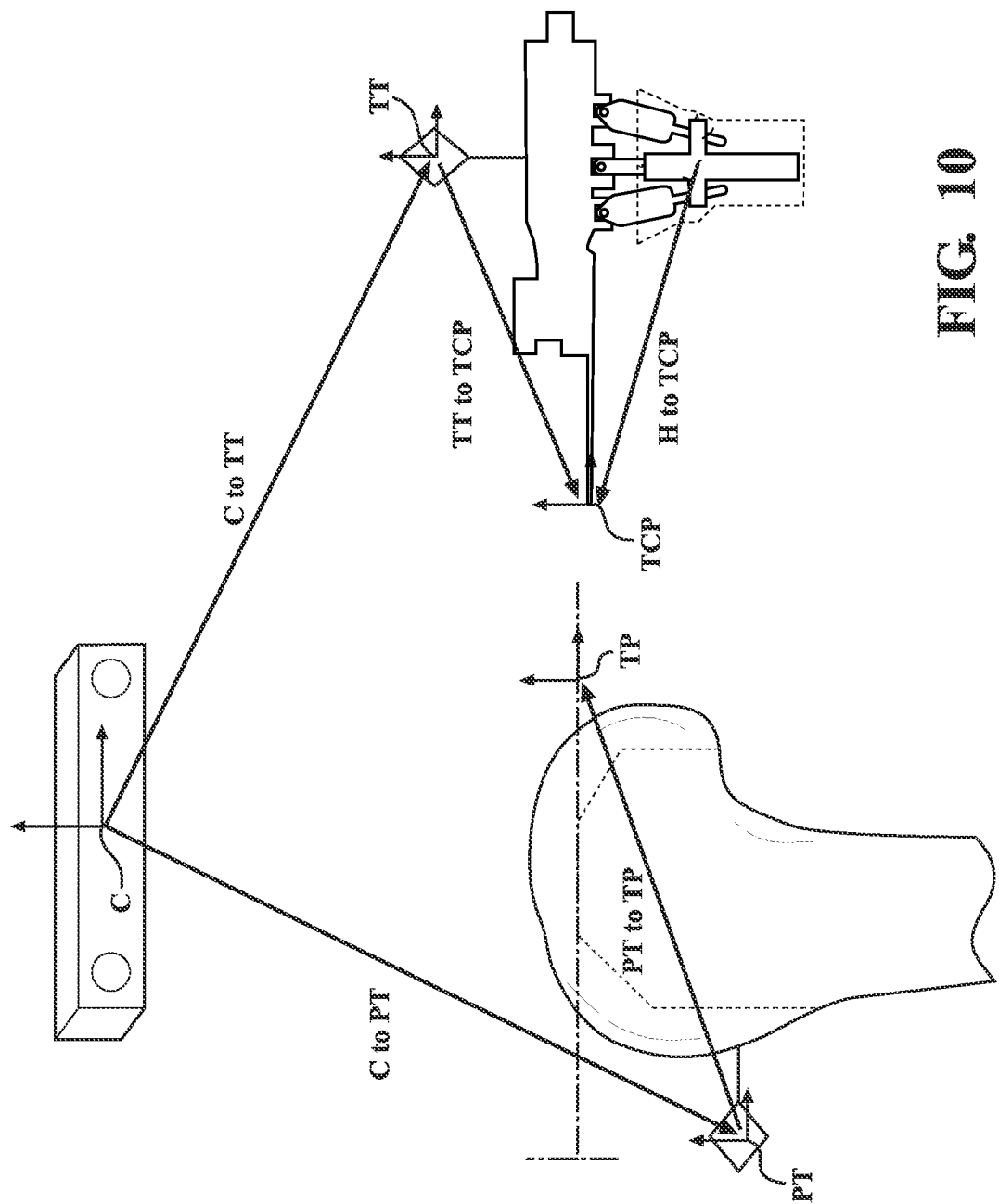
FIG. 10 is a schematic view of various transforms of the hand-held robotic surgical system.

In one exemplary configuration, the instrument 14 is best shown in FIGS. 8 and 9. The instrument 14 includes the hand-held portion 16 to be held by the user, the tool support 18 movably coupled to the hand-held portion 16 to support the tool 20, the actuator assembly 400 with the plurality of actuators 21, 22, 23 operatively interconnecting the tool support 18 and the hand-held portion 16 to move the tool support 18 in at least three degrees of freedom relative to the hand-held portion 16, and the constraint assembly 24 having the passive linkage 26 operatively interconnecting the tool support 18 and the hand-held portion 16.

The hand-held portion 16 comprises a grip 72 for being grasped by the user so that the user is able to manipulate, guide, and/or grasp the instrument 14. The hand-held portion 16 may be configured with ergonomic features such as a grip for a hand of a user to hold, a textured or mixed material coating for preventing a user's hand from slipping when wet and/or bloody. The hand-held portion 16 may include a taper to accommodate users with different hand sizes and contoured to mate with the contours of a user's hand and/or fingers. The hand-held portion 16 also comprises a base 74 to which the grip 72 is attached by one or more fasteners, adhesive, welding, or the like. In the version shown, the base 74 comprises a sleeve 76 having a generally hollow cylindrical shape. Joint supports 77, 78, 79 extend from the sleeve 76. The actuators 21, 22, 23 may be movably coupled to the base 74 at the joint supports 77, 78, 79 via joints described further below.

The tool support 18 comprises a tool support body 80 to which the tool tracker 52 can be fixed to or removably mounted via one or more tracker mounts fixed to the tool support 18 at one or more mounting locations 82. In one example, the tool tracker 52 is integrated with the tool support 18. In another example, the tool tracker 52 is removably mounted at the one or more mounting locations 82. The tool 20 is removably coupled to the tool support 18 in the version shown. In particular, the tool support 18 comprises a tool coupler, such as head 84 to which the tool 20 is mounted, as described in U.S. Pat. No. 9,820,753 to Walen et al., incorporated herein by reference. The head 84 may be configured to utilize an oscillating-style of saw blade, as well as a sagittal-style saw blade. The drive motor M that drives operation of the tool 20 is disposed in the tool support body 80 (e.g., to drive oscillation of the saw blade in some versions). The tool 20 may be attached to and released from the head 84 in the manner disclosed in U.S. Pat. No. 9,820,753 to Walen et al., incorporated herein by reference. As best shown in FIG. 9, the tool support 18 also comprises a plurality of actuator mounts 86, 88, 90 at which the actuators 21, 22, 23 are to be movably coupled to the tool support 18 via joints, as described further below. The actuator mounts 86, 88, 90 may comprise brackets, or the like, suitable to mount the actuators 21, 22, 23 such that the tool support 18 is able to move in at least three degrees of freedom relative to the hand-held portion 16.

The actuators 21, 22, 23, in the version shown, comprise electric, linear actuators that extend between the base 74 and the tool support body 80. When actuated, an effective length of the actuator 21, 22, 23 changes to vary a distance between the tool support body 80 and the base 74 along a corresponding axis of the actuator 21, 22, 23. Accordingly, the control system 60 commands the actuators 21, 22, 23 to work in a coordinated fashion, responding to individual inputs given to each actuator 21, 22, 23, respectively, by the control system 60 to change their effective lengths and move the tool support 18 in at least three degrees of freedom relative to the hand-held portion 16 into the target pose. In the version shown, three actuators 21, 22, 23 are provided, and may be referred to as first, second, and third actuators 21, 22, 23 or front actuators 21, 22, and rear actuator 23. The first, second, and third actuators 21, 22, 23 are adjustable in effective length along a first active axis AA1, a second active axis AA2, and a third active axis AA3 (see FIG. 9). The first, second, and third actuators 21, 22, 23 are independently adjustable in effective length to adjust one or more of a pitch orientation, a roll orientation, and a z-axis translation position of the tool support 18 relative to the hand-held portion 16, as previously described. More actuators may be provided in some examples. The actuators may comprise rotary actuators in some examples. The actuators 21, 22, 23 may comprise linkages having one or more links of any suitable size or shape. The actuators 21, 22, 23 may have any configuration suitable to enable movement of the tool support 18 relative to the hand-held portion 16 in at least three degrees of freedom. For example, in some versions, there may be one front actuator and two rear actuators, or some other arrangement of actuators.

In this version, the actuators 21, 22, 23 are coupled to the base 74 and the tool support body 80 via a plurality of active joints. The active joints include a set of first active joints 92 that couple the actuators 21, 22, 23 to the tool support body 80 at the actuator mounts 86, 88, 90. In one version, as shown in FIG. 9, the first active joints 92 comprises active U-joints. The U-joints comprise first pivot pins 94 and joint blocks 96. The first pivot pins 94 pivotally connect the joint blocks 96 to the actuator mounts 86, 88, 90 via throughbores 98 in the joint blocks 96. Set screws 100 may secure the first pivot pins 94 to the actuator mounts 86, 88, 90. The U-joints may also comprise second pivot pins 104. The joint blocks 96 have crossbores 102 to receive the second pivot pins 104. The second pivot pins 104 have throughbores 103 to receive the first pivot pins 94, such that the first pivot pins 94, the joint blocks 96, and the second pivot pins 104 form a cross of the U-joint. The first pivot pin 94 and the second pivot pin 104 of each U-joint define pivot axes PA that intersect. The second pivot pins 104 pivotally connect a pivot yoke 106 of the actuators 21, 22, 23 to the joint blocks 96. As a result, the actuators 21, 22, 23 are able to move in two degrees of freedom relative to the tool support body 80. Other types of active joints are also contemplated, such as active spherical joints comprising balls with slots that receive pins.

Referring to FIG. 9, the active joints also comprise a set of second active joints 108 coupling the front two actuators 21, 22 to the base 74 of the hand-held portion 16. In the version shown, the second active joints 108 are supported at the joint supports 77, 78. Each of the second active joints 108 comprises a swivel yoke 110 arranged to swivel relative to the base 74 of the hand-held portion 16 about a swivel axis SA. Each swivel yoke 110 has a swivel head 112 and a post 114 extending from the swivel head 112 to pivotally engage the base 74 at one of the joint supports 77, 78. Nuts 115 threadably connect to one end of the posts 114 to trap the posts 114 in the base 74 while allowing the respective swivel yoke 110 to freely rotate within its respective joint support 77, 78.

Each of the second active joints 108 comprises a carrier 116 pivotally coupled to one of the swivel yokes 110. The carriers 116 have internally threaded throughbores 117 to receive lead screws 150 of the front two actuators 21, 22, as described further below. Each of the carriers 116 also comprises opposed trunnions 118 that allow the carriers 116 to pivot relative to the swivel yokes 110 about pivot axes PA (see FIG. 9) by being seated in pockets in the swivel yokes 110. In some versions, for each of the second active joints 108, the swivel axis SA intersects the pivot axis PA to define a single vertex about which the actuators 21, 22 move in two degrees of freedom.

Covers are fastened to the swivel heads 112 and define one of the pockets, while the swivel head 112 defines the other pocket. During assembly, the carriers are first positioned with one of the trunnions placed in the pocket in the swivel head 112, and the cover is then fastened over the other trunnion such that the carrier is captured between the cover and the swivel head 112 and is able to pivot relative to the swivel yoke 110 via the trunnions and pockets. Owing to the configuration of the swivel yokes 110 and the associated carriers, i.e., the carrier's ability to swivel about the swivel axes SA and pivot about the pivot axes PA, the second active joints 108 allow two degrees of freedom of movement of the front two actuators 21, 22 relative to the base 74. Other joint arrangements between the front two actuators 21, 22 and the base 74 are also possible.

The active joints also comprise a third active joint 124 coupling the rear (third) actuator 23 to the base 74 of the hand-held portion 16. In the version shown, the third active joint 124 is supported at the joint support 79. The third active joint 124 comprises a pivot housing 126 fixed to the joint support 79 of the base 74.

The third active joint 124 comprises a carrier pivotally coupled to the pivot housing 126 via trunnions. Fasteners having pockets attach to either side of the pivot housing 126 via throughbores to engage the trunnions. The fasteners are arranged such that the carrier is able to pivot via the trunnions being located in the pockets after assembly. The carrier has an internally threaded throughbore to receive a lead screw 150 of the rear actuator 23, as described further below. Owing to the configuration of the pivot housing 126 and associated carrier, i.e., the ability of the associated carrier to only pivot about the pivot axis PA (e.g., and not swivel), the third active joint 124 allows only one degree of freedom of movement of the rear actuator 23 relative to the base 74. Other joint arrangements between the rear actuator 23 and the base 74 are also possible.

Each of the actuators 21, 22, 23 comprises a housing. The housing comprises a canister and a cap threadably connected to the canister. The pivot yokes 106 that form part of the first active joints 92 are fixed to the housings such that the housings and pivot yokes 106 are able to move together relative to the tool support 18 via the first active joints 92. The caps capture annular shoulders of the pivot yokes 106 to secure the pivot yokes 106 to the canisters.

In some versions, the pivot yokes 106 and canisters comprise one or more alignment features to align each pivot yoke 106 to its respective canister in a predefined, relative orientation. Such alignment features may comprise mating portions, keys/keyways, or the like. During assembly, the pivot yoke 106 may first be secured to the canister in its predefined, relative orientation, and the cap may then be threaded onto the canister (e.g., via mating outer and inner threads) to trap the pivot yoke 106 to the canister at the predefined, relative orientation. This predefined relationship may be helpful in routing and/or aligning the flex circuits Fc, preventing rolling of the pivot yoke 106 relative to the canister, and/or for other purposes.

Each of the actuators 21, 22, 23 also comprises a motor disposed in each housing. The motor has a casing disposed in the housing and a motor winding assembly disposed within the casing. The motor winding assembly may also be aligned in a predefined, relative orientation to the canister, such as via a set screw or other alignment feature, such as those described above. Each motor also has a rotor fixed to the lead screw 150. The lead screw 150 is supported for rotation in the housing by one or more bushings and/or bearings. The rotor and associated lead screw 150 are configured to rotate relative to the housing upon selective energization of the motor. The lead screws 150 have fine pitch and lead angles to prevent backdriving (i.e., they are self-locking). As a result, a load placed on the tool 20 does not easily back drive the motor. In some examples, the lead screws 150 have an 8-36 class 3 thread that results in a lead of from 0.02 to 0.03 inches/revolution. Other thread types/sizes may also be employed.

Each of the actuators 21, 22, 23 may be controlled by a separate motor controller. Motor controllers may be wired separately to the actuators 21, 22, 23, respectively, to individually direct each actuator 21, 22, 23 to a given target position. In some examples, the motor controllers are proportional integral derivative (PID) controllers. In some examples, the motor controllers may include cascaded control loops relating to position, velocity, and torque (current). Additionally, and/or alternatively, the motor controller may only include of a torque (current) control loop. In another example, the position control loop may directly feed the torque (current) control loop. Each of these control stages may be implemented as a PID controller, state space controller, and/or utilize alternate or additional control techniques (e.g., velocity feedforward, torque feedforward, etc.). In some cases, the torque (current) control loop is implemented using field-oriented control and space vector modulation. The stages of the control loop could be distributed between various components of the system. In some examples, the position loop and velocity loop are implemented in the instrument controller and the torque control loop is implemented directly in the control boards 31 as part of the control housing 29 on the instrument 14, mitigating the impact of data communication latency from the instrument 14 through the connection to the console 33, since the current control loop does not require any data feedback via the console 33. The position control loop and velocity control loop are not as sensitive to the communication latency and can be implemented in the console 33. In some examples, the motor controllers can be integrated with or form part of the instrument controller 28. For ease of illustration, the motor controllers shall be described herein as being part of the instrument controller 28.

A power source provides, for example, 32 VDC power signals to the motors via the console 33. The 32 VDC signal is applied to the motors through the instrument controller 28. The instrument controller 28 selectively provides the power signal to each motor to selectively activate the motors. This selective activation of the motors is what positions the tool 20. The motors may be any suitable type of motor, including brushless DC servomotors, permanent magnet synchronous motors, other forms of DC motors, or the like. The power source also supplies power to the instrument controller 28 to energize the components internal to the instrument controller 28. In some examples, the actuator motor may be a 3-phase, brushless motor. The actuator motor may be a DC motor. The actuator motor may be a permanent magnet synchronous motor. Each of the actuator motors may be configured with a sinusoidal back-EMF, configured to achieve limited mechanical cogging, allowing smooth and particular motion, limiting torque ripple. However, other motor types are contemplated. It should be appreciated that the power source can provide other types of power signals such as, for example, 12 VDC, 24 VDC, 40 VDC, etc. The instrument may use electronic switches, e.g., MOSFETs or GaN FETs to PWM the voltage signals to the 3-phase motor on/off at a high frequency, e.g., typically at a rate of at least 16 kHz, up to 256 kHz or higher.

In one possible implementation, one or more sensors S (see also FIG. 7) transmit signals back to the instrument controller 28 so that the instrument controller 28 can determine a current position and/or angle of the associated actuator 21, 22, 23 (i.e., a measured position). The levels of these signals may vary as a function of the rotational position of the associated rotor. In one implementation, the sensor(s) S may resolve the rotational position of the rotor within a given turn at a high resolution. These sensors S may be Hall-effect sensors that output analog and/or digital signals based on the sensed magnetic fields from the rotor, or from other magnets placed on the lead screw 150 (e.g., the 2-pole magnet A low voltage signal, e.g., 5 VDC, for energizing the Hall-effect sensors may be supplied from the motor controller associated with the motor with which the Hall-effect sensors are associated. In some examples, two Hall-effect sensors are disposed in the housing and spaced 90 degrees apart from each other around the rotor to sense joint position so that the instrument controller 28 is able to determine the position and count incremental turns of the rotor). In some versions, the Hall-effect sensors output digital signals represents incremental counts. Various types of motors and sensor arrangements are possible. In some examples, the motors are brushless DC servomotors, and two or more internal Hall-effect sensors may be spaced 90 degrees, 120 degrees, or any other suitable spacing from each other around the rotor. The sensors S may also comprise absolute or incremental encoders, which may be used to detect a rotational position of the rotor and to count turns of the rotor. Other type of encoders may be also used as the one or more sensors. The sensors may be placed at any suitable location on the actuator and its surrounding components suitable to determine the position of each actuator as it is adjusted, such as on the housing, nut, screw, etc. In yet another configuration, sensorless motor control may be utilized. In such an implementation, the position of each rotor may be determined by measuring the motor's back-emf and/or inductance. One suitable example may be found in U.S. Pat. No. 7,422,582, which is hereby incorporated by reference in its entirety.

In some examples, the sensors and/or encoders may measure position feedback for joint position control and/or to determine the position of the tool support 18 relative to the hand-held portion 16 when used in conjunction with a kinematic model of the instrument 14. In some examples, the sensors and/or encoders rely on a multi-turn measurement, which accumulates from revolution to the next, used to determine an absolute position of the actuator 21, 22, 23 along its axis and is used in conjunction with the known pitch (i.e., revolutions per inch of the leadscrew). Additionally, or alternatively, the sensors and/or encoders may be used to determine the "electrical angle of the rotor" for use in electronic commutation of the motor. For example, the sensors and/or encoders may be used to determine a rotor position and apply appropriate energization signals to achieve optimal (efficient) torque generation. In this example, the sensors and/or encoders may utilize a single turn or sub-turn (within one electrical revolution) measurement that rolls over each electrical revolution. The number of electrical revolutions is equal to the number of mechanical revolutions divided by the number of magnetic poles of the motor (e.g., number of pole pairs). However, it is contemplated that a sensor-less method be implemented.

In some examples, output signals from the Hall-effect sensors are sent to the instrument controller 28. The instrument controller 28 monitors the received signals for changes in their levels. Based on these signals the instrument controller 28 determines joint position. Joint position may be considered the degrees of rotation of the rotor from an initial or home position. The rotor can undergo plural 360° rotations. The joint position can therefore exceed 360°. A scalar value referred to as a count is representative of joint position from the home position. The rotors rotate in both clockwise and counterclockwise directions. Each time the signal levels of the plural signals (analog or digital) undergo a defined state change, the instrument controller 28 increments or decrements the count to indicate a change in joint position. For every complete 360° rotation of the rotor, the instrument controller 28 increments or decrements the value of the count by a fixed number of counts. In some examples, the count is incremented or decremented between 100 and 3,000 per 360-degree revolution of the rotor. In some examples, there are 1,024 positions (counts) per 360-degree revolution of the rotor, such as when an incremental encoder is used to monitor joint position. Internal to the instrument controller 28 is a counter associated with each actuator 21, 22, 23. The counter stores a value equal to the cumulative number of counts incremented or decremented. The count value can be positive, zero or negative. In some versions, the count value defines incremental movement of the rotor. Accordingly, the rotors of the actuators 21, 22, 23 may first be moved to known positions, referred to as their home positions (described further below), with the count values being used thereafter to define the current positions of the rotors.

As previously described, the carriers have the internally threaded throughbores to threadably receive the lead screws 150 so that each of the lead screws 150 can rotate relative to a corresponding one of the carriers to adjust the effective length of a corresponding one of the plurality of actuators 21, 22, 23 and thereby vary the counts measured by the instrument controller 28. Each of the housings and corresponding carriers are constrained from relative movement in at least one degree of freedom to allow the lead screws 150 to rotate relative to the carriers. More specifically, the lead screws 150 are able to rotate relative to the carriers owing to: the pivot yokes 106 being unable to rotate about the associated active axes AA1, AA2, AA3 (i.e., the pivot yokes 106 are limited from such rotational movement by virtue of the configuration of the first active joints 92); and the carriers being unable to rotate about the associated active axes AA1, AA2, AA3 (i.e., the carriers are limited from such rotational movement by virtue of the configuration of the second active joints 108 and the third active joint 124).

Stops 152, such as threaded fasteners and shoulders formed on the lead screws 150, are fixed to the lead screws 150. The stops 152 are sized to abut the carriers 116 at ends of travel of each lead screw 150.

As previously described, the actuators 21, 22, 23 are actively adjustable in effective length to enable movement of the tool support 18 relative to the hand-held portion 16. One example of this effective length is labeled "EL" on the third actuator 23. Here, the effective length EL is measured from the pivot axis PA to a center of the associated first active joint 92. As each actuator 21, 22, 23 is adjusted, the effective length EL changes, by varying how far the lead screw 150 has been threaded into or out of its associated carrier and thereby changing the distance from the center of the associated carrier to the center of the associated first active joint 92. The actuators 21, 22, 23 are adjustable between minimum and maximum values of the effective length EL. The effective length EL of each actuator 21, 22, 23 can be represented/measured in any suitable manner to denote the distance between the tool support 18 and the hand-held portion 16 along the active axes AA1, AA2, AA3 that changes to cause various movements of the tool support 18 relative to the hand-held portion 16.

The constraint assembly 24 works in concert with the actuators 21, 22, 23 to constrain the movement provided by the actuators 21, 22, 23. The actuators 21, 22, 23 provide movement in three degrees of freedom, while the constraint assembly 24 constrains movement in three degrees of freedom. In the version shown, the constraint assembly 24 comprises the passive linkage 26, as well as a passive linkage joint 156 that couples the passive linkage 26 to the tool support 18.

In one version, as shown in FIG. 9, the passive linkage joint 156 comprises a passive linkage U-joint. The U-joint comprises a first pivot pin 158 and a joint block 160. The first pivot pin 158 pivotally connects the joint block 160 to a passive linkage mount 162 of the tool support body 80 via a throughbore 164 in the joint block 160. A set screw 166 may secure the first pivot pin 158 to the passive linkage mount 162. The U-joint also comprises a second pivot pin 170. The joint block 160 has a crossbore 168 to receive the second pivot pin 170. The second pivot pin 170 pivotally connects a passive linkage pivot yoke 172 of the passive linkage 26 to the joint block 160. The second pivot pin 170 has a throughbore 171 to receive the first pivot pin 158, such that the first pivot pin 158, the joint block 160, and the second pivot pin 170 form a cross of the U-joint. The first pivot pin 158 and the second pivot pin 170 define pivot axes PA that intersect. As a result, the passive linkage 26 is able to move in two degrees of freedom relative to the tool support body 80. Other types of passive linkage joints are also contemplated, such as a passive linkage spherical joint comprising a ball with slot that receives a pin.

The passive linkage 26 comprises a shaft 174 fixed to the passive linkage pivot yoke 172. The passive linkage 26 also comprises the sleeve 76 of the base 74, which is configured to receive the shaft 174 along a constraint axis CA. The passive linkage 26 is configured to allow the shaft 174 to slide axially along the constraint axis CA relative to the sleeve 76 and to constrain movement of the shaft 174 radially relative to the constraint axis CA during actuation of one or more of the actuators 21, 22, 23.

The passive linkage 26 further comprises a key to constrain rotation of the shaft 174 relative to the sleeve 76 about the constraint axis CA. The key fits in an opposing keyway in the shaft 174 and sleeve 76 to rotationally lock the shaft 174 to the sleeve 76. Other arrangements for preventing relative rotation of the shaft 174 and sleeve 76 are also contemplated, such as an integral key/slot arrangement, or the like. The passive linkage 26 operatively interconnects the tool support 18 and the hand-held portion 16 independently of the actuators 21, 22, 23. The passive linkage is passively adjustable in effective length EL along the constraint axis CA during actuation of one or more of the actuators 21, 22, 23. The sleeve 76, shaft 174, and key 176 represent one combination of links for the passive linkage 26. Other sizes, shapes, and numbers of links, connected in any suitable manner, may be employed for the passive linkage 26.

In the version shown, the passive linkage joint 156 is able to pivot about two pivot axes PA relative to the tool support 18. Other configurations are possible.

Also, in the version shown, the first active joints 92 and the passive linkage joint 156 define pivot axes PA disposed on a common plane. Non-parallel pivot axes PA, parallel pivot axes PA disposed on different planes, combinations thereof, and/or other configurations, are also contemplated.

In some versions, the head 84 of the tool support 18 is arranged so that the tool 20 is located on a tool plane BP (e.g., a blade plane) parallel to the common plane when the tool 20 is coupled to the tool support 18. In some examples, the tool plane BP is spaced from the common plane CP by 2.0 inches or less, 1.0 inches or less, 0.8 inches or less, or 0.5 inches or less.

In the version shown, the actuators 21, 22, 23 are arranged such that the active axes AA1, AA2, AA3 are in a canted configuration relative to the constraint axis CA in all positions of the actuators 21, 22, 23, including when in their home positions. Canting the axes AA1, AA2, AA3 generally tapers the actuator arrangement in a manner that allows for a slimmer and more compact base 74 and associated grip 72. Other configurations are contemplated, including those in which the active axes AA1, AA2, AA3 are not in the canted configuration relative to the constraint axis CA. Such configurations may include those in which the actuator axes AA1, AA2, AA3 are parallel to each other in their home positions.

Further configurations of the actuators, active joints, and constraint assembly are possible. It is contemplated that the control techniques described may be applied to other mechanical configurations not mentioned, in particular those for controlling a tool or saw blade relative to a hand-held portion in one or more degrees of freedom. In some versions, the constraint assembly may be absent and the tool support 18 of the instrument 14 may be able to move in additional degrees of freedom relative to the hand-held portion 16. For example, the instrument may include linear actuators, rotary actuators, or combinations thereof. The instrument may include 2, 3, 4, 5, 6 or more different actuators arranged parallel or in series.

Virtual Boundaries

The software employed by the control system 60 to control operation of the instrument 14 includes a boundary generator 182 (see FIG. 7). The boundary generator 182 may be implemented on the instrument controller 28, the navigation controller 36, and/or on other components, such as on a separate controller. The boundary generator 182 may also be part of a separate system that operates remotely from the instrument 14. Referring to FIG. 7 the boundary generator 182 is a software program or module that generates one or more virtual boundaries 184 for constraining movement and/or operation of the instrument 14. In some examples, the boundary generator 182 provides virtual boundaries 184 that define a virtual cutting guide (e.g., a virtual saw cutting guide). Virtual boundaries 184 may also be provided to delineate various operational/control regions as described below. The virtual boundaries 184 may be one-dimensional (1D), two-dimensional (2D), three-dimensional (3D), and may comprise a point, line, axis, trajectory, plane (an infinite plane or plane segment bounded by the anatomy or other boundary), volume or other shapes, including complex geometric shapes. The virtual boundaries 184 may be represented by pixels, point clouds, voxels, triangulated meshes, other 2D or 3D models, combinations thereof, and the like. U.S. Patent Publication No. 2018/0333207 and U.S. Pat. No. 8,898,043 are incorporated by reference, and any of their features may be used to facilitate planning or execution of the surgical procedure.

The virtual boundaries 184 may be used in various ways. For example, the control system 60 may: control certain movements of the tool 20 to stay inside the boundary; control certain movements of the tool 20 to stay outside the boundary; control certain movements of the tool 20 to stay on the boundary (e.g., stay on a point, trajectory, and/or plane); control certain movements of the tool 20 to approach the boundary (attractive boundary) or to be repelled from the boundary (repulsive boundary); and/or control certain operations/functions of the instrument 14 based on a relationship of the instrument 14 to the boundary (e.g., spatial, velocity, etc.). Other uses of the boundaries 184 are also contemplated.

In some examples, one of the virtual boundaries 184 is a desired cutting plane, as shown in FIG. 2. The control system 60 will ultimately function to keep the tool 20 on the desired cutting plane in some versions. The virtual boundary 184 that controls positioning of the tool 20 may also be a volumetric boundary, such as one having a thickness slightly larger than a blade thickness to constrain a saw blade to stay within the boundary and on a desired cutting plane, as shown in FIG. 2. Therefore, the desired cutting plane can be defined by a virtual planar boundary, a virtual volumetric boundary, or other forms of virtual boundary. Virtual boundaries 184 may also be referred to as virtual objects. The virtual boundaries 184 may be defined with respect to an anatomical model AM, such as a 3D bone model (see FIG. 2, which illustrates the anatomical model AM being virtually overlaid on the actual femur F due to their registration). In other words, the points, lines, axes, trajectories, planes, volumes, and the like, that are associated with the virtual boundaries 184 may be defined in a coordinate system that is fixed relative to a coordinate system of the anatomical model AM such that tracking of the anatomical model AM (e.g., via tracking the associated anatomy to which it is registered) also enables tracking of the virtual boundary 184.

The anatomical model AM is registered to the first patient tracker 54 such that the virtual boundaries 184 become associated with the anatomical model AM and associated coordinate system. The virtual boundaries 184 may be implant-specific, e.g., defined based on a size, shape, volume, etc. of an implant and/or patient-specific, e.g., defined based on the patient's anatomy. The virtual boundaries 184 may be boundaries that are created pre-operatively, intra-operatively, or combinations thereof. In other words, the virtual boundaries 184 may be defined before the surgical procedure begins, during the surgical procedure (including during tissue removal), or combinations thereof. The virtual boundaries 184 may be provided in numerous ways, such as by the control system 60 creating them, receiving them from other sources/systems, or the like. The virtual boundaries 184 may be stored in memory for retrieval and/or updating.

In some cases, such as when preparing the femur F for receiving the total knee implant IM (see FIG. 1), the virtual boundaries 184 comprise multiple planar boundaries that can be used to delineate multiple cutting planes (e.g., five cutting planes) for the total knee implant IM, and are associated with a 3D model of the distal end of the femur F. These multiple virtual boundaries 184 can be activated, one at a time, by the control system 60 to constrain cutting to one plane at a time.

The instrument controller 28 and/or the navigation controller 36 track the state of the tool 20 relative to the virtual boundaries 184. In one example, the state of the TCP coordinate system (e.g., pose of the saw blade) is measured relative to the virtual boundaries 184 for purposes of determining target positions for the actuators 21, 22, 23 so that the tool 20 remains in a desired state. In some cases, the control system 60 controls/positions the instrument 14 in a manner that emulates the way a physical handpiece would respond in the presence of physical boundaries/barriers.

Referring back to FIG. 7, two additional software programs or modules run on the instrument controller 28 and/or the navigation controller 36. One software module performs behavior control 186. Behavior control 186 is the process of computing data that indicates the next commanded/desired position and/or orientation (e.g., desired pose) for the tool 20. In some cases, only the desired position of the TCP is output from the behavior control 186, while in some cases, the commanded pose of the tool 20 is output. Output from the boundary generator 182 (e.g., a current position and/or orientation of the virtual boundaries 184 in one or more of the coordinate systems) may feed as inputs into the behavior control 186 to determine the next commanded position of the actuators 21, 22, 23 and/or orientation for the tool 20.

The behavior control 186 may process this input, along with one or more other inputs described further below, to determine the commanded pose.

The instrument controller 28 may control the one or more actuators 21, 22, 23 by sending command signals to each actuator 21, 22, 23 to adjust the tool 20 towards a desired pose. The instrument controller 28 may know the entire length that an actuator 21, 22, 23 may adjust the tool support 18 relative to the hand-held portion 16. In some examples, the instrument controller 28 knows the entire length which an actuator 21, 22, 23 is capable of adjusting and may send command signals to the actuators 21, 22, 23 to move a measured distance from position to position. A measured position may be a known position, or a distance between the present location of an actuator 21, 22, 23 and the actuator limits. Each position that the actuator 21, 22, 23 moves to may be a measured distance from a positive limit and a negative limit of actuator travel (i.e., a position between two ends of a lead screw). The instrument controller 28 may command the actuators 21, 22, 23 to and from measured positions as described below.

The instrument controller 28 may send command signals to each actuator 21, 22, 23 to move the actuators 21, 22, 23 from a first position to a commanded position which will place the tool 20 into a desired pose. In some examples, the commanded position may be determined by the instrument controller 28 in conjunction with the navigation system 32 to determine the location of the tool 20 and tool support 18 relative to the hand-held portion 16, patient trackers PT, 54, 56, a virtual object, such as desired cut plane or a combination thereof and send a signal to the actuators 21, 22, 23 to adjust a certain distance or commanded position in order to place the tool 20 into the desired pose. The instrument controller may command the actuator 21, 22, 23 to a position in order to reach the desired adjustment of the tool 20. The instrument controller 28 may control the actuators 21, 22, 23 to linearly move a calculated distance to adjust the tool 20 towards a desired pose. In other examples, such as when absolute encoders are used, the instrument controller may send signals to the actuators 21, 22, 23 to place each actuator 21, 22, 23 into a commanded position based on the known location of the tool support 18 relative to the hand-held portion determined by the absolute encoder.

The instrument controller 28 may know the entire length that an actuator 21, 22, 23 may adjust the tool support 18 relative to the hand-held portion 16. In some examples, the instrument controller 28 knows the entire length which an actuator 21, 22, 23 is capable of adjusting and may send command signals to the actuators 21, 22, 23 to move a measured distance from position to position (e.g., by commanding a desired amount of linear travel via commanded rotation). A measured position may be a known position, or a distance between the present location of an actuator 21, 22, 23 and the actuator limits. Each position that the actuator 21, 22, 23 moves to may be a measured distance from a positive limit and a negative limit of actuator travel (i.e., a position between two ends of a lead screw). The instrument controller 28 may command the actuators 21, 22, 23 to and from positions as described below. The instrument controller may command the actuator 21, 22, 23 to a position in order to reach the desired adjustment of the tool 20. The instrument controller 28 may control the actuators 21, 22, 23 to linearly move a calculated distance to adjust the tool 20 towards a desired pose. In other examples, such as when absolute encoders are used, the instrument controller may send signals to the actuators 21, 22, 23 to place each actuator 21, 22, 23 into a commanded position based on the known location of the actuator 21, 22, 23 between the respective actuator travel limits determined by the absolute encoder. Alternately, in one example, an incremental encoder may be used in conjunction with a homing procedure performed during system setup as described in U.S. Patent Publication No. 2017/0156799, which is hereby incorporated by reference. A homing procedure may be used, placing the actuators 21, 22, 23 and the joints at their centered position, and subsequently determines the absolute offsets of the incremental encoders. By determining the offsets of the incremental encoders, the incremental encoders may perform as absolute encoders going forward.

In some examples, when a homing position is used, the homing process establishes the initial rotor positions (zero position) of the actuators 21, 22, 23. The home position is effectively a position of the rotor 148 that provides the greatest possible travel in each direction along the active axis AA1, AA2, AA3. In some examples, the home position is generally located such that a home point HP of the lead screw 150, centrally disposed halfway between the stops 152, is centrally disposed in the associated carrier 116 (see FIG. 12 which illustrates two of the actuators 22, 23 in their home positions). Even when the homing procedure is not used, such as with absolute encoders, setting the actuators 21, 22, 23 to the home point HP prior to or after executing other modes (such as approach mode, described further below) may be included. The instrument controller 28 may be configured to control the actuators 21, 22, 23 to their home positions between minimum and maximum values of the effective lengths EL of the actuators 21, 22, 23.

When in the home position, the amount of adjustability of the actuators 21, 22, 23 is maximized to keep the tool 20 at a desired pose. Various levels of adjustment are possible depending on the particular geometry and configuration of the instrument 14. In some examples, when all the actuators 21, 22, 23 are in their home positions, the tool 20 may be adjusted in pitch orientation about +/−18° relative to the home position, assuming zero changes in the roll orientation and no z-axis translation. In some examples, when all the actuators 21, 22, 23 are in their home positions, the tool 20 may be adjusted in roll orientation about +/−33° relative to the home position, assuming zero changes in the pitch orientation and no z-axis translation. In some examples, when all the actuators 21, 22, 23 are in their home positions, the tool 20 may be adjusted in z-axis translation about +/−0.37 inches relative to the home position, assuming zero changes in the pitch orientation and roll orientation. The tool 20, of course, may be adjusted in pitch, roll, and z-axis translation simultaneously, sequentially, or combinations thereof during operation.

In some examples, when one or more of the actuators 21, 22, 23 have reached their limit, the instrument controller 28 may require the hand-held portion 16 to be adjusted in order to bring the tool 20 back into a range where the actuators are capable of adjusting the tool 20 towards the desired pose. In such a case, a simulated commanded position may be used to indicate to a user how to move the hand-held portion 16 in order to bring the tool 20 and actuators 21, 22, 23 back into alignment with the desired pose. A simulated commanded position may be a position determined by the instrument controller 28 in conjunction with navigation data from the navigation system 32 in which the hand-held portion 16 must be moved to adjust the tool 20 towards a desired pose without adjusting the actuators 21, 22, 23. The simulated commanded position works with the one or more displays 38 to signal to a user that the hand-held portion 16 needs to be moved in particular way to place the tool 20 at the desired pose. In some examples, guidance array 500 to signal to a user to move the hand-held portion 16 in the same fashion as if the actuators 21, 22, 23 were adjusting the tool 20, but relies on the user to correct the pose of the tool 20 by manipulating the hand-held portion 16 while the actuators remain in position.

The second software module performs motion control 188. One aspect of motion control 188 is the control of the instrument 14. The motion control 188 receives data defining the next commanded pose from the behavior control 186. Based on these data, the motion control 188 determines the next rotor position of the rotors 148 of each actuator 21, 22, 23 (e.g., via inverse kinematics) so that the instrument 14 is able to position the tool 20 as commanded by the behavior control 186, e.g., at the commanded pose. In other words, the motion control 188 processes the commanded pose, which may be defined in Cartesian space, into actuator positions (such as rotor positions) of the instrument 14, so that the instrument controller 28 can command the motors 142 accordingly, to move the actuators 21, 22, 23 of the instrument 14 to commanded positions, such as commanded rotor positions corresponding to the commanded pose of the tool 20. In one version, the motion control 188 regulates the rotor position of each motor 142 and continually adjusts the torque that each motor 142 outputs to, as closely as possible, ensure that the motor 142 drives the associated actuator 21, 22, 23 to the commanded rotor position.

In some versions, the instrument controller 28, for each actuator 21, 22, 23, determines the difference between a measured position and a commanded position of the rotor 148. The instrument controller 28 outputs a target current (proportional to a torque of the rotor), changing the voltage to adjust the current at the actuator from an initial current to the target current. The target current effectuates a movement of the actuators 21, 22, 23, moving the tool 20 from the measured pose to the commanded pose. This may occur after the commanded pose is converted to joint positions. In one example, the measured position of each rotor 148 may be derived from the sensor S described above, such as an encoder.

The boundary generator 182, behavior control 186, and motion control 188 may be sub-sets of a software program. Alternatively, each may be software programs that operate separately and/or independently in any combination thereof. The term "software program" is used herein to describe the computer-executable instructions that are configured to carry out the various capabilities of the technical solutions described. For simplicity, the term "software program" is intended to encompass, at least, any one or more of the boundary generator 182, behavior control 186, and/or motion control 188. The software program can be implemented on the instrument controller 28, navigation controller 36, or any combination thereof, or may be implemented in any suitable manner by the control system 60.

A clinical application 190 may be provided to handle user interaction. The clinical application 190 handles many aspects of user interaction and coordinates the surgical workflow, including pre-operative planning, implant placement, registration, bone preparation visualization, and post-operative evaluation of implant fit, etc. The clinical application 190 is configured to output to the displays 38. The clinical application 190 may run on its own separate processor or may run alongside the instrument controller 28 and/or the navigation controller 36. In one example, the clinical application 190 interfaces with the boundary generator 182 after implant placement is set by the user, and then sends the virtual boundaries 184 returned by the boundary generator 182 to the instrument controller 28 for execution.

An initial location of the base coordinate system BCS can be determined based on a known geometric relationship between the tool support coordinate system TCS and the base coordinate system BCS when the actuators 21, 22, 23 are in their home positions or other predetermined position. This relationship changes when the actuators 21, 22, 23 are adjusted and the associated changes can be determined based on the kinematics of the robotic system 10 (e.g., which establishes a dynamic transformation between these coordinate systems). Alternatively, or additionally, another tracker could be attached and fixed with respect to the base coordinate system BCS to directly track a pose of the base coordinate system BCS relative to the tool support coordinate system TCS. Thus, the robotic system 10 knows the position of the tool 20, such as in the home position and its relation to the pose of the hand-held portion 16. Accordingly, when the tool 20 is moved by the user and its pose is tracked using the tool tracker 52, the robotic system 10 also tracks the pose of the hand-held portion 16 and its base coordinate system BCS. In some examples, as a result of prior calibration processes, the position of the tool 20 relative to the tool support 18 is assumed to be known.

In some versions, the home position is determined by first determining a pose of the hand-held portion 16 (e.g., of the base coordinate system BCS) relative to the tool support 18 (e.g., relative to the tool support coordinate system TCS) in a common coordinate system by employing a separate tracker fixed to the hand-held portion 16. This spatial relationship between the hand-held portion 16 and the tool support 18 could also be determined by registration using the pointer 57 and known calibration divots on the hand-held portion 16, or via other navigation methods. The current rotor position of each of the actuators 21, 22, 23 can then be derived from this spatial relationship based on the kinematics of the instrument 14. Knowing the current rotor positions and measuring changes from the current rotor positions using the encoders (and corresponding encoder signals), the instrument controller 28 can thereafter operate each of the actuators 21, 22, 23 until they reach their home positions. The home positions can be stored in the memory of the instrument controller 28.

In essence, the instrument controller 28 uses tracking data obtained by the navigation system 32 from the trackers 52 coupled to tool support 18 and the hand-held portion 16 on the instrument 14 to determine the position of the actuators 21, 22, 23 so that, thereafter, the incremental encoders can operate as absolute encoders.

Instructional data packets are sent, for example, to the motor controllers, such as from the console 33 or another component of the instrument controller 28. These instructional data packets include the target position for the rotors 148 of the motors 142 (or target position of the actuator). Here, each target position may be a positive or negative number representative of a targeted cumulative count for the associated rotor 148. The console 33 or other component of the instrument controller 28 generates and sends these instructional data packets to each motor controller at the rate of one packet every 0.05 to 4 milliseconds. In some examples, each motor controller receives an instructional data packet at least once 0.125 milliseconds.

During use, when the robotic system 10 determines a pose (a current pose) of the tool 20 with the navigation system 32 by virtue of the tracker 52 being located on the tool support 18. The instrument controller 28 may also determine a current position of each of the actuators 21, 22, 23 based on an output encoder signal from the one or more encoders located on each of the actuators 21, 22, 23. Once the current position of each of the actuators 21, 22, 23 is received, the instrument controller 28 may calculate a current pose of the hand-held portion 16 (e.g., a current pose of the base coordinate system BCS with respect to a desired coordinate system, such as the TCP coordinate system using forward kinematics to convert from the actuator positions to the pose (TCP with respect to BCS). Once the instrument controller 28 has the current relative poses of the tool support 18 and the hand-held portion 16 in the desired coordinate system, the instrument controller 28 may then determine a commanded pose of the tool 20 based on the current pose of the tool 20 as determined by the navigation system 32, the current pose of the hand-held portion 16 calculated by the current position of each of the actuators 21, 22, 23, and based on a position and/or orientation of a planned virtual object, subject as a desired cutting plane. The instrument computes a pose (a commanded pose) of TCP with respect to BCS that results in the TCP being on the desired plane or aligned with the planned virtual object. The instrument controller 28 may send command instructions to the actuators 21, 22, 23 to move to a commanded position, thereby changing the pose of the tool support 18 and tool 20. In one example, the commanded pose of the tool 20 is further based on a target cut plane so the instrument controller 28 calculates the current pose of the tool support 18 and the current positions of the actuators 21, 22, 23 in order to determine the current pose of the hand-held portion 16. Once the current pose of the tool support 18, current positions of the actuators 21, 22, 23, and the current pose of the hand-held portion 16 are known, the instrument controller 28 can send command signals to the actuators 21, 22, 23 to adjust the tool support 18 and tool 20 based on the desired plane. The controller computes the commanded pose assuming that, momentarily (during a single iteration) the pose of the hand-held portion (BCS) is stationary relative to patient anatomy. By updating the corresponding poses each time, the actual movement of BCS is adjusted for.

Turning to FIG. 11, the exemplary control is described with respect to the various transforms. The TCP is determined by tracking the tool 20 with the tracker 52 in LCLZ (LCLZ-TT) and determining a transform between tool tracker 52 and the TCP of the tool 20 (TT-TCP), such as the saw, using registration data. Similarly, the patient is tracked using the patient tracker PT (shown as 54) in the LCLZ (LCLZ-PT). A transform (PT-TP) is determined between the patient tracker PT and each planned virtual object 184 (TP) using registration data and planning information. As described above, a transform between BCS and TCP (BCS-TCP) is computed based on the current positions of each actuator (described above). The transform between BCS and TCP is utilized to relate the various coordinate systems back to the hand-held portion 16, since the commanded pose may be determined relative to the BCS. Conceptually, the commanded pose, is an update to the BCS to TCP transform which results in the TCP being aligned with the planned virtual object 184 (the target plane TP) in this example.

It should be appreciated that the phrase 'TCP' of the instrument" has been used interchangeably with the phrase 'position of the saw blade'. Thus, in any instance where the TCP of the instrument/tool is used, it may be substituted with the position of the saw blade and vice-versa. Of course, it is also contemplated that the position of the 'saw blade' may alternatively be a position of a tool of any suitable configuration, such as a drill, bur, guide tube, a screw driver, a tap, a pin, and the like.

Throughout this description, unless otherwise noted, any instance of pose may be a commanded pose, a current pose, a past pose, or a past commanded pose. While each of these poses may be different from one another, due to the frequency of control, the difference in position and/or orientation between these poses may be minimal in each control iteration.

It should be understood that the combination of position and orientation of an object is referred to as the pose of the object. Throughout this disclosure, it is contemplated that the term pose may be replaced by position and/or orientation and vice-versa to achieve suitable alternatives of the concepts described herein. In other words, any use of the term pose can be replaced with position and any use of the term position may be replaced with pose.

Operation

During operation, the robotic system 10 is initially powered up and the software application for operating the system is started. The trackers 52, 54, 56, PT are initialized and the trackers 52, 54, 56 are placed on the instrument 14 and on the target anatomy (e.g., femur F and tibia T). With the trackers 54, 56 mounted to the anatomy, the anatomy and/or associated images/models are registered to the trackers 54, 56 using known registration techniques. This may require the user to touch certain surfaces or landmarks on the anatomy with the pointer 57. For example, this may require the user to touch several points on the surface of the anatomy while pressing a select button on the pointer 57 or pressing a foot switch of the navigation system 32. This "paints" the points on the surface in the navigation system 32 for matching with the pre-operative and/or intra-operative image/model of the anatomy. The pre-operative image and/or the intra-operative image/model of the anatomy is loaded in the navigation system 32. The tracked portion of the anatomy is registered to the pre-operative/intra-operative image/model. By extension, this allows the robotic system 10 to, as the anatomy moves, present a graphical representation of the actual position and orientation of the anatomy on the displays 38.

In a calibration/registration procedure, the orientation and location of the tracker 52 is calibrated/registered relative to the tool support 18 by reference to the fixed and known locations of the calibration divots CD or other reference points. In some examples, one or more trackers 52 may be located on the tool support 18, the hand-held portion 16, or both so that the position of the tool support 18 and/or the hand-held portion 16 are tracked by the navigation system 32. In examples in which the tracker 52 is integrated into the instrument 14, then such calibration would be unnecessary since the relative location of the tracker 52 to the tool support 18 is known.

The virtual objects (e.g., virtual boundaries 184) being used to control operation of the instrument 14 are also defined/obtained. Software running on instrument controller 28 (e.g., the boundary generator 182) generates/obtains an initial definition of the virtual objects. The user may have the ability and option to adjust the nature/placement of the virtual objects as may be necessary.

In one exemplary configuration, the control system 60 defines various regions at predefined distances and/or positions from the target site and/or anatomy. Each of these regions may be defined in the coordinate system associated with the anatomy and/or virtual boundaries 184. In some cases, these regions are defined as spheres or other geometric primitives about the target site and/or the anatomy. In other examples, the regions (and others described below) may be defined with respect to the instrument 14, tool support 18, the hand-held portion 16, the tool 20, the target site/anatomy, or a combination thereof. The control system 60 may control the instrument 14 when the regions defined by the hand-held portion 16, the tool support 18, the tool 20, the target site/anatomy, or a combination thereof approach a specific virtual boundary/virtual cutting guide feature.

In particular, the instrument controller 28 generates a set of target rotor positions to which the rotors 148 integral to the motors 142 must rotate to maintain the tool 20 at the desired pose. In other words, if the user moves the hand-held portion 16 in a manner that causes the tool 20 to move away from its desired pose, this is detected by the navigation system 32. In response to this movement, the instrument controller 28 determines, based on data from the navigation system 32, how far the tool 20 has moved away from the desired pose and compensates for such movement by driving the actuators 21, 22, 23 as needed to bring the tool 20 back to the desired pose. It should be appreciated that such deviations from the desired pose will usually be small, as the instrument controller 28 will be operating at a high frequency (e.g., frame rate) to continuously account for such deviations in substantially real-time.

The target rotor positions are determined based on the relationships between actuation of the actuators 21, 22, 23 and resulting movement (e.g., kinematics). For example, if the desired pose requires z-axis translation relative to the hand-held portion 16, there is a first order relationship between the extent to which the tool 20 will move in the z-axis and the amount of rotation of each rotor 148 (e.g., how many counts are associated with such z-axis movement). There are also relationships between the extent to which the tool 20 will change its pitch orientation in response to actuation of the third actuator 23 alone, or in combination with one or both of the first and second actuators 21, 22. Lastly, there are relationships between the extent to which the tool 20 will change its roll orientation in response to actuation of one or both of the first and second actuators 21, 22, with or without actuation of the third actuator 23. Based on these relationships, the instrument controller 28 determines the target rotor position for each rotor 148 that is required to maintain the desired pose of the tool 20. The instrument controller 28 operates the motors 142 based on these target rotor positions. For example, the console 33 may transmit packets to the motor controllers containing these target rotor positions, and each motor controller may apply appropriate energization signals to the associated motor 142. These energization signals cause the rotation of the rotor 148 that results in the repositioning of the lead screw 150 that displaces the tool support 18/tool 20 as needed to maintain the tool 20 in the desired pose.

As described previously, the actuators 21, 22, 23 are held at the home position or other predetermined position as the user arranges the hand-held portion 16, guided by the alignment members 502, 504, toward the desired plane. By keeping the actuators 21, 22, 23 at their home position or other predetermined position, a user may find it easier to adjust and line up the tool 20 with the desired plane and instrument pose relative to the target. However, when the tool is at the desired pose, the visual guidance is intended to guide the user as to how to move the hand-held portion 16 to provide the instrument 14 with sufficient adjustability by keeping the actuators 21, 22, 23 near their home positions or other predetermined position. For example, the user may need to move the hand-held portion 16 upwardly in the z-axis direction to move all the actuators 21, 22, 23 closer to their home positions, while keeping the tool 20 at the desired pose. In other words, the actuators 21, 22, 23 may be nearly fully extended. To accomplish this, the directional indication from the guidance array 500 is upward. In this case, the guidance array 500 is actually guiding the user to move the hand-held portion 16 upward so that the actuators 21, 22, 23 operate toward their home positions to maximize adjustability of the actuators 21, 22, 23. As the user moves the hand-held portion 16 upward, the actuators 21, 22, 23 continue to operate to keep the tool 20 at the desired pose (e.g., on the virtual boundary 184). As a result, the actuators 21, 22, 23 retract, such as retracting toward their home positions. Ideally, when the user starts cutting bone, a maximum amount of travel is available in either direction for each actuator 21, 22, 23. Otherwise, if one or more of the actuators 21, 22, 23 have nearly reached their available travel in either direction, then even slight movements of the hand-held portion 16 may result in the instrument controller 28 being unable to keep the tool 20 at the desired pose, and an inaccurate cut could be made.

Additionally, and/or alternatively, in some versions, the tool 20 may move to the desired pose and then the user may adjust the hand-held portion 16 to a more comfortable position within the threshold value of available travel of actuators 21, 22, 23 to perform a cut while the tool 20 is maintained at its desired position. The user may then select, by activating an input device, such as a button and/or a foot switch, or selecting on a touchscreen, to move into a free-hand mode where the pose of the hand-held portion 16 relative to the pose of the tool 20 is held or frozen in its current spatial relationship. It is contemplated that the held pose of the hand-held portion 16 relative to the pose of the tool 20 changes the virtual threshold value of the actuators 21, 22, 23, restraining actuator movement by to maintain the held pose once the user has selected an operating mode.

Visual Guidance

As shown in FIGS. 12-28, instrument 14 also includes a guidance array 500. The guidance array 500 provides an operator with visual indication of the pose of the blade support 18 relative to the hand-held portion 16 during operation of the instrument 14. Accordingly, the guidance array 500 provides visual indication to the operator of required changes in pitch orientation, roll orientation, and z-axis translation of the hand-held portion 16 to achieve the desired pose of the tool 20 while affording the plurality of actuators 21, 22, 23 with maximum adjustability to maintain the tool 20 on the target plane TP. The guidance array 500 includes a tool alignment member 502 coupled to the blade support 18 and a handle alignment member 504 coupled to the hand-held portion 16 for guiding the user as to how to move the hand-held portion 16 to provide the instrument 14 with sufficient adjustability by keeping the actuators 21, 22, 23 near their home positions or other predetermined positions. In some configurations, at least a portion of the tool alignment member 502 and at least a portion of the handle alignment member 504 may be aligned when the actuators 21, 22, 23 are in their respective home positions. For example, in the configuration shown in FIGS. 12-17, a top surface 503 of the tool alignment member 502 and a top surface 505 of the handle alignment member 504 are aligned when the actuators 21, 22, 23 are in their respective home positions.

In certain configurations, the term "aligned" is defined as at least a portion of the tool alignment member 502 and at least a portion of the handle alignment member 504 being substantially co-planar or intersecting within a suitable tolerance. For example, when at least a portion of the tool alignment member 502 and at least a portion of the handle alignment member 504 are aligned, the tool alignment member 502 and the handle alignment member 504 provide an operator of the instrument 14 with visual indication that the blade support 18 has a desired range of motion relative to the hand-held portion 16. Particularly, when in the home position, the amount of adjustability of the actuators 21, 22, 23 is maximized to keep the tool 20 at a desired pose. In some examples, the portion of the alignment between the tool alignment member and the handle alignment member may be 99 percent or more aligned, 90 percent or more aligned, 70 percent or more aligned, or even 60 percent or more aligned. In other examples, the suitable alignment may be within a designated proximity to a target pose such as within a 1 percent deviation from the target pose, a 5 percent deviation from the target pose, a 10 percent deviation from the target pose, or even a 20 percent deviation or more from the target pose in each individual degree of freedom. Similarly, the suitable alignment may be within 1 mm of the target pose, within 2 mm of the target pose, or even with 5 mm or more of the target pose in each individual degree of freedom. Additionally, the suitable alignment may be within a 1 degree or more deviation from the target pose, a 5 degree or more deviation from the target pose, a 15 degree or more deviation from the target pose, or even a 30 degree or more deviation from the target pose in roll and/or pitch.

In one configuration, referring to FIGS. 12-28, the tool alignment member 502 may be a member that extends away from the blade support 18. For example, the tool alignment member 502 may include a tool alignment portion 510 defining a tool alignment plane 512 (shown in FIG. 17) that is parallel, or even, co-planar with the blade plane BP and provides visual indication of the pose of the blade plane BP to an operator of the instrument 14. The terms tool plane and blade plane BP may be used interchangeably. The tool alignment member 502 may have any shape or structure capable of providing visual indication of the pose of the blade plane BP relative to the handle alignment member 504. In one example, as shown in FIGS. 12-28, the tool alignment portion 510 of the tool alignment member 502 may define a "U" shape. In this example, the tool alignment portion 510 defines an elongated body and two protrusions that allow the tool alignment portion to surround the handle alignment portion 524 when the tool alignment member 502 and the handle alignment member 504 are aligned when the actuators 21, 22, 23 are at their respective home positions. Each portion of the tool alignment portion 510 may be generally planar with a length, a width, and a height defining a three-dimensional shape for providing visual indication of the alignment and misalignment with the handle alignment member. The "U" shaped profile of the tool alignment member 502 may allow an operator to view the pose of the handle alignment portion relative to the elongated member as well as the protrusions, further aiding with providing visual indication of the pose of the blade support 18 relative to the hand-held portion 16.

Referring to FIGS. 15 and 16, for example, the tool alignment member 502 may also include a mounting portion 506 configured to be mounted to the blade support 18. The mounting portion 506 may be mounted to the blade support 18 using any suitable means (e.g., fasteners, magnets, adhesives, etc.) at any suitable location to facilitate the functions of the tool alignment member 502 (discussed in further detail below). The tool alignment member 502 may further include a support portion 508. The support portion 508 may extend from the mounting portion 506 to support the tool alignment portion 510. In some examples, the tool alignment member 502 may be rigid relative to the blade support 18 to facilitate the functions of the tool alignment member 502. The tool alignment member 502 may be formed from any suitable material such as plastic, aluminum, steel, composite, the like, or a combination thereof. Further, the tool alignment member may be formed using any suitable method of production including 3D printing, casting, machining, injection molding, stamping, the like, or a combination thereof. The tool alignment portions 510 may be contemplated to be formed as other shapes (described in further detail below). In other configurations, the tool alignment member 502 may be the tool 20 itself. For example, the tool 20 and the handle alignment member 504 may be aligned when the actuators 21, 22, 23 are in their respective home positions.

In one example, such as shown in FIGS. 12-28, the handle alignment member 504 may extend from the hand-held portion 16. The handle alignment member 504 may include a handle alignment portion 524 defining a handle alignment plane 526 (shown in FIG. 17) that provides visual indication of the pose of the hand-held portion 16 to an operator of the instrument 14. Notably, the handle alignment plane 526 is aligned with the tool alignment plane 512 when the actuators 21, 22, 23 are in their respective home positions. The handle alignment member 504 may be any suitable shape or configuration which would provide a user visual indication that one or more of the actuators 21, 22, 23 have moved from their respective home positions. In some examples, such as shown in FIGS. 12-28, the handle alignment portion 524 of the handle alignment member 504 defines a planar rectangular member having a length, a height, and a width defining a three-dimensional shape. The relative shape and dimensions of the handle alignment member 504 provides visual indication when the actuators 21, 22, 23 are moved from their respective home position by exposing particular features of the handle alignment member relative to the tool alignment member 502.

Referring to FIGS. 15 and 16, the handle alignment member 504 may also include a mounting collar 516 which includes a first portion 518 and a second portion 520. Collectively, the first and second portions 518, 520 are configured to be coupled to each other to form the mounting collar 516 and mount the handle alignment member 504 to the grip 72 of the hand-held portion 16. The first and second portion 518, 520 may be coupled using any suitable means. In some examples, fasteners such as screws, bolts, clamps, the like, or a combination thereof may be used. The mounting collar 516 may be mounted to the hand-held portion 16 at any suitable location to facilitate the functions of the handle alignment member 504 (discussed in further detail below). Also, as best shown in FIG. 16, the handle alignment member 504 may be removably coupled to the mounting collar 516 of the hand-held portion 16. For example, the handle alignment member 504 may be magnetically coupled to the hand-held portion 16 such that the handle alignment member 504 may be decoupled on demand or in the event that the operator's hand is pinched between the tool alignment member 502 and the handle alignment member 504. Any suitable means of removably coupling the handle alignment member 504 to the hand-held portion are contemplated (e.g., magnets, latches, clips, fasteners, hook-and-loop, the like, and combinations thereof.)

The handle alignment member 504 may also include a support arm 522. The support arm 522 may extend from the mounting collar 516 to support the handle alignment portion 524. Notably, as best illustrated in FIGS. 12-17, the support arm 522 extends upward from the grip 72 of the hand-held portion 16 such that the handle alignment portion 524 of the handle alignment member 504 is aligned with the tool alignment portion 510 of the tool alignment member 502 when the actuators 21, 22, 23 are in their respective home positions. In some examples, the handle alignment member 504 is rigid relative to the hand-held portion 16 to facilitate the functions of the handle alignment member 504. The handle alignment member 504 may be formed from any suitable material such as plastic, aluminum, steel, composite, the like, or a combination thereof. Further, the handle alignment member 504 may be formed using any suitable method of production including 3D printing, casting, machining, injection molding, stamping, the like, or a combination thereof.

In some configurations, the guidance array 500 may include two or more tool alignment members and two or more handle alignment members. In some examples, the guidance array 500 may include the first tool alignment member 502 and a second tool alignment member 528. Similarly, in some examples, the guidance array 500 may include the first handle alignment member 504 and a second handle alignment member 530. It is contemplated in some examples there may be four or more, or six or more, or even a plurality of tool alignment members and handle alignment members, respectively. For example, referring to FIGS. 12-28, in some configurations, the first alignment members 502, 504 and the second alignment members 528, 530 extend from opposite sides of the hand-held portion 16, having a mirrored arrangement from each other. As shown in FIG. 17, both the first tool alignment member 502 and the first handle alignment member 504, as well as the second tool alignment member 528 and the second handle alignment member 530 are aligned with each other, respectively, when the actuators 21, 22, 23 are in their respective home positions, providing visual indication that the blade support 18 has the desired range of motion relative to the hand-held portion 16. Notably, the alignment members 502, 504, 528, 530 may be any suitable shape to provide indication of the alignment of the tool alignment members 502, 528 relative to the handle alignment members 504, 530, respectively. For example, the alignment members 502, 504, 528, 530 may be generally planar, prismatic, define protrusions that aid with visual indication (e.g., define an "X" cross-section, define an "L" cross-section), be cylindrical, spherical, the like, or combinations thereof.

Additionally, the first and second tool alignment members 502, 528, as well as the first and second handle alignment members 504, 530 (which may be collectively referred to as the guidance array 500) are arranged about the blade support 18 and hand-held portion 16 such that the first and second tool alignment members 502, 528 as well as the first and second handle alignment members 504, 530 are visible from a proximal end 560 of the blade support 18 throughout an entire range of motion of the blade support 18 relative to the hand-held portion 16. In other words, the first and second tool alignment members 502, 528 as well as the first and second handle alignment members 504, 530 are configured to be visible to an operator holding the instrument 14 such that the operator has a line of sight to the first and second tool alignment members 502, 528 as well as the first and second handle alignment members 504, 530 throughout the entire range of motion of the blade support 18 relative to the hand-held portion 16. Further, the guidance array 500 may be arranged such that the guidance array 500 provides visual indication of the pose of the blade support 18 relative to the hand-held portion 16 in all cutting postures of the instrument 14 (e.g., during a distal femur cut or a posterior chamfer cut).

During operation of the instrument 14, the target plane TP of the instrument 14, at least one of the tool alignment members 502, 528 and at least one of the handle alignment members 504, 530 may be arranged such that they are aligned in a first spatial relationship when the tool 20 is on the target plane TP and the actuators 21, 22, 23 are in their respective home positions. As shown in the configuration illustrated in FIG. 17, for example, the target plane TP, the tool alignment members 502, 528, and the handle alignment members 504, 530 are arranged in the first spatial relationship when the tool alignment plane 512, the handle alignment plane 526, and the target plane TP are co-planar. For example, referring to FIG. 17, when the tool alignment members 502, 528, and the handle alignment members 504, 530 are arranged in the first spatial relationship, the "U" shaped tool alignment portion 510 surrounds the rectangular handle alignment portion 524, and the top surfaces 503, 505 of both the tool alignment portion 510 and the handle alignment member portion 524, respectively, are co-planar, indicating that the actuators 21, 22, 23 are at their respective home positions. The first spatial relationship provides visual indication that the tool 20 is aligned with the target plane TP and the actuators 21, 22, 23 are in their respective home positions such that the actuators 21, 22, 23 have the maximum amount of adjustability to keep the tool 20 at a desired pose, affording the hand-held surgical robotic system the maximum adjustment of pitch, roll, and z-axis translation (i.e., elevation) to maintain the tool 20 on the target plane TP.

Notably, to facilitate visual indication throughout the range of motion of the actuators 21, 22, 23, the tool alignment members 502, 528 and the handle alignment members 504, 530 are arranged and sized relative to each other such that the tool alignment members 502, 528 and the handle alignment members 504, 530 do not collide at any point between a first position and a second position of each of the plurality of actuators 21, 22, 23. Collectively, the first and second positions of each of the plurality of actuators 21, 22, 23 define a potential range of motion of the blade support 18 relative to the hand-held portion 16. The potential range of motion may define a space in which the blade support 18 may move relative to the hand-held portion 16. For example, FIGS. 52 and 53 show potential positions of the blade support 18 relative to the hand-held portion overlayed over each other. In one configuration, for example the blade support 18 may move relative to the hand-held portion 16 within a space having a height of about 150 mm and a width of about 115 mm. It is contemplated that the height and width of the space may vary based on the geometry of the instrument 14 and limits of the actuators 21, 22, 23.

Also, during operation of the instrument 14, at least one of the tool alignment members 502, 528 and at least one of the handle alignment 504 members 530 may be arranged such that they are misaligned from each other, respectively, in a second spatial relationship when the blade support 18 is in a pose that does not provide the desired range of motion relative to the hand-held portion 16 (illustrated in FIGS. 18-28). The second spatial relationship provides visual indication that the blade support 18 is in a pose relative to the hand-held portion 16 that does not provide the instrument 14 with the desired range of motion, and therefore, indicates that the operator must adjust the pose of the hand-held portion 16 such that the tool alignment members 502, 528 and the handle alignment members 504, 530 are aligned in the first spatial relationship to afford the instrument 14 maximum adjustability. Notably, the addition of the second tool alignment member 528 and the second handle alignment member 530 functions to further aid with providing visual indication of the pose of the blade support 18 relative to the hand-held portion 16.

There are various scenarios in which the tool alignment members 502, 528 may be misaligned from the handle alignment members 504, 530 in the second spatial relationship. For example, the blade support 18 may pitch relative to the hand-held portion 16 about a lateral axis 558 (shown in FIGS. 18-21), the blade support 18 may roll relative to the hand-held portion 16 about a longitudinal axis 552 (shown in FIGS. 22-24), and/or the blade support 18 may displace along a vertical axis 554 (i.e., elevate) relative to the hand-held portion 16 (shown in FIGS. 25-28). It should be appreciated that other misalignments resulting from movement of the blade support 18 relative to the hand-held portion 16 in other degrees of freedom are contemplated. It should be also appreciated that a combination of the misalignments mentioned above may occur simultaneously. For example, the blade support 18 may be pitched and rolled relative to the hand-held portion 16 simultaneously. When the tool alignment member 502 is misaligned relative to the handle alignment member 504 the resulting second spatial relationship provides visual indication of the pose of the blade support 18 relative to the hand-held portion 16 even if the misalignment occurs in multiple degrees of freedom.

In some configurations, the first spatial relationship may provide visual indication that the blade support 18 is aligned in the pitch degree of freedom relative to the hand-held portion 16 about the lateral axis 558. However, as described above, the plurality of actuators 21, 22, 23 may be configured to adjust at least a pitch of the blade support 18 relative to the hand-held portion 16 to maintain the tool 20 on the target plane TP. For example, FIGS. 18-21 illustrate the blade support 18 pitched by an amount relative to the hand-held portion 16 such that the plurality of actuators 21, 22, 23 no longer have maximum adjustability. When the blade support 18 is pitched relative to the hand-held portion 16 such that the plurality of actuators 21, 22, 23 no longer have maximum adjustability, at least one of the tool alignment members 502, 528 may be misaligned with at least one of the handle alignment members 504, 530, respectively, in the second spatial arrangement. The second spatial arrangement may include a pitch relationship. The pitch relationship may provide visual indication of the magnitude of the pitch of blade support 18 relative to the hand-held portion 16 about the lateral axis.

For example, as shown in FIGS. 18-21, the tool alignment member 502 and the handle alignment member 504 may be arranged in the pitch relationship when a distal portion 542 of the handle alignment member 504 further from a blade plane BP (illustrated as distance D1) than a proximal portion 544 of the handle alignment member 504 along the longitudinal axis 552 of the handle alignment member 504 (illustrated as distance D2) in a direction of the pitch. Also, for example, as best shown in FIG. 21, when the second tool alignment member 528 is pitched relative to the second handle alignment member 530 such that the plurality of actuators 21, 22, 23 no longer have maximum adjustability, a longitudinally distal portion 542 of the second handle alignment member 530 is further from a blade plane BP (illustrated as distance D3) than a longitudinally proximal portion 544 of the second handle alignment member 530 along a longitudinal axis 552 of the second handle alignment member 530 (illustrated as distance D4) in the direction of the pitch. In other words, when the blade support 18 is pitched relative to the hand-held portion 16 such that the plurality of actuators 21, 22, 23 no longer have maximum adjustability, one end of the handle alignment members 504, 528 is further away from the blade plane BP than the other end along the longitudinal axis of the tool 20 in the direction of the movement. Thus, the arrangement of the alignment members 502, 504, 528, 530 in the pitch relationship may provide visual indication that the blade support 18 does not have the desired range of motion relative to the hand-held portion 16 and that the operator must adjust the pose of the hand-held portion 16 so that the tool alignment members 502, 528 and the handle alignment members 504, 530 come into alignment in the first spatial relationship, affording the instrument 14 maximum adjustability.

In other configurations, the first spatial relationship may provide visual indication that the blade support 18 is aligned in the roll degree of freedom relative to the hand-held portion 16 about the longitudinal axis 552. The plurality of actuators 21, 22, 23 may be configured to adjust at least a roll of the blade support 18 relative to the hand-held portion 16 to maintain the tool 20 on the target plane TP. For example, FIGS. 22-24 illustrate the blade support 18 rolled relative to the hand-held portion 16 by an amount such that the plurality of actuators 21, 22, 23 no longer have maximum adjustability. When the blade support 18 is rolled relative to the hand-held portion 16 such that the plurality of actuators 21, 22, 23 no longer have maximum adjustability, at least one of the tool alignment members 502, 528 may be misaligned with the handle alignment members 504, 530, respectively, in the second spatial arrangement. The second spatial arrangement may include a roll relationship. The roll relationship may provide visual indication of the magnitude of the roll of the blade support 18 relative to the hand-held portion 16 about the longitudinal axis 552.

For example, as shown in FIGS. 22-24, the tool alignment member 502 and the handle alignment member 504 may be arranged in the roll relationship when a distal portion 546 of the handle alignment member 504 further from a blade plane BP (illustrated as distance D1) in than a proximal portion 548 of the handle alignment member 504 (illustrated as distance D2) along a lateral axis 558 of the handle alignment member 504 in a direction of the roll. Also, for example, FIG. 24 shows a laterally distal portion 546 of the second handle alignment member 530 further from a blade plane BP (illustrated as distance D3) in than a laterally proximal portion 548 of the second handle alignment member 530 (illustrated as distance D4) along the lateral axis 558 in a direction of the roll. Further, still referring to FIG. 24, the second spatial relationship of the first tool alignment member 502 relative to the first handle alignment member 504 combined the second spatial relationship of the second tool alignment member 528 relative to the second handle alignment member 530 may provide further visual indication of the pose of the blade support 18 relative to the hand-held portion 16 than merely the first tool alignment member 502 relative to the first handle alignment member 504 alone. Particularly, the first handle alignment member 504 and the second handle alignment member 530 may cumulatively define the handle alignment plane 526 (shown in FIG. 24), which may be rolled relative to the tool alignment plane 512 such that the plurality of actuators 21, 22, 23 no longer have maximum adjustability, providing visual indication of the pose of the blade support 18 relative to the hand-held portion. Thus, the operator is provided with another visual indication that the blade support 18 does not have the optimal range of motion relative to the hand-held portion 16. In other words, when the blade support 18 is rolled relative to the hand-held portion 16 such that the plurality of actuators 21, 22, 23 no longer have maximum adjustability, one side of the handle alignment members 504, 528 will be displaced further from the blade plane BP than the other side of the handle alignment members 504, 528 in the direction of the deviation. Thus, the arrangement of the alignment members 502, 504, 528, 530 in the roll relationship may provide visual indication that the blade support 18 does not have the desired range of motion relative to the hand-held portion 16 and that the operator must adjust the pose of the hand-held portion 16 so that the tool alignment member 502 and the handle alignment member 504 come into alignment in the first spatial relationship, affording the instrument 14 maximum adjustability.

In additional configurations, the first spatial relationship may provide visual indication that the blade support 18 is free of any vertical displacement (i.e., elevation) relative to the hand-held portion 16 about the vertical axis 554. The plurality of actuators 21, 22, 23 may be configured to adjust at least an elevation of the blade support 18 relative to the hand-held portion 16 to maintain the tool 20 on the target plane TP. For example, FIGS. 25-28 illustrate the blade support 18 elevated by an amount relative to the hand-held portion 16 such that the plurality of actuators 21, 22, 23 no longer have maximum adjustability. When the blade support 18 is elevated relative to the hand-held portion 16 such that the plurality of actuators 21, 22, 23 no longer have maximum adjustability, at least one of the tool alignment members 502, 528 may be misaligned with at least one of the handle alignment member 504, 530, respectively, in the second spatial arrangement. The second spatial arrangement may include an elevation relationship. The elevation relationship may provide visual indication of the magnitude of elevation of the blade support 18 relative to the hand-held portion 16. For example, as shown in FIGS. 25-28, the tool alignment member 502 and the handle alignment member 504 may be arranged in the elevation relationship when the tool alignment member 502 is displaced above the handle alignment member 504 in a direction of the elevation at a distance D1. Also, for example, FIGS. 26 and 28 show the second handle alignment member 530 displaced above the second tool alignment member 528 at a distance D3. Thus, the arrangement of the alignment members 502, 504, 528, 530 in the elevation relationship may provide visual indication that the blade support 18 does not have the desired range of motion relative to the hand-held portion 16 and that the operator must adjust the pose of the hand-held portion 16 so that the tool alignment members 502, 528 and the handle alignment members 504, 530 come into alignment in the first spatial relationship, affording the instrument 14 maximum adjustability.

It should be appreciated in view of the description above that the guidance array 500 provides numerous benefits to the operation of the instrument 14. For example, the guidance array 500 reduces the magnitude of focal point shifts required for the operator to ascertain the pose of the blade support 18 relative to the hand-held portion 16. In other words, since the guidance array 500 arranged relative to the tool 20 such that the guidance array 500 is substantially within a line of sight of an operator such that the operator does not have to substantially shift their focal point (e.g., turn their head) to receive visual indication of the pose of the blade support 18 relative to the hand-held portion 16. Simultaneously, while the guidance array 500 is substantially within the line of sight of the operator, the guidance array 500 is arranged toward the proximal portion 560 of the tool support so that a user may view the guidance array 500 and the distal tip of the tool 20, so that the user may focus on the cut and the alignment simultaneously. Said differently, the guidance array 500 is positioned a particular distance from the distal tip of the tool 20 such that the user will have an unobstructed view of the surgical site and the tool 20. Additionally, the guidance array 500 provides the operator with an easily discernable visual indication of the pose of the blade support 18 relative to the hand-held portion 16, reducing the need for auxiliary components (e.g., auxiliary navigation displays) to provide visual indication. Also, the guidance array 500 suffers from minimal parallax. Further, since the guidance array 500 primarily provides visual indication through mechanical structure, there is no lag in providing the operation visual indication as compared to electronic navigation.

In FIGS. 29-32, another configuration of the guidance array 600 is shown. In the illustrated configuration of the guidance array 600, a tool alignment member 602 may include a tool alignment portion 610 defining a cylindrical shape. Similarly, a handle alignment member 604 may include a handle alignment portion 624 defining a cylindrical shape. As shown in the configuration illustrated in FIG. 32, for example, the target plane TP, the tool alignment member 602, and the handle alignment member 604 are arranged in the first spatial relationship when the tool alignment portion 610 the handle alignment portion 624, and the target plane TP intersect, providing visual indication that the tool 20 is aligned with the target plane TP and the actuators 21, 22, 23 are in their respective home positions. In certain configurations, the term "intersect" is defined as at least a portion of the tool alignment member 602 and at least a portion of the handle alignment member 604 being substantially aligned (as described above) when viewed from a proximal end 560 of the hand-held surgical system 10 within a suitable tolerance. Referring to FIG. 32, the tool alignment portion 610 and the handle alignment portion 624 may include markings in the form of a first color 666 and a second color 668, respectively. The markings (666, 668) on the tool alignment portion 610 and the handle alignment portion 624 serve to provide visual indication of the alignment of the blade support 18 to the hand-held portion 16. For example, when the markings (666, 668) are aligned such that the markings (666, 668) overlap when viewed from a proximal end 560 of the hand-held instrument 14 by an operator (shown as shown in FIG. 32), the operator is provided with visual indication that blade support 18 has the maximum range of adjustability relative to the hand-held portion 16. Notably, the markings (666, 668) each have a length which defines the tolerance of suitable overlap for which the blade support 18 will have the optimal range of motion relative to the hand-held portion 16. The tool alignment member 602 and the handle alignment member 604 may be arranged such that they are misaligned in a second spatial relationship when the blade support 18 is in a pose that does not provide the desired range of motion relative to the hand-held portion 16 (as described above). Also, as best shown in FIGS. 30 and 31, the handle alignment member 604 may be removably coupled to the hand-held portion 16. For example, the handle alignment member 604 may be magnetically coupled to the hand-held portion 16 such that the handle alignment member 604 may be decoupled on demand. However, any suitable means of removably coupling the handle alignment member 604 to the hand-held portion are contemplated (e.g., latches, clips, fasteners, hook-and-loop, the like, and combinations thereof.)

Notably, the guidance array 600 may include a second tool alignment member 628 and a second handle alignment member 630 to provide further indication of the pose of the blade support 18 relative to the hand-held portion 16. For example, if the blade support 18 were to be rolled in a direction by an amount relative to the hand-held portion 16 away from the configuration shown in FIG. 32 such that the plurality of actuators 21, 22, 23 no longer have maximum adjustability, one side of the handle alignment members 604, 628 will be displaced further from the blade plane BP than the other side of the handle alignment members 604, 628 in the direction of the deviation. In other words, the markings 668 on the handle alignment portion 624 would displace away from the markings 666 on the tool alignment portion 610 in the direction of the deviation, misaligning the handle alignment portion 624 relative to the tool alignment portion 610, providing visual indication that the blade support 18 does not have the desired range of motion relative to the hand-held portion 16 and that the operator must adjust the pose of the hand-held portion 16 so that the tool alignment members 602, 628 and the handle alignment members 604, 630 come into alignment in the first spatial relationship, affording the instrument 14 maximum adjustability. Similarly, the second tool alignment member 628 and the second handle alignment member 630 would provide further indication of the pose of the blade support 18 relative to the hand-held portion 16 in the pitch and elevation degrees of freedom.

FIGS. 33 and 34 illustrate yet another configuration of the guidance array 600'. In the illustrated configuration of the guidance array 600', a tool alignment member 602' may include a tool alignment portion 610' defining a spherical shape. Similarly, a handle alignment member 604' may include a handle alignment portion 624' defining a spherical shape. In some configurations, such as shown in FIG. 34, the tool alignment portion 610' are arranged on the blade plane BP. As shown in the configuration illustrated in FIG. 34, for example, the target plane TP, the tool alignment member 602', and the handle alignment member 604' are arranged in the first spatial relationship when the tool alignment portion 610', the handle alignment portion 624', and the target plane TP intersect, providing visual indication that the tool 20 is aligned with the target plane TP and the actuators 21, 22, 23 are in their respective home positions. Referring to FIG. 34 specifically, the tool alignment portion 610' and the handle alignment portion 624' may be sized such that an operator may easily discern that they are aligned when viewing the guidance array 600' form the proximal end 560 of the instrument 14, providing visual indication that the blade support 18 has the optimal amount of travel relative to the hand-held portion 16. Also, the tool alignment member 602' and the handle alignment member 604' may be arranged such that they are misaligned in a second spatial relationship when the blade support 18 is in a pose that does not provide the desired range of motion relative to the hand-held portion 16 (as described above). Notably, the guidance array 600' may include a second tool alignment member 628' and a second handle alignment member 630' to provide further indication of the pose of the blade support 18 relative to the hand-held portion 16.

Notably, the guidance array 600' may include a second tool alignment member 628' and a second handle alignment member 630' to provide further indication of the pose of the blade support 18 relative to the hand-held portion 16. For example, if the blade support 18 were to be rolled by an amount relative to the hand-held portion 16 away from the configuration shown in FIG. 34 such that the plurality of actuators 21, 22, 23 no longer have maximum adjustability, one side of the handle alignment members 604', 628' will be displaced further from the blade plane BP than the other side of the handle alignment members 604', 628' in the direction of the deviation. In other words, the spherical handle alignment portion 624' would displace away from the spherical tool alignment portion 610' in the direction of the deviation, misaligning the spherical handle alignment portion 624' relative to the spherical tool alignment portion 610', providing visual indication that the blade support 18 does not have the desired range of motion relative to the hand-held portion 16 and that the operator must adjust the pose of the hand-held portion 16 so that the tool alignment members 602', 628' and the handle alignment members 604', 630' come into alignment in the first spatial relationship, affording the instrument 14 maximum adjustability. Similarly, the second tool alignment member 628' and the second handle alignment member 630' would provide further indication of the pose of the blade support 18 relative to the hand-held portion 16 in the pitch and elevation degrees of freedom.

FIGS. 35-37 illustrate another example of the guidance array 600''. In the illustrated example of the guidance array 600'', a tool alignment member 602'' includes a tool alignment portion 610'', and a handle alignment member 604'' includes a handle alignment portion 624''. Notably, however, as illustrated in the configuration shown in FIG. 36, the tool alignment portion 610'' and the handle alignment portion 624'' may be offset from the blade plane BP when the tool alignment member 602'', and the handle alignment member 604'' are arranged in the first spatial relationship such that the tool alignment member 602'' and the handle alignment member 604'' do not interfere with the line of sight of the surgical navigation system 32 to any tracking markers 584 (discussed below). For example, as shown in FIG. 36, the tool alignment portion 610'' and the handle alignment portion 624'' are aligned along a plane defined between the blade plane BP and the grip 72 of the hand-held portion 16. In other words, in the configuration shown in FIGS. 35-37, the tool alignment portion 610'' and the handle alignment portion 624'' are not co-planar with the blade plane BP when the tool alignment member 602'' and the handle alignment member 604'' are arranged in the first spatial relationship such that they are aligned (i.e., substantially parallel). However, the tool alignment portion 610'' and the handle alignment portion 624'' are parallel to the blade plane BP when the tool alignment member 602'' and the handle alignment member 604'' are arranged in the first spatial relationship, providing visual indication that the tool 20 is aligned with the target plane TP and the actuators 21, 22, 23 are in their respective home positions. Also, the tool alignment member 602'' and the handle alignment member 604'' may be arranged such that they are misaligned in a second spatial relationship when the blade support 18 is in a pose that does not provide the desired range of motion relative to the hand-held portion 16 (as described above). Notably, the guidance array 600'' may include a second tool alignment member 628'' and a second handle alignment member 630'' to provide further indication of the pose of the blade support 18 relative to the hand-held portion 16.

Notably, the guidance array 600'' may include a second tool alignment member 628'' and a second handle alignment member 630'' to provide further indication of the pose of the blade support 18 relative to the hand-held portion 16. For example, if the blade support 18 were to be rolled by an amount relative to the hand-held portion 16 away from the configuration shown in FIG. 37 such that the plurality of actuators 21, 22, 23 no longer have maximum adjustability, one side of the handle alignment members 604'', 628'' will be displaced further from the tool alignment plane 512 than the other side of the handle alignment members 604'', 628'' in the direction of the deviation. In other words, the handle alignment portion 624" would displace away from the tool alignment portion 610" in the direction of the deviation, misaligning the handle alignment portion 624" relative to the tool alignment portion 610", providing visual indication that the blade support 18 does not have the desired range of motion relative to the hand-held portion 16 and that the operator must adjust the pose of the hand-held portion 16 so that the tool alignment members 602", 628" and the handle alignment members 604", 630" come into alignment in the first spatial relationship, affording the instrument 14 maximum adjustability. Similarly, the second tool alignment member 628" and the second handle alignment member 630" would provide further indication of the pose of the blade support 18 relative to the hand-held portion 16 in the pitch and elevation degrees of freedom.

FIGS. 38 and 39 illustrate a further configuration of the guidance array 600'''. In the illustrated configuration of the guidance array 600''', a tool alignment member 602''' includes a tool alignment portion 610''', and a handle alignment member 604''' includes a handle alignment portion 624'''. Notably, however, unlike the configurations shown in FIGS. 12-28 and 35-37, the tool alignment member 602''' only aligns with one side of the handle alignment member 604''', whereas in the configurations in FIGS. 12-28 and 39-42, the tool alignment member 502 aligns with both a distal and proximal end of the handle alignment member 504. As shown in the configuration illustrated in FIG. 39, for example, the target plane TP, the tool alignment member 602''', and the handle alignment member 604''' are arranged in the first spatial relationship when the tool alignment portion 610''', the handle alignment portion 624''', and the target plane TP are aligned, providing visual indication that the tool 20 is aligned with the target plane TP and the actuators 21, 22, 23 are in their respective home positions. Also, the tool alignment member 602''' and the handle alignment member 604''' member may be arranged such that they are misaligned in a second spatial relationship when the blade support 18 is in a pose that does not provide the desired range of motion relative to the hand-held portion 16 (as described above). Notably, the guidance array 600''' may include a second tool alignment member 628''' and a second handle alignment member 630''' to provide further indication of the pose of the blade support 18 relative to the hand-held portion 16.

Notably, the guidance array 600''' may include a second tool alignment member 628''' and a second handle alignment member 630''' to provide further indication of the pose of the blade support 18 relative to the hand-held portion 16. For example, if the blade support 18 were to be rolled by an amount relative to the hand-held portion 16 away from the configuration shown in FIG. 39 such that the plurality of actuators 21, 22, 23 no longer have maximum adjustability, one side of the handle alignment members 604''', 628''' will be displaced further from the blade plane BP than the other side of the handle alignment members 604''', 628''' in the direction of the deviation. In other words, the handle alignment portion 624''' would displace away from the tool alignment portion 610''' in the direction of the deviation, misaligning the handle alignment portion 624''' relative to the tool alignment portion 610''', providing visual indication that the blade support 18 does not have the desired range of motion relative to the hand-held portion 16 and that the operator must adjust the pose of the hand-held portion 16 so that the tool alignment members 602''', 628''' and the handle alignment members 604''', 630''' come into alignment in the first spatial relationship, affording the instrument 14 maximum adjustability. Similarly, the second tool alignment member 628''' and the second handle alignment member 630''' would provide further indication of the pose of the blade support 18 relative to the hand-held portion 16 in the pitch and elevation degrees of freedom.

Notably, as shown in the configurations illustrated in FIGS. 29-39 and FIG. 51, the tool alignment member(s) 602, 602', 602", 602''' may be integrally formed with a tool tracker 574 of the surgical navigation system that may be removably coupled to the blade support 18. Integrally forming the tool alignment member(s) 602, 602', 602", 602''' with the tool tracker 574 reduces the mounting space required on the blade support 18 and allows the tool tracker to be closer to the tip of the tool 20, facilitating more accurate surgical navigation. The tool tracker 574 may include sidewalls 580 attached with a cross member 582, each of the sidewalls 580 includes one or more of the plurality of markers 584. In some configurations, the plurality of markers may be arranged in a mirrored configuration on each of the sidewalls 580. The sidewalls 580 may contour with the profile of the blade support 18. Additionally, in some configurations, the markers 584 may be active, passive, or a combination thereof. In other configurations, the markers 584 may be arranged on the tool alignment member(s) 602, 602', 602", 602''' to improve the line of sight with the surgical navigation system 32. To mount the tool tracker 574 to the blade support 18, the tool tracker 574 may include a guide slot 576 and the blade support 18 may include a guide rail 578 at the distal end of blade support 18 (shown in FIG. 35). The guide slot 576 of the tool tracker 574 is sized to receive the guide rail 578 of the blade support 18, allowing the tool tracker 574 to be connected onto the distal end of the blade support 18.

Additionally, the tool alignment member 602 and/or the handle alignment member 604 may include one or more visual indicia. In some configurations, such as shown in FIGS. 32 and 34 for example, the tool alignment member 602 includes at least a first visual indicia 562 and the handle alignment member 604 includes at least a second visual indicia 564. Notably, the first visual indicia 562 is visually distinguishable from the second visual indicia 564. In the version shown in FIGS. 32 and 34, for example, the first visual indicia 562 may arranged such that it is visible from the proximal end 560 of the hand-held portion 16 when the tool alignment member 602 and the handle alignment member 604 are misaligned (i.e., in the second spatial arrangement). Conversely, the second visual indicia 564 is arranged such that it is visible from the proximal end of the hand-held portion 16 when the tool alignment member 602 and the handle alignment member 604 are aligned (i.e., in the first spatial arrangement). Thus, the first visual indicator 562 and the second visual indicator 564 provide an operator with an easily identifiable visual indication of the alignment of the tool alignment member 602 relative to the handle alignment member 604. In some versions, the visual indicia comprise one or more visual cues (e.g., pattern, light, color, combinations thereof, and the like.). For example, referring to FIG. 32, the visual indicia may include the colored markings 666, 668.

In another configuration, such as shown in FIGS. 47-48, for example, the tool alignment member 502 and the handle alignment member 504 each have the first visual indicia 562 and the second visual indicia 564. For example, the first visual indicia 562 may be a first color 566, and the second visual indicia 564 may be a second color 568. In this configuration, the first color 566 is visible along the edges where the tool alignment member 504 and handle alignment member 504 are adjacent when the tool alignment member and the handle alignment member are aligned (best shown in FIGS. 35, 37, and 40), and, conversely, at least one of the second visual indicia 564 is visible along the edges where the tool alignment member 504 and handle alignment member 504 are adjacent when the tool alignment member 502 and the handle alignment member 504 are misaligned (best shown in FIG. 40). To facilitate this configuration, top surface 503 of the tool alignment member 502 and the top surface 505 of handle alignment member 504 may include the first visual indicia 562. Similarly, a side surface 570 of the tool alignment member 502 and a side surface 572 of the handle alignment member 504 may include the second visual indicia 564 such that when the tool alignment member 502 and the handle alignment member 504 are misaligned with each other, the second visual indicia 564 is revealed, providing an indication that one or more of the plurality of actuators 21, 22, 23 have moved from their home position. The visual indicia 562, 564 allow an operator to quickly differentiate between surfaces of the tool alignment member 502 and the handle alignment member 504 in order to quickly discern whether the tool alignment member 502 and the handle alignment member 504 are misaligned. For example, as shown in FIG. 40, at least one of the second visual indicia 564 (in the form of second color 568 and provided on side surface 572) is visible when the tool alignment member 502 and the handle alignment member 504 are misaligned, providing an indication that one or more of the plurality of actuators 21, 22, 23 have moved from their home position.

Referring to FIGS. 42 and 43, the instrument 14 may include a light emitter, such as an LED, 586 on any suitable location within the line of sight of the operator, such as the tool alignment member 502, the handle alignment member 504, or the blade support 18. The light emitter 586 may be configured to be illuminated when the blade support 18 has the desired range of motion, providing visual indication that the blade support 18 and the hand-held portion 16 are within a designated range of alignment with a target plane TP. For example, the light emitter 586 may be configured to indicate that the actuators 21, 22, 23 are in the first spatial arrangement, (i.e., having the desired range of motion). Alternatively, the light emitter 586 may be configured to illuminate when the blade support 18 are in the second spatial arrangement. For example, when the first visual indicator 201 is operated to indicate that movement of the hand-held portion 16 is needed, the visual indicator 201 is representing that one or more of the actuators 21, 22, 23 is too far away from its home position, misaligning the tool alignment member and the handle alignment member, indicating that the hand-held portion 16 needs to be moved.

In some examples, the controller may control the light emitter 586 based on the commanded position of the actuators 21, 22, 23 and the available travel of the actuators 21, 22, 23. For example, a first color may be based on a first range of travel within an operational range of the actuators 21, 22, 23 and a commanded position of the actuators 21, 22, 23, and a second color may be a second range of travel within the operational range of the actuators 21, 22, 23 and a commanded position of the actuators 21, 22, 23, which is different than the first range of travel. A third color representing a third range of travel of the actuators 21, 22, 23 within the available travel may also be included, the third range of travel different than the second range of travel. For example, the first color is red and correlates to the commanded position of the actuator 21, 22, 23 being closest to the outer limits of the available travel, the second color is yellow and correlates to the commanded position of the actuator 21, 22, 23 being farther away from the outer limits of the available travel, and the third color is green indicating that the commanded position of the actuator 21, 22, 23 is far from the limits of the available travel range.

In a further example, the colors associated with the light emitter 586 may be representative of several actuator parameters such that the light emitter 586 would convey to the user a first color representative of the amount of travel needed to bring at least one actuator 21, 22, 23 to the commanded position, and a second color representative of the direction needed to move the hand-held portion 16 to bring the tool 20 into the operational range of the actuator. As described above, the third color may correspond to the outermost range of available travel (i.e., the least travel remaining available relative to the commanded position, the second color may correspond to the middle range of available travel, and the first color may correspond to the innermost range of available travel (i.e., the most travel remaining available relative to the commanded position). In some examples, when the light emitter 586 is configured to be sectioned into two or more portions. Each of the respective portions may illuminate in different states to indicate a direction of desired movement of the hand-held portion 16. In some versions, the illumination of an upper portion and a lower portions of the light emitter 586 may be operated in the same state based on a commanded position and the available travel of the hand-held portion 16.

Alternatively, the light emitter 586 or other indicia may be controlled based on one or more components of the commanded pose and one or more range of motions in particular degrees of freedom. More particularly, the light emitter 586 or other indicia may be controlled based on the pitch component of the commanded pose and a pitch range of motion. Alternatively, or in combination, the light emitter 586 may be controlled based on the roll component of the commanded pose and a roll range of motion. The pitch and the roll range of motion may be defined by a series of nested ranges. The control system 60 may control the light emitter to emit a first color when the pitch component of the commanded pose is within the innermost range of the pitch range of motion and the roll component of the commanded pose is within the innermost range of the roll range of motion. Alternatively, the control system 60 may control the light emitter to emit a second color light, or prevent power to the light emitter, when either the pitch component of the commanded pose is in a relatively outer range of pitch range of motion or the roll component of the commanded pose is in a relatively outer range of the roll range of motion. By controlling the light emitter 586 in this manner, the light indicia can indicate that the user is in a good pose relative to pitch and roll or the user needs to adjust one of pitch and roll. Similarly, the control system 60 may further emit a first color only when a further condition exists, such as when an elevation component of the commanded pose also falls within the innermost range of an elevation range of motion. Further still, the control system 60 may control the light emitter 586 to emit a second color light or prevent power to the light emitter 586 when any of the pitch component, roll component, or elevation components are outside their respective innermost ranges of motion. While elevation, pitch, and roll are mentioned here, it is also contemplated that the light emitter 586 could be controlled based the components of the commanded pose in the other degrees of freedom relative and their respective ranges of motion.

Referring to FIGS. 44-50, in another configuration, the instrument 14 may include a shroud 700 coupled to and extending between the blade support 18 and the hand-held portion 16. Notably, as shown in FIGS. 29-39, the shroud 700 may be included on the instrument 14 simultaneously with the tool alignment member 502 and the handle alignment member 504. The shroud 700 may be formed from any suitable material such as plastic, rubber, composite, the like, or a combination thereof, that is compatible with a sterilization process, such as with an auto-clave sterilization process or a hydrogen-peroxide sterilization process. The shroud 700 may be coupled to the blade support 18 and the hand-held portion 16 using any suitable means such as clamps, fasteners, adhesives, the like, or a combination thereof. In some configurations, the shroud 700 may surround at least one of the plurality of actuators 21, 22, 23. The shroud 700 may include accordion-like folds, capable of expanding and bending as the blade support 18 moved relative to the hand-held portion 16. Also, in some configurations, the shroud 700 defines at least two shroud landmarks 702 (described in further detail below). In some configurations there may be two or more, five or more, ten or more, or even a plurality of shroud landmarks 702. When the blade support 18 moves relative to the hand-held portion 16, the displacement of the shroud landmarks 702 relative to each other provides visual indication of a pose of the blade support 18 relative to the hand-held portion 16. Notably, referring to FIG. 45, the instrument 14 may include one or more shroud alignment members 706 removably coupled to the hand-held portion 16. For example, in some configurations, the instrument 14 may include at least two shroud alignment members 706. The should alignment member(s) 706 may be transparent and include shroud alignment markings 708. For example, referring to FIG. 47, the shroud alignment markings 708 may indicate when the plurality of actuators 21, 22, 23 are in their respective home positions and the instrument 14, therefore, has an optimal range of motion. In some configurations, there may be two or more, or four or more, or even a plurality of shroud alignment members 706. For example, FIGS. 47-50 show the hand-held surgical robotic system including a second shroud alignment member 714 for providing further visual indication of a pose of the blade support 18 relative to the hand-held portion 16.

In some configurations, the at least two shroud landmarks 702 include at least two creases 704. In some configurations, the creases 704 may be defined by the accordion-like folds. The creases 704 may define planes 716 (shown in FIG. 46) that provide visual indication of the pose of the blade support 18 relative to the hand-held portion 16. The creases 704, for example, the planes 716 to may be substantially parallel and offset at a distance corresponding the shroud alignment marking 708 such that the planes 716 are aligned with the shroud alignment markings 708 in a first position 710, providing visual indication that the plurality of actuators 21, 22, 23 are in their respective home positions and the instrument 14, therefore, has an optimal range of motion. Also, however, the planes 716 may displace vertically and angularly when the blade support 18 and hand-held portion 16 are moved to a second position 712, providing visual indication that the blade support 18 does not have the optimal range of motion relative to the hand-held portion 16.

FIGS. 47-50 show that, similar to the tool alignment member 502 and the handle alignment member 504, the shroud 700 may be configured such that the shroud 700 provides visual indication to an operator of the pose of the blade support 18 relative to the hand-held portion 16. For example, FIG. 48 shows the shroud 700 when the blade support 18 is pitched relative to the hand-held portion. FIG. 49 shows the shroud 700 when the blade support 18 is rolled relative to the hand-held portion 16. FIG. 50 shows the shroud 700 when the blade support 18 is elevated relative to the hand-held portion. In each of FIGS. 48-50, the pose of the creases 704 relative to the shroud alignment markings 708 provide visual indication to an operator of the pose of the blade support 18 relative to the hand-held portion 16.

In some configurations, similar to the tool alignment member 502 and the handle alignment member 504, the at least two shroud landmarks 702 may include a first visual indicia 562 and a second visual indicia 564. Also, similar, the first visual indicia 562 may be visually distinguishable from the second visual indicia 564 such that they provide an operator with an easily identifiable visual indication of the pose of the blade support 18 relative to the hand-held portion. For example, the first visual indicia 562 may be a first color and the second visual indicia 564 may be a second color. In the present configuration, the first color is visible when the blade support 18 is in the first position (i.e., the plurality of actuators 21, 22, 23 are in their respective home positions), and at the second color is visible when the blade support 18 is in the second position (i.e., the blade support 18 does not have the optimal range of motion relative to the hand-held portion 16.).

In another configuration, shown in FIGS. 54-77, the instrument 14 also includes a guidance array 900. The guidance array 900 provides an operator with visual indication of the pose of the tool support 18 relative to the hand-held portion 16 during operation of the instrument 14, providing visual indication to the operator of required changes in pitch orientation, roll orientation, and z-axis translation of the hand-held portion 16 to achieve the desired pose of the tool 20 while affording the actuator assembly 400 (discussed above) with maximum adjustability to maintain the tool 20 on the target plane TP. The guidance array 900 includes a handle alignment member 904 extending from the hand-held portion 16 for providing visual indication to an operator to guide the operator as to how to move the hand-held portion 16 to provide the instrument 14 with sufficient adjustability by keeping the actuators 21, 22, 23 of the actuator assembly 400 near their home positions or other predetermined positions.

The handle alignment member 904 may be any suitable shape or configuration which would provide an operator user with visual indication that one or more of the actuators 21, 22, 23 of the actuator assembly 400 has moved from their respective home positions. For example, referring to FIGS. 54-77, the handle alignment member 904 may include a handle alignment projection 906. The handle alignment projection 906 may extend toward the tool mount 18a. Notably, referring to FIGS. 54-77, the handle alignment projection 906 may be shaped such that at least a portion 908 of the handle alignment projection 906 is arranged at an oblique angle relative to the longitudinal axis 910 and the lateral axis 912 of the tool 20/tool support 18. For example, the handle alignment projection 906 may define a handle alignment edge 914 arranged at an oblique angle relative to the longitudinal axis 910 and the lateral axis 912 of the tool 20/tool support 18. The "oblique" angle of the handle alignment projection 906 relative to the longitudinal axis 910 and the lateral axis 912 may include, for example, arrangements of the handle alignment projection 906 at an angle of greater than 0 degrees and less than 90 degrees relative to both the longitudinal axis 910 and the lateral axis 912. For example, the tool alignment projection 906 may define a tool alignment edge 914 that has a 45-degree angle relative to the longitudinal and lateral axes 910, 912.

In one configuration, for example, such as shown in FIGS. 54-77, the handle alignment member 904 may define a hook-shaped handle alignment projection 906. The hook-shaped handle alignment projection 906 may define a curved handle alignment edge 914 that sweeps inwards toward the tool support 18 to define the aforementioned oblique angle. While the configuration in FIGS. 54-77 shows a hook-shaped handle alignment projection 906, any suitable edge defining an oblique angle is contemplated, such as (but not limited to) polygonal edges, stepped edges, etc. Notably, as will be discussed in further detail below, the oblique angle of the handle alignment projection 906 relative to the longitudinal axis 910 and the lateral axis 912 of the tool 20/tool support 18 may provide a user to more accurately discern the pose of the tool support 18 relative to the hand-held portion 16 in multiple degrees of freedom simultaneously.

In some configurations, such as shown in in the configuration of FIGS. 54-57, at least a portion of the handle alignment projection 906 and the tool plane BP may be aligned when the actuators 21, 22, 23 of the actuator assembly 400 are in their respective home positions, providing an operator with visual indication that the tool support 18 has an optimal range of motion relative to the hand-held portion 16. In certain configurations, the term "aligned" is defined as at least a portion of the handle alignment projection 906 being substantially co-planar or intersecting the tool plane BP within a suitable tolerance. Particularly, when in the home position, the amount of adjustability of the actuators 21, 22, 23 of the actuator assembly 400 is maximized to keep the tool 20 at a desired pose. In some examples, the alignment between at least a portion of the handle alignment projection 906 and the tool plane BP may be 99 percent or more aligned, 90 percent or more aligned, 70 percent or more aligned, or even 60 percent or more aligned. In other examples, the suitable alignment may be within a designated proximity to a target pose such as within a 1 percent deviation from the target pose, a 5 percent deviation from the target pose, a 10 percent deviation from the target pose, or even a 20 percent deviation or more from the target pose in each individual degree of freedom. Similarly, the suitable alignment may be within 1 mm of the target pose, within 2 mm of the target pose, or even with 5 mm or more of the target pose in each individual degree of freedom. Additionally, the suitable alignment may be within a 1 degree or more deviation from the target pose, a 5 degree or more deviation from the target pose, a 15 degree or more deviation from the target pose, or even a 30 degree or more deviation from the target pose in roll and/or pitch.

Conversely, the tool plane BP and the handle alignment projection 906 are configured to be misaligned when the hand-held portion 16 is in a pose that does not provide the optimal range of motion, providing visual indication that the hand-held portion 16 is in a pose that does not provide the tool support 18 with the optimal range of motion, and thus needs to be adjusted by the operator (discussed in further detail below). In some configurations, the guidance array 900 may also include a tool alignment member 902. In one configuration, for example, referring to FIGS. 54-77, the tool alignment member 902 may extend from the tool support 18. The tool alignment member 902 may have any shape or structure capable of providing visual indication of the pose of the tool plane BP relative to the handle alignment member 904. For example, the tool alignment member 902 may include a tool alignment projection 916 extending toward the tool mount 18a. Referring to FIGS. 54-77, for example, similar to the handle alignment projection 906, the tool alignment projection 916 may have at least a portion 920 arranged at an oblique angle relative to the longitudinal axis 910 and the lateral axis 912 of the tool 20/tool support 18. In some configurations, for example, the tool alignment projection 916 may define a tool alignment edge 918 that is oblique relative to the longitudinal axis 910 and the lateral axis 912 of the tool 20.

It is contemplated that the optimal range of motion may be the maximum range of motion in one, two, three or more degrees of freedom. It is also contemplated that the optimal range of motion may not necessarily be the maximum range of motion, but rather a range of motion that is desired for a preferred pose of the tool support for a particular cut with the saw or other preplanned virtual object, such as a planned cut or planned axis. The optimal range of motion need not be the center of the range of motion in one or more degrees of freedom, but may be the center of the range of motion in one, two, or three degrees of freedom in certain configurations.

In one configuration, for example, such as shown in FIGS. 54-77, the tool alignment member 902 may define a hook-shaped tool alignment projection 916. The hook-shaped tool alignment projection 916 may define a curved tool alignment edge 918 that sweeps inwards toward the tool support 18 to define the aforementioned oblique angle. While the configuration in FIGS. 54-77 shows a hook-shaped tool alignment projection 916, any suitable edge defining an oblique angle is contemplated, such as (but not limited to) polygonal edges, stepped edges, etc. Notably, the hook-shaped tool alignment projection 916 and the hook-shaped handle alignment projection 906 may be configured to be aligned when the tool support 18 has the optimal range of motion relative to the hand-held portion 16, and may be further configured to be misaligned when the hand-held portion 16 is in a pose that does not provide the tool support 18 with the optimal range of motion, providing visual indication that the hand-held portion 16 is in a pose that does not provide the tool support 18 with the optimal range of motion.

In some examples, the tool alignment edge may be offset from and parallel to the handle alignment edge when the actuators 21, 22, 23 of the actuator assembly 400 are in their respective home positions, providing an operator with visual indication that the tool support 18 has a desired range of motion relative to the hand-held portion 16. Also, in some examples, the tool alignment member 916 is arranged closer to the tool support 18 than the handle alignment member 906.

In some configurations, the tool alignment projection 916 substantially aligned with the tool plane BP. For example, the tool alignment projection 916 may be coplanar with the tool plane BP. As such, the tool alignment projection 916 may serve as a visual representation of the orientation of the tool plane BP to facilitate providing visual indication of the pose of the hand-held portion 16 relative to the tool support 18. However, it is important to note that the handle alignment member 904 may function to provide visual indication of the pose of the hand-held portion 16 relative to the tool support 18 without the addition of a tool alignment member 902. Particularly, a user may still perceive the relationship of the tool support 18 relative to the hand-held portion 16 by examining the relationship between the handle alignment member 904 and the tool 20.

The handle alignment member 904 may be removably coupled to the hand-held portion 16. For example, the handle alignment member 904 may include a handle coupling portion 922 configured to be coupled to the hand-held portion 16. As best shown in FIG. 58, the handle coupling portion 922 of the handle alignment member 904 may be removably coupled to the hand-held portion 16. For example, the handle coupling portion 922 may be magnetically coupled to the hand-held portion 16 such that the handle alignment member 904 may be decoupled on demand or in the event that the operator's hand is pinched between the handle alignment member 904 and the tool alignment member 902 and/or the tool support 18. Any suitable means of removably coupling the handle alignment member 904 to the hand-held portion 16 are contemplated (e.g., magnets, latches, clips, fasteners, hook-and-loop, the like, and combinations thereof).

The handle alignment member 904 may also include a support arm 924. The support arm 924 may extend from the handle coupling portion 922 to support the handle alignment member 904. Notably, as best illustrated in FIGS. 54-58, the support arm 924 extends upward from the grip 72 of the hand-held portion 16 such that the handle alignment member 904 is aligned with the tool plane BP when the actuators 21, 22, 23 of the actuator assembly 400 are in their respective home positions. In some examples, the handle alignment member 904 is rigid relative to the hand-held portion 16 to facilitate the functions of the handle alignment member 904. The handle alignment member 904 may be formed from any suitable material such as plastic, aluminum, steel, composite, the like, or a combination thereof. Further, the handle alignment member 904 may be formed using any suitable method of production including 3D printing, casting, machining, injection molding, stamping, the like, or a combination thereof.

Similarly, referring to FIG. 58, the tool alignment member 902 may also include a tool coupling portion 926 configured to be coupled to the tool support 18. The tool coupling portion 926 may be mounted to the tool support 18 using any suitable means (e.g., fasteners, magnets, adhesives, etc.) at any suitable location to facilitate the functions of the tool alignment member 802. For example, the tool support 18 may include a tool mounting rail 928 extending laterally from the tool support 18. The tool coupling portion 926 of the tool alignment member 902 may define a tool mounting channel 930 configured to be engaged with the tool mounting rail 928 to removably secure the tool alignment member 902 to the tool support 18.

The tool alignment member 902 may further include a support portion 932. The support portion 932 may extend from the tool coupling portion 926 to support the tool alignment member 902. In some examples, the tool alignment member 902 may be rigid relative to the tool support 18 to facilitate the functions of the tool alignment member 902. The tool alignment member 902 may be formed from any suitable material such as plastic, aluminum, steel, composite, the like, or a combination thereof. Further, the tool alignment member may be formed using any suitable method of production including 3D printing, casting, machining, injection molding, stamping, the like, or a combination thereof.

In some configurations, the guidance array 900 may include two or more handle alignment member and two or more tool alignment members. Any number of corresponding tool alignment members and handle alignment members are contemplated. For example, the guidance array 900 may include the first handle alignment member 904 and a second handle alignment member 934 extending from the hand-held portion 16 at a separate location from the first handle alignment member 904. Similarly, the second handle alignment member 934 may include a second handle alignment projection 936. The second handle alignment projection 936 may extend toward the tool mount 18*a*. Notably, referring to FIGS. 54-77, the second handle alignment projection 936 may be shaped such that at least a portion 938 of the second handle alignment projection 936 is arranged at an oblique angle relative to the longitudinal axis 910 and the lateral axis 912 of the tool 20/tool support 18. For example, the second handle alignment projection 936 may define a second handle alignment edge 940 arranged at an oblique angle relative to the longitudinal axis 910 and the lateral axis 912 of the tool 20/tool support 18.

In some examples, the guidance array 900 may include the first tool alignment member 902 and a second tool alignment member 942 extending from the hand-held portion 16 at a separate location from the first tool alignment member 902. For example, referring to FIGS. 54-77, in some configurations, the first alignment members 902, 904 and the second alignment members 934, 942 extend from opposite sides of the hand-held portion 16, having a mirrored arrangement from each other.

The second tool alignment member 942 may include a second tool alignment projection 944 extending toward the tool mount 18. The second tool alignment projection 944 may have at least a portion 946 arranged at an oblique angle relative to the longitudinal axis 910 and the lateral axis 912 of the tool 20/tool support 18. In some configurations, for example, the second tool alignment projection 944 may define a second tool alignment edge 948 that is oblique relative to the longitudinal axis 910 and the lateral axis 912 of the tool 20/tool support 18. In some examples, the second tool alignment edge 948 may be offset from and parallel to the second handle alignment edge 940 when the actuators 21, 22, 23 of the actuator assembly 400 are in their respective home positions, providing an operator with visual indication that the tool support 18 has an optimal range of motion relative to the hand-held portion 16. For example, referring to FIGS. 54 and 56, the handle alignment edge(s) 914, 940 and the tool alignment edge(s) 918, 948 are offset from and parallel to each other when the actuators 21, 22, 23 of the actuator assembly 400 are in their respective home positions Notably, the alignment members 902, 904, 934, 942 may be any suitable shape to provide indication of the alignment of the tool alignment members 902, 934 relative to the handle alignment members 904, 942, respectively. It is contemplated in some examples there may be four or more, or six or more, or even a plurality of tool alignment members and handle alignment members, respectively As shown in FIGS. 54-57, both the first tool alignment projection 916 and the first handle alignment projection 906, as well as a second tool alignment projection 942 and the second handle alignment projection 936 are aligned with each other, respectively, when the actuators 21, 22, 23 of the actuator assembly 400 are in their respective home positions, providing visual indication that the tool support 18 has the optimal range of motion relative to the hand-held portion 16. Conversely, the first tool alignment projection 916 and the first handle alignment projection 906, as well as a second tool alignment projection 944 and the second handle alignment projection 936 are configured to be misaligned with each other, respectively, when the hand-held portion 16 is in a pose that does not provide the optimal range of motion, providing visual indication that the hand-held portion 16 is in a pose that does not provide the tool support 18 with the optimal range of motion, and thus needs to be adjusted by the operator.

During operation of the instrument 14, the handle alignment projections(s) 906, 936 and the tool plane BP may be arranged such that they are aligned in a first spatial relationship 950 when the actuators 21, 22, 23 of the actuator assembly 400 are in their respective home positions. For example, referring to FIGS. 54-57, when the handle alignment projection(s) 906, 936 and the tool plane BP are arranged in the first spatial relationship 950, the handle alignment projection(s) 906, 936 and the tool plane BP are aligned, providing visual indication that the actuators 21, 22, 23 of the actuator assembly 400 are at their respective home positions.

Additionally, referring to FIG. 57, when the instrument 14 is maintaining the tool support 18 such that the tool 20 remains in the target plane TP, the target plane TP, the handle alignment projection(s) 906, 936, and the tool plane BP are configured to be arranged in the first spatial relationship 950 when the handle alignment projection(s) 906, 936, the tool plane BP, and the target plane TP are aligned, providing visual indication that the tool 20 is aligned with the target plane TP and the actuators 21, 22, 23 are in their respective home positions such that the actuators 21, 22, 23 have the maximum amount of adjustability to keep the tool 20 at a desired pose, affording the instrument 14 the maximum adjustment of pitch, roll, and z-axis translation (i.e., elevation) to maintain the tool 20 on the target plane TP.

During operation of the instrument 14, the handle alignment projection(s) 906, 936 may be arranged such that they are misaligned from the tool plane BP in a second spatial relationship 952 when the tool support 18 is in a pose that does not provide the desired range of motion relative to the hand-held portion 16 (illustrated in FIGS. 59-75). The second spatial relationship 952 provides visual indication that the tool support 18 is in a pose relative to the hand-held portion 16 that does not provide the instrument 14 with the desired range of motion, and therefore, indicates that the operator must adjust the pose of the hand-held portion 16 such that the handle alignment projection(s) 906, 936 are aligned with the tool plane BP in the first spatial relationship 950 to afford the instrument 14 maximum adjustability.

Similarly, during operation of the instrument 14 that further includes at least one of the tool alignment members 902, 942 having the tool alignment projection(s) 916, 944, the handle alignment projections(s) 906, 936 and the tool alignment projection(s) 916, 944 may be arranged such that they are aligned in the first spatial relationship 950 when the actuators 21, 22, 23 of the actuator assembly 400 are in their respective home positions. For example, referring to FIGS. 54-57, when the handle alignment projection(s) 906, 936 and the tool alignment projection(s) 916, 944 are arranged in the first spatial relationship 950, the handle alignment projection(s) 906, 936 and the tool alignment projection(s) 916, 944 are aligned, respectively, providing visual indication that the actuators 21, 22, 23 are at their respective home positions.

Also similarly, referring to FIG. 57, when the instrument 14 is maintaining the tool support 18 such that the tool 20 remains in the target plane TP, the target plane TP, the handle alignment projection(s) 906, 936, and the tool alignment projection(s) 916, 944 are configured to be arranged in the first spatial relationship when the handle alignment projection(s) 906, 936, the tool alignment projection(s) 916, 944, and the target plane TP are aligned, providing visual indication that the tool 20 is aligned with the target plane TP and the actuators 21, 22, 23 are in their respective home positions such that the actuators 21, 22, 23 have the maximum amount of adjustability to keep the tool 20 at a desired pose, affording the instrument 14 the maximum adjustment of pitch, roll, and z-axis translation (i.e., elevation) to maintain the tool 20 on the target plane TP.

Additionally, during operation of the instrument 14, that further includes at least one of the tool alignment members 902, 942, the tool alignment projection(s) 916, 944 and the handle alignment projection(s) 902, 942 may be arranged such that they are misaligned from each other, respectively, in the second spatial relationship 952 when the tool support 18 is in a pose that does not provide the desired range of motion relative to the hand-held portion 16 (illustrated in FIGS. 59-75). The second spatial relationship 952 provides visual indication that the tool support 18 is in a pose relative to the hand-held portion 16 that does not provide the instrument 14 with the desired range of motion, and therefore, indicates that the operator must adjust the pose of the hand-held portion 16 such that the tool alignment projection(s) 916, 944 and the handle alignment projection(s) 906, 936 are aligned in the first spatial relationship 950 to afford the instrument 14 maximum adjustability. Notably, the addition of the second tool alignment member 942 and the second handle alignment member 934 functions to further aid with providing visual indication of the pose of the tool support 18 relative to the hand-held portion 16. Notably, to facilitate visual indication throughout the range of motion of the actuators 21, 22, 23, the tool alignment members 902, 942 and the handle alignment members 904, 934 are arranged and sized relative to each other such that the tool alignment members 902, 942 and the handle alignment members 904, 934 do not collide at any point between the first position and the second position of each of the plurality of actuators 21, 22, 23 of the actuator assembly 400.

There are various scenarios in which the handle alignment projection(s) 906, 936 may be misaligned from the tool plane BP and/or the tool alignment projection(s) 916, 944 in the second spatial relationship 952. For example, the tool support 18 may pitch relative to the hand-held portion 16 about the lateral axis 912 (shown in FIGS. 59-62), the tool support 18 may roll relative to the hand-held portion 16 about the longitudinal axis 910 (shown in FIGS. 63-66), and/or the tool support 18 may displace along a vertical axis 954 (i.e., elevate) relative to the hand-held portion 16 (shown in FIGS. 67-70). It should be appreciated that other misalignments resulting from movement of the tool support 18 relative to the hand-held portion 16 in other degrees of freedom are contemplated. It should be also appreciated that a combination of the misalignments mentioned above may occur simultaneously. For example, the tool support 18 may be pitched and rolled relative to the hand-held portion 16 simultaneously. When the handle alignment projection(s) 906, 936 are misaligned relative to the tool plane BP and/or the tool alignment projection(s) 916, 944, the resulting second spatial relationship 952 provides visual indication of the pose of the tool support 18 relative to the hand-held portion 16 even if the misalignment occurs in multiple degrees of freedom.

In some configurations, the first spatial relationship 950 may include a first pitch relationship 956 that provides visual indication that the tool support 18 is aligned in the pitch degree of freedom relative to the hand-held portion 16 about the lateral axis 912. However, as described above, the plurality of actuators 21, 22, 23 of the actuator assembly 400 may be configured to adjust at least a pitch of the tool support 18 relative to the hand-held portion 16 to maintain the tool 20 on the target plane TP. For example, FIGS. 59-62 illustrate the tool support 18 pitched by an amount relative to the hand-held portion 16 such that the plurality of actuators 21, 22, 23 no longer have maximum adjustability.

When the tool support 18 is pitched relative to the hand-held portion 16 such that the plurality of actuators 21, 22, 23 no longer have maximum adjustability, the handle alignment projection(s) 906, 936 may be misaligned with the tool plane BP and/or the tool alignment projection(s) 916, 944, respectively, in the second spatial arrangement 952. The second spatial arrangement 952 may include a second pitch relationship 958. The second pitch relationship 958 may provide visual indication of the magnitude and direction pitch of tool support 18 relative to the hand-held portion 16 about the lateral axis 912.

For example, as shown in FIGS. 59-62, the handle alignment projection(s) 906, 936 and the tool plane BP and/or the tool alignment projection(s) 916, 944 may be arranged in the second pitch relationship 958 when a first portion 960 of the handle alignment projection(s) 906, 936 are further from the tool plane BP and/or the tool alignment projection(s) 916, 944 than a second portion 962 of the handle alignment projection(s) 906, 936 in a direction of the pitch. Referring to FIGS. 59-62, for example, a distal portion 964 of the handle alignment projection(s) 906, 936 is further from the tool plane BP and/or the tool alignment projection(s) 916, 944 than a proximal portion 966 of the handle alignment member projection(s) 906, 936 along the longitudinal axis 910. For example, as shown in FIGS. 59-62, the handle alignment projection(s) 906, 936 are pitched below the tool alignment projection(s) 916, 944 such that a distal end of the handle alignment projections 906,936 are below a distal end of the tool alignment projection(s) 916, 944, providing visual indication to a user that the grip 72 should be pivoted to eliminate the pitch condition.

In other words, when the tool support 18 is pitched relative to the hand-held portion 16 such that the plurality of actuators 21, 22, 23 no longer have maximum adjustability, one end of the handle alignment projection(s) 906, 936 is further away from the tool plane BP and/or the tool alignment projection(s) 916, 944 than the other end along the longitudinal axis 910 in the direction of the pitch. Thus, the second pitch relationship 958 may provide visual indication that the tool support 18 does not have the desired range of motion relative to the hand-held portion 16 and that the operator must adjust the pose of the hand-held portion 16 so that the handle alignment projection(s) 906, 936 come into alignment with the tool plane BP and/or the tool alignment projection(s) 916, 944 in the first spatial relationship 950, affording the instrument 14 maximum adjustability.

In other configurations, the first spatial relationship 950 may include a first roll relationship 968 that provides visual indication that the tool support 18 is aligned in the roll degree of freedom relative to the hand-held portion 16. The plurality of actuators 21, 22, 23 may be configured to adjust at least a roll of the tool support 18 about the longitudinal axis 910 relative to the hand-held portion 16 to maintain the tool 20 on the target plane TP. For example, FIGS. 63-66 illustrate the tool support 18 rolled relative to the hand-held portion 16 by an amount such that the plurality of actuators 21, 22, 23 no longer have maximum adjustability. When the tool support 18 is rolled relative to the hand-held portion 16 such that the plurality of actuators 21, 22, 23 no longer have maximum adjustability, the handle alignment projection(s) 906, 936 may be misaligned with the tool plane BP and/or the tool alignment projection(s) 916, 944, respectively, in the second spatial arrangement 952. The second spatial arrangement 952 may include a second roll relationship 970. The second roll relationship 970 may provide visual indication of the magnitude and direction of the roll of the tool support 18 relative to the hand-held portion 16 about the longitudinal axis 910.

For example, as shown in FIGS. 63-66, the handle alignment projection(s) 906, 936 and the tool plane BP and/or the tool alignment projection(s) 916, 944 may be arranged in the second roll relationship 970 when a lateral portion 972 of the handle alignment projection(s) 906, 936 is further from the tool plane BP and/or the tool alignment projection(s) 916, 944 in than a medial portion 974 of the handle projection(s) 906, 936 in a direction of the roll. Notably, referring to FIG. 66, the second spatial relationship 952 of the first handle alignment projection 906 relative to the tool plane BP and/or the first tool alignment projection 916 combined with the second spatial relationship 952 the second handle alignment projection 936 relative to the tool plane BP and/or the second tool alignment projection 944 may provide further visual indication of the pose of the tool support 18 relative to the hand-held portion 16 than merely the second spatial relationship 952 of the first handle alignment projection 906 relative to the tool plane BP and/or the first tool alignment projection 916.

Particularly, the addition of the second tool alignment member 942 and the second handle alignment member 934 provides the operator with another visual indication that the tool support 18 does not have the optimal range of motion relative to the hand-held portion 16. In other words, referring to FIGS. 63-66, when the tool support 18 is rolled relative to the hand-held portion 16 such that the plurality of actuators 21, 22, 23 no longer have maximum adjustability, one side of the handle alignment projection(s) 906, 936 will be displaced further from the tool plane BP and/or the tool alignment projection(s) 916, 944 than the other side of the handle alignment projection(s) 906, 936 in the direction of the roll. For example, as shown in FIGS. 63-66, a lateral portion 972 of the first handle alignment projection 906 is below the first tool alignment projection 916, while a lateral portion 972 of the second handle alignment projection 916 is above the second tool alignment projection 944, indicating the hand-held portion 16 is rolled in a clockwise direction relative to the tool support 18. Thus, the operator is provided with feedback that the hand-held portion 16 should be adjusted in a clockwise direction to bring the instrument 14 back to a position with maximum adjustability. Thus, the second roll relationship 970 may provide visual indication that the tool support 18 does not have the desired range of motion relative to the hand-held portion 16 and that the operator must adjust the pose of the hand-held portion 16 so that the handle alignment projection(s) 906, 936 and the tool plane BP and/or the tool alignment projection(s) 916, 944 come into alignment in the first spatial relationship 950, affording the instrument 14 maximum adjustability.

In additional configurations, the first spatial relationship 950 may include a first elevation relationship 978 that provides visual indication that the tool support 18 is free of any vertical displacement (i.e., elevation) relative to the hand-held portion 16 about the vertical axis 954. The plurality of actuators 21, 22, 23 of the actuator assembly 400 may be configured to adjust at least an elevation of the tool support 18 relative to the hand-held portion 16 to maintain the tool 20 on the target plane TP. For example, FIGS. 67-70 illustrate the tool support 18 elevated by an amount relative to the hand-held portion 16 such that the plurality of actuators 21, 22, 23 no longer have maximum adjustability. When the tool support 18 is elevated relative to the hand-held portion 16 such that the plurality of actuators 21, 22, 23 no longer have maximum adjustability, the handle alignment projection(s) 906, 936 may be misaligned with the tool plane BP and/or the tool alignment projection(s) 916, 944, respectively, in the second spatial arrangement 952. The second spatial arrangement 952 may include a second elevation relationship 980. The second elevation relationship 980 may provide visual indication of the magnitude of elevation of the tool support 18 relative to the hand-held portion 16.

For example, as shown in FIGS. 67-70, the handle alignment projection(s) 906, 936 and the tool plane BP and/or the tool alignment projection(s) 916, 944 may be arranged in the second elevation relationship 980 when the handle alignment projection(s) 906, 936 are displaced below the tool plane BP and/or the tool alignment projection(s) 916, 944 in a direction of the elevation. In other words, when the tool support 18 is elevated relative to the hand-held portion 16 such that the plurality of actuators 21, 22, 23 no longer have maximum adjustability, the handle alignment projection(s) 906, 936 will be space above or below the tool plane BP and/or the tool alignment projection(s) 916, 944 along the vertical axis 954 in the direction of the elevation. Thus, the arrangement of the handle alignment projection(s) 906, 936 relative to the tool alignment projection(s) 916, 944 in the second elevation relationship 980 may provide visual indication that the tool support 18 does not have the optimal range of motion relative to the hand-held portion 16 and that the operator must adjust the pose of the hand-held portion 16 so that the handle alignment projection(s) 906, 936 come into alignment with the tool plane BP and/or the tool alignment projection(s) 916, 944 in the first spatial relationship 950, affording the instrument 14 maximum adjustability. For example, the tool alignment projections 916,944 are shown in FIGS. 67-70 above the handle alignment projections 906,936 on either side on the instrument 14, providing visual indication to a user that the hand-held portion 16 needs to be moved upwards to align the hand-held portion 16 with tool support 18 to place the instrument 14 into a position with maximum adjustability.

It should be appreciated in view of the description above that the guidance array 900 provides numerous benefits to the operation of the instrument 14. For example, the handle alignment projection(s) 906, 936 (and the handle alignment edge(s) 914, 940 defined thereby) may be arranged at an oblique angle relative to a longitudinal axis 910 and a lateral axis 912 defined by the tool 20/tool support 18. The arrangement of the portions 908, 938 of the handle alignment projection(s) 906, 936 at an oblique angle relative to the longitudinal axis 910 and the lateral axis 912 provides the advantage of enabling an operator to perceive the alignment of the handle alignment projection(s) 906, 936 relative to the tool plane BP and/or the tool alignment projection(s) 916, 944 in multiple degrees of freedom simultaneously.

For example, as illustrated in FIGS. 71-75, in some configurations, the actuator assembly 400 is configured to simultaneously adjust at least the pitch and the roll of the tool support 18 relative to the hand-held portion 16. For example, referring to FIGS. 71-75, where the tool support 18 is simultaneously displaced in both the pitch and the roll degrees of freedom, the arrangement of the oblique portion(s) 908, 938 of the handle alignment projection(s) 906, 936 relative to the tool plane BP and/or the tool alignment projection(s) 916, 944 provides visual indication of the pose of the hand-held portion 16 relative to the tool support in at least two degrees of freedom. Particularly, that the second spatial arrangement 952 of the handle alignment projection(s)) 906, 936 relative to the tool plane BP and/or the tool alignment projection(s) 916, 944, respectively, provides visual indication of at least the second pitch relationship 958 and the second roll relationship 970 of the tool support BP relative to the hand-held portion 16, providing visual indication that the hand-held portion 16 is in a pose relative to the tool support 18 that does not provide the tool support 18 with the optimal range of motion. Therefore, the operator is alerted that the operator must adjust the pose of the hand-held portion 16 so that the handle alignment projection(s) 906, 936 and the tool plane BP and/or the tool alignment projection(s) 916, 944 come into alignment in the first spatial relationship 944, affording the instrument 14 maximum adjustability.

As an example of this feedback in multiple degrees of freedom, FIGS. 71-75 show one end of the handle alignment projection(s) 906, 936 is further away from the tool plane BP and/or the tool alignment projection(s) 916, 944 than the other end along the longitudinal axis 910 in the direction of the pitch, and one side of the handle alignment projection(s) 906, 936 displaced further from the tool plane BP and/or the tool alignment projection(s) 916, 944 than the other side of the handle alignment projection(s) 906, 936 in the direction of the roll. Thus, the oblique arrangement of the handle alignment projection(s) 906, 936 (and in some configurations, the tool alignment projection(s) 916, 944) promotes visual indication of the pose of the tool support 18 relative to the hand-held portion 16 by providing a first visual reference toward a lateral portion 972 of the handle alignment projection(s) 906, 936 that provides visual indication in the roll degree of freedom, and a second visual reference toward a first portion 960 of the handle alignment projection(s) 906, 936 that provides visual indication in the pitch degree of freedom. Therefore, cumulatively, the oblique portions 908, 938 handle alignment projection(s) 906, 936 provide increased functionality for visual indication as compared to orthogonal arrangements of the handle alignment projection(s).

Additionally, as shown in FIGS. 76-77, the tool alignment member 902 and/or the handle alignment member 904 may include one or more visual indicia for facilitating a user's visual perception of the alignment of the handle alignment projection(s) 906, 936 relative to the tool alignment projection(s) 916, 944, For example, the handle alignment projection(s) 906, 936 and/or the tool alignment projection(s) 916, 944 may each include at least one of a first visual indicia 986 and a second visual indicia 988, the first visual indicia 986 being visually distinguishable from the second visual indicia 988. The first visual indicia 986 and/or the second visual indicia 988 may be arranged on the handle alignment projection(s) 906,936 and/or the tool alignment projection(s) 916, 944, for example, on a bevel surface 990 and/or on a side surface 992 of the handle alignment projection(s) 906, 936 and/or the tool alignment projection(s) 916, 944. However, any suitable surface of the handle alignment projection(s) 906, 936 and/or the tool alignment projection(s) 916, 944 is contemplated to facilitate an operator's visual perception of the alignment of the handle alignment projection(s) 906, 936 relative to the tool alignment projection(s) 916, 944. Thus, the first visual indica 986 and/or second visual indicia 988 provide an operator with an easily identifiable visual indication of the alignment of the tool alignment projection 916 relative to the handle alignment projection 906. In some versions, the visual indicia comprise one or more distinct visual cues (e.g., pattern, light, color, combinations thereof, and the like.). For example, referring to FIGS. 76-77, the visual indicia may include the colored markings.

In the version shown in FIGS. 76-77, for example, the visual indicia may be arranged such that the first visual indicia 986 of the handle alignment projection 906 and the first visual indicia 986 of the tool alignment projection 916 are aligned when the tool alignment projection 916 and the handle alignment projection 906 are aligned, providing visual indication that the tool support 18 has the optimal range of motion relative to the hand-held portion 16. Conversely, the first visual indicia 986 of the handle alignment projection 906 and the first visual indicia 986 of the tool alignment projection may be configured to be misaligned when the tool alignment projection 916 and the handle alignment projection 906 are misaligned, providing visual indication that the hand-held portion 16 is in a pose that does not provide the tool support 18 with the optimal range of motion.

FIGS. 78-85 show yet another configuration of a guidance array 1000 for use with a hand-held surgical robotic system 10. Similar to the configurations described above, the guidance array 1000 provides an operator with visual indication of the pose of the tool support 18 relative to the hand-held portion 16 during operation of the instrument 14, providing visual indication to the operator of required changes in pitch orientation, roll orientation, and z-axis translation of the hand-held portion 16 to achieve the desired pose of the tool 20 while affording the actuator assembly 400 (discussed above) with maximum adjustability to maintain the tool 20 on the target plane TP. The guidance array 1000 includes a handle alignment member 1004 extending from the hand-held portion 16 for providing visual indication to an operator to guide the operator as to how to move the hand-held portion 16 to provide the instrument 14 with sufficient adjustability by keeping the actuators 21, 22, 23 of the actuator assembly 400 near their home positions or other predetermined positions.

Referring to FIGS. 80-83, for example, the handle alignment member 1004 includes a handle support arm 1106. The handle support arm 1106 extends between a first handle support arm end 1108 and a second handle support arm end 1110. The handle support arm 1106 includes a handle coupling portion 1112 coupled to the first handle support arm end 1108 (best shown in FIGS. 81 and 82). The handle coupling portion is configured to couple the handle alignment member 1004 to the hand-held portion 16 of the instrument 14. For example, in some configurations, the handle coupling portion 1112 includes a handle coupling member 1114 configured to couple to a corresponding coupling member 1116 disposed on the hand-held portion 16.

Referring to FIGS. 80-82, in some configurations, the handle coupling portion 1112 of the handle alignment member 1004 is magnetically coupled to the hand-held portion 16 of the instrument 14. Accordingly, the handle alignment member 1004 can be quickly magnetically attached and detached from the hand-held portion 16. To facilitate this magnetic connection, one of the handle coupling member 1114 and the coupling member disposed on the hand-held portion 16 may include one or more magnets 1118, while the other of the handle coupling member 1114 and the coupling member disposed on the hand-held portion 16 may include one or more magnets 1118 and/or a ferromagnetic material 1120 such that the handle coupling member 1114 and the coupling member disposed on the hand-held portion 16 are configured to magnetically couple to each other to couple the handle alignment member 1004 to the hand-held portion 16.

Referring to FIGS. 81 and 83, the handle alignment member 1004 further includes a handle alignment member mount 1122 coupled to the second handle support arm end 1110. Additionally, in the configuration shown in FIGS. 81 and 83, the handle alignment member 1004 also further includes a handle alignment indication member 1124 coupled to the handle alignment member mount 1122. The handle alignment indication member 1124 may be any suitable shape or configuration which would provide an operator user with visual indication that one or more of the actuators 21, 22, 23 of the actuator assembly 400 has moved from their respective home positions. For example, in one configuration, similar to other configurations described above, the handle alignment member 1004 may define a hook-shaped projection. Also similar to as described above, least a portion of the handle alignment indication member 1124 and the tool plane BP may be aligned when the actuators 21, 22, 23 of the actuator assembly 400 are in their respective home positions, providing an operator with visual indication that the tool support 18 has an optimal range of motion relative to the hand-held portion 16. Conversely, the tool plane BP and the handle alignment indication member 1124 are configured to be misaligned when the hand-held portion 16 is in a pose that does not provide the optimal range of motion, providing visual indication that the hand-held portion 16 is in a pose that does not provide the tool support 18 with the optimal range of motion, and thus needs to be adjusted by the operator.

Still referring to FIGS. 81 and 83, the handle alignment indication member 1124 may be removably coupled to the handle alignment member mount 1122 using one or more fasteners 1128. Additionally, the handle alignment indication member 1124 may be comprised of a material suitable for autoclave sterilization. Suitable materials include, but are not limited to, stainless steel and autoclavable polymers, such as polyphenylsulfone. Examples of methods of producing the handle alignment indication member 1124 include: forming the handle alignment indication member 1124 by stamping a sheet of stainless steel, machining the handle alignment indication member 1124 from a block of an autoclavable polymer, such as polyphenylsulfone, and molding the handle alignment indication member 1124 from an autoclavable polymer, such as polyphenylsulfone.

In some configurations, referring to FIGS. 78-86, the guidance array 1000 may also include a tool alignment member 1126. In one configuration, for example, the tool alignment member 1126 may extend from the tool support 18. Similar to as described above for other configurations, the handle alignment member 1004 and the tool alignment member 1126 are aligned when the tool support 18 has an optimal range of motion relative to the hand-held portion 16. Also, similar to the handle alignment member 1004 described above, the tool alignment member 1126 may include a tool support arm 1130 extending between a first tool support arm end 1132 and a second tool support arm end 1134. The tool support arm 1130 includes a tool coupling portion 1136 coupled to the first tool support arm end 1132 (best shown in FIG. 81). The tool coupling portion 1136 is configured to couple the tool alignment member 1026 to the tool support 18 of the instrument 14. For example, in some configurations, the tool coupling portion 1136 includes a tool coupling member (not shown) configured to couple to a corresponding coupling member 1138 disposed on the tool support 18. Also similar to as described above, the tool alignment member 1126 may be magnetically coupled to the tool support 18.

The tool alignment member 1126 also includes a tool alignment member mount 1140 coupled to the second support arm end 1134. The tool alignment member 1126 further includes a tool alignment indication member 1142. The tool alignment indication member 1142 may be coupled to the tool alignment member mount 1140 using, for example, fasteners. The tool alignment indication member 1142 may be comprised of like materials and produced through like methods as the handle alignment indication member 1124. In some configurations, the handle alignment indication member 1124 and the tool alignment indication member 1142 may have identical shape and size to improve manufacturing efficiency and costs.

Additionally, referring to FIGS. 80 and 85, the handle alignment indication member 1124 and/or the tool alignment indication member 1142 may include laser markings 1144 to facilitate visual indication of the pose of the handle alignment indication member 1124 relative to the tool alignment indication member 1142 and/or the tool plane BP. Accordingly, when the tool support 18 does not have optimal range of motion relative to the hand-held portion 16, the laser markings 1144 enhance the visual indication provided to the operator that adjusting the pose of the hand-held portion is needed. Although the laser marking may be form using lasers, other methods of forming markings on the handle alignment indication member 1124 and/or the tool alignment indication member 1142 are contemplated such as, but not limited to, printing, scoring, etching etc. In another configuration, referring to FIG. 85, the polymer used to form the handle alignment indication member 1124 and/or the tool alignment indication member 1142 may be dyed to provide a contrasting color to the surrounding components to enhance the visual indication provided to the operator.

As briefly described above, the instrument 14 may include a tracker that enables the pose of the instrument 14 to be tracked by a surgical navigation system. For example, referring to FIGS. 78-86, the instrument 14 may include a tracker 1150 coupled to the blade support 18 or other tool support. Accordingly, the tracker 1150 enables the robotic surgical system 10 to determine a current location of where the tool plane BP is in space or axis of a tool is in space. The tracker 1150 includes a tracker frame 1152. The tracker frame 1152 includes at least two faces 1156. The at least two faces 1156 are non-planar with one another. For example, FIG. 78 shows the at least two faces arranged in a wedge shape relative to each other. The tracker 1150 also includes and at least six optical markers 1154 coupled to the tracker frame. At least three of the six optical markers 1154 are attached to each of the at least two faces 1156. In some configurations, the plurality of markers 1154 are coupled on the at least two faces 1156 are arranged as mirrors of each other, while in other configurations, the plurality of markers 1154 are arranged asymmetrically. In other configurations, the at least two faces 1156 may be on opposite sides of a plane that bisects the instrument 14.

Additionally, the tracker frame 1152 may define an instrument engaging aperture 1170 for receiving a proximal portion of the instrument 14. Accordingly, the instrument 14 may include a mount 1172 for engaging and retaining the tracker frame 1152 relative to the instrument 14. For example, the tracker frame 1152 may partially surround the mount 1172 when the tracker 1150 is coupled to the instrument 14. In some examples, the mount 1172 may be a slot. The tracker 1150 may further include a battery 1174 for powering the tracker 1150. For example, in some configurations, the optical markers 1154 may be active markers that have a light source that emits light, such as an infrared LED. The battery may also power an antenna, 1162, described in further detail below. For example, one or more of the at least six optical markers 1154 may be LED emitters, the one or more LED emitters are arranged to form at least two arrays, with each array including at least one LED emitter.

As also previously described above, the robotic surgical system 10 includes a control system 60. Referring to FIG. 86, the control system 60 includes, among other components, the navigation system 32 and the instrument controller 28. The control system 60 is configured to control the actuators 21, 22, 23 to align the tool plane BP of the instrument 14 with at least one target plane 184. With continued reference to FIG. 86, the tracker 1150 includes an input device 1160, an antenna 1162, and a tracker controller 1164. The tracker controller 1164 is coupled to the input device 1160 and the antenna 1162 to provide an input signal to the navigation system 32. Accordingly, the control system 60 may be configured to detect an input signal from the input device 1160 and change a position change of the tool support 18 by the actuators 21, 22, 23 to align the tool support 18 with a different one of the plurality of target planes 184. Additionally, the navigation system 32 may be configured to determine the tool plane BP of the saw blade 20 based on a target face, the target face being based on the target plane 184 selected. Alternatively, the control system 60 may be configured to detect an input signal from the input device and to align the tool support with a different one of the plurality of axes (as opposed to planes), and/or the navigation system may be configured to determine the pose of the tool support based on a target face, the target face being based on the target axes selected.

In another aspect, the robotic surgical system 10 may be configured to determine the current tool plane BP using the tool tracker 1150 and the navigation system 32; Accordingly, the robotic surgical system 10 may select with the input device 1160 one of the plurality of target planes 184 and adjust the tool support 18 with the plurality of actuators 21, 22, 23 to place the current plane BP in line with the selected target plane 184.

Additional clauses of the present invention are included below:

I. A hand-held surgical robotic system for supporting a saw blade, the hand-held surgical robotic system comprising:
   a hand-held portion;
   a blade support movably coupled to the hand-held portion, the blade support configured to support a saw blade;
   an actuator assembly operatively attached to the blade support and the hand-held portion, the actuator assembly configured to move the blade support relative to the hand-held portion in a plurality of degrees of freedom;
   a tool alignment member coupled to and extending from the blade support; and
   a handle alignment member coupled to and extending from the hand-held portion;
      wherein at least a portion of the tool alignment member and at least a portion of the handle alignment member are aligned when the blade support has a desired range of motion relative to the hand-held portion.

II. The hand-held robotic system of clause I, wherein the actuator assembly includes a plurality of actuators and each of the plurality of actuators are configured to move between a first position and a second position to move the blade support relative to the hand-held portion, wherein a home position is a midpoint between the first position and the second position of each of the plurality of actuators, and the blade support has the desired range of motion when at least two of the plurality of actuators are at their home position.

III. The hand-held robotic system of clause II, wherein the tool alignment member and the handle alignment member are misaligned when the hand-held portion is in a pose that does not provide the desired range of motion, providing visual indication that the hand-held portion is in a pose that does not provide the blade support with the desired range of motion.

IV. The hand-held robotic system of any one of clauses I-III, wherein the tool alignment member and the handle alignment member are arranged and sized relative to each other such that the tool alignment member and the handle alignment member do not collide at any point between a first position and a second position of each of the plurality of actuators, with the collective first and second positions of each of the plurality of actuators defining a potential range of motion of the blade support relative to the hand-held portion, the potential range of motion defining a space having a height of a height of about 150 mm and a width of about 115 mm.

V. The hand-held robotic system of any one of clauses I-IV, wherein the tool alignment member is arranged on the blade support and the handle alignment member is arranged on the hand-held portion such that a portion of the tool alignment member and a portion of the handle alignment member are positioned above a grip of the hand-held portion and are visible from a proximal end of the blade support as the plurality of actuators move the blade support relative to the hand-held portion.

VI. The hand-held robotic system of any one of clauses I-V, wherein the plurality of actuators are configured to adjust at least a pitch of the blade support relative to the hand-held portion, and wherein a first spatial arrangement of the tool alignment member relative to the handle alignment member provides visual indication of a first pitch relationship of the blade support relative to the hand-held portion and a second spatial arrangement of the tool alignment member relative to the handle alignment member provides a second pitch relationship of the blade support relative to the hand-held portion;
wherein the first spatial arrangement provides visual indication that the tool alignment member and the handle alignment member are aligned and the blade support has the desired range of motion relative to the hand-held portion, and the second spatial arrangement of the tool alignment member relative to the handle alignment member provides visual indication of the pitch of the blade support relative to the hand-held portion, a distal portion of the tool alignment member is further from a tool plane than a proximal portion of the tool alignment member along a longitudinal axis in a direction of the pitch.

VII. The hand-held robotic system of any one of clauses I-VI, wherein the plurality of actuators are configured to adjust at least an elevation of the blade support relative to the hand-held portion, and wherein a first spatial arrangement of the tool alignment member relative to the handle alignment member provides visual indication of a first elevation relationship of the blade support relative to the hand-held portion and a second spatial arrangement of the tool alignment member relative to the handle alignment member provides a second elevation relationship of the blade support relative to the hand-held portion;
wherein the first spatial arrangement provides visual indication that the tool alignment member and the handle alignment member are aligned and the blade support has the desired range of motion relative to the hand-held portion, and the second spatial arrangement provides visual indication of the elevation of the blade support relative to the hand-held portion, the tool alignment member is at least partially above or below the handle alignment member in a direction of the elevation.

VIII. The hand-held robotic system of any one of clauses I-VII, wherein the plurality of actuators are configured to adjust at least a roll of the blade support relative to the hand-held portion, and wherein a first spatial arrangement of the tool alignment member relative to the handle alignment member provides visual indication of a first roll relationship of the blade support relative to the hand-held portion and a second spatial arrangement of the tool alignment member relative to the handle alignment member provides a second roll relationship of the blade support relative to the hand-held portion;
wherein the spatial arrangement provides visual indication that the tool alignment member and the handle alignment member are aligned and the blade support has the desired range of motion relative to the hand-held portion, and the second spatial arrangement provides visual indication of the roll of the blade support relative to the hand-held portion, a distal portion of the tool alignment member is further from a tool plane than a proximal portion of the tool alignment member along a lateral axis in a direction of the roll.

IX. The hand-held robotic system of any one of clauses I-VIII, wherein:
the tool alignment member includes a first tool alignment member and a second tool alignment member, wherein the first tool alignment member and second tool alignment member extend from opposite sides of the blade support;
the handle alignment member includes a first handle alignment member and a second handle alignment member, wherein the first handle alignment member and the second handle alignment member extend from the hand-held portion;
wherein the first tool alignment member and the first handle alignment member, and the second tool alignment member and the second handle alignment member intersect each other, respectively, when the blade support has the desired range of motion relative to the hand-held portion; and
wherein the first and second tool alignment members and the first and second handle alignment members are visible from a proximal end for the blade support throughout an entire range of motion of the blade support relative to the hand-held portion.

X. The hand-held robotic system of clauses IX, wherein the plurality of actuators are configured to adjust at least a pitch of the blade support relative to the hand-held portion, and wherein a first spatial arrangement of the tool alignment members relative to the handle alignment members provides visual indication of a first pitch relationship of the blade support relative to the hand-held portion and a second spatial arrangement of the tool alignment members relative to the handle alignment members provides a second pitch relationship of the blade support relative to the hand-held portion;
wherein the first spatial arrangement provides visual indication that the tool alignment members and the handle alignment members are aligned and the blade support has the desired range of motion relative to the hand-held portion, and the second spatial arrangement of the tool alignment members relative to the handle alignment members provides visual indication of the pitch of the blade support relative to the hand-held portion, a distal portion of at least one of the tool alignment members is further from a tool plane than a proximal portion of the tool alignment members along a longitudinal axis in a direction of the pitch.

XI. The hand-held robotic system of any one of clauses IX and X, wherein the plurality of actuators are configured to adjust at least an elevation of the blade support relative to the hand-held portion, and wherein a first spatial arrangement of the tool alignment members relative to the handle alignment members provides visual indication of a first elevation relationship of the blade support relative to the hand-held portion and a second spatial arrangement of the tool alignment members relative to the handle alignment members provides a second elevation relationship of the blade support relative to the hand-held portion;

wherein the first spatial arrangement provides visual indication that the tool alignment members and the handle alignment members are aligned and the blade support has the desired range of motion relative to the hand-held portion, and the second spatial arrangement provides visual indication of the elevation of the blade support relative to the hand-held portion, the tool alignment members are at least partially above or below the handle alignment members in a direction of the elevation.

XII. The hand-held robotic system of any one of clauses IX-XI, wherein the plurality of actuators are configured to adjust at least a roll of the blade support relative to the hand-held portion, and wherein a first spatial arrangement of the tool alignment members relative to the handle alignment members provides visual indication of a first roll relationship of the blade support relative to the hand-held portion and a second spatial arrangement of the tool alignment members relative to the handle alignment members provides a second roll relationship of the blade support relative to the hand-held portion;

wherein the spatial arrangement provides visual indication that the tool alignment members and the handle alignment members are aligned and the blade support has the desired range of motion relative to the hand-held portion, and the second spatial arrangement provides visual indication of the roll of the blade support relative to the hand-held portion, a distal portion of at least one of the tool alignment members is further from a tool plane than a proximal portion of the tool alignment members along a lateral axis in a direction of the roll.

XIII. The hand-held robotic system of any one of clauses IX-XII, wherein the first tool alignment member and the second tool alignment member are aligned with the first handle alignment member and the second handle alignment member, respectively, when the blade support has the desired range of motion relative to the hand-held portion.

XIV. The hand-held robotic system of clause III, the tool alignment member and the handle alignment member provides a first visual indicia and a second visual indicia, the first visual indicia being visually distinguishable from the second visual indicia, and wherein the first visual indicia is visible firm a proximal end of the hand-held portion when the tool alignment member and the handle alignment member are misaligned and the second visual indicia is visible from the proximal end of the hand-held portion when the tool alignment member and the handle alignment member are aligned.

XV. The hand-held robotic system of clause XIV, wherein the tool alignment member and the handle alignment member each have the first visual indicia and the second visual indicia.

XVI. The hand-held robotic system of clause XV, wherein the first visual indicia is a first color, and the second visual indicia is a second color, wherein the first color is visible when the tool alignment member and the handle alignment member are aligned, and at least one of the second visual indicia is visible when the tool alignment member and the handle alignment member are misaligned.

XVII. The hand-held robotic system of clause XVI, wherein the tool alignment member and the handle alignment member further comprise a top surface and a side surface; and wherein the top surface includes the first visual indicia and the side surface includes the second visual indicia, such that when the tool alignment member and the handle alignment member are misaligned to each other, the second visual indicia is revealed, providing an indication that one or more of the plurality of actuators have moved from their home position.

XVIII. The hand-held robotic system of any one of clauses I-XVII, wherein the tool alignment member is a saw blade.

XIX. The hand-held robotic system of any one of clauses I-XVIII, further comprising a tracker for a surgical navigation system, the tracker being removably coupled to the blade support, wherein the tracker comprises a tracking element for localizing and the tool alignment member, and wherein the tracker is a part of the tool alignment member.

XX. A hand-held robotic system for supporting a saw blade, the hand-held robotic system comprising:
a hand-held portion;
a blade support movably coupled to the hand-held portion to support the saw blade;
an actuator assembly operatively attached to the blade support and the hand-held portion, the actuator assembly configured to move the blade support relative to the hand-held portion in a plurality of degrees of freedom;
a first tool alignment member and a second tool alignment member coupled to and extending on both sides from the blade support; and
a first handle alignment member and a second handle alignment member coupled to and extending from the hand-held portion;
wherein the first tool alignment member and the second tool alignment member are aligned with the first handle alignment member and the second handle alignment member, respectively, when the blade support has a desired range of motion relative to the hand-held portion.

XXI. The hand-held robotic system of clause XX, wherein the actuator assembly includes a plurality of actuators and each of the plurality of actuators are configured to move between a first position and a second position, moving the blade support relative to the hand-held portion in a range of motion; and
  wherein a home position is a midpoint between the first position and the second position of each of the plurality of actuators, and the blade support and hand-held portion has the desired range of motion when each of the plurality of actuators are at their home position.

XXII. The hand-held robotic system of clause XXI, wherein the first tool alignment member and the second tool alignment member are misaligned with the first and the second handle alignment members, respectively when the blade support and hand-held portion are moved to a position other than the home position, providing visual indication that the blade support and hand-held portion are in a position without the desired range of motion.

XXIII. The hand-held robotic system of clause XXII, wherein the tool alignment members and the handle alignment members further comprise a top surface and a side surface; and
  wherein the top surface includes a first visual indicia and the side surface includes a second visual indicia, the first visual indicia is different than the second visual indicia, such that when the tool alignment member and the handle alignment member are misaligned to each other, the second visual indicia is revealed on one of the tool alignment members, the handle alignment members, or both, providing an indication that one or more of the plurality of actuators have moved from their home position.

XXIV. The hand-held robotic system of clause XXIII, wherein the plurality of actuators are configured to adjust at least a pitch of the blade support relative to the hand-held portion, and wherein a first spatial arrangement of the tool alignment members relative to the handle alignment members provides visual indication of a first pitch relationship of the blade support relative to the hand-held portion and a second spatial arrangement of the tool alignment members relative to the handle alignment members provides a second pitch relationship of the blade support relative to the hand-held portion;
  wherein the first spatial arrangement provides visual indication that the tool alignment members and the handle alignment members are aligned and the blade support has the desired range of motion relative to the hand-held portion, and the second spatial arrangement of the tool alignment members relative to the handle alignment members provides visual indication of the pitch of the blade support relative to the hand-held portion, a distal portion of at least one of the tool alignment members is further from a tool plane than a proximal portion of the tool alignment members along a longitudinal axis in a direction of the pitch.

XXV. The hand-held robotic system of any one of clauses XXII and XXIV, wherein the plurality of actuators are configured to adjust at least an elevation of the blade support relative to the hand-held portion, and wherein a first spatial arrangement of the tool alignment members relative to the handle alignment members provides visual indication of a first elevation relationship of the blade support relative to the hand-held portion and a second spatial arrangement of the tool alignment members relative to the handle alignment members provides a second elevation relationship of the blade support relative to the hand-held portion;
  wherein the first spatial arrangement provides visual indication that the tool alignment members and the handle alignment members are aligned and the blade support has the desired range of motion relative to the hand-held portion, and the second spatial arrangement provides visual indication of the elevation of the blade support relative to the hand-held portion, the tool alignment members are at least partially above or below the handle alignment members in a direction of the elevation.

XXVI. The hand-held robotic system of any one of clauses XXIII-XXV, wherein the plurality of actuators are configured to adjust at least a roll of the blade support relative to the hand-held portion, and wherein a first spatial arrangement of the tool alignment members relative to the handle alignment members provides visual indication of a first roll relationship of the blade support relative to the hand-held portion and a second spatial arrangement of the tool alignment members relative to the handle alignment members provides a second roll relationship of the blade support relative to the hand-held portion;
  wherein the spatial arrangement provides visual indication that the tool alignment members and the handle alignment members are aligned and the blade support has the desired range of motion relative to the hand-held portion, and the second spatial arrangement provides visual indication of the roll of the blade support relative to the hand-held portion, a distal portion of at least one of the tool alignment members is further from a tool plane than a proximal portion of the tool alignment members along a lateral axis in a direction of the roll.

XXVII. A visual indication system for use with a hand-held robotic system, the hand-held robotic system including a tool, a hand-held portion, a blade support movably coupled to the hand-held portion to support the tool, and a plurality of actuators operatively interconnecting the blade support and the hand-held portion and configured to move the blade support relative to the hand-held portion in a plurality of degrees of freedom, the visual indication system comprising:
  a shroud coupled to and extending between the blade support and the hand-held portion such that the shroud surrounds at least one of the plurality of actuators;
  wherein the shroud defines at least two shroud landmarks configured to displace relative to each other when the blade support and the hand-held portion are misaligned to each other to provide visual indication of a pose of the blade support relative to the hand-held portion.

XXVII. The visual indication system of clause XXVII, wherein the at least two shroud landmarks include at least two creases, wherein the creases define planes that are substantially parallel in a first position, the planes being offset from one another by a first distance when the blade support and the hand-held portion, and wherein the at least two defined planes intersect when the blade support and hand-held portion are moved to a second position.

XXIX. The visual indication system of clause XXVIII, wherein the blade support defines a blade plane, and wherein the at least two creases are substantially parallel to the blade plane when the blade support and the hand-held portion are in the first position.

XXX. The visual indication system of clause XXIX, wherein the at least two shroud landmarks include a first visual indicia and a second visual indicia, the first visual indicia being visually distinguishable from the second visual indicia, and wherein the first visual indicia is a first color and a second visual indicia is a second color, and wherein the first color is visible when the blade support is in the first position, and at least one of the second visual indicia is visible when the blade support is in the second position.

XXXI. A hand-held robotic system for supporting a saw blade, the hand-held robotic system comprising:
a hand-held portion;
a blade support movably coupled to the hand-held portion to support the saw blade;
a plurality of actuators operatively interconnecting the blade support and the hand-held portion and configured to move the blade support relative to the hand-held portion in a plurality of degrees of freedom;
a light source on the blade support;
a first tool alignment member and a second tool alignment member coupled to and extending on both sides from the blade support; and
a first handle alignment member and a second handle alignment member coupled to and extending from the hand-held portion;
wherein the first tool alignment member and the second tool alignment member are aligned with the first handle alignment member and the second handle alignment member, respectively, when the blade support has a desired range of motion relative to the hand-held portion; and
wherein the light source is illuminated when the blade support has the desired range of motion to indicate that the blade support and the hand-held portion are within a designated range of alignment with a cutting plane.

XXXII. A hand-held surgical robotic system for supporting a saw blade, the hand-held surgical robotic system comprising:
a hand-held portion;
a blade support movably coupled to the hand-held portion, the blade support configured to support a saw blade;
a plurality of actuators operatively interconnecting the blade support and the hand-held portion, the plurality of actuators configured to move the blade support relative to the hand-held portion in a plurality of degrees of freedom;
a tool alignment member coupled to and extending from the blade support; and
a handle alignment member coupled to and extending from the hand-held portion;
wherein the handle alignment member is removably connected with the hand-held portion.

XXXII. The hand-held surgical robotic system of clause XXXII, wherein the handle alignment member is magnetically connected to the hand-held portion such that the handle alignment member is removably connected to the hand-held portion.

XXXIV. Surgical system for treating an anatomical structure according to a plurality of target planes, comprising:
an instrument comprising:
a saw blade;
a hand-held portion;
an actuator system comprising a plurality of actuators;
a blade support to support the saw and move the saw, the plurality of actuators extending between the blade support and a hand-held portion, the blade support comprising a saw drive motor coupled to a saw mount;
a navigation system;
a tracker for being coupled to the blade support, the tracker being configured to determine a current tool plane, the tracker including
a tracker frame
at least six optical markers coupled to the tracker frame, the tracker frame including at least two faces, the at least two faces being non-planar with one another, with at least three of the at least three six optical markers being coupled to each of the at least two faces; and
a control system in communication with the navigation system and the tracker, the control system configured to control the actuator system to align the current tool plane with at least one of a plurality of target planes.

XXXV. The surgical system of clause XXXIV further comprising:
an input device;
an antenna; and
a controller coupled to the input device and the antenna, the controller configured to
provide an input signal to the navigation system.

XXXVI. The surgical system of clause XXXV, wherein the control system is further configured to
(a) detect an input signal from the input device of the tracking unit;
(b) change a position change of the blade support by the actuator system to align the tool support with a different one of the plurality of target planes;
wherein the navigation system is configured to determine the tool plane of the saw blade based on a target face, the target face being based on the target plane selected.

XXXVII. The surgical system of any one of clauses XXXIV-XXXVI, wherein the plurality of optical markers is at least six optical markers, at least three optical markers of the at least six optical markers are coupled to each of the at least two faces.

XXXVIII. The surgical system of any one of clauses XXXIV-XXXVII, wherein the plurality of trackers coupled on the at least two faces are arranged as mirrors of each other.

XXXIX. The surgical system of any one of clauses XXXIV-XXXVIII, wherein the plurality of trackers coupled on the at least two faces are arranged asymmetrically.

XL. A surgical method of controlling a surgical system comprising a hand-held robotic instrument a saw blade; a hand-held portion; an actuator system comprising a plurality of actuators; a blade support to support the saw and move the saw, the plurality of actuators extending between the blade support and a hand-held portion, the blade support comprising a saw drive motor coupled to a saw mount; a navigation system; a tool tracker for being coupled to the blade support, the tool tracker being configured to determine a current tool plane; and a control system in communication with the navigation system and the tracker, the control system configured to control the actuator system to align the current tool plane with at least one of a plurality of target planes, each of the plurality of target planes corresponding to a cut plane; the method comprising:
  determining the current tool plane with the tool tracker and the navigation system;
  selecting with an input device on the tracker one of the plurality of target planes;
  adjusting the tool support with the plurality of actuators to place the current plane in line with the selected target plane; and
  selecting with the input device a different one of the plurality of target planes.

XLI. A surgical instrument tracker for tracking a surgical saw or other tool, the tracker comprising:
  a tracker frame defining an instrument engaging aperture for receiving a proximal portion of the saw, the tracker frame including a mount;
  at least six optical markers coupled to the tracker frame, the tracker frame including at least two faces, the at least two faces being non-planar with one another, with at least three of the at least three six optical markers being coupled to each of the at least two faces;
  wherein the tracker frame at least partially surrounds an accessory mount when the mount of the tracker is coupled to the accessory mount.

XLII. The instrument tracker of clause XLI, wherein the mount is a slot.

XLII. The instrument tracker of any one of XLI and XLII, wherein the at least two faces are on opposite sides of a plane that bisects the surgical saw or tool.

XLIV. The instrument tracker of any one of XLI-XLIII, wherein the tracker frame further includes an input device operatively coupled with a control system.

XLV. The instrument tracker of clause XLIV, further comprising a battery configured to power one or more of the at least six optical markers, the input device, or both, the battery is removably coupled with the tracker frame.

XLVI. The instrument tracker of clause XLV, further comprising an antenna operatively coupled with battery, and configured to send and receive information with the control system.

XLVII. The instrument tracker of clause XLVI, wherein the instrument tracker further includes a controller coupled to at least one of the at least six optical markers, the battery, and the antenna.

XLVII. The instrument tracker of any one of clauses XLV-XLVII, wherein one or more of the at least six optical markers are LED emitters, the one or more LED emitters are arranged to form at least two arrays, each array comprising at least one LED emitter.

XLIX. A mechanical alignment apparatus configured to be used with a hand-held surgical robotic system for providing visual indication of a pose of a hand-held portion of the hand-held surgical robotic system relative to a tool support of the hand-held surgical robotic system, the mechanical alignment apparatus comprising:
  a support arm extending between a first support arm end and a second support arm end, the support arm including a coupling portion coupled to the first support arm end and configured to be removably coupled to one of the hand-held portion and the tool support of the hand-held surgical robotic system; and
  an alignment member mount coupled to the second support arm end; and
  an alignment indication member coupled to the alignment member mount.

Several embodiments have been described in the foregoing description. However, the embodiments discussed herein are not intended to be exhaustive or limit the invention to any particular form. The terminology, which has been used, is intended to be in the nature of words of description rather than of limitation. Many modifications and variations are possible in light of the above teachings and the invention may be practiced otherwise than as specifically described.

The invention claimed is:

1. A hand-held surgical robotic system, the hand-held surgical robotic system comprising:
  a hand-held portion;
  a blade support movably coupled to the hand-held portion, the blade support including a blade mount defining a blade plane;
  a saw blade removably coupled to the blade support and disposed on the blade plane, the saw blade defining a longitudinal axis and a lateral axis, perpendicular to the longitudinal axis;
  an actuator assembly operatively attached to the blade support and the hand-held portion, the actuator assembly configured to move the blade support relative to the handheld portion in a plurality of degrees of freedom; and
  a handle alignment member extending from the hand-held portion, the handle alignment member including a handle alignment projection extending toward the blade mount, wherein at least a portion of the handle alignment projection is oriented at an oblique angle relative to the longitudinal axis and the lateral axis of the saw blade as the actuator assembly moves the blade support relative to the hand-held portion;
  wherein the portion of the handle alignment projection and the blade plane are aligned when the blade support has an optimal range of motion relative to the hand-held portion.

2. The hand-held surgical robotic system of claim 1, wherein the actuator assembly includes a plurality of actuators, and each of the plurality of actuators are configured to move between a first position and a second position to move the blade support relative to the hand-held portion, wherein a home position is a midpoint between the first position and the second position of each of the plurality of actuators, and the blade support has the optimal range of motion when at least two of the plurality of actuators are at their home position.

3. The hand-held surgical robotic system of claim 2, wherein the blade plane and the handle alignment projection are misaligned when the hand-held portion is in a pose that does not provide the optimal range of motion, providing visual indication that the hand-held portion is in a pose that does not provide the blade support with the optimal range of motion.

4. The hand-held surgical robotic system of claim 2, wherein the handle alignment member is arranged and sized relative to the blade support such that the handle alignment member does not collide with the blade support at any point between the first position and the second position of each of the plurality of actuators of the actuator assembly.

5. The hand-held surgical robotic system of claim 4, wherein the first position and the second position of the plurality of actuators define a range of motion of a distal end of the saw blade relative to the hand-held portion, the range of motion defining a space having a maximum height of about 150 mm and a maximum width of about 115 mm.

6. The hand-held surgical robotic system of claim 3, wherein the actuator assembly is configured to adjust at least one of a pitch, an elevation, and a roll of the blade support relative to the hand-held portion;
   wherein a first spatial arrangement of the handle alignment projection relative to the blade plane provides visual indication of at least one of a first pitch relationship, a first elevation relationship, and a first roll relationship of the blade support relative to the hand-held portion;
   wherein the first spatial arrangement provides visual indication that the handle alignment projection and the blade plane are aligned, and the blade support has the optimal range of motion relative to the hand-held portion;
   wherein a second spatial arrangement of the handle alignment projection relative to the blade plane provides visual indication of at least one of a second pitch relationship, a second elevation relationship, and a second roll relationship of the blade support relative to the hand-held portion; and
   wherein the second spatial arrangement provides visual indication that the hand-held portion is in a pose relative to the blade support that does not provide the blade support with the optimal range of motion.

7. The hand-held surgical robotic system of claim 6, wherein the handle alignment member is a first handle alignment member, and the handle alignment projection is a first handle alignment projection, and the hand-held surgical robotic system further comprises:
   a second handle alignment member extending from the hand-held portion at a separate location from the first handle alignment member, the second handle alignment member including a second handle alignment projection extending toward the blade mount, wherein at least a portion of the second handle alignment projection is oblique relative to the longitudinal axis and the lateral axis of the saw blade;
   wherein the first handle alignment projection and the second handle alignment projection are aligned with the blade plane when the blade support has the optimal range of motion relative to the hand-held portion.

8. The hand-held surgical robotic system of claim 7, wherein the actuator assembly is configured to adjust at least the pitch and the roll of the blade support relative to the hand-held portion;
   wherein the portion of the first handle alignment projection and the second handle alignment projection that is oblique provides visual indication of the pose of the hand-held portion relative to the blade support in at least two degrees of freedom such that the second spatial arrangement of the first handle alignment projection and the second handle alignment projection relative to the blade plane provides visual indication of at least the second pitch relationship and the second roll relationship of the blade support relative to the hand-held portion, providing visual indication that the hand-held portion is in a pose relative to the blade support that does not provide the blade support with the optimal range of motion.

9. The hand-held surgical robotic system of claim 3, further comprising a tool alignment member extending from the blade support, the tool alignment member including a tool alignment projection extending toward the blade mount, wherein at least a portion of the tool alignment projection is oblique relative to the longitudinal axis and the lateral axis of the saw blade.

10. The hand-held surgical robotic system of claim 9, wherein at least a portion of the tool alignment projection is oblique relative to the longitudinal axis and the lateral axis of the saw blade.

11. The hand-held surgical robotic system of claim 10, wherein the tool alignment projection defines a tool alignment edge, and the handle alignment member defines a handle alignment edge that is oblique relative to the longitudinal axis and the lateral axis of the saw blade;
   wherein the tool alignment edge is defined such that the tool alignment edge is offset from and parallel to the handle alignment edge when the blade support is aligned with the hand-held portion.

12. The hand-held surgical robotic system of claim 10, wherein the tool alignment projection and the handle alignment projection are misaligned when the hand-held portion is in a pose that does not provide the optimal range of motion, providing visual indication that the hand-held portion is in a pose that does not provide the blade support with the optimal range of motion.

13. The hand-held surgical robotic system of claim 10, wherein the handle alignment projection and the tool alignment projection include a first visual indicia and a second visual indicia, the first visual indicia being visually distinguishable from the second visual indicia; and
   wherein the first visual indicia of the handle alignment projection and the first visual indicia of the tool alignment projection are aligned when the tool alignment projection and the handle alignment projection are aligned, providing visual indication that the blade support has the optimal range of motion relative to the hand-held portion; and
   wherein the first visual indicia of the handle alignment projection and the first visual indicia of the tool alignment projection are misaligned when the tool alignment projection and the handle alignment projection are misaligned, providing visual indication that the hand-held portion is in a pose that does not provide the blade support with the optimal range of motion.

14. The hand-held surgical robotic system of claim 13, wherein each of the handle alignment projection and the tool alignment projection further comprises a beveled surface and a side surface; and
   wherein the beveled surface includes the first visual indicia, and the side surface includes the second visual indicia.

15. The hand-held surgical robotic system of claim 1, further comprising:
   a shroud coupled to and extending between the blade support and the hand-held portion;
   wherein the shroud defines at least two shroud landmarks configured to displace relative to each other when the blade support and the hand-held portion are misaligned relative to each other such that the hand-held portion is in a pose that does not provide the optimal range of motion to provide visual indication of a pose of the blade support relative to the hand-held portion.

16. The hand-held surgical robotic system of claim 15, wherein the at least two shroud landmarks include at least two creases, wherein the at least two creases define planes that are substantially parallel and offset from one another by a first distance the blade support has an optimal range of motion relative to the hand-held portion; and wherein the at least two creases displace from each other at a second distance when the blade support and the hand-held portion are misaligned relative to each other such that the hand-held portion is in a pose that does not provide the optimal range of motion to provide visual indication of a pose of the blade support relative to the hand-held portion.

17. The hand-held surgical robotic system of claim 16, wherein the at least two creases are substantially parallel to the blade plane when the blade support and the hand-held portion are aligned relative to each other.

18. The hand-held surgical robotic system of claim 15, wherein the handle alignment member includes at least two shroud alignment members;
  wherein the at least two shroud alignment members are configured to be aligned with the at least two shroud landmarks when the blade support is aligned with the hand-held portion; and
  wherein the at least two shroud alignment members are misaligned with the at least two shroud landmarks when the blade support and the hand-held portion are misaligned relative to each other such that the hand-held portion is in a pose that does not provide the optimal range of motion to provide visual indication of a pose of the blade support relative to the hand-held portion.

19. The hand-held surgical robotic system of claim 1, wherein the portion of the handle alignment projection that is at an oblique angle relative to the longitudinal axis and the lateral axis defines a curve.

\* \* \* \* \*